Aug. 30, 1960 L. D. AMDAHL ET AL 2,951,232

TAPE CONTROL CIRCUITS

Filed Nov. 21, 1955 56 Sheets-Sheet 1

INVENTORS
KENNETH E. SCHREINER-LOWELL D. AMDAHL
JOHN P. CEDARHOLM-NORMAN F. EICHENBERGER
BYRON L. HAVENS-JOACHIM JEENEL

BY [signature]

ATTORNEY

INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY John A. Hall
ATTORNEY INVENTORS
KENNETH E. SCHREINER-LOWELL D. AMDAHL
JOHN P. CEDARHOLM-NORMAM F. EICHENBERGER
BYRON L. HAVENS-JOACHIM JEENEL
BY John A. Hall
ATTORNEY INVENTORS
KENNETH E. SCHREINER-LOWELL D. AMDAHL
JOHN P. CEDARHOLM-NORMAM F. EICHENBERGER
BYRON L. HAVENS-JOACHIM JEENEL
BY [signature]
ATTORNEY INVENTORS
KENNETH E. SCHREINER-LOWELL D. AMDAHL
JOHN P. CEDARHOLM-NORMAN F. EICHENBERGER
BYRON L. HAVENS-JOACHIM JEENEL
BY [signature]
ATTORNEY INVENTORS
KENNETH E. SCHREINER-LOWELL D. AMDAHL
JOHN P. CEDARHOLM-NORMAM F. EICHENBERGER
BYRON L. HAVENS-JOACHIM JEENEL
BY [signature]
ATTORNEY Aug. 30, 1960 L. D. AMDAHL ET AL 2,951,232

TAPE CONTROL CIRCUITS

Filed Nov. 21, 1955 56 Sheets-Sheet 7

INVENTORS
KENNETH E. SCHREINER-LOWELL D. AMDAHL
JOHN P. GEDARHOLM-NORMAN F. EICHENBERGER
BYRON L. HAVENS-JOACHIM JEENEL

BY [signature]

ATTORNEY

INVENTORS
KENNETH E. SCHREINER-LOWELL D. AMDAHL
JOHN P. CEDARHOLM-NORMAM F. EICHENBERGER
BYRON L. HAVENS-JOACHIM JEENEL
BY [signature]
ATTORNEY Aug. 30, 1960 L. D. AMDAHL ET AL 2,951,232

TAPE CONTROL CIRCUITS

Filed Nov. 21, 1955 56 Sheets-Sheet 9

INVENTORS
KENNETH E. SCHREINER-LOWELL D. AMDAHL
JOHN P. CEDERHOLM-NORMAN F. EICHENBERGER
BYRON L. HAVENS- JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY John A. Hall
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—NORMAN F. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY
ATTORNEY Aug. 30, 1960 L. D. AMDAHL ET AL 2,951,232

TAPE CONTROL CIRCUITS

Filed Nov. 21, 1955 56 Sheets-Sheet 20

INVENTORS
KENNETH E. SCHREINER-LOWELL D. AMDAHL
JOHN P. CEDARHOLM-NORMAN F. EICHENBERGER
BYRON L. HAVENS-JOACHIM JEENEL
BY [signature]
ATTORNEY Aug. 30, 1960 L. D. AMDAHL ET AL 2,951,232

TAPE CONTROL CIRCUITS

Filed Nov. 21, 1955 56 Sheets-Sheet 21

INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY John A. Hall
ATTORNEY Aug. 30, 1960 L. D. AMDAHL ET AL 2,951,232

TAPE CONTROL CIRCUITS

Filed Nov. 21, 1955 56 Sheets-Sheet 22

INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS– JOACHIM JEENEL
BY
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH P. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY Aug. 30, 1960 L. D. AMDAHL ET AL 2,951,232

TAPE CONTROL CIRCUITS

Filed Nov. 21, 1955 56 Sheets-Sheet 27

INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY John A. Hall
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY Aug. 30, 1960 L. D. AMDAHL ET AL 2,951,232

TAPE CONTROL CIRCUITS

Filed Nov. 21, 1955 56 Sheets-Sheet 39

INVENTORS
KENNETH E. SCHREINER - LOWELL D. AMDAHL
JOHN P. CEDARHOLM - NORMAN F. EICHENBERGER
BYRON L. HAVENS - JOACHIM JEENEL
BY
ATTORNEY

INVENTORS
KENNETH E. SCHREINER - LOWELL D. AMDAHL
JOHN P. CEDARHOLM - NORMAN F. EICHENBERGER
BYRON L. HAVENS - JOACHIM JEENEL
BY
ATTORNEY

INVENTORS
KENNETH E. SCHREINER - LOWELL D. AMDAHL
JOHN P. CEDARHOLM - NORMAN F. EICHENBERGER
BYRON L. HAVENS - JOACHIM JEENEL
BY [signature]
ATTORNEY Aug. 30, 1960 L. D. AMDAHL ET AL 2,951,232

TAPE CONTROL CIRCUITS

Filed Nov. 21, 1955 56 Sheets-Sheet 42

INVENTORS
KENNETH E. SCHREINER - LOWELL D. AMDAHL
JOHN P. CEDARHOLM - NORMAN F. EICHENBERGER
BYRON L. HAVENS - JOACHIM JEENEL

BY [signature]

ATTORNEY

INVENTORS
KENNETH E. SCHREINER - LOWELL D. AMDAHL
JOHN P. CEDARHOLM - NORMAN F. EICHENBERGER
BYRON L. HAVENS - JOACHIM JEENEL
BY
ATTORNEY

INVENTORS
KENNETH E. SCHREINER - LOWELL D. AMDAHL
JOHN P. CEDARHOLM - NORMAN F. EICHENBERGER
BYRON L. HAVENS - JOACHIM JEENEL
BY John A. Hall
ATTORNEY INVENTORS
KENNETH E. SCHREINER - LOWELL D. AMDAHL
JOHN P. CEDARHOLM - NORMAN F. EICHENBERGER
BYRON L. HAVENS - JOACHIM JEENEL
BY [signature]
ATTORNEY Aug. 30, 1960 L. D. AMDAHL ET AL 2,951,232

TAPE CONTROL CIRCUITS

Filed Nov. 21, 1955 56 Sheets-Sheet 46

INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS– JOACHIM JEENEL
BY [signature]
ATTORNEY INVENTORS
KENNETH E. SCHREINER—LOWELL D. AMDAHL
JOHN P. CEDARHOLM—NORMAN F. EICHENBERGER
BYRON L. HAVENS—JOACHIM JEENEL
BY [signature]
ATTORNEY INVENTORS
KENNETH E. SCHREINER–LOWELL D. AMDAHL
JOHN P. CEDARHOLM–NORMAN F. EICHENBERGER
BYRON L. HAVENS– JOACHIM JEENEL
BY John A. Hall
ATTORNEY INVENTORS
KENNETH E. SCHREINER–LOWELL D. AMDAHL
JOHN P. CEDARHOLM–NORMAN F. EICHENBERGER
BYRON L. HAVENS–JOACHIM JEENEL
BY [signature]
ATTORNEY INVENTORS
KENNETH E. SCHREINER–LOWELL D. AMDAHL
JOHN P. CEDARHOLM–NORMAM F. EICHENBERGER
BYRON L. HAVENS–JOACHIM JEENEL
BY [signature]
ATTORNEY INVENTORS
KENNETH E. SCHREINER–LOWELL D. AMDAHL
JOHN P. CEDARHOLM–NORMAM F. EICHENBERGER
BYRON L. HAVENS–JOACHIM JEENEL
BY [signature]
ATTORNEY INVENTORS
KENNETH E. SCHREINER – LOWELL D. AMDAHL
JOHN P. CEDARHOLM – NORMAN F. EICHENBERGER
BYRON L. HAVENS – JOACHIM JEENEL
BY [signature]
ATTORNEY Aug. 30, 1960

L. D. AMDAHL ET AL

TAPE CONTROL CIRCUITS 2,951,232

Filed Nov. 21, 1955

56 Sheets-Sheet 55

INVENTORS
KENNETH E. SCHREINER-LOWELL D. AMDAHL
JOHN P. CEDARHOLM-NORMAN F. EICHENBERGER
BYRON L. HAVENS-JOACHIM JEENEL

BY [signature]

ATTORNEY

INVENTORS
KENNETH E. SCHREINER-LOWELL D. AMDAHL
JOHN P. CEDARHOLM-NORMAN F. EICHENBERGER
BYRON L. HAVENS-JOACHIM JEENEL
BY [signature]
ATTORNEY United States Patent Office 2,951,232
Patented Aug. 30, 1960

2,951,232

TAPE CONTROL CIRCUITS

Lowell D. Amdahl, Redondo Beach, Calif., Byron L. Havens, Closter, N.J., Joachim Jeenel, New York, N.Y., Kenneth E. Schreiner, Harrington Park, N.J., John P. Cedarholm, New York, N.Y., and Norman F. Eichenberger, Cincinnati, Ohio, assignors to International Business Machines Corporation, New York, N.Y., a corporation of New York Filed Nov. 21, 1955, Ser. No. 547,983

6 Claims. (Cl. 340—172.5)

This invention relates to tapes used in large scale calculators on to which coded information may be recorded and from which coded information may be taken.

The specific type of tape herein disclosed is magnetic, that is, it is essentially of such nature that it may be magnetized and having high retentivity will remain indefinitely in that state. The material of this tape has properties generally defined by a virtually square hysteresis curve so that having been magnetized in a positive sense it will remain magnetized until a magnetomotive force of more than enough to drive it to the opposite state is applied.

Coded information may be recorded on such a tape by causing a change of state wherever a bit is to be recorded, that is, where the tape is moving past a recording means, this means will be controlled to apply a field in one direction thereto and when a bit is entered, the field will be reversed. Thus a long string of bits will appear as a long string of reversals of the magnetic state of the tape. It is immaterial whether the change is from a positive sense to a negative sense or otherwise, the record consisting merely of a change from one state to another. In recording new information on a tape where information was previously entered, a separate pass for the erasure of the old information is not necessary as this is automatically done during the recording of the new information.

In the specific embodiment of the present invention the digits of a word are recorded successively along the tape, but each digit contains a plurality of bits recorded simultaneously. Where a digit is expressed in a four place code the tape will contain four parallel tracks.

The information may be recorded while the tape is moving in either direction and may be read out while the tape is moving in either direction. For practical purposes the tape is caused to move in only one direction for recording, but is moved in both directions for reading out.

Within the calculator where this tape is employed there are two fundamental operations carried out, the reading of information in to the tape and the reading of information out of the tape. In each case the tape is moved at high speed past a recording and detecting head, for affecting the magnetic state of the tape and for controlling circuits in accordance with the magnetic state thereof.

The tape is used for two general purposes, the first as an intermediate speed device for entering information into the calculator and the second as a storage device. It will be realized that a high speed calculator working on a megacycle basis, operates in such manner that it would be entirely uneconomic to enter information by hand or even by punched card. Hence programming is accomplished by first preparing stacks of business machine cards containing the operational and informational codes, then transferring this information to tapes and finally entering the information from the tapes to the calculator.

During the operation of the calculator and after programming information has been properly entered, the tapes may be used for storage purposes, that is results and partial results may be recorded thereon instead of being put in storage. Since the records stored in the calculator are of an ephemeral character, the tape may be used as a means to preserve the record within the calculator if and when the operations thereof are brought to a halt for any one of a number of reasons. The records on the tape are permanent (unless knowingly erased). Thus the tapes may be used for storage of tables and a large file of such tapes may be stored for future use when such tables are needed in further calculations.

A feature of the invention is a method of recording information in such manner that it may be read out from a tape with equal facility in either direction. The tape has magnetic properties such that when magnetized in a positive sense it will retain that condition indefinitely, unless a force is applied to strongly magnetize it in a negative sense. There is then a flip-flop movement in the magnetic state of the tape. Recording of information consists of a flip-flop reversal of the magnetization and since the record may be read out, not by noting the direction or sense of the magnetization, but by noting the reversals it will be clear that the recorded signals may be read as the tape moves in either direction.

A feature of the invention is the use of what might be termed illegitimate numbers for special signals. In the binary decimal system used herein each decimal digit appears in pure binary code 0001 for 1, 0010 for 2, and so forth. This four place code, however, is capable of expressing, in addition to the ten digits, certain two digit decimal numbers (10 to 15 inclusive) and these are generally considered illegitimate numbers and are automatically reported in the working of the calculator as greater than nine errors. In the tape circuits of the present invention certain of these numbers are used as signals since the report will be the same, read forwards or read backwards. An ordinary 12 expressed as 0001, 0010 if read backwards would appear as 21 and since the tapes must be read as they run in either direction it is essential that single code signals be used. Also since all of the ten digits must be used for numeric information no one of such commonly used codes may be employed as signals.

This feature may therefore be stated as the use of single code signals, ordinarily regarded as erroneous and outside the category of legitimate informational code signals, for dispersal among such informational code signals for operational purposes. Such signals will be spoken of hereinafter as character 12 or character 13 signals and it will be understood that such terminology is used to define a single code signal rather than a plurality of ordinarily used digital codes.

There are twelve tape address switches and but eight tape units. Since each tape is characterized by a particular address there are twelve tape address switches whereby the routiner may locate any one of the tapes (up to eight in number) by its characterizing number. Thus in a given problem, cited by way of example, a tape characterized by the address number seven may actually be placed in tape unit number three, so that in some routine operation where tape address seven appears, the tape address switch number seven will set up circuits to render the number three tape unit operative.

Generally, tapes having addresses one to eight inclusive are the so-called problem tapes whereas those having addresses nine to twelve are known as the library routines, the compiling routines, the tracing programs (known by the inelegant but nevertheless expressive pseudonym as debugging tapes) and test routine tapes for exercising the calculator. Experience has shown that eight tapes are ample for any operation, but the provision of twelve addresses and the twelve address switches make it a simple matter to add additional tape units without any structural changes in the calculator when and if expansion of facilities becomes necessary.

A feature of the invention is the alternate use of two tapes for iterative operations where one may be used for reading out and the other used for reading in on one operation and where these roles are reversed on a succeeding operation. Such two tapes will be given the addresses 1 and 11, or 2 and 12, by way of example, so that the advance in operations is made by the simple addition of the value ten in each instance, the modulo 20 value being used for the actual address. Thus, on the first operation the address will be 01, by way of example, on the second operation the address will be 01+10=11, on the third operation the address will be 11+10−20=01, on the fourth operation the address will be 21+10−20=11, and so on. Thus by the iterative addition of ten to the tape address on each operation the physically two tapes will be alternately approached and the functions or roles of these two tapes will be alternated. This has nothing to do with the physical capacity of the tapes, but is a unique operation provided to increase the speed of the calculator since in many problems the output of one operation is used as the input of a succeeding operation and hence the alternate use of these two tapes provides a ready means for expeditiously carrying out such operations. This addition of the value 10 is made by the routiner so that the tape addresses appear in the instruction register as 01 and 11 alternately. These addresses direct the use of those tape units which respond to the setting of address switches 1 and 11. Thus by the use of a greater number of address switches than the number of tape units and particularly by the use of switches having the same units digit but different tens digits, the selection of tape units may be simplified particularly in carrying out iterative operations.

Another feature of the invention is a novel means for synthesizing operating signals to be written on tape to flank the blocks of informational signals known as words. It will be noted that an entire block of words is flanked at each end by an instruction word and that the extremes of these words are the flanking character 13 signals. Each word, other than the instruction words, is flanked by the character 12 signal and since such signals are many times more numerous than the character 13 signals, no special means for entering a character 13 signal is provided with the exception of an auxiliary terminal used in conjunction with the means provided to enter the character 12. The use of this auxiliary terminal has the effect of adding the value 1 to the character 12 signal to produce the character 13 signal. This is possible since the character 12 signal is actually the binary representation of the value 12 and adding a 1 bit thereto produces the binary representation of the value 13.

A feature of this means is the fact that no binary adder is used or is necessary because the character 12 signal has a binary 0 bit at the code place where this forced 1 bit is placed so that by forcing in this 1 bit the desired character 13 is formed.

Another feature of the invention is the means employed for transferring information to and from tape. Information to be written on tape consists of a plurality of informational codes registered and coexisting in a storage register. In order to write these codes on tape they must be presented one after the other, not simultaneously but in seriatum. Consequently, a temporary register, known herein as Register 1, is employed into which the plurality (17) of codes may be transferred simultaneously, that is within the same single time period. Thereafter they are shifted, step by step until each has been shifted out of the register either at one end or the other where each is then used in the writing operation. In the reading operation the opposite procedure is employed, that is, the codes are entered into the last code place of the register one at a time and as each is entered all are shifted until the entire register is filled, whereupon all are transferred to storage simultaneously.

However, the character 12 and character 13 signals are handled in a different manner. At the beginning of a writing operation, a character 13 is entered into the extreme code place or latch of the register and is then shifted step by step until the register is completely filled with this character. On the next shifting operation, as the character 13 is shifted out of the last place of the register, every place therein is cleared and a word from storage is entered in place of this complete line of characters 13. Thereupon, and on the next shifting operation as the code at the head of the line is shifted out and then written on tape, a character 12 is entered in the last place now just vacated by the code at the end of the line. As the word is shifted out, step by step, the register is filled step by step with characters 12 until again the register is completely filled with such signals. Thus the operational codes are entered in seriatim, the informational codes are entered simultaneously and all, both operational and informational are transferred to the writing circuits in seriatim, all but one of the operational codes per word being discarded.

Another feature of the invention is a means for translating recurring binary bits into alternate on and off signals. Each binary code, registrable in a temporary storing register is characterized by an UP condition for expressing a binary 1 bit and a DOWN condition for expressing a binary 0 bit and the conventional temporary storing register is provided with a latch for each code place, which latch is triggered by a binary 1 bit and released when another code is to be recorded. The writing of codes on magnetic tape, however, requires that the codes be translated, for the recording is in the form of a change in magnetic state in either direction from negative to positive or from positive to negative. Thus along on a bit track a first bit encountered will change the magnetic state of the tape from negative to positive and a second bit encountered will change the magnetic state back from positive to negative. Thus the translating means employed is characterized by the use of binary latches, that is, latches each of which will respond to one type of bit (the binary 0 bit or the binary 1 bit) and will change its state on or off to off or on respectively. In the particular type circuit herein employed, the binary latches are made responsive to the binary 0 bits so that the codes as written are inverted. It may be noted that as codes are read out of the tape they are again inverted so as to appear in the circuitry beyond in their true form.

Other features will appear hereinafter.

The drawings consist of fifty-six sheets having sixty-three figures, as follows.

Figure 9:
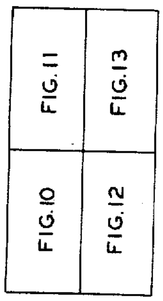
Fig. 9 is a block diagram showing how Figs. 10, 11, 12 and 13 should be placed to form a timing chart for the operations in which data is taken from the CRT storage and written on tape.
Figure 10:
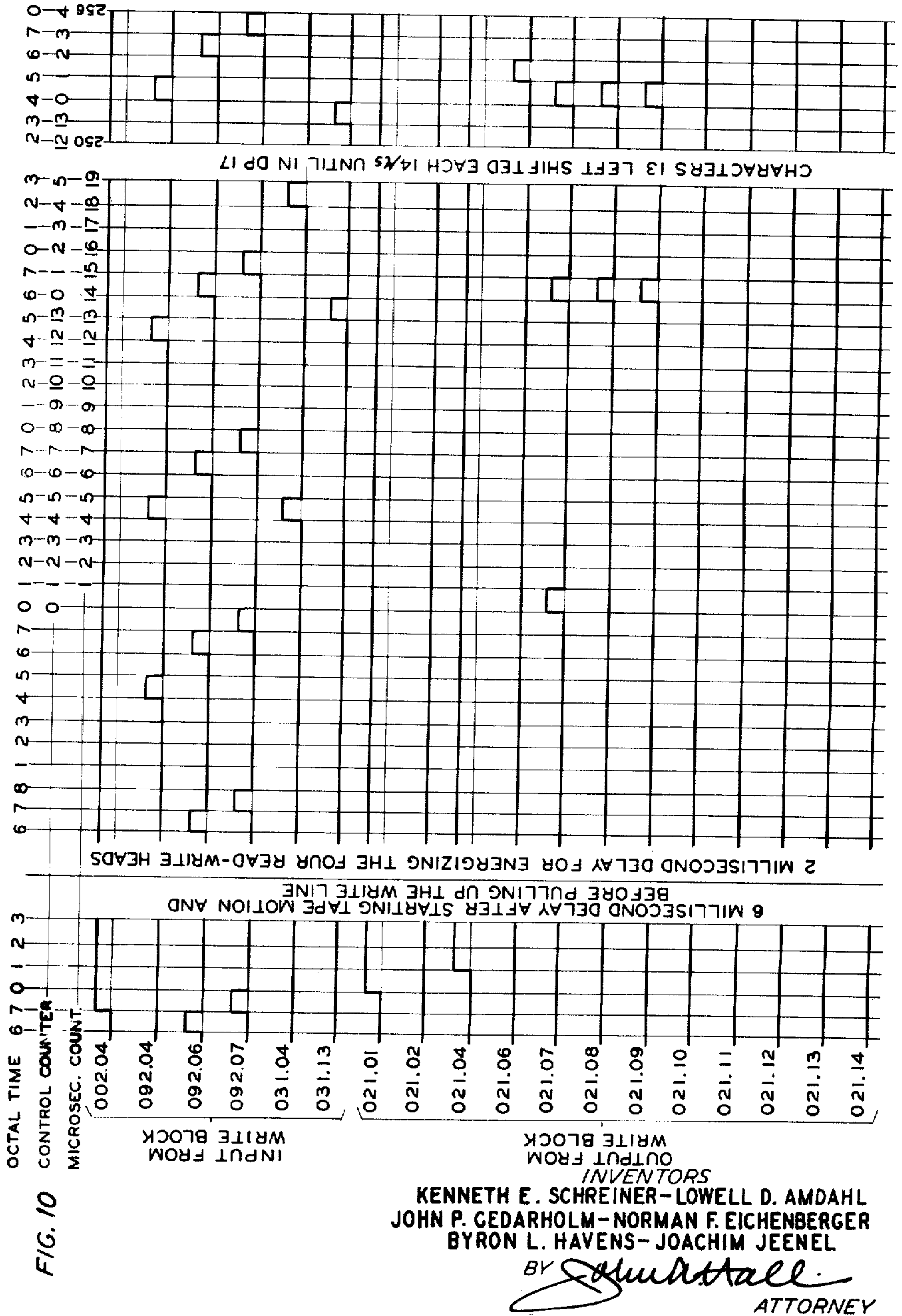
Figure 11:
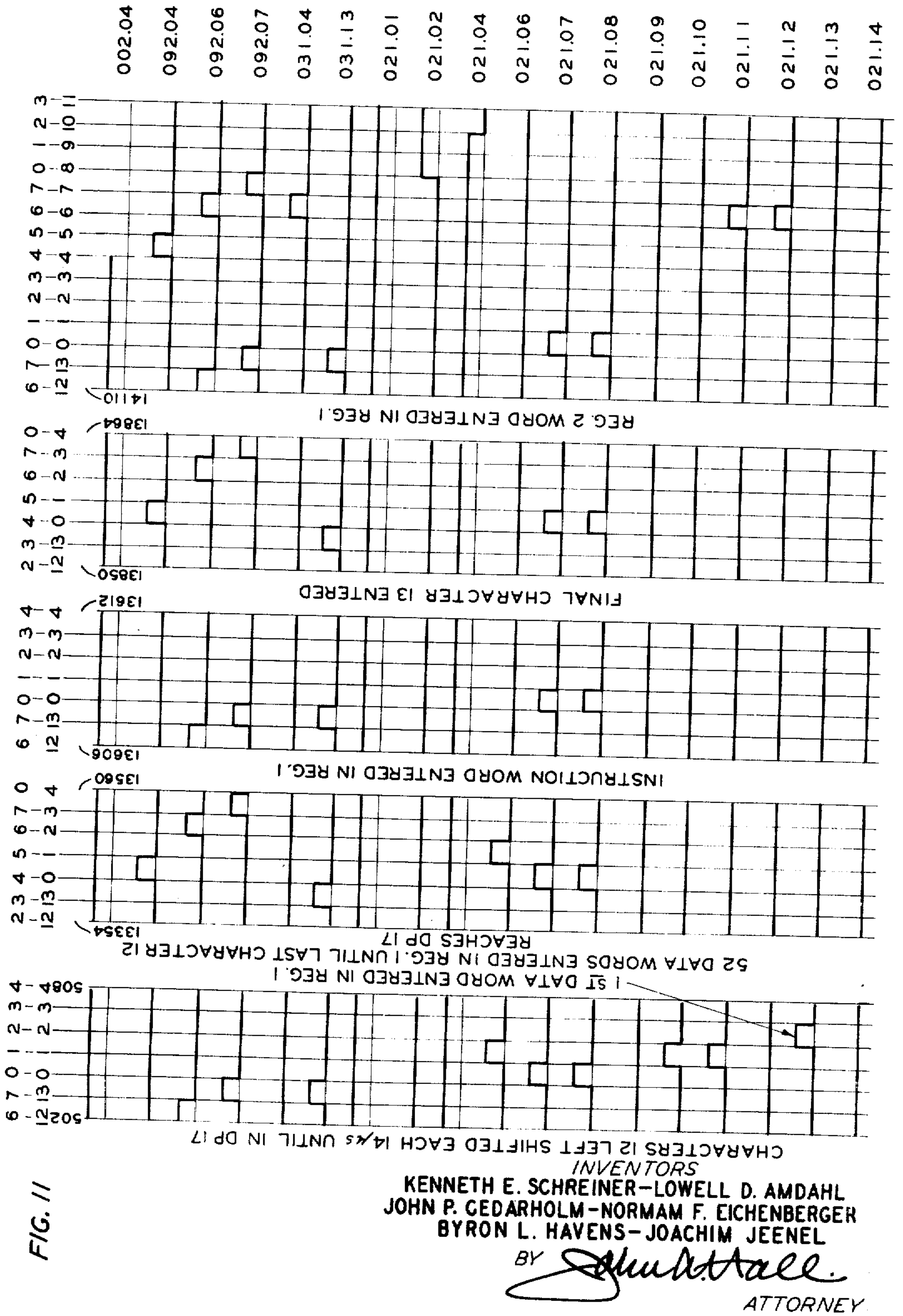
Figure 13:
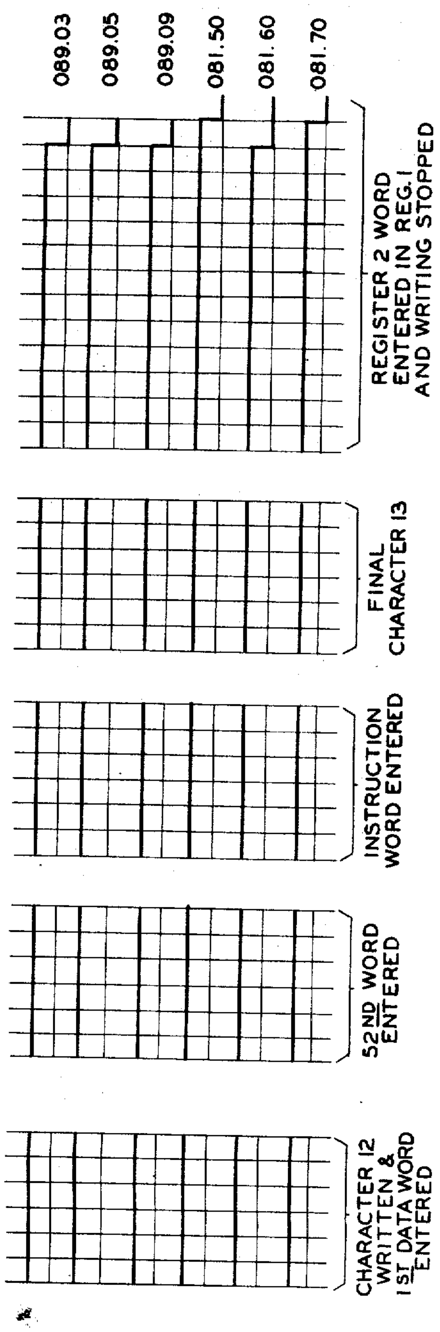
Figure 14:
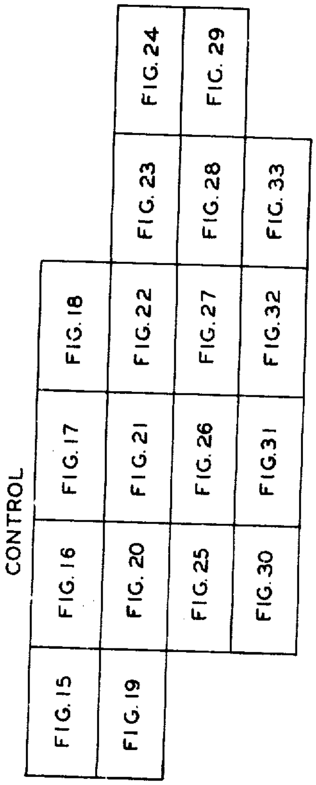
Figure 44:
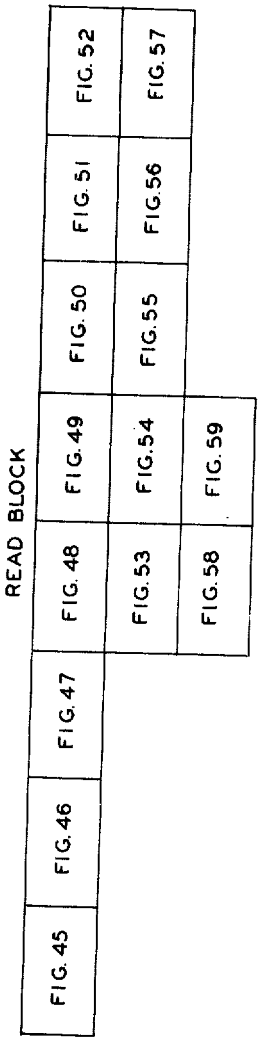
Figure 34:
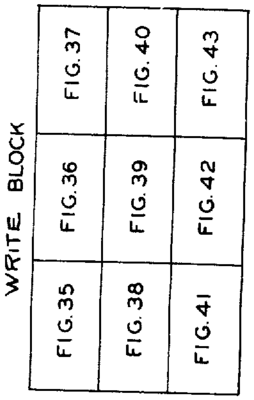
Figure 15:
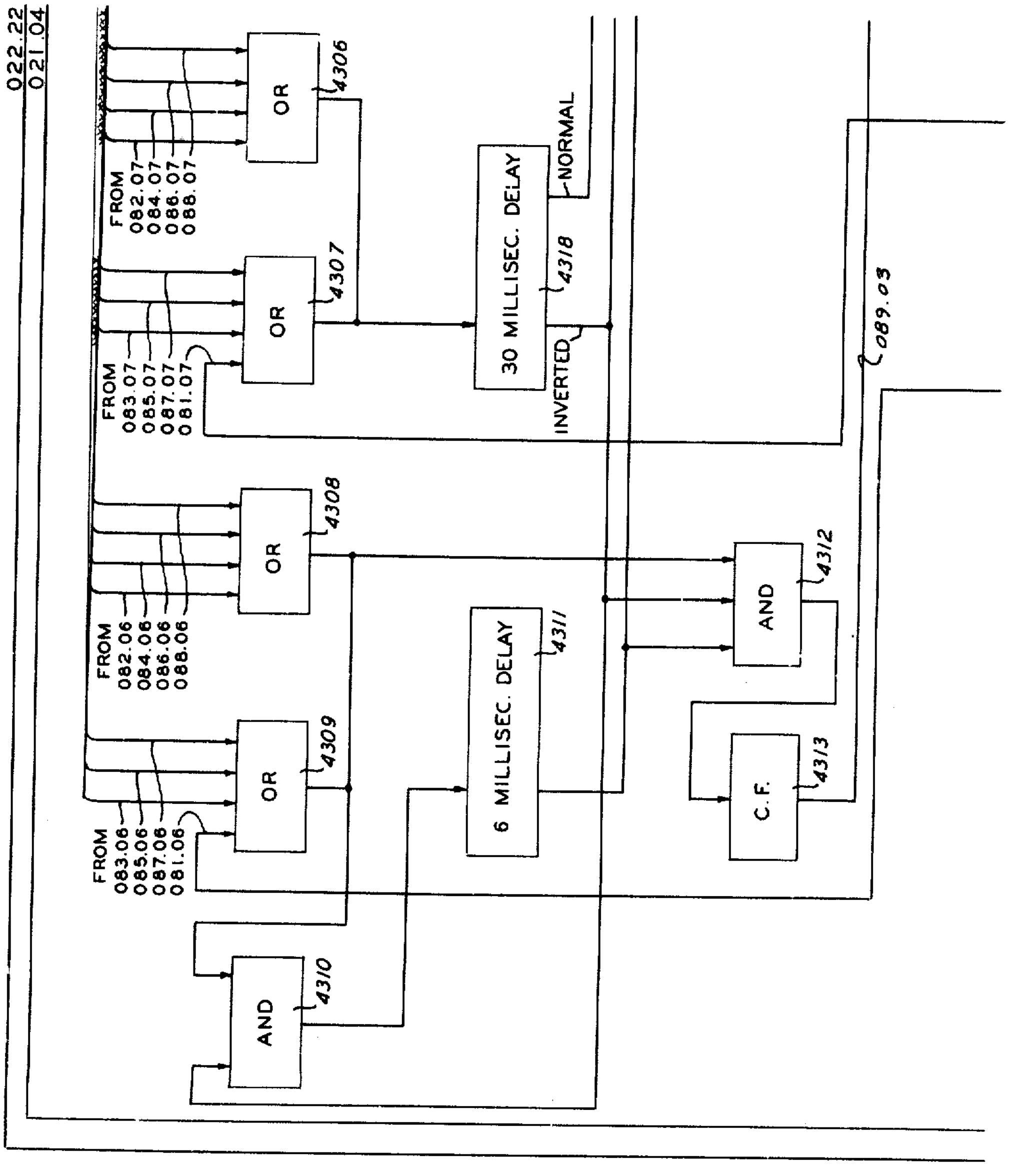
Figure 16:
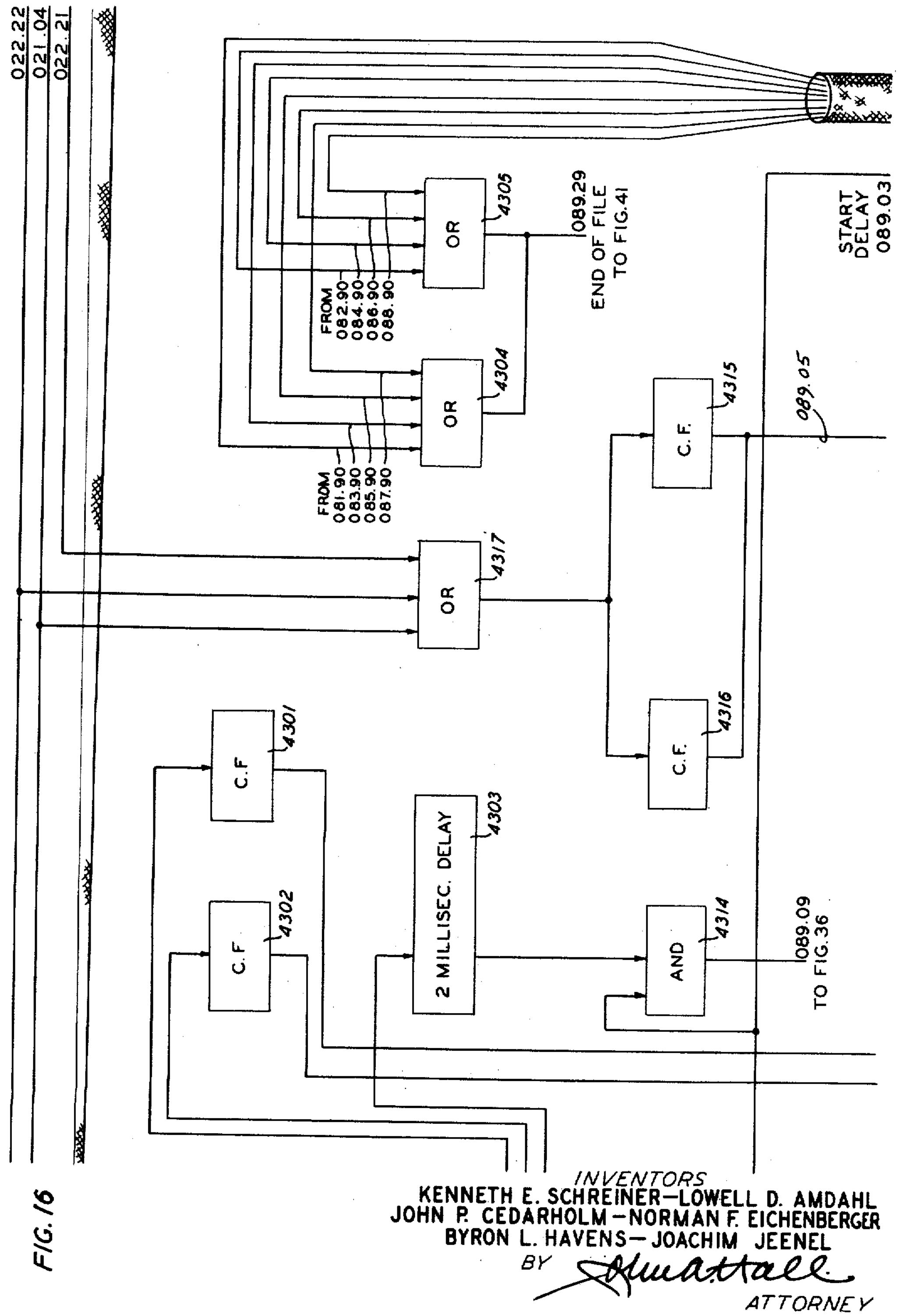
Figure 17:
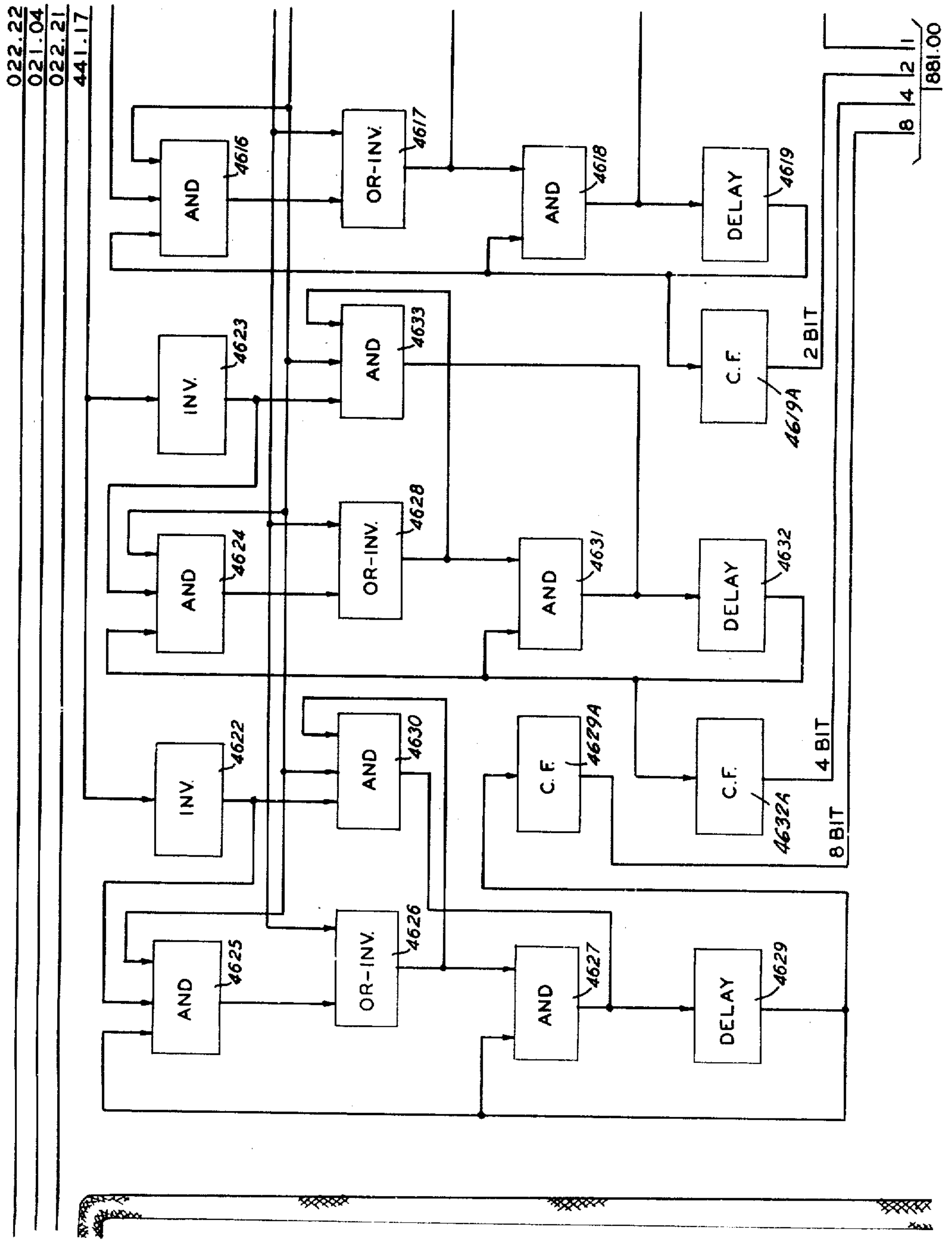
Figure 18:
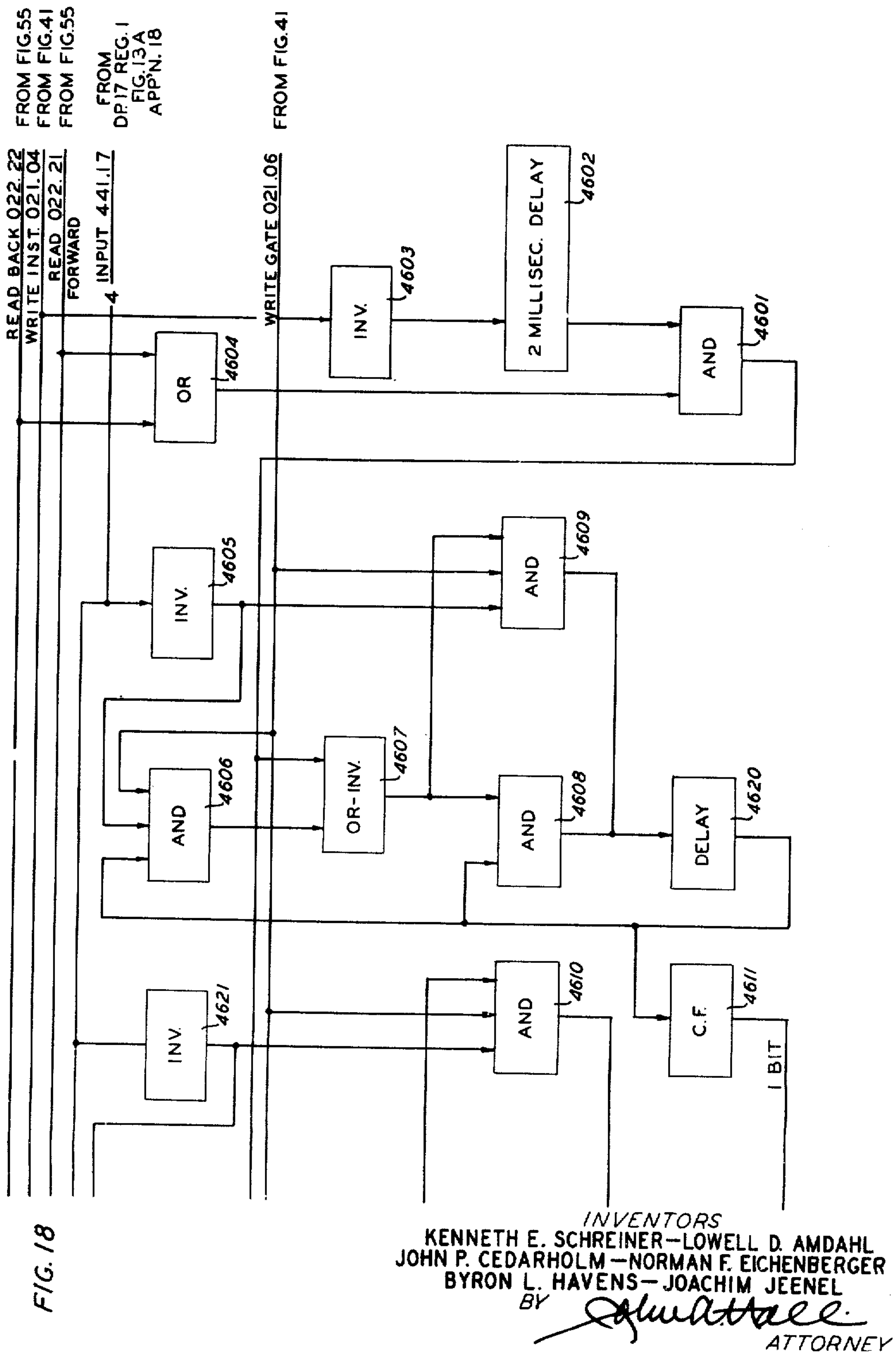
Figure 19:
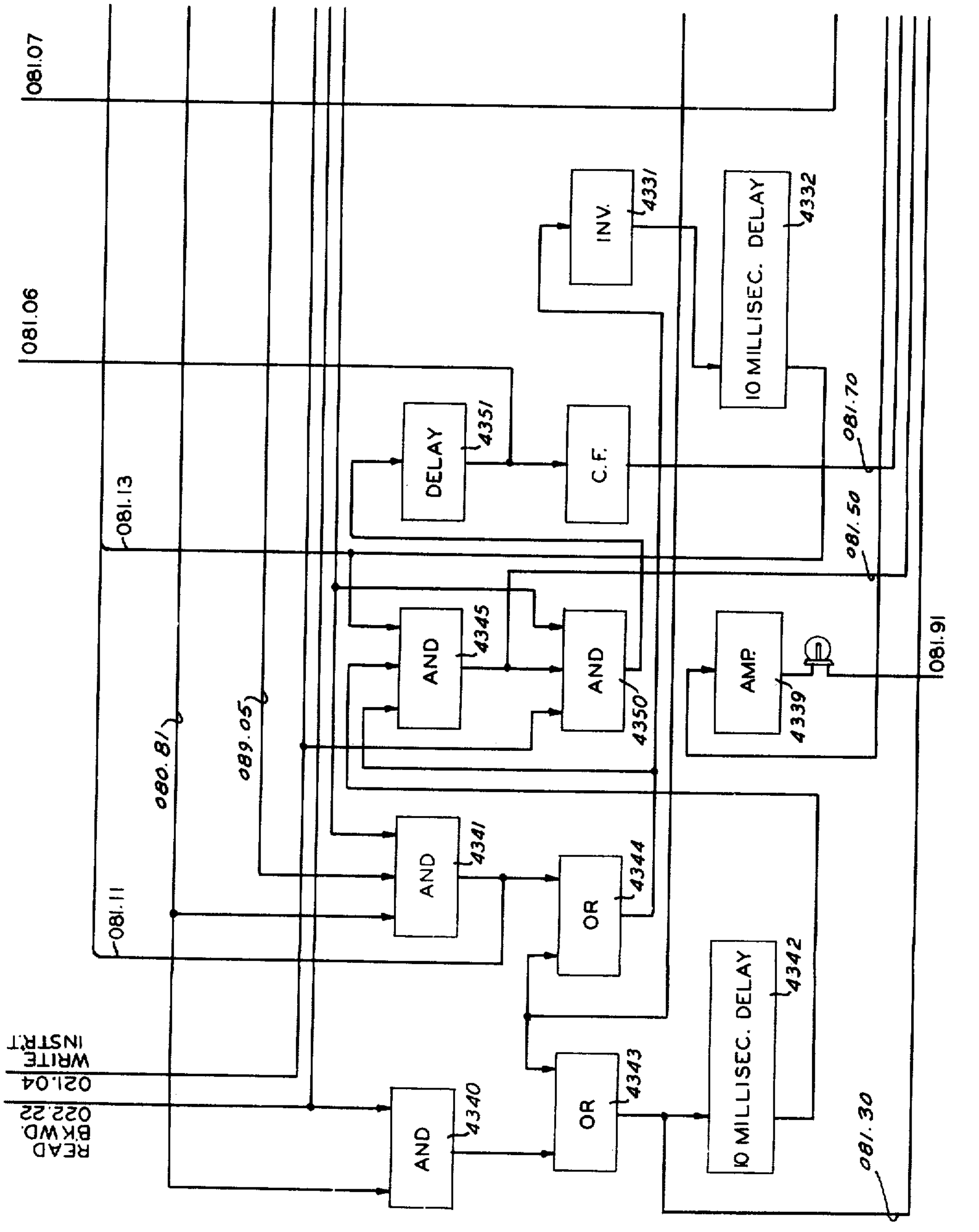
Figure 20:
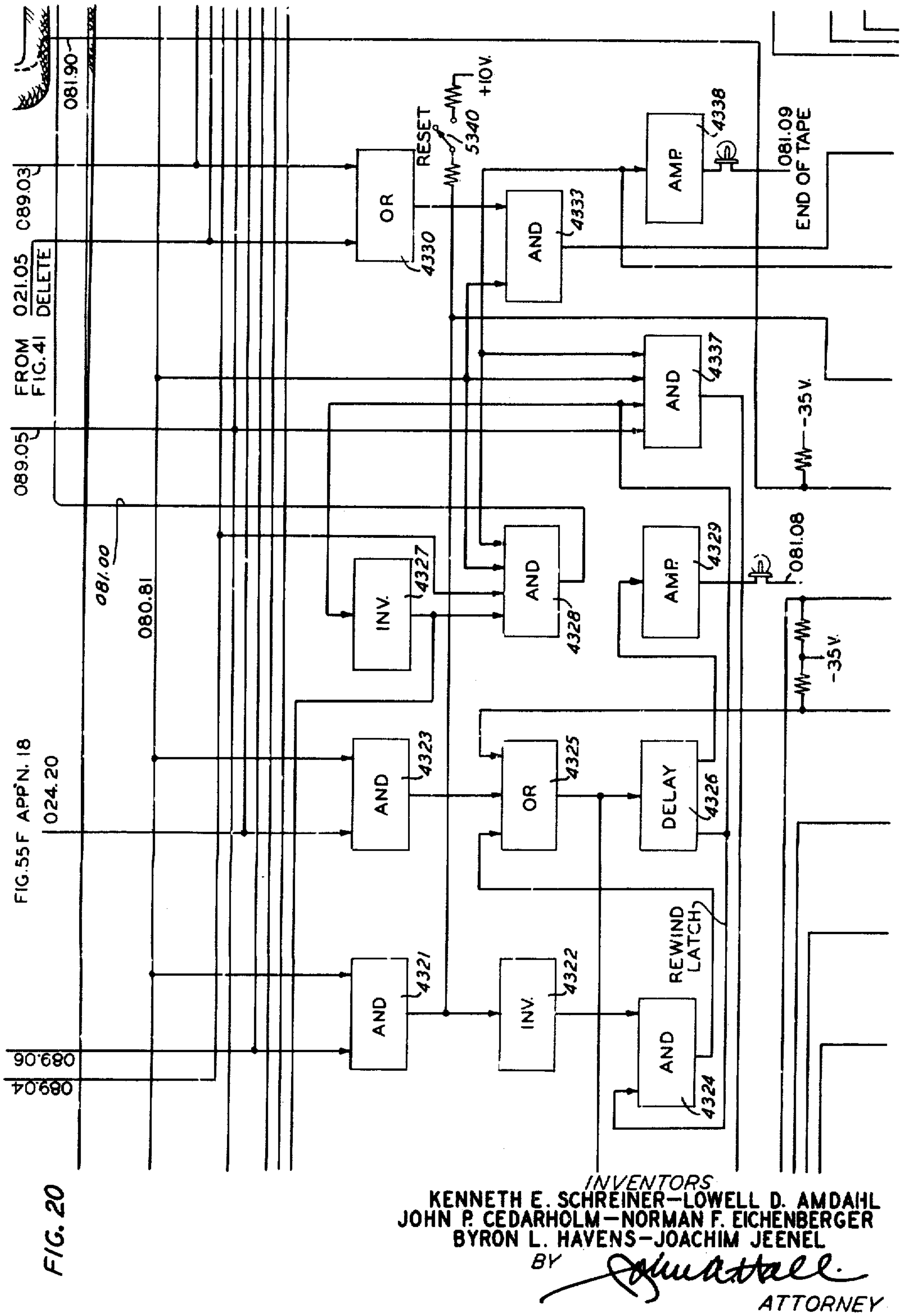
Figure 21:
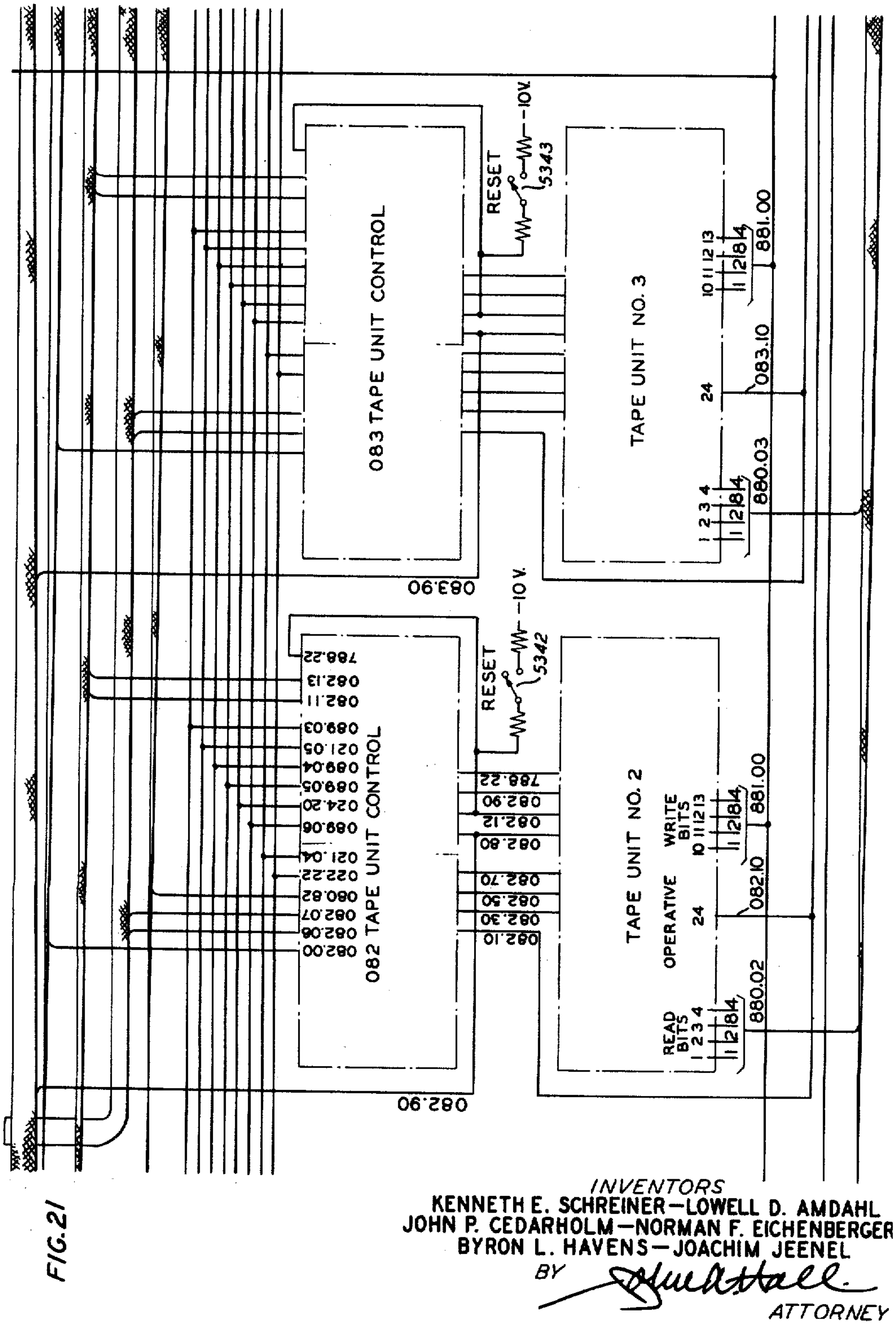
Figure 22:
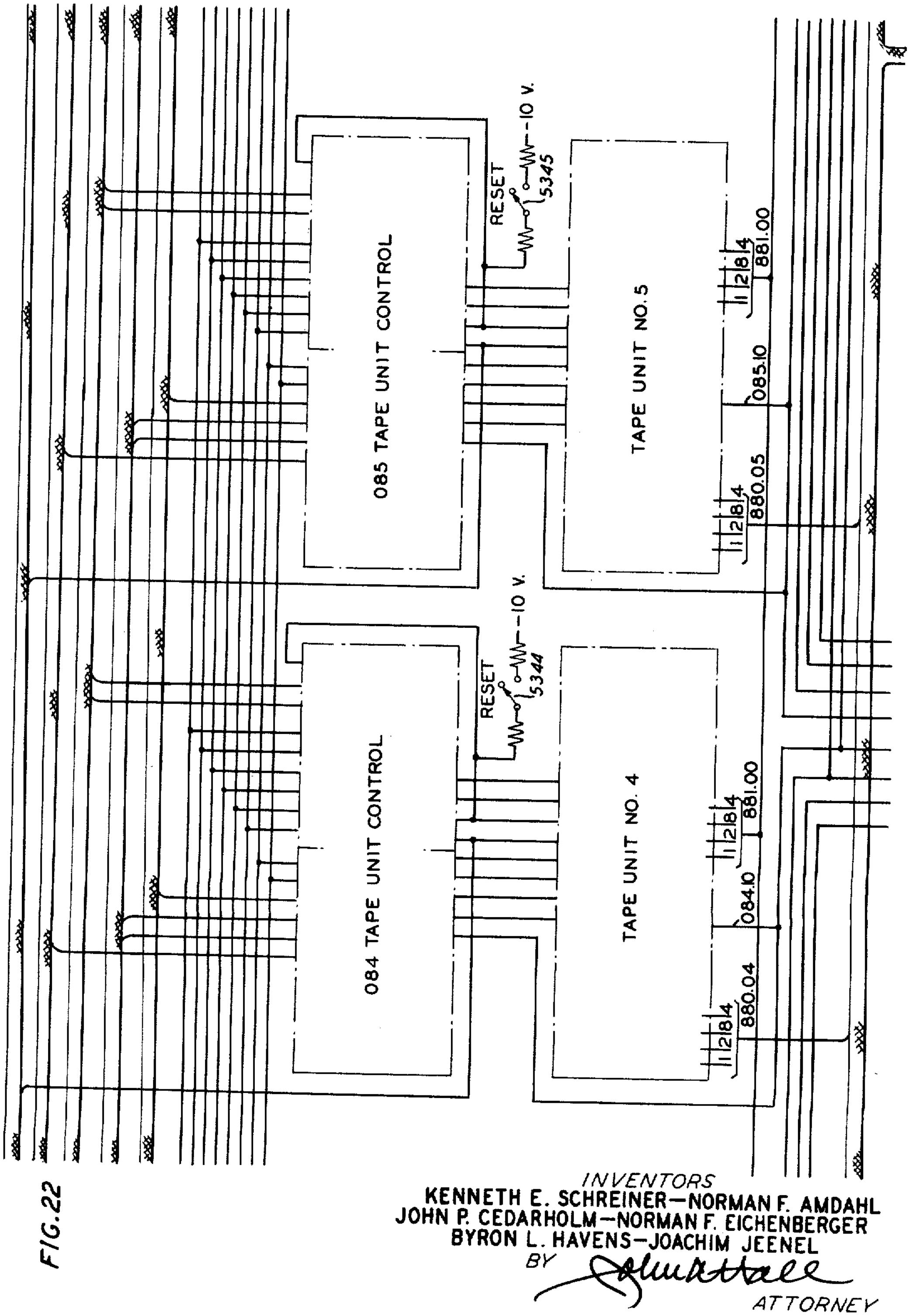
Figure 25:
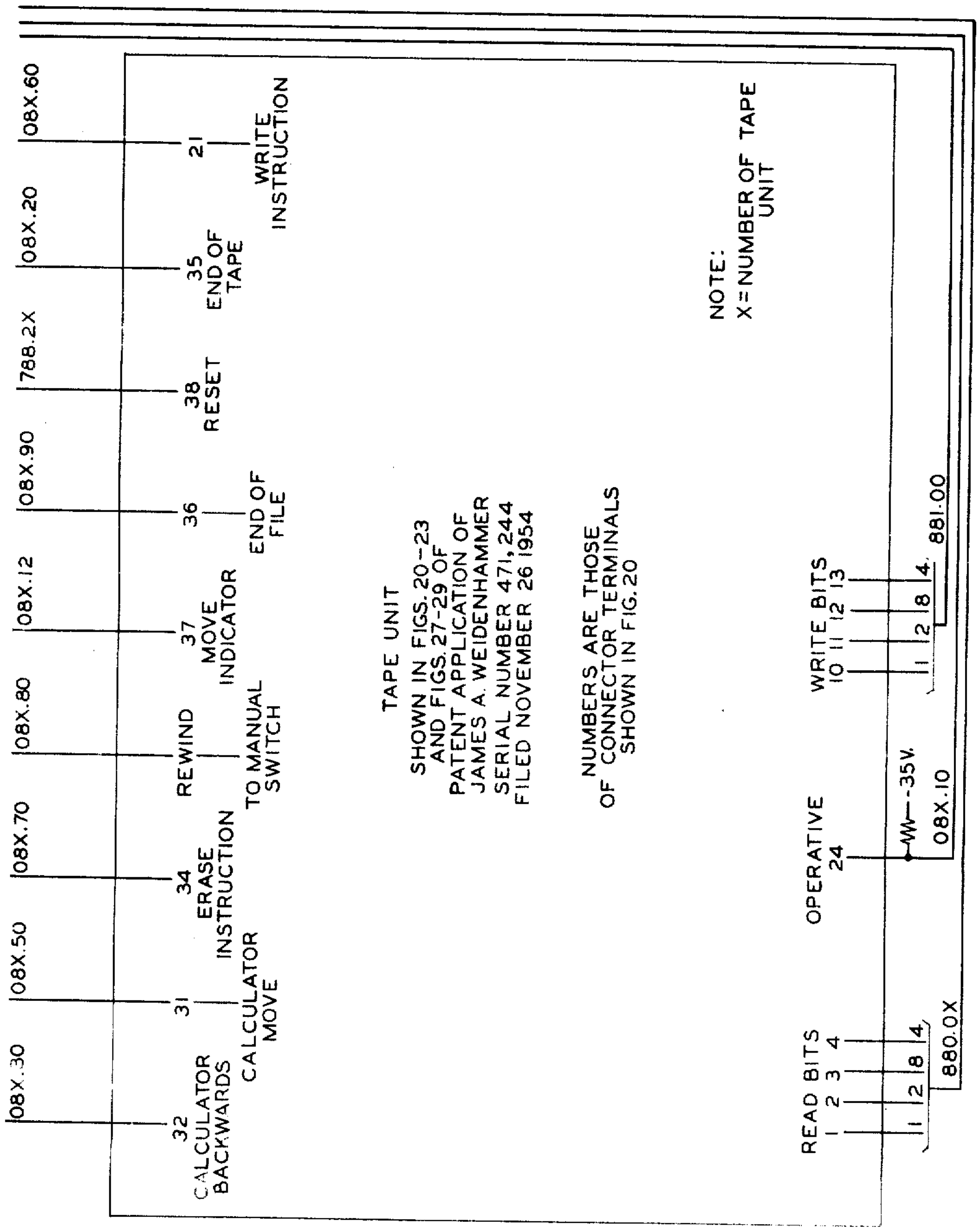
Figure 27:
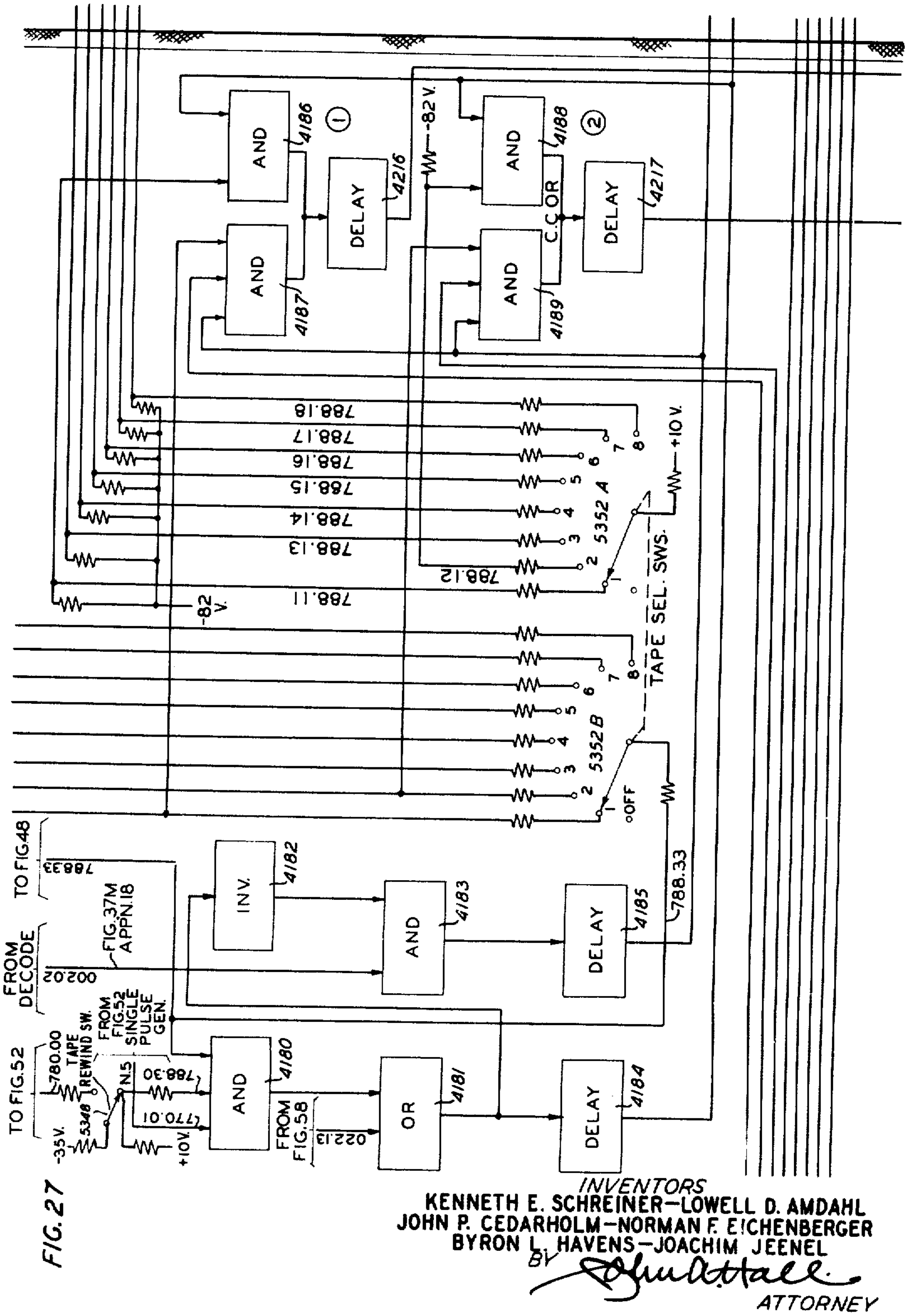
Figure 28:
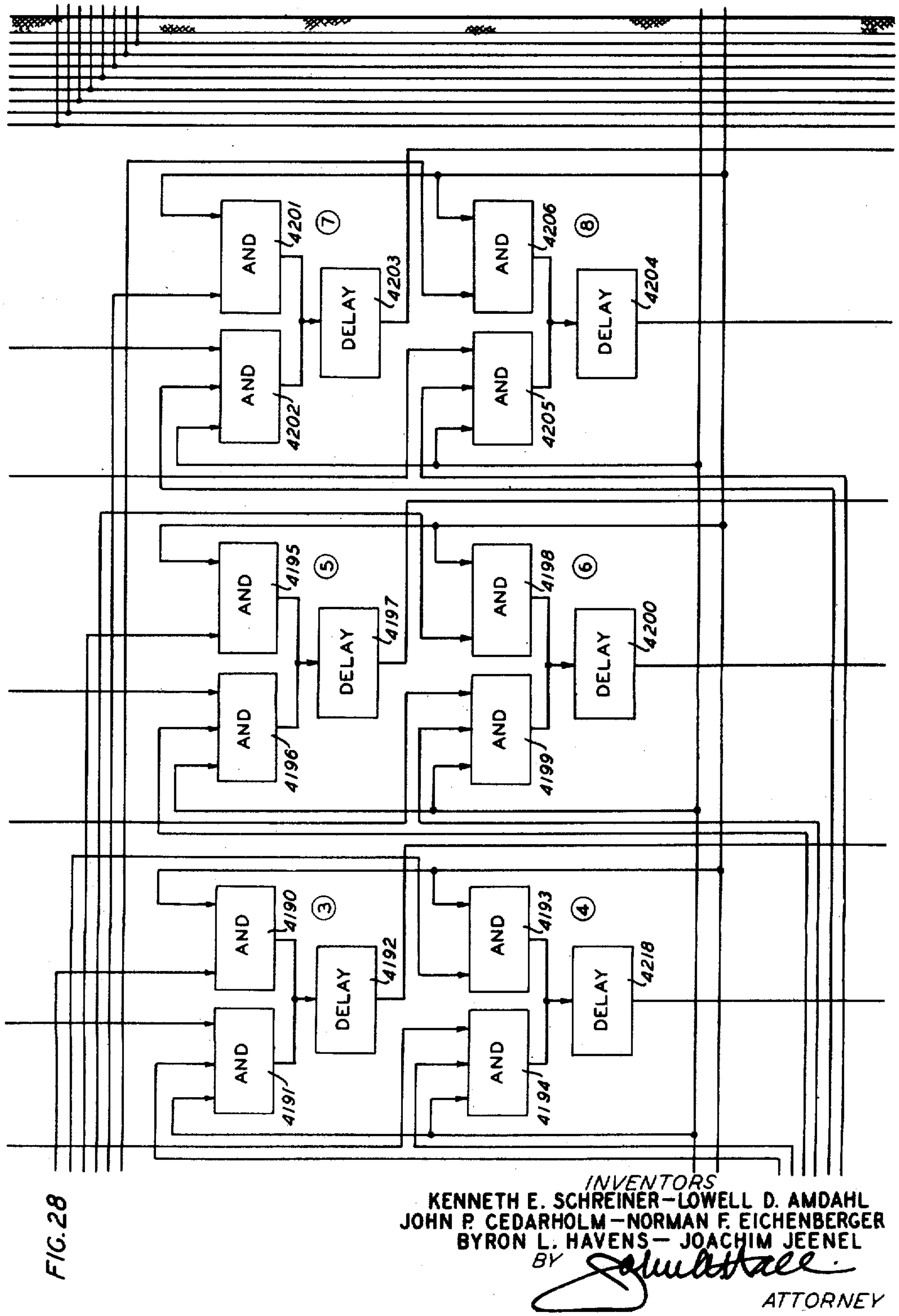
Figure 29:
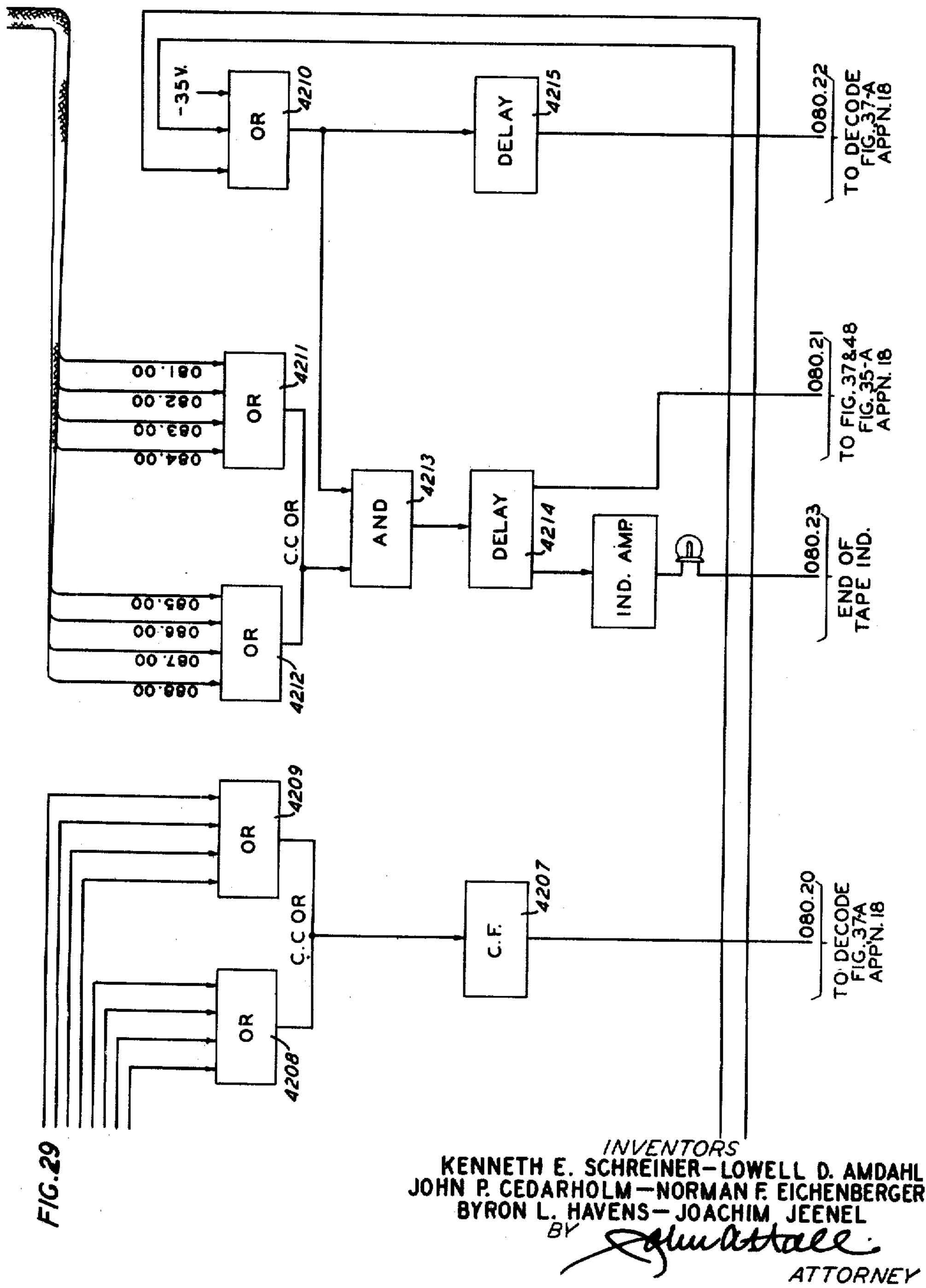
Figure 30:
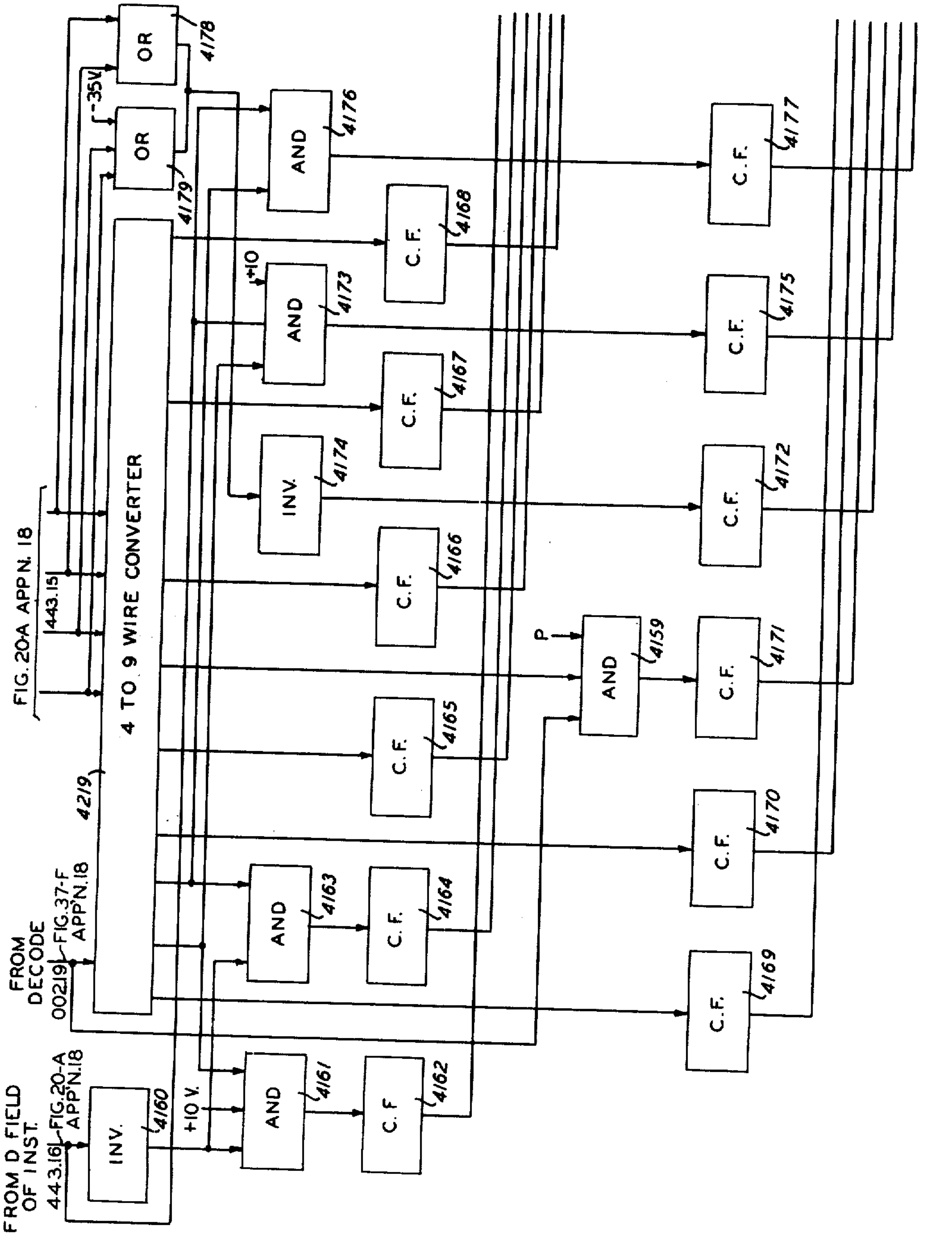
Figure 32:
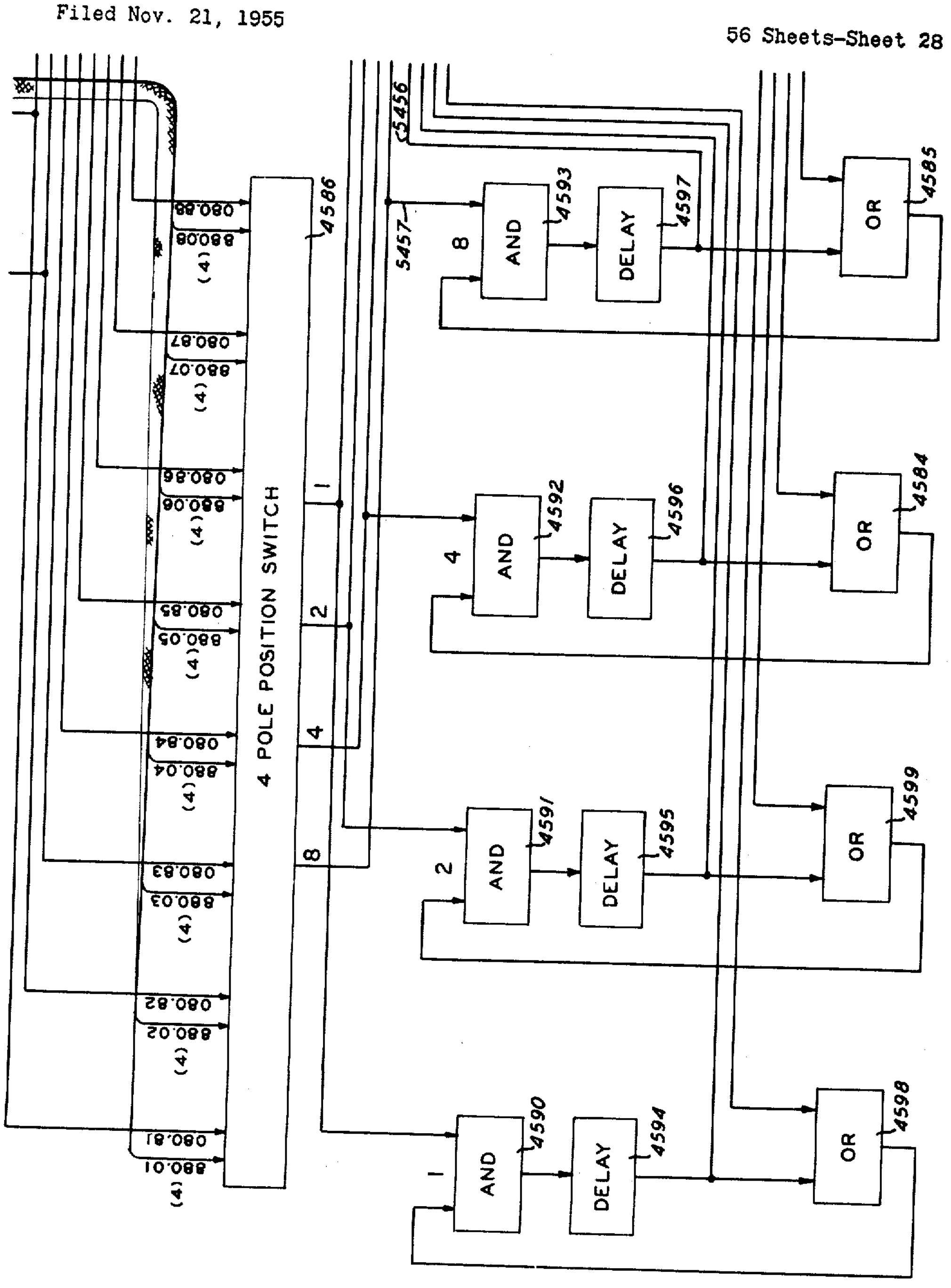
Figure 33:
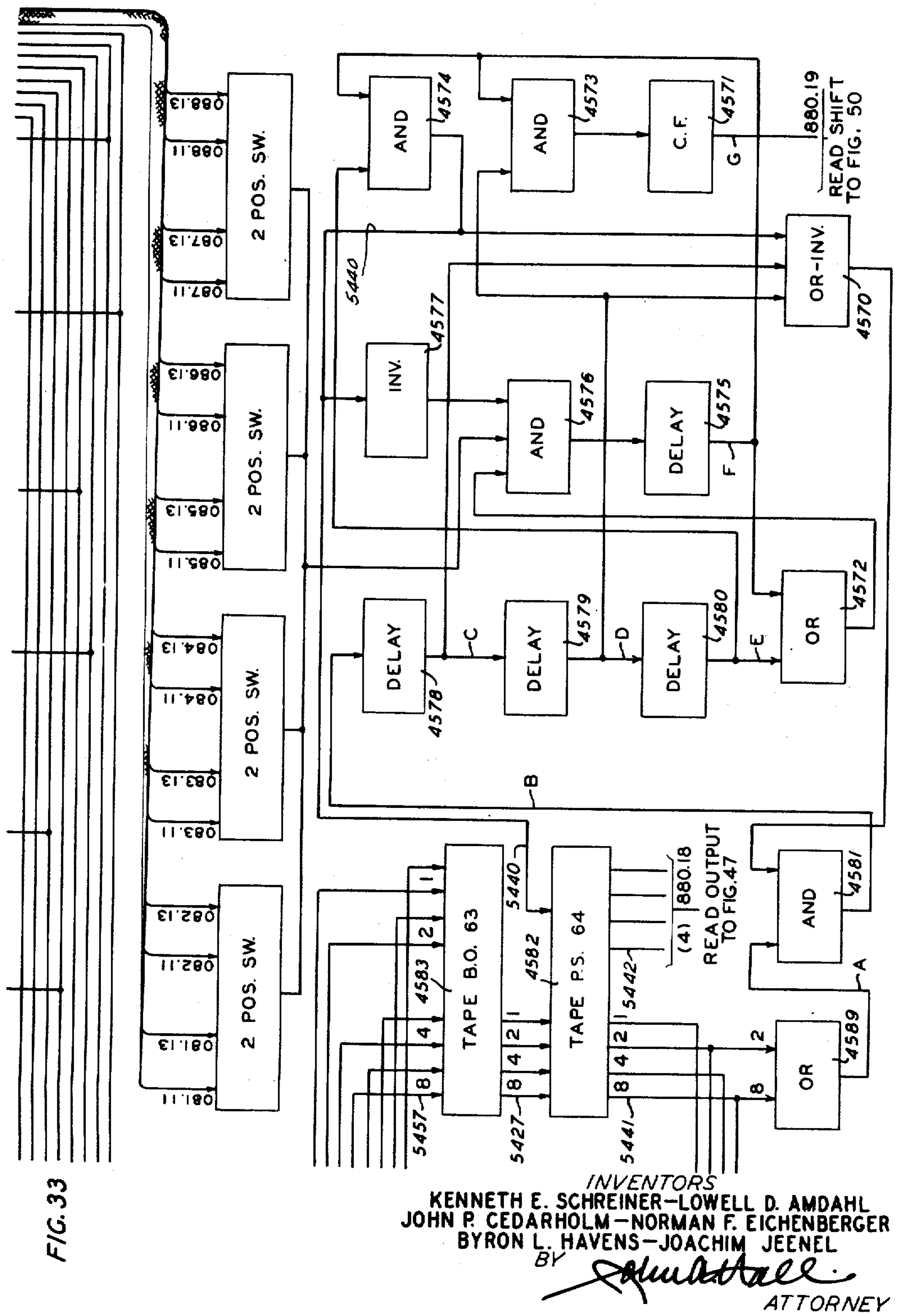
Figure 35:
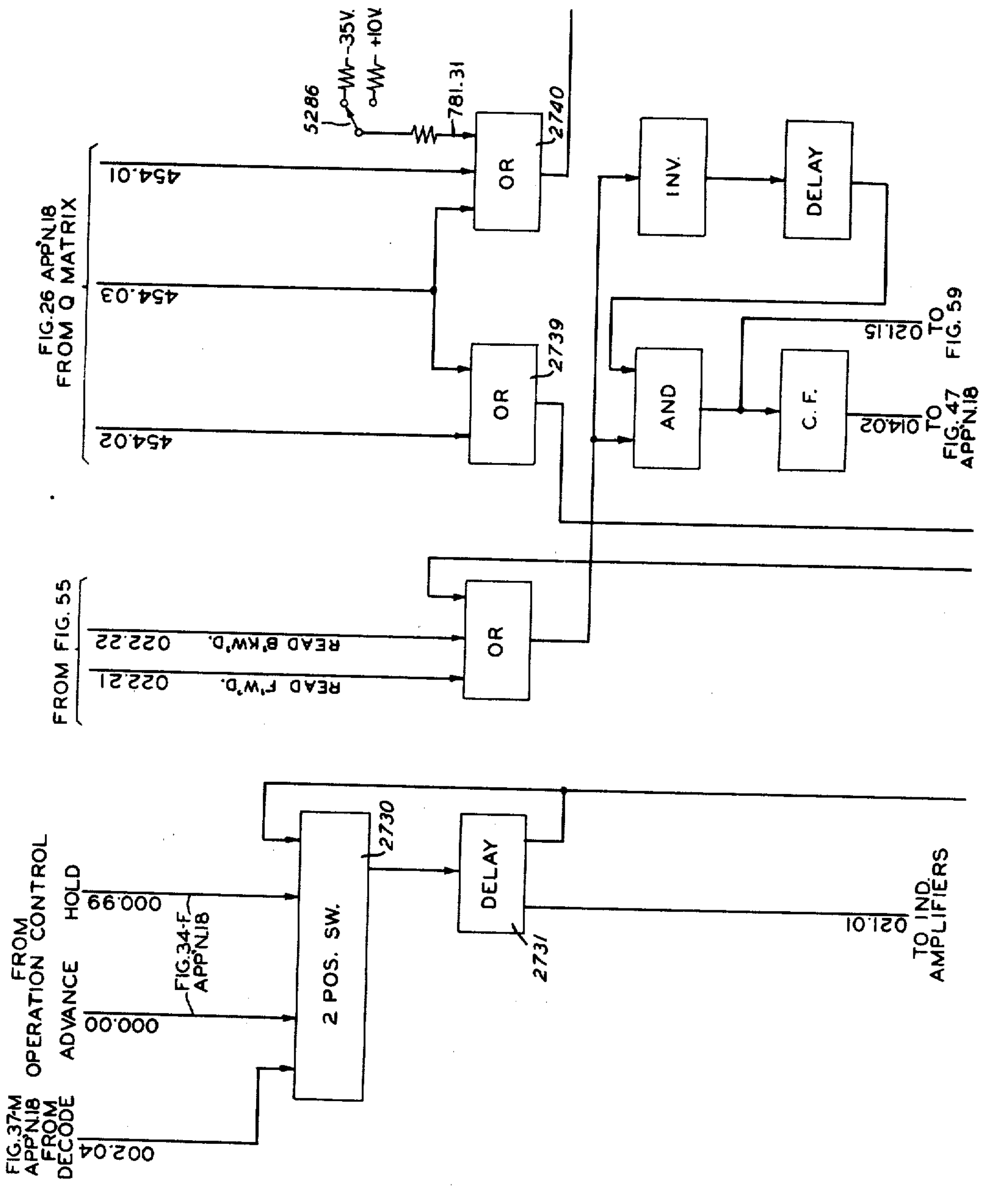
Figure 36:
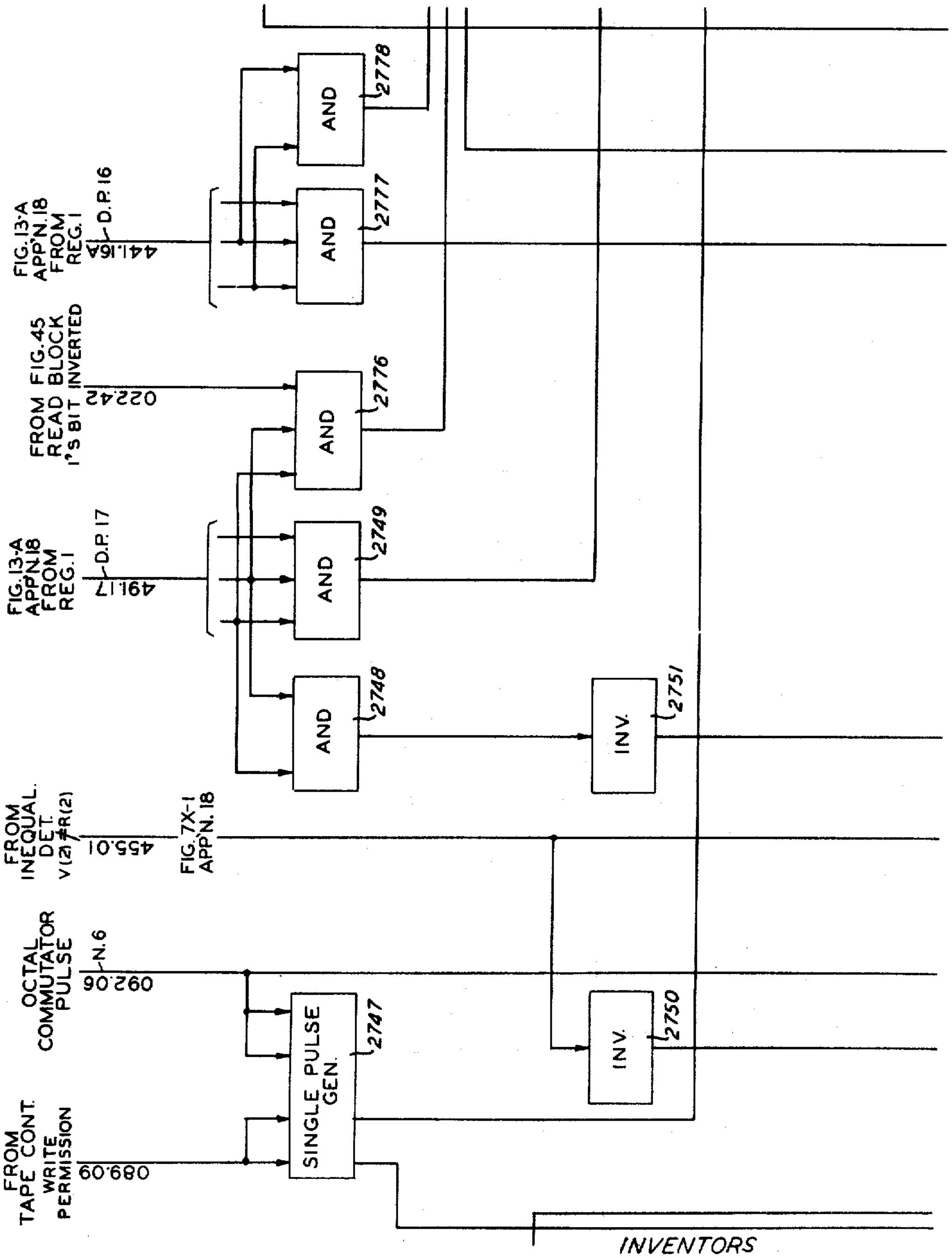
Figure 37:
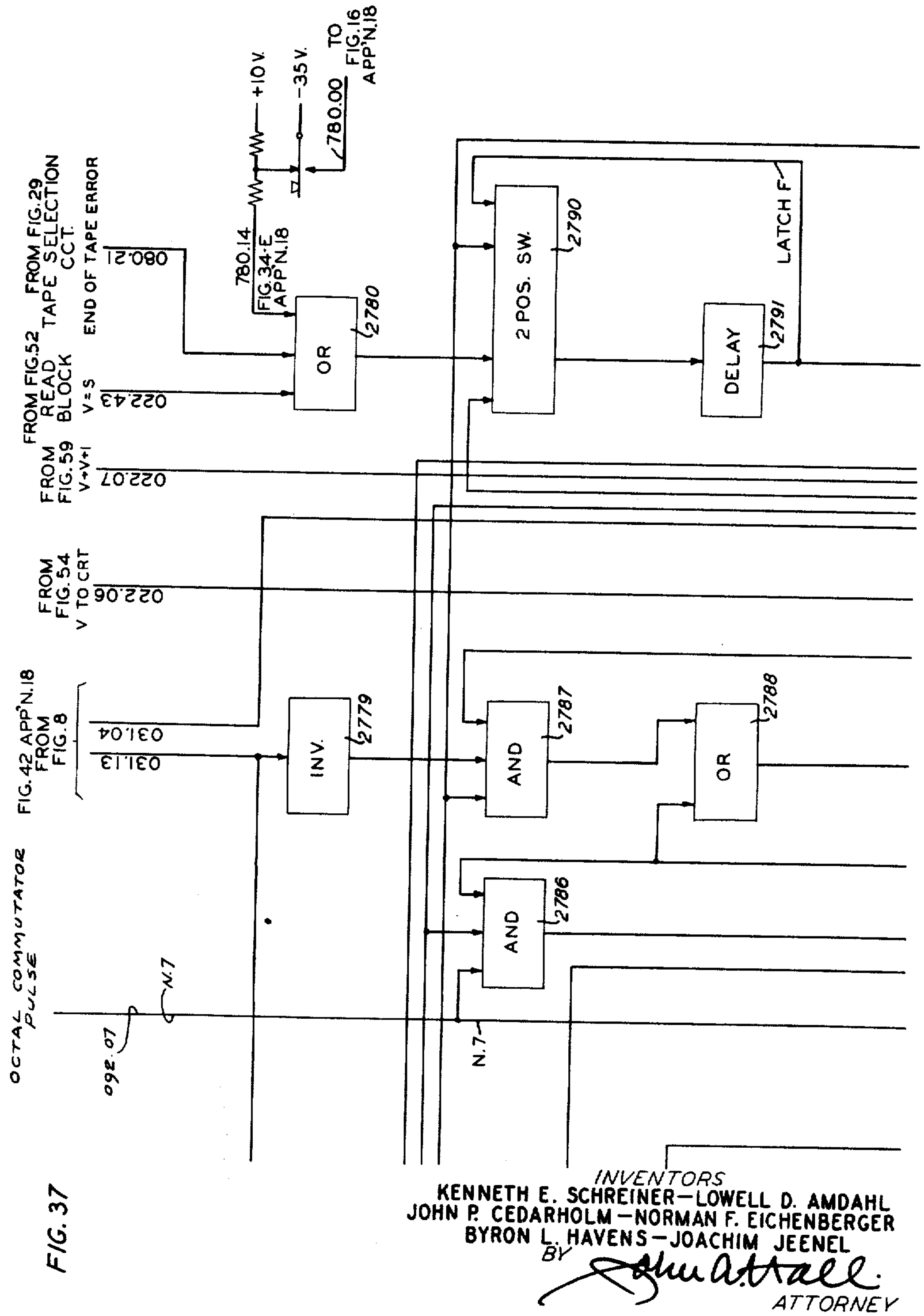
Figure 39:
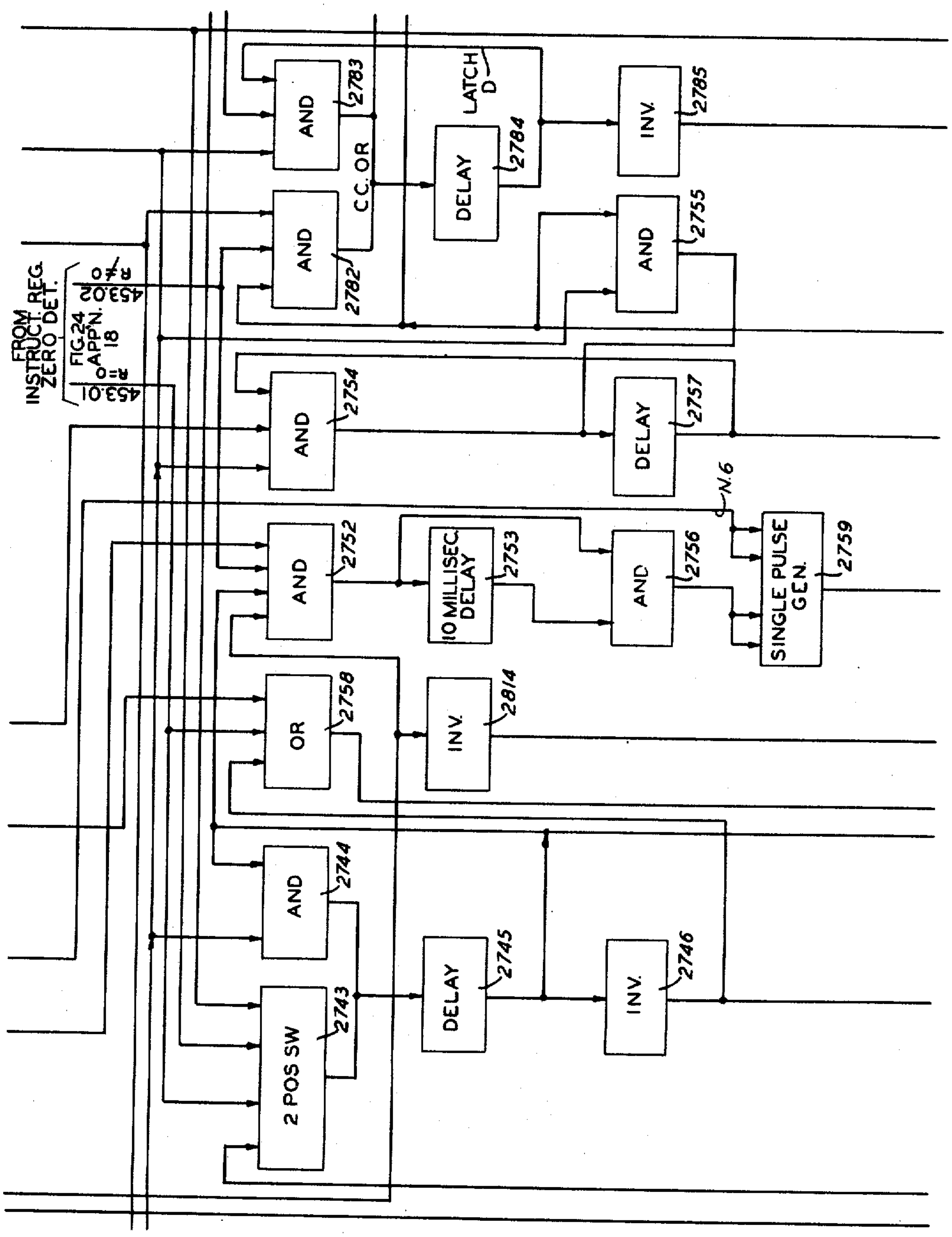
Figure 40:
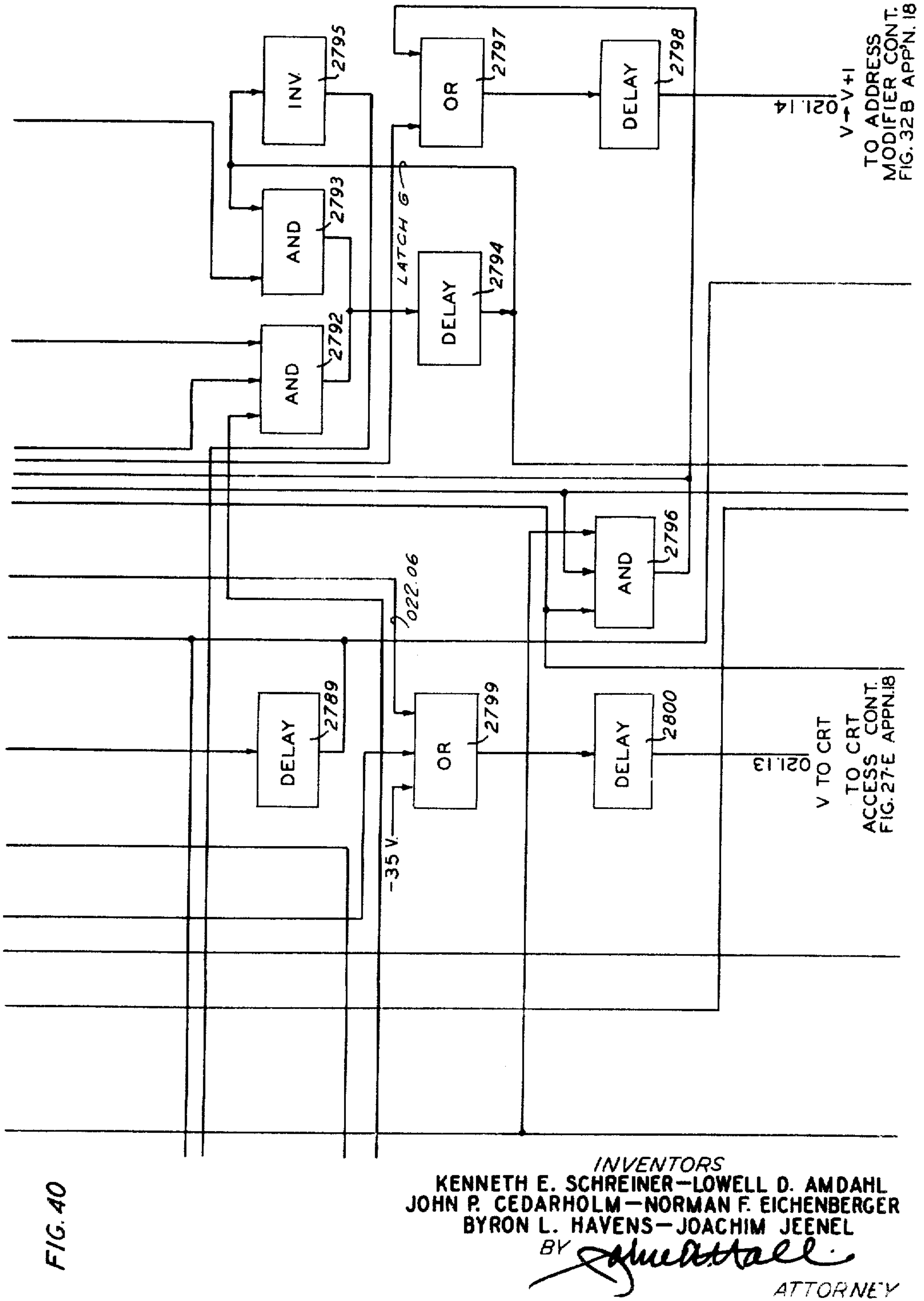
Figure 41:
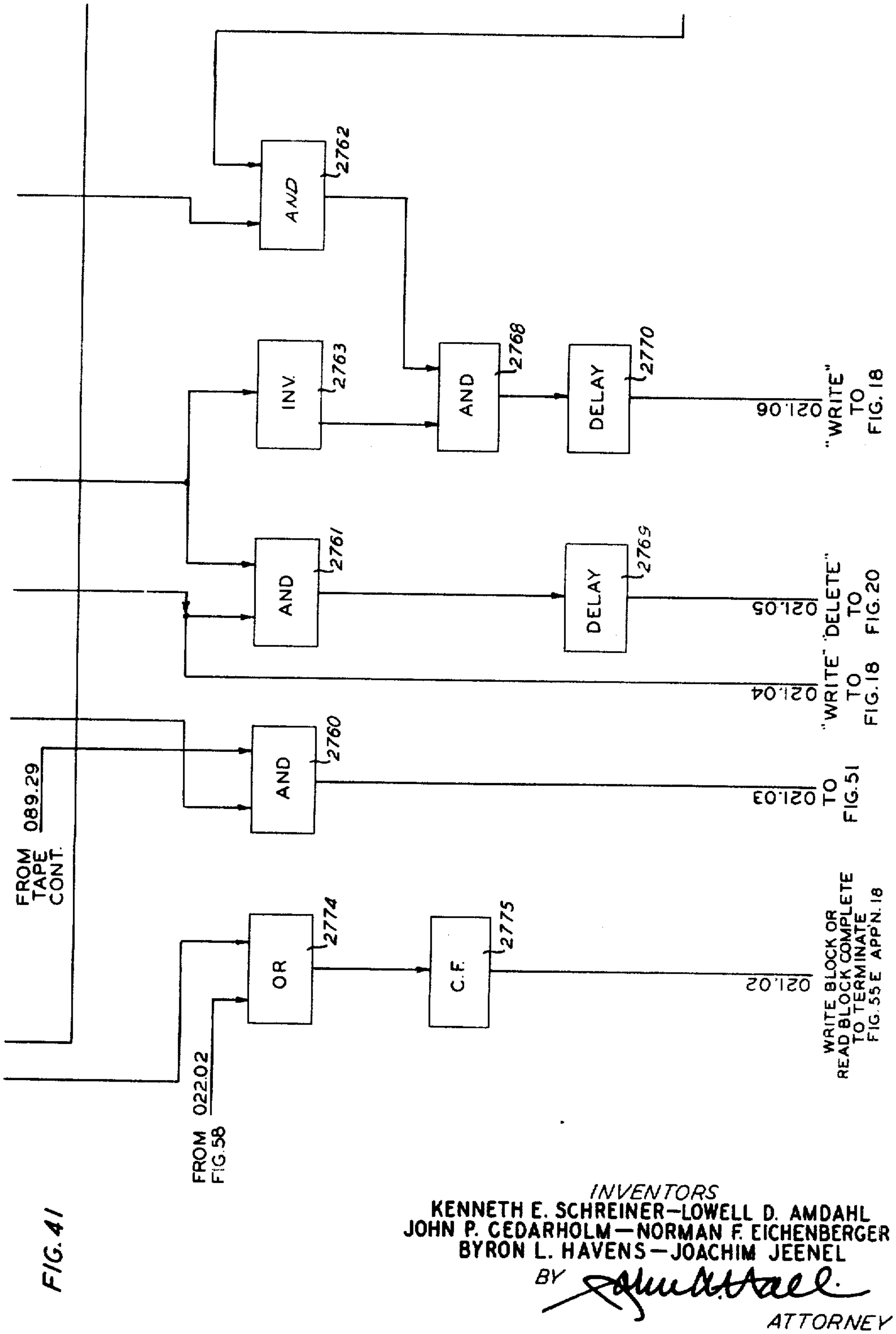
Figure 42:
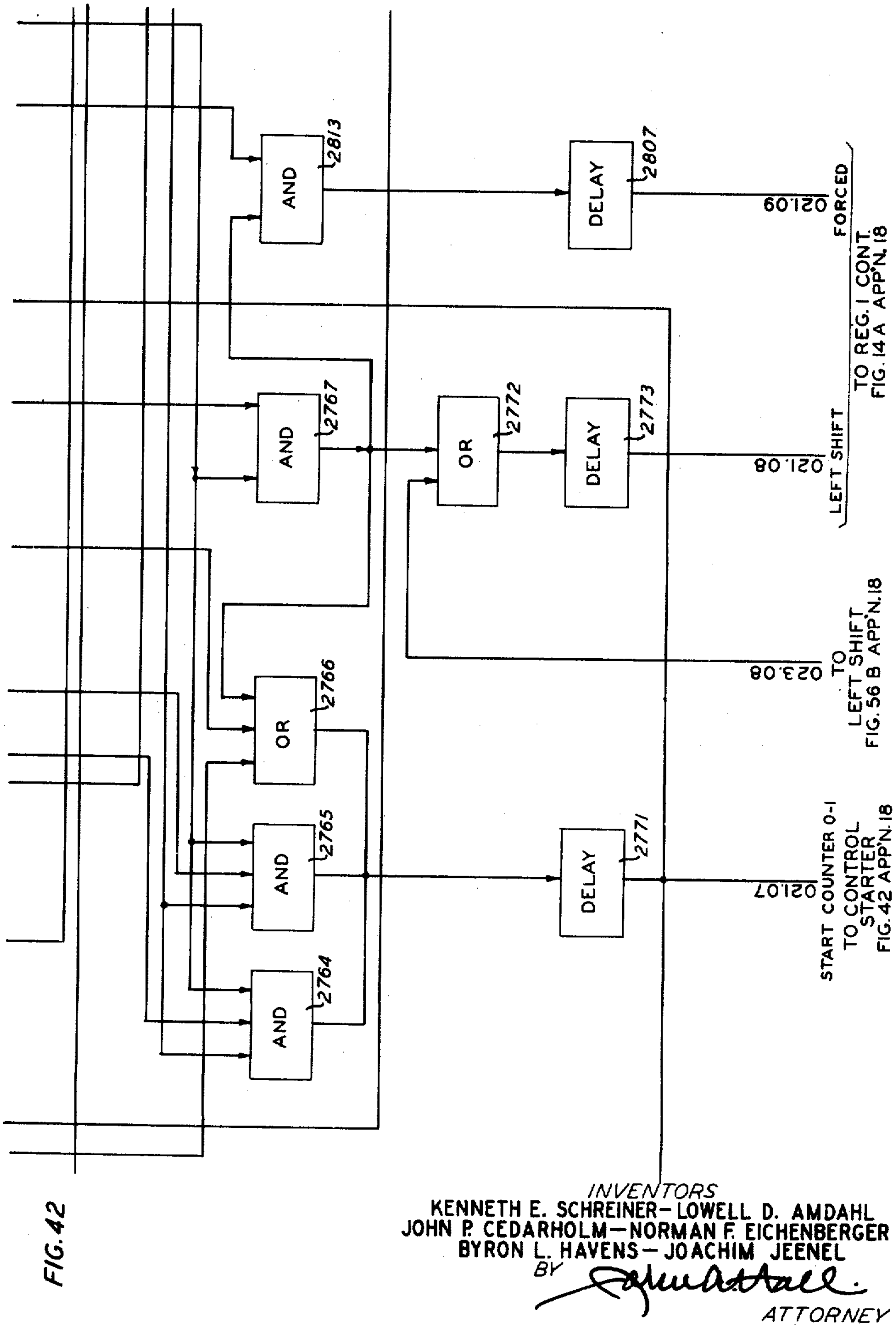
Figure 43:
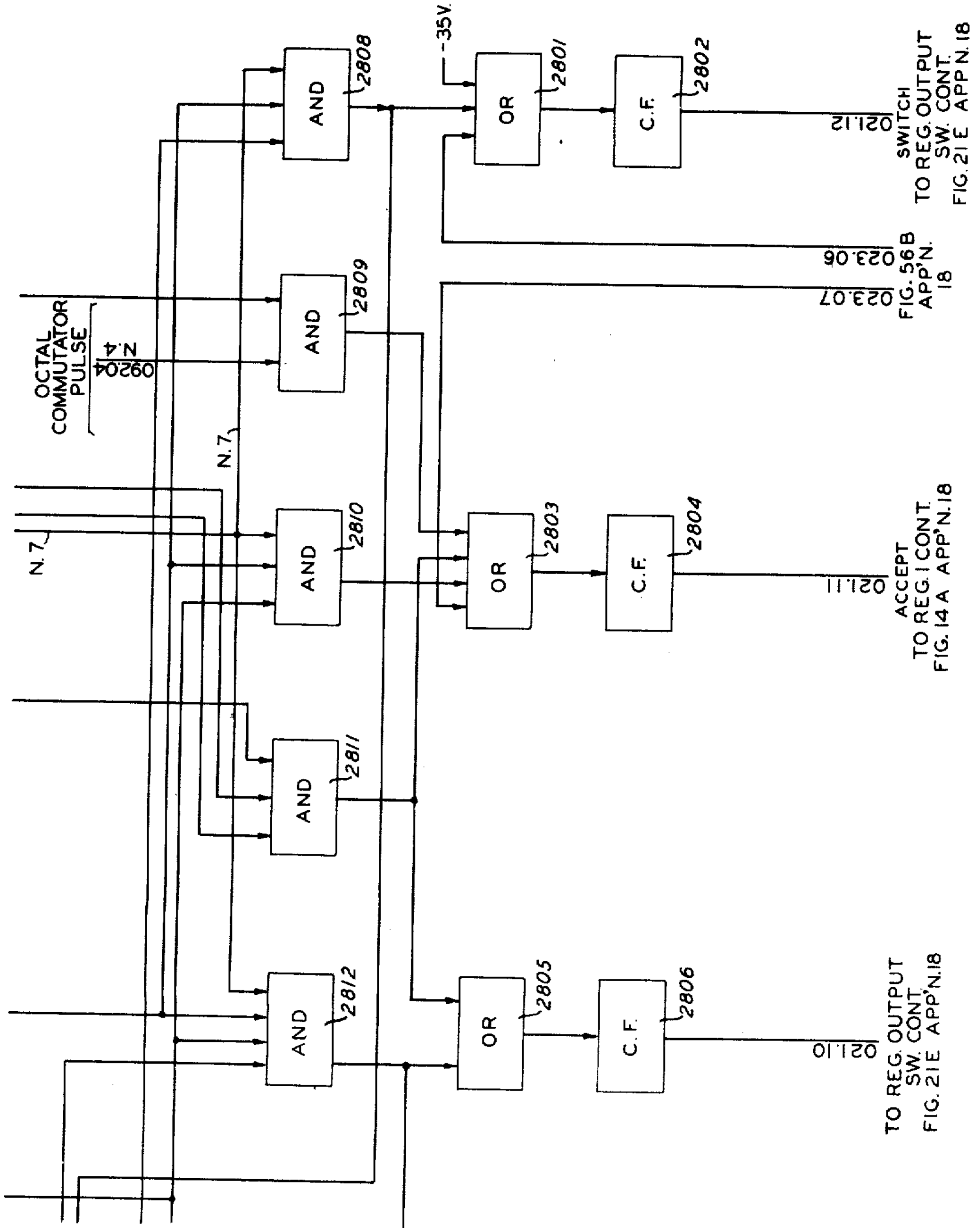
Figure 60:
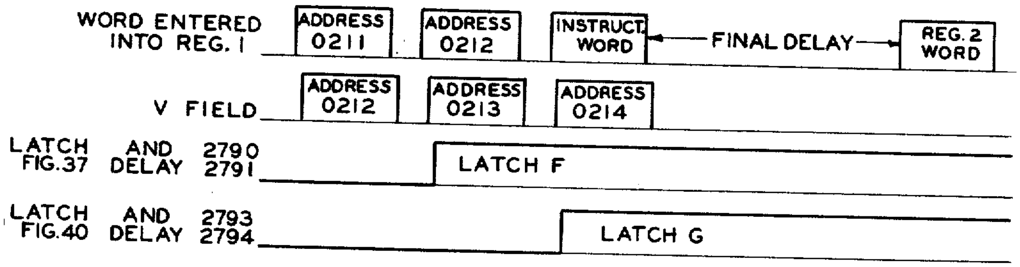
Figure 62:
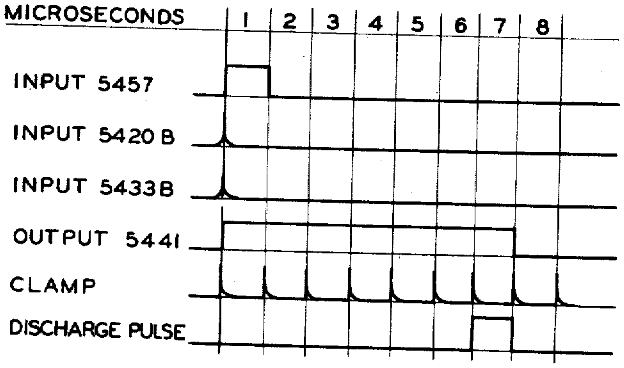
Figure 61:
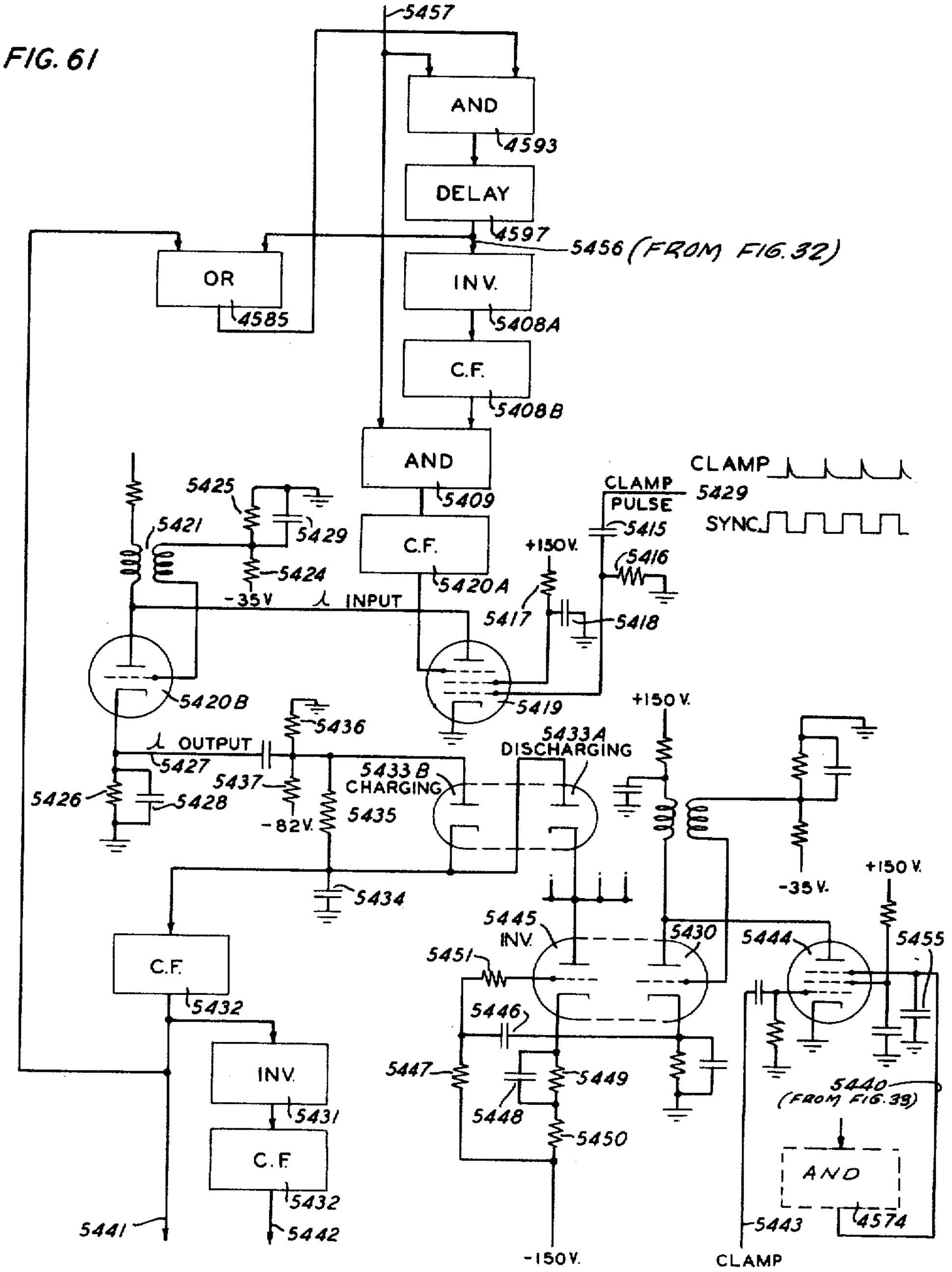
Figure 63:
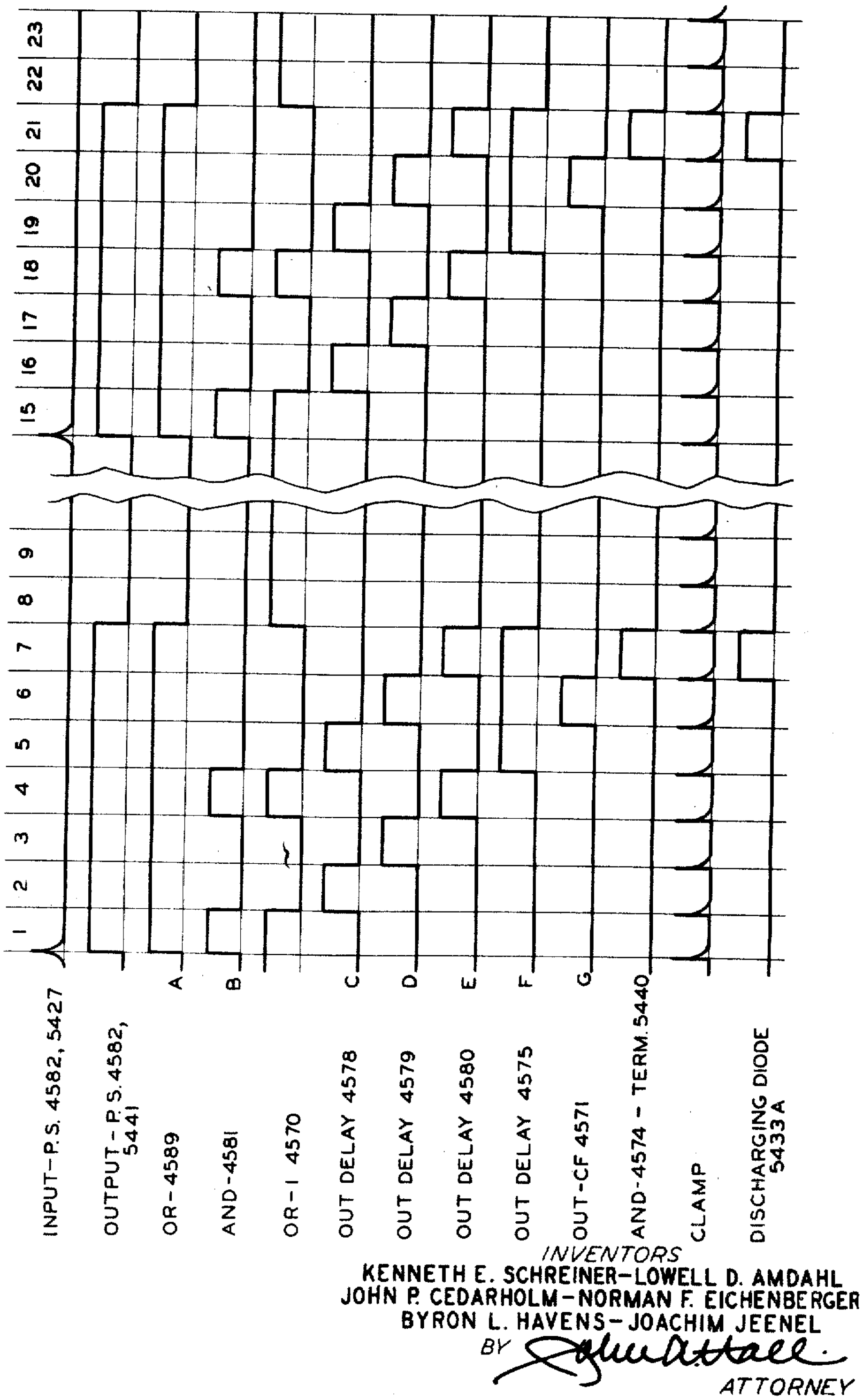

Figs. 10, 11, 12 and 13, placed as indicated in Fig. 9, constitute a timing chart showing the operations in writing a block of 52 words taken from CRT storage, addresses 0965 to 1016 inclusive by way of example;

Fig. 14 is a block diagram showing how Figs. 15 to 33 inclusive may be placed to show the tape handling circuits under the control of the Write Block (Fig. 34) or the Read Block (Fig. 44) as selected and enabled by the Decode circuit;

Figs. 15 and 16 are the Tape Control Circuits, common to the individual tape unit control circuits shown in detail in Figs. 19 and 20 and indicated in Figs. 21, 22, 23 and 24;

Figs. 17 and 18 are the Write Bit Input circuits through which the various digits and signals are passed (once each 14 microseconds) for recording on the tape, the said digits and signals being shifted out of Register 1 into this circuit and then delivered by this circuit to the tape unit (Fig. 25);

Figs. 19 and 20 are the individual tape unit control circuits for tape unit member 1, shown in detail;

Figs. 21, 22, 23 and 24 are indications of tape units 2 to 8 inclusive each with its associated tape unit control together with the multiple wiring connections for such an array of identical units;

Fig. 25 is a block indicating tape unit member 1, which being fully disclosed elsewhere is herein merely indicated by the connections made thereto in application 13;

Figs. 26 to 31 constitute a diagrammatic showing of the twelve tape address switches, sufficient detail being shown for the number 01 switch to indicate the manner in which such switch may be manually set in the preparation of the calculator for the performance of a given series of operations;

Figs. 27, 28, 29 and 30 show the circuitry of the tape selection circuits, Figs. 27, 28 and 29 showing the circuitry beyond the tape address switches and Fig. 30 showing the circuitry before the tape address switches and constituting the means for selecting the said tape address switches;

Figs. 32 and 33 show the circuitry for reading out from a tape and delivering the digits and other signals found on the tape to a register where they are accepted and shifted until the register contains a complete word at which time such word is transferred as a whole to CRT storage;

Fig. 34 is a block diagram showing how Figs. 35 to 43 inclusive may be placed to provide the circuitry for the so-called Write Block, that is the means triggered by the Decode circuit when a calculator suboperation calls for an operation in which data is taken from CRT storage and written on tape;

Figs. 35 to 43 inclusive show the circuitry enabled by the Decode circuit when an operation involving the taking of information from storage and recording it on tape is signalled, this block of circuits being characterized in general by a plurality of incoming terminals from other calculator circuits placed along the upper edge of Figs. 35, 36 and 37 and a plurality of outgoing terminals leading to other calculator circuits along the lower edge of Figs. 41, 42 and 43;

Fig. 44 is a block diagram showing how Figs. 45 to 59 inclusive may be placed to form a logical circuit diagram of the so-called Read Block, that is the means triggered by the Decode circuit when a calculator suboperation calls for an operation in which data is read from tape, entered temporarily in a register and then transferred to storage;

Figs. 45 to 59 inclusive show the circuitry enabled by the Decode circuit when an operation involving the reading of information from tape and the storage thereof is signalled, this block of circuits being characterized in general by a plurality of incoming terminals from other calculator circuits placed along the upper edge of the block and outgoing terminals leading to other calculator circuits along the lower edge thereof;

Fig. 60 is a time chart showing how the advancing count of addresses controls the writing of the final word of a block and the writing of the usual end of block instruction word followed by a given delay;

Fig. 61 is a circuit diagram of the blocking oscillator and the pulse stretcher used in the circuits between the reading heads of the tape units and the Register 1 in which the information taken from the tape is stored step by step until a full 17 digit word is placed therein and is ready for transfer to storage;

Fig. 62 is a time chart showing the operations within the blocking oscillator and the pulse stretcher of Fig. 61; and Fig. 63 is a time chart showing the operations within the circuits between the pulse stretchers of Fig. 61 and the temporary storage register used for the entry of information into Register 1 prior to storage thereof and showing how the record on the tape consisting of changes in direction of magnetization for each binary 0 are converted to outgoing binary 1 bits.

In order to have a clear understanding of the operation of the tape control circuits of the present invention it will be helpful to have a general understanding of certain arrangements and certain terminology employed in the calculator in which the present circuits are employed. This calculator is partially disclosed in certain patents and patent applications which will be referred to hereinafter, as follows.

(1) U.S. Patent Re. 23,699, entitled "Pulse Delay Circuit," by Byron L. Havens, issued 8–18–53, a reissue of U.S. Patent 2,624,839, issued 1–6–53.

(2) Application Serial No. 257,747, filed 11–23–51, entitled "Digital Information Register," by Havens et al., granted as U.S. Patent No. 2,782,305, on February 19, 1957.

(3) Application Serial No. 338,122, filed 2–20–53, entitled "Serial-Parallel Binary-Decimal Adder," by Havens et al.

(4) Application Serial No. 434,548, filed 6–4–54, entitled "Checking Circuit," by Deerhake et al.

(5) Application Serial No. 444,251, filed 7–19–54, entitled "Regeneration and Octal Counter," by Charles R. Borders.

(6) Application Serial No. 44,253, filed 7–19–54, entitled "Electrostatic Storage Systems," by Deerhake et al.

(7) Application Serial No. 458,909, filed 9–28–54, entitled "Counting Register," by Byron L. Havens granted as U.S. Patent No. 2,910,240, on October 27, 1959.

(8) Application Serial No. 465,076, filed 10–27–54, entitled "Checking Circuit," by Deerhake et al granted as U.S. Patent No. 2,826,359 on March 11, 1958.

(9) Application Serial No. 469,592, filed 10–27–54, entitled "Printer for Calculating Unit," by Shafer et al.

(10) Application Serial No. 470,160, filed 11–22–54, entitled "Electronic Multiplier-Divider," by Byron L. Havens.

(11) Application Serial No. 470,570, filed 11–23–54, entitled "Electronic Display System," by George F. Bland granted as U.S. Patent No. 2,854,192, on September 30, 1958.

(12) Application Serial No. 470,715, filed 11–23–54, entitled "Product Generator," by Havens et al.

(13) Application Serial No. 471,244, filed 11–26–54, entitled "Tape to Card and Card to Tape Converter" by James A. Weidenhammer.

(14) Application Serial No. 472,098, filed 11-23-54, entitled "Checking Circuit, by Schreiner et al granted as U.S. Patent No. 2,837,278, on June 3, 1958.

(15) Application Serial No. 547,982, filed Nov. 21, 1955, entitled "Convertible Storage System," by Bland et al granted as U.S. Patent No. 2,841,740, on July 1, 1958.

(16) Application Serial No. 540,394, filed Oct. 14, 1955, entitled "NORC Register Bit Inventory Computer."

(17) Application Serial No. 547,981, filed Nov. 21, 1955, entitled "High Speed Electronic Calculator" by Havens, et al.

The specifications and subject matter of each of the U.S. patents and U.S. patent applications listed above are incorporated herein as part of this application as though they were fully set forth in the body of this specification and may be referred to hereinafter by the number immediately preceding their listing. For example, U.S. patent application Serial Number 444,253, filed 7-19-54, entitled "Electrostatic Storage System," by Deerhake et al., is referred to as "application 6."

The invention embodied in each of the U.S. patents and U.S. patent applications listed above is assigned to the same assignee to which this invention is assigned.

In application 11 there is disclosed means to display some 80 numerals comprising 17 digits in each of Register 1, Register 2 and the Instruction Register, five four digit words in the V Field, U Field, M4 Field, M6 Field, and M8 Field, and nine digits which may or may not be temporarily assigned for test purposes. In the instruction Register, counting from the left, the first digit is for the Indicated Bit Count, a digit related in a unique manner to the contents of the remaining 16 digits and used for checking purposes. Next follows the P Field, a 2 digit word by which a particular tape unit is identified, the Q Field, a 2 digit word setting forth an operational code, and then in order the R, S, and T Fields, each a four digit word used to identify certain addresses.

In the following description certain terms are used and many basic circuit components are mentioned all of which are set forth in the prior art disclosures above set forth and some of which are shortly described as follows.

A BIT is a binary item, that is, a signal indicating a 1 in the binary code of 0 and 1. The four consecutive binary orders, reading from right to left, represent the decimal digits 1, 2, 4 and 8 and the sum of these values as represented by the BITS expressed in any binary code equals the value of the decimal digit represented thereby. A BIT is therefore a single binary item in a code which is used to express or convey a given amount of information.

A word is a series of decimal digits each expressed in a pure binary code. In the calculator in which the present invention is employed 17 digit words are used, the first digit expressed by the first two BITS being what is known as the indicated bit count and which bears a unique relationship to the following 16 digits each expressed by a four BIT binary code and which expresses some unique information.

The binary-decimal system is one in which the decimal digits of a word or a number are each separately expressed in a pure binary code. Thus a code 1001, having an 8 BIT and a 1 BIT, expresses the decimal digit 9. It will appear hereinafter that any other legitimate number, higher in value than 9, will be expressed by more than one such binary code, that is a separate binary code for each digit, as for example, 0100, 0101, 1001, for the decimal number 459.

It may be noted at this point that a four place binary code may also express certain two digit decimal numbers such as 1111, equal to the decimal number 15. This, however, may be taken as an illegitimate number and is spoken of hereinafter as a greater than nine number, there being in the calculator certain circuitry for dealing with such numbers. Hence 1111 is a greater than nine number, but 0001, 0101, also expressing the decimal number 15 is a legitimate number.

However, it is to be especially noted that these illegitimate numbers are put to a special use in the circuits of the present invention since they provide two digit numbers which give exactly the same signal read forwards or backwards. Thus on a tape each word is flanked by a character 12, not the 0001, 0010 which is used for the decimal digits but by the 1100 which is used as an end of word signal. The circuits of the present invention will detect an 1100 and report it as a greater than 9 error except when it is read from a tape and then it will be reported as an end of word signal. The 0001, 0010 cannot be used as an end of word signal for if the tape is read backwards then it will be reported as 0010, 0001 (decimal number 21).

A time interval is one microsecond. A time interval may, of course, be of any convenient value but the circuits of the present invention have been constructed and arranged to operate on a megacycle basis. It may particularly be noted that the delay circuit disclosed in the Havens reissue patent has been constructed and arranged to receive a pulse on an input terminal during one time interval and to deliver a like pulse on an output terminal during a succeeding time interval one microsecond later.

Throughout the circuitry of this device and the calculator with which it is associated, a common source of clamping potential and synchronizing pulses, clearly shown in said Havens reissue patent, is employed. This serves to pace all operations described hereinafter.

UP and DOWN refer to potentials. In this electronic system, each component, such for instance as a tube circuit, is arranged to be active when the potential on its control conductor is UP and inactive when such potential is DOWN. Generally, as in a cathode follower circuit, when the potential on an input terminal is UP the potential on the output terminal is UP and likewise when the potential on an input terminal is DOWN the potential on the output terminal is DOWN. It may be stated, merely by way of example, that a potential of plus 5 volts or more will constitute an UP condition and a potential of minus 30 volts or less will constitute a DOWN condition. UP means that the voltage present at a particular point is positive with respect to ground and DOWN means that the voltage present is negative with respect to ground. If the control grid of a vacuum tube is referred to as DOWN, it means that the voltage at that control grid is below the cutoff value of the vacuum tube.

Numerous coincidence circuits are employed herein. An AND circuit refers to a circuit which is operable to produce an UP condition on its output terminal only when all of its input terminals are UP. An OR circuit refers to a circuit operable to produce an UP condition on its output terminal when any one or another or more of its input terminals are UP.

In the logical diagram forming the main part of the present disclosure an AND circuit is shown as a rectangle about the designation AND and having a plurality of input terminals and a single output terminal.

A cathode follower circuit is a tube circuit having its anode connected to a positive potential source or otherwise arranged so that the grid constitutes an input and the cathode or cathode circuit constitutes an output. When the grid is UP, the cathode will go UP and when the grid is DOWN the cathode will go DOWN. A cathode follower circuit is used wherever the output of some previous circuit, such as an AND or OR circuit, would be overloaded by the following circuits. Frequently, when the demand of following circuits is great, several CF circuits will be used in parallel.

The AND and OR circuits may be combined with the cathode follower circuits, in which case they are designated AND-CF and OR-CF respectively.

Another component of these circuits is an inverter, generally designated INV. This includes a tube and is so arranged that when the input is DOWN the output is UP and when the input is UP the output is DOWN.

Frequently, a logical element is required which comprises a diode OR circuit driving an inverter. Such a circuit is termed an OR–INV circuit and is so designated in the logical diagram.

One of the most important of the circuit components used herein is the delay circuit which will pass a pulse after a delay of one microsecond. Such a device is fully disclosed in the said Havens reissue patent.

Numerous switches are provided for gating information into given circuits. Such switches consist essentially of an AND circuit for each BIT, multiplied by the number of circuits which are to have access to a given output circuit. Thus a two position four pole switch may be a device leading from two separate four wire circuits to be alternatively connected to a single four wire circuit. There will thus be four AND circuits each having one of its inputs connected to a common control circuit and its other input connected to the wires of the circuit to be gated and a similar set of four AND circuits having a common control and the four wires of the circuit to be gated. The particular one of the circuits to be gated is dependent on the particular one of the common control wires which is energized. The outputs of the corresponding input BIT AND circuits are multipled to an output BIT wire. Various combinations of logical circuits may be wired to provide any desired switching arrangement.

A binary adder is one which will add bits in accordance with the principles of binary addition. It has three inputs, two for bringing in the bits to be added and the third for bringing in a carry bit from a similar adder when a plurality of such units are used if numbers expressed in binary codes of more than one place are to be added. There are two outputs, one for an output sum bit and another for an output carry bit. In accordance with the principles of binary addition, a single input bit will produce an output sum bit, two input bits will produce an output carry bit, and three input bits will produce both an output sum bit and an output carry bit.

A latch is a circuit component used to hold or maintain a bit. The circuit is simple and contains essentially only an AND circuit and a DELAY circuit, the output of each being connected to the input of the other. When the control circuit of the AND circuit is UP and a BIT is introduced into this circuit, the BIT will continuously circulate therein until the control circuit is driven DOWN. The DELAY circuit acts to constantly regenerate the BIT which it transmits from its output through the enabled AND circuit to its own input.

Another circuit component is known as a 4 to 9 wire converter and is essentially a translator for translating any one of the digits 1 to 9 inclusive expressed by the four wires of a binary code into a corresponding UP condition on one of 9 single conductors. The apparatus is always set to represent zero in the absence of any other indication, in other words, when a bit appears on no one of the four input wires, then an UP condition will appear on a tenth single output wire.

An inequality detector is a logical circuit by which any two binary codes may be compared for equality. There are two sets of 1, 2, 4 and 8 bit wires incoming to this circuit and a single output wire which is normally UP until the two incoming codes reach equality whereupon the single output goes DOWN. This circuit will respond to like input conditions, either UP or DOWN.

One of the essential control elements of these circuits is a device known as an Octal Commutator. This is a bundle or bus of eight leads generally designated N.0 to N.7 inclusive on each of which a pulse appears in turn in each succeeding microsecond interval, the cycle being repeated constantly so that there is available a source of eight pulses which may be used for counting, timing, synchronizing or for any other purpose desired. It consists generally of a series arrangement of eight one microsecond delay circuits effectively placed in a closed ring circuit whereby the operation of each triggers the next. The output of each except the last operates an OR circuit and an inverter circuit to hold the input of the first clear but the output of the last allows this circuit to relax and hence the series is recycled. The circuit operates automatically and indefinitely and thus provides a source of pulses recurring on each of the eight leads therefrom each eight microseconds. In the following description a time N.4, by way of example, will refer to the pulse emitted on the N.4 lead during any single octal cycle. If several octal cycles are being considered then the time N5.4 will refer to the fifth pulse, emitted by the N.4 lead, of the sixth octal cycle (the counting is 0 to 7 inclusive).

A pulse stretcher is a circuit which responds to a pulse to establish a given output condition and then maintains such condition over a given period of time. Generally speaking the incoming pulse is of short duration, often the output of a blocking oscillator, so that the pulse stretcher is in the nature of a trigger circuit which responds to this incoming pulse and maintains an established condition until another pulse automatically timed is received to cause the termination of such condition. Frequently the pulse stretcher normally maintains an UP condition on its output so that it is essentially an inverter which translates a short positive incoming pulse to a longer negative outgoing pulse. Often the pulse stretcher consists essentially of a cathode follower circuit whose grid responds to the charge on a condenser, such condenser being under control of a charging circuit and a discharging circuit. An incoming pulse delivered by a blocking oscillator circuit will act to charge this condenser and this will maintain the charge sufficiently long to maintain the cathode follower fully conductive, until a discharging pulse is received. This discharging pulse is automatically produced and delivered so that the outgoing pulse from the pulse stretcher is automatically terminated.

A blocking oscillator is a component often used to forward a pulse where the signal consists of a potential pulse and where circuit conditions prohibit any current drain. The blocking oscillator therefore is a device which responds to an extremely short voltage pulse and produces an equally short pulse of useful current value, such for instance of sufficient current value for charging the condenser of a pulse stretcher. It is therefore somewhat in the nature of an amplifier placed in between a circuit where a substantial current drain (and a consequent drop in potential) cannot be tolerated and a circuit which requires for its proper operation a significant current flow.

Certain components incorporated in the present circuits are known as millisecond delay circuits. These are essentially trigger circuits and spoken of as single shot multivibrators which respond to a one microsecond positive input signal and produce a long negative output, measured in milliseconds ranging in value from .2 to 30 milliseconds.

Figures 1, 2:
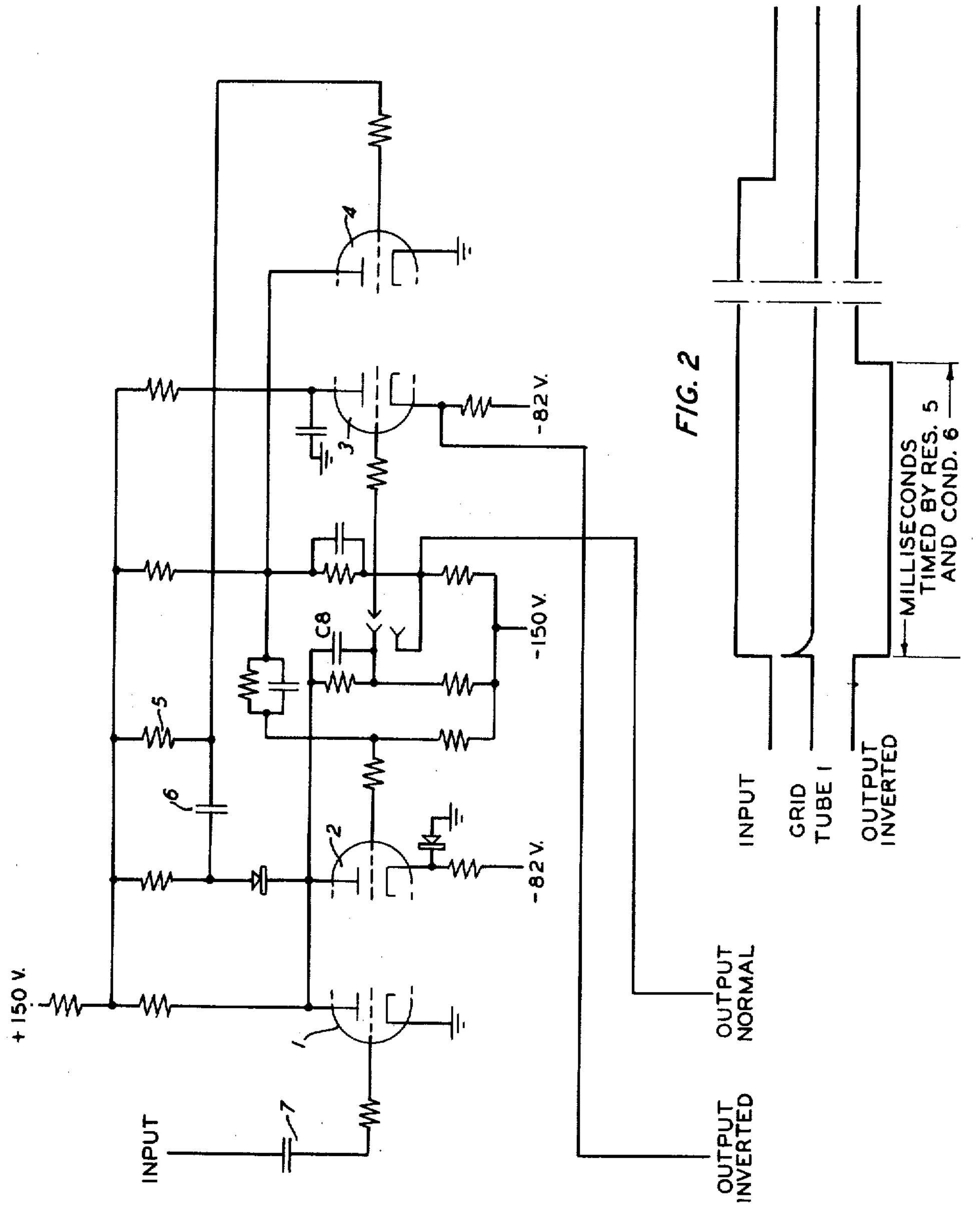
Fig. 1 is a schematic circuit diagram of a millisecond delay circuit.
Fig. 2 is a timing chart showing the manner of operation of a millisecond delay circuit.

Fig. 1 is a schematic diagram of a millisecond delay circuit and Fig. 2 is a timing chart to show the operation thereof. When the input terminal is driven UP (for an indefinite period, a microsecond or a matter of seconds) then by virtue of the condenser 7 in the input lead the tube 1 is rendered transiently conductive. As the plate of the tube 1 goes DOWN, the grid of tube 3, normally UP, goes DOWN and consequently the output goes DOWN. Also the grid of tube 4, normally UP, goes DOWN, and consequently its plate goes UP and carries the grid of tube 2 UP so that this tube will maintain the DOWN condition on the plate of tube 1. However, the condenser 6 and its timing resistor 5 gradually bring the grid of tube 4 UP, whereupon its plate goes DOWN, the grid of tube 2 goes DOWN and the plate thereof and the grid of tube 3 go UP, carrying the output wire UP.

Alternative connections are shown for the grid of tube 3. As shown the tube 3 is controlled from the plate circuit of tube 1. If the alternative connection is made then the tube 3 will be controlled from the plate circuit of tube 4 and consequently the output will be inverted, being normally DOWN and emitting a long timed output UP pulse. The timing of this circuit is controlled by the value of the resistor 5 and the condenser 6, so that by adjustment of these values any desired length of delay may be provided.

The signal convention used in the tapes may be shortly described by the following table.

TABLE 1

| | Binary Code | | | | Inverse Code | | | | Record | | | |
|---|---|---|---|---|---|---|---|---|---|---|---|---|
| | 8 | 4 | 2 | 1 | 8 | 4 | 2 | 1 | 4 | 8 | 2 | 1 |
| Decimal Digit: | | | | | | | | | | | | |
| 0 | 0 | 0 | 0 | 0 | 1 | 1 | 1 | 1 | 1 | 1 | 1 | 1 |
| 1 | 0 | 0 | 0 | 1 | 1 | 1 | 1 | 0 | 1 | 1 | 1 | 0 |
| 2 | 0 | 0 | 1 | 0 | 1 | 1 | 0 | 1 | 1 | 1 | 0 | 1 |
| 3 | 0 | 0 | 1 | 1 | 1 | 1 | 0 | 0 | 1 | 1 | 0 | 0 |
| 4 | 0 | 1 | 0 | 0 | 1 | 0 | 1 | 1 | 0 | 1 | 1 | 1 |
| 5 | 0 | 1 | 0 | 1 | 1 | 0 | 1 | 0 | 0 | 1 | 1 | 0 |
| 6 | 0 | 1 | 1 | 0 | 1 | 0 | 0 | 1 | 0 | 1 | 0 | 1 |
| 7 | 0 | 1 | 1 | 1 | 1 | 0 | 0 | 0 | 0 | 1 | 0 | 0 |
| 8 | 1 | 0 | 0 | 0 | 0 | 1 | 1 | 1 | 1 | 0 | 1 | 1 |
| 9 | 1 | 0 | 0 | 1 | 0 | 1 | 1 | 0 | 1 | 0 | 1 | 0 |
| Character: | | | | | | | | | | | | |
| 12 | 1 | 1 | 0 | 0 | 0 | 0 | 1 | 1 | 0 | 0 | 1 | 1 |
| 13 | 1 | 1 | 0 | 1 | 0 | 0 | 1 | 0 | 0 | 0 | 1 | 0 |

In the above table the decimal digits 0 to 9 inclusive and the characters 12 and 13 are listed in the first column. In the second column, headed "Binary Code" the 8 bit, 4 bit, 2 bit, and 1 bit, reading from the left to the right, of the pure binary code are listed. In the third column, headed "Inverse Code" the inverse 8 bit, the inverse 4 bit, the inverse 2 bit and the inverse 1 bit for the corresponding decimal digits and characters are listed. These would be the outputs of the inverters through which the binary code bits are fed. In the fourth column, headed "Record", the same code as in the third column is used except that the 8 bit column and the 4 bit column are interchanged. By making this change a bit will invariably appear in either one or both of the two middle columns (or the two middle tracks when recorded on tape) so that a so-called "skew pulse" is provided within each and every code, which acts as a control agent in the handling of the tape.

Figure 5:
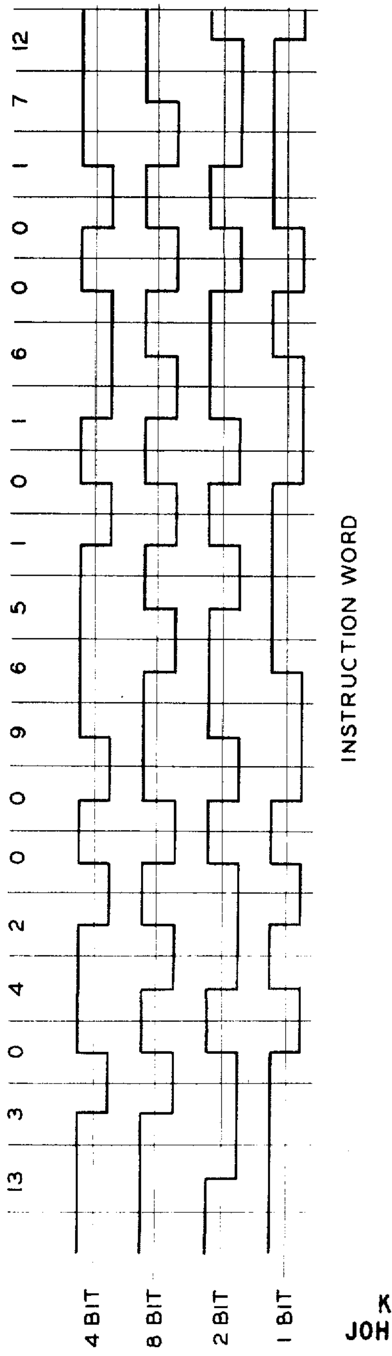
Fig. 5 is a schematic representation of an instruction word as recorded in a tape showing by graphs the changes in the magnetic state of the four tracks therein, each graph showing the positive and negative states to which the material in the track is driven.
Figure 6:
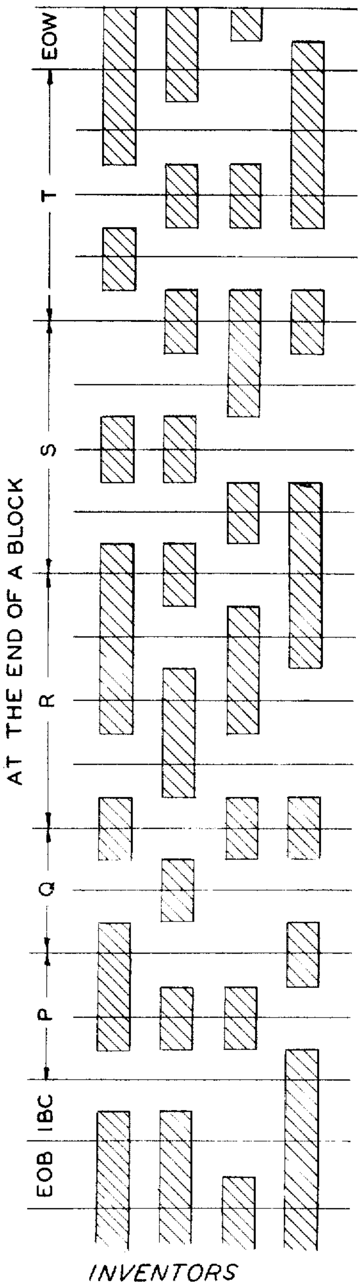
Fig. 6 is a similar schematic representation showing by clear and hatched areas the same recording as in Fig. 5.

Figs. 5 and 6 are schematic drawings believed to be useful in showing the configuration of magnetic states of a portion of a tape in which an end of block word is recorded. In Fig. 5 the UP and DOWN or positive and negative magnetic states of the four tracks are indicated by graphs, whereas in Fig. 6 the same different magnetic states are indicated by clear and hatched areas.

The arrangement of the information as recorded on the tape is in files, blocks, and words. A file is a complete category of information and may embrace more than one tape. A block is a subdivision of a file and is always recorded on one tape and a word is a subdivision of a block. Each block has an end-of-block word, which is an instruction word, at each end thereof and anywhere from 1 to 2000 words between such instruction words.

Figure 3:
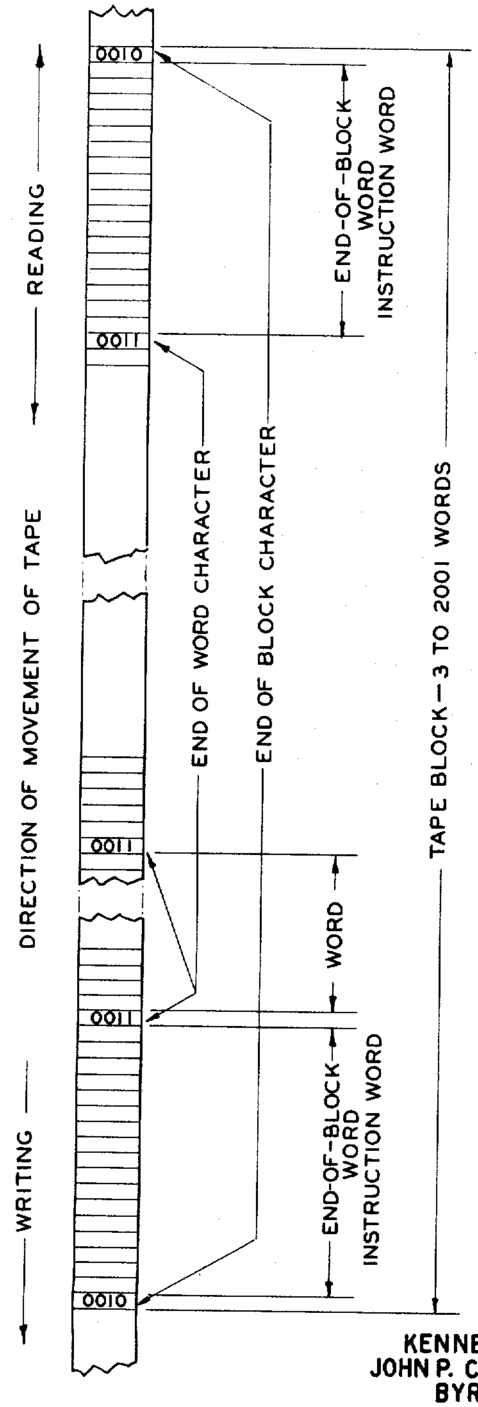
Fig. 3 is a schematic representation of a length of tape sufficient to hold a block, that is a given number of words flanked at either end by an end of block word and showing the order in which the various signals and the digits of the words are recorded thereon.

Fig. 3 is a schematic representation of a portion of a tape containing a single block of words. This shows that the tape may be moved in one direction for writing and in either direction for reading. It shows a plurality of seventeen digit words, the two end words being instruction or end-of-block words containing operational codes and the intermediate words being informational in character. The extreme left hand and extreme right hand codes are the end-of-block character 13 codes and the codes flanking each word are the end-of-word character 12 codes.

Figure 4:
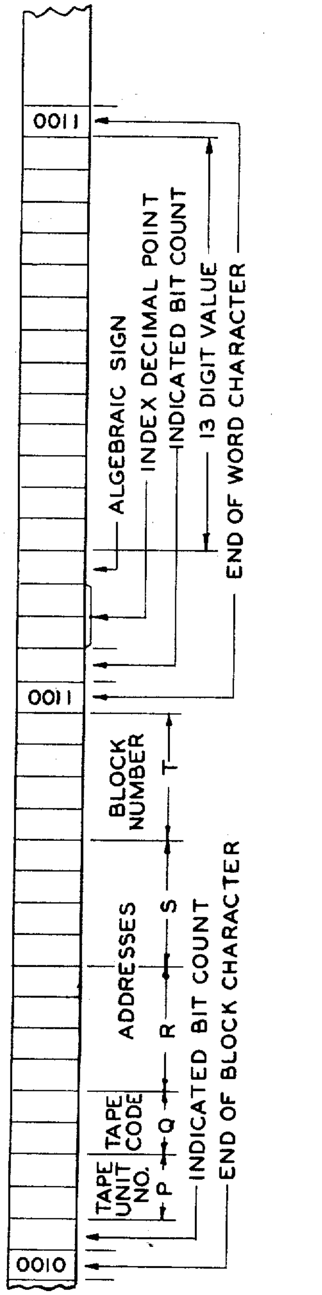
Fig. 4 is a showing of the same nature as Fig. 3 but on an enlarged scale to show the arrangement of two words in more detail.

Fig. 4 is an enlarged view of the same nature showing in detail the character of the information carried in the various digits of the words. Starting from the right it will be noted that there is first found an end-of-word character 12 code (0011) (see Table I) and then seventeen code places. In places 1 to 13 inclusive the actual word will be recorded with its highest order significant digit in place 13. Next, in position 14, will be a single digit for expressing the algebraic sign of the word and in positions 15 and 16 there will be a two place code for the index, information regarding the location of the decimal point. Finally, in position 17 there is a one place code for the indicated bit count. To the left of position 17 there is again the end of word character 12 (0011). Then follows another 17 digit word containing in positions 1, 2, 3 and 4 the T Field which is the block number of this particular block. The positions 5, 6, 7 and 8 constitute the S Field and the positions 9, 10, 11 and 12 constitute the R Field. These two Fields contain addresses, usually limiting addresses so that search may be made from the address in the R Field to the address in the S Field. Positions 13 and 14 constitute the Q Field and this contains the tape code, revealing the general character of the information in the block. Positions 15 and 16 constitute the P Field and contain a code identifying the tape unit number where this particular tape is placed. In position 17 again we find the indicated bit count; and this is followed by the end of block character 13 (0010).

Each seventeen digit word has in its seventeenth place (the last reading from the right) a two place code known as the indicated bit count. This is a value uniquely describing the contents of the other sixteen digits of the word and consists of the three's complement of the modulo four value of the actual count of bits therein. By way of example, the instruction word, shown in Fig. 5 is

30420096510160017

The bit count of the sixteen digits of this word may be derived from Table I as follows:

| Position | Digit | Bits | Count |
|---|---|---|---|
| 16 | 0 | 1111 | 0 |
| 15 | 4 | 0111 | 1 |
| 14 | 2 | 1101 | 1 |
| 13 | 0 | 1111 | 0 |
| 12 | 0 | 1111 | 0 |
| 11 | 9 | 1010 | 2 |
| 10 | 6 | 0101 | 2 |
| 9 | 5 | 0110 | 2 |
| 8 | 1 | 1110 | 1 |
| 7 | 0 | 1111 | 0 |
| 6 | 1 | 1110 | 1 |
| 5 | 6 | 0101 | 2 |
| 4 | 0 | 1111 | 0 |
| 3 | 0 | 1111 | 0 |
| 2 | 1 | 1110 | 1 |
| 1 | 7 | 0100 | 3 |
| | | | total 16 |

16/4=4+0 remainder
The modulo 4 value of 16 is therefore =0
The three's complement of 0 is 3−0=3

Therefore the indicated bit count of this instruction word is 3, which is the digit appearing in position 17 of this word. It may be noted that since the codes listed in the column marked "Bits" are inverted, the count of the word in its inverted form is actually a count of the 0 bits.

*General arrangement and operations*

Figure 7:
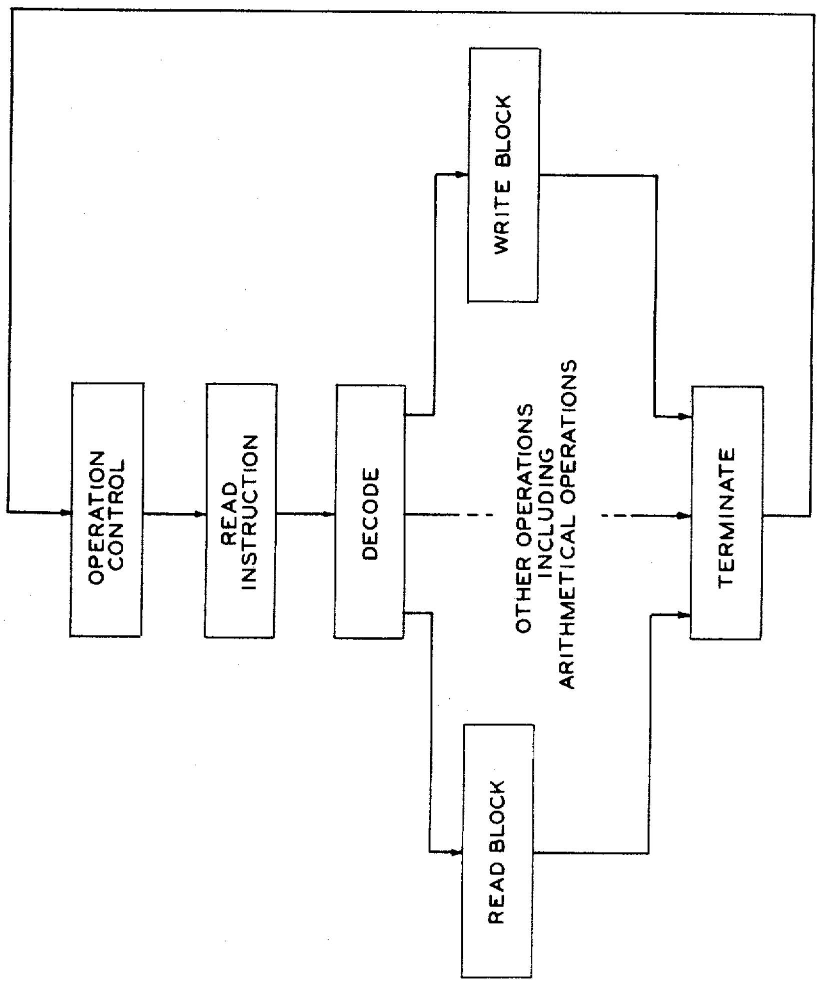
Fig. 7 is a flow chart useful in pointing out the sequence of circuit operations.

Fig 7 is a flow chart of that portion of the circuitry of the calculator in which the present invention is incorporated as a part. The operation control on an original start or a start signalled by the termination of a previous operation will first cause the reading of the instructions for the next operation. This in turn will activate a circuit known as the Decode—a circuit which will sort out the instructions and thereupon enable the means for carrying out the proper suboperation. In accordance with the present arrangements it will activate either the Read Block, which controls the transfer of information to cathode ray tube storage from magnetic tape storage or the Write Block which controls the transfer of information in the other direction.

When the operations of the Read Block or the Write Block have been completed then a signal is transmitted to the Terminate Circuit and that in turn will notify the Operation Control circuit that another operation or suboperation may be started.

In any such operation the proper tape must be selected and the circuits for its use must be activated. It has been mentioned hereinbefore that there are twelve tape address switches and eight tape units, which arrangement makes for convenience in programming. Also it has been pointed out above that a particular tape designated for use in a given operation is identified in the controlling instruction word in the P Field, that is, the 15th and 16th position digits of the said instruction word. These two digits identify one of the twelve tape address switches and the particular switch selected then operates the particular tape unit to which it has previously been set.

When the calculator is set up for operation on a given problem, the various tape unit switches are manually set in accordance with the program after which the tape unit selection during the operations of the calculator become automatic.

Allusions will hereinafter be made to certain components of the tape units, all of which are considered conventional herein and all of which will be found fully described in application 13 above.

Once the tape has been selected for writing, the course of the operation is under the control of the Write Block circuit. One of the first things which the Write Block circuit does is to energize the move and forward bias coils in the selected tape unit. At the same time it also activates the erase head so that the erasing operation might take place before a writing starts. Signals for performing these functions are developed by one of the eight tape unit control circuits, and the signals for the forward bias coil, the moving coil and the erase head are delivered to the tape unit itself.

In the tape unit the erase signal is delivered to the tape unit auxiliary chassis where it immediately energizes the erase head. The moving coil signal is also fed into the tape unit auxiliary chassis where it energizes the moving coil. The forward bias coil signal, which is actually an absence of the backward bias coil signal, permits the tape to be moved in the forward direction when the backward bias coil signal is not developed.

Six milliseconds later the common tape control circuit develops a signal which is delivered to the Tape Unit Amplifier where it sets up the conditions that permit a writing operation to take place when a bit is presented at the input of the Tape Unit Amplifier. Two milliseconds later the common Tape Control circuit develops a signal for the Write Block circuit which permits the latter to perform a writing operation. The Write Block circuit at this time directs the read-out of words from CRT storage into Register 1, according to the character of the Instruction Register. Each 14 microseconds a digit is shifted out of position 17 of Register 1 and gated through the Tape Writing circuits into the circuits of the tape units themselves. The digits are entered into the selected tape unit through the tape unit circuit. It should be noted that the inverse of the digit to be written is actually written, having been inverted by the Tape Writing circuits.

The inverted digits are entered into the tape units and from there into the four tape unit amplifiers. One such tape unit amplifier is capable of writing one bit, and therefore four such amplifiers are located in each of the eight tape units in order that the 1, 2, 4 and 8 bits might be written. Writing is accomplished by changing the direction of the flux in the read-write head.

When all the digits of all the data words called for by the R and S Fields of the Instruction Register have been written, the Write Block circuit pulls DOWN the write line which accomplishes the de-energization of the moving coil and the erase head. Since the tape does not come to a full stop until approximately eight milliseconds (about .75 inch) after the moving coil is de-energized, the erase head continues to be energized for about nine milliseconds after the absence of an erase signal at the tape unit amplifier circuit is detected. This permits the tape to be erased during the coasting period.

Actually the Write Block circuit is instructed to stop tape operation by an Inequality Detector after the latter determines that the V Field code and the S Field code are identical. It should be understood that even prior to the tape writing operation the R Field code of the Instruction Register had been inserted into the V Field where it was modified by one each time that a new word had been read out of CRT storage into Register 1 for entry on tape. At the same time that the Write Block circuit brings the tape to a stop it energizes the Terminate circuit in order that a new calculator suboperation cycle might be started.

The Write Block circuit may also be directed to stop further tape operation by the presence of a greater-than-9 or modulo 4 error in the Register 1 word read out from CRT storage as recognized by the Register Error Storage circuit by reaching the end-of-tape or by depressing the SUBOPERATION AND TAPE STOP pushbutton on the console. It should be realized that each time that a word is taken out of CRT storage and entered into Register 1, it is checked by the Word Check circuit which in turn notifies the Register Error Storage circuit to pass on this information to the Write Block circuit. If it should happen that the tape travels so far that the red-of-tape label is sensed by the photo-electric cell in the tape unit, a signal is developed by the Tape Unit Auxiliary Chassis and fed through the Tape Unit circuit and the Tape Selection circuit before reaching the Write Block circuit where it forces the latter to cause the end-of-block word to be written in order that the completion latch might be energized and the writing circuits thereby de-energized. A word check failure signal also brings about the stalling of the calculator. Stopping the tape manually fro mthe main frame of the calculator requires the depression of the SUBOPERATION AND TAPE STOP pushbotton on the console.

It is unlikely that an end-of-tape label will be sensed during a writing operation inasmuch as an end-of-file label is sensed before the end-of-tape label. The photoelectric cell in the tape unit determines the presence of an aluminum patch on the inactive side of the tape and develops a signal through the Tape Unit Auxiliary Chassis which is fed through the Write Block circuit which permits the calculator to be stalled provided that the End-of-File Condition Stop switch on the console is in the STOP position. Since the end-of-file indicator light is illuminated at this time and the calculator is stalled, the operator is forewarned that the writing has passed the end-of-file mark on the tape and that any subsequent writing operation may not be completed on this tape. It must be understood that a distance is provided between the end-of-file label and the end-of-tape label such that a 2000 word block may be written after the end-of-file label is sensed.

If, on the other hand, the operator prefers to accomplish a conditional transfer by the end-of-file signal rather than the stalling of the calculator, he places the End-of-File Condition Stop switch to the PROCEED position and the operational code 67 is programmed into the Instruction Register in the subsequent cycle so that the Program Indicator Storage circuit might reset the end-of-file latch in the Read Block circuit. When the Terminate circuit is now energized, the calculator is free to enter into another suboperation cycle in line with the sequence of instructions which the programmer desires.

A deletion operation differs from a writing operation to the extent that the tape is now saturated in one direction, there being no change of flux. Two output amplifiers are provided in the Tape Unit Amplifier circuit, one of which is always conductive during a tape writing operation, so that the flux in the read-write head is developed in either of two directions. An actual writing takes place by a change of flux in the read-write coil. In a deleting operation, therefore, only one of the amplifiers is operated, and therefore the head serves to saturate the tape in one direction.

The Calculator is capable of delecting the entire tape or any block thereon. To saturate the entire tape, it is necessary first to rewind it to the load point. In deleting a specific block on tape, it is first necessary to read the tape backwards in order to determine the location of the block, after which a deleting code must be inserted into the Instruction Register in order to accomplish the deletion. During a deletion operation, the Write Block circuit goes through its regular functions of removing words from CRT storage, entering them into Register 1, shifting the digits out as if for actual writing, entering character 12's from the right, modifying the V Field during each read-out from CRT storage and performing all the other functions associated with writing. However, since a write gate signal cannot be developed by the Write Block circuit during a deletion, the digits shifted out of Register 1 cannot be entered into tape. When the V Field code is found to be identical to the S Field code, as in the regular writing operation, the Write Block circuit stops the tape and initiates the Terminate suboperation in order that another calculator suboperation cycle may be started.

Since writing and deleting must be accomplished automatically, it is essential that the correct operational code be present in the Instruction Register. For writing, the codes 90 and 91 must be present, and for deleting the codes 92 and 93 must be present. These codes in positions 13 and 14 (the Q Field) of the Instruction Register are examined by the Q Matrix before they serve to direct the Write Block circuit to perform the desired operation.

Timing during both the writing and deleting operations is accomplished by the Control Counter and the Octal Commutator. The one microsecond pulse developed by the Control Counter each 14 microseconds serves to shift out the digit in position 17 of Register 1 into the Tape circuit. Thus it determines the time interval between bits written on tape. During a deleting operation, as above stated, the digit in position 17 is shifted out into the Tape circuit although it is not permitted to change the flux of the read-write head. The Octal Commutator provides the necessary timing required to shift the instruction word from the Instruction Register into Register 1 to enter data words from CRT storage into Register 1, and to transfer the Register 2 word into Register 1 at the end of a writing or deletion operation.

The reading operation may take place either in the forward or backward direction and either automatically or manually. In any event the first thing which must be done is to select the desired tape for operation. If the reading is to be automatic, tape selection is accomplished by properly positioning the Tape Address switches on the console and inserting the appropriate P Field code into the Instruction Register. For manual reading, tape selection is performed by positioning the Tape Unit Selector switch to the desired one of eight positions corresponding to the eight tape units.

Just as the writing operation is controlled by the Write Block circuit, the reading operation is controlled by the Read Block circuit. If the operational code is 94, calling for a forward reading operation, the Q Matrix circuit informs the Read Block circuit of this fact. As in writing so in reading, the moving coil and the forward bias coil are immediately energized. Actually the forward bias coil in the tape unit is always energized, except when a backward signal is given to the tape circuit. The signal for energizing the moving coil is developed by the particular Tape Unit Control circuit in operation. The signal from this selected tape unit control circuit is fed into the Tape Unit Auxiliary Chassis. Actually even the moving coil is always energized and what the signal developed by the Tape Unit Control circuit does is to energize it in a different direction. The direction of the current in the moving coil is thus reversed, and the reading operation commences.

As soon as the read-write heads discover a change of flux on tape, a signal is developed by the Tape Unit Amplifier. For example, if the bit 4 head and the bit 2 head discover such a condition, two signals are developed by the associated amplifier circuits and fed into the Tape Reading circuits. Since the digits are written inversely, a reading of a 2 bit and a 4 bit from tape indicates the presence of a binary-decimal 9. The inversion takes place in the Tape Reading circuits during which time the signals are stretched and a gating signal is developed six microseconds later for gating the 9 into the Buffer Storage circuit shown in the Read Block circuit. Each succeeding parallel reading of the four bits is likewise inverted in the Tape Reading Circuits, the signals stretched and the binary-decimal values inserted into the Tape Buffer Storage circuit for storage for an interval of about 14 microseconds.

After 17 digits have been transferred from tape into Register 1, the T Field code of this initial end-of-block word is compared with the T Field code of the Instruction Register by the Inequality Detector. If the codes are found to be identical, the actual reading of the data words are transferred from Register 1 into CRT storage. After the selected word block has been completely read from tape and stored in CRT, the Read Block circuit initiates the Terminate suboperation in order that another calculator suboperation cycle may be started.

Both codes 94 and 96 call for a forward reading operation, but the 96 code also permits the examination of every word, including the initial end-of-block word, during the searching for the desired word block. Under code 96 every word is subjected to a greater-than-9, modulo 4 and word size error check. This means that every time that the read-write heads detect a bit on the face of the tape and cause the tape amplifier circuit and the Tape Reading circuits to be operated, the inverse of the bits read is inserted through the Tape Buffer Storage circuit into Register 1. The word is transferred shortly thereafter onto the parallel transfer bus for examination by the Word Check circuit. This circuit examines the Register 1 word for a greater-than-9 and a modulo 4 error. The 17 digit word is also examined for a word size error during its presence in Register 1.

An automatic backward reading operation is called for by the presence of operational codes 95 and 97 in the Instruction Register. The same circuits and drawings are used to accomplish a backward reading operation as are used for a forward reading operation, the only difference being that the backward bias coil is energized at this time in order to accomplish the backward motion of the tape. That is to say, the backward bias coil is energized ten milliseconds prior to the change of current flow through the moving coil. Furthermore, since the digits will now be read in a backward direction, it is necessary to insert them into Register 1 through position 17 thereat rather than through position 1 as in the case of forward reading.

The tape may also be read manually either in the forward or backward direction by the depression of the READ FORWARD or READ BACKWARD pushbutton, respectively, provided that the Tape Unit Selector switch on the console is set to the desired position or type of operation. So long as the manual read operation is in process, the ADVANCE line from Operation Control is held DOWN and calculator operation prevented.

Although the identical circuits are used to accomplish a forward or backward manual reading operation as are used to accomplish the same automatic operation, the digits read from tape and entered into Register 1 cannot be subsequently entered into the CRT circuits for storage. A manual reading operation in either direction can only accomplish a check of the 17 digit word read from tape for a greater-than-9, modulo 4 or word size error. If it is desired to store the digits read, resort must be had to the operation codes for an automatic operation.

Timing for the manual or automatic reading operations is accomplished by the Octal Communtator. This permits the word read out from tape and entered into Register 1 to be stored in CRT at the proper time interval and the final end-of-block work present in Register 1 to be transferred to Register 2 at the conclusion of the automatic reading operation. Since the digits had previously been written on tape with an approximately 14 microsecond spacing, they are read at approximately the same time interval, taking into consideration tape slippage and other factors.

During an automatic reading operation, tape motion is normally stopped by the sensing of the final end-of-block word of a block entered into CRT storage. Tape motion may also be stopped during automatic reading when an end-of-file mark is sensed on tape. Furthermore, the tape may be stopped manually by the depression of the SUBOPERATION AND TAPE STOP pushbutton. During manual reading, tape motion can be stopped manually by depressing either the SUBOPERATION AND TAPE STOP pushbutton or the ARITHMETIC AND CONTROL RESET pushbutton on the console or automatically when the final end-of-block word is read into Register 1. Only one block can be read each time the TAPE READ FORWARD or TAPE READ BACKWARD pushbutton is depressed.

Another tape operation which may be performed either automatically or manually is that of rewinding. Automatically it is accomplished by programming a 98 into the Instruction Register after the tape unit has been selected, at which time a signal is delivered to the Tape Unit Control circuit of the tape unit selected for operation, as indicated in the Tape Selection circuit. As in the backward reading operation, a signal is developed by the selected tape unit control circuit which energizes the backward coil in the tape unit ten milliseconds before the current through the moving coil is reversed. Manually, rewinding may be accomplished by depressing the LOAD pushbutton on the tape unit frame itself after tape unit power has been turned on. Rewinding is only accomplished in the backward direction.

The rewinding operation may also be stopped either manually or automatically. Automatically it is stopped when during the course of a rewinding operation an instruction is programmed into the calculator calling for a read forward or write operation. It should be understood that the operation of the calculator continues as normal during the rewinding period. However, with a read or write instruction having been programmed and the end-of-tape having been reached, the selected Tape Unit Control circuit operates the common Tape Control Circuit in such a manner as to de-energize the rewind latch in the Tape Unit Control circuit and cause the backward bias line to go DOWN. It also energizes a 30 millisecond delay circuit which prevents the writing from taking place until the end of this time interval. In the above description endeavoring to show the interrelationship of the various circuits used in the calculator (many of which are not shown herein but all of which are fully disclosed in the above noted applications) particularly insofar as they relate to the performance of major functions of tape unit operation, it has been assumed that the tape unit which has been selected for one of the above discussed operations has had its power turned on (this is done locally) and is in an operative condition. That is to say, the tape has been properly located in the vacuum manifold of the tape unit, the various motors and relays have been operated and the necessary voltage applied to the cathodes and plates of the tubes in the Tape Unit Auxiliary Chassis and the Tape Unit Amplifiers.

*Detailed description*

In the following detailed description there will be mentioned from time to time various connections, terminals, or leads coming from various parts of the complete circuit of the calculator, all of which are shown in some one or another of the list of applications given above. It will be understood that the circuitry by which the signals on these terminals are derived cannot be given herein without overwhelming the present disclosure with an immense mass of detail not particularly pertinent to this disclosure. By way of example, Fig. 25 shows a box representing the tape unit itself which is fully described in application 13, the application Serial Number 471,244, filed November 26, 1954, entitled "Tape to Card and Card to Tape Converter" by James A. Weidenhammer. As a single example, the terminal 08X.20 provides inputs to AND circuits 4328 and 4337 of the associated tape unit control circuit as it responds to an End of Tape signal derived by the tape unit and transmitted over the number 35 prong of the multi-contact plug (Fig. 20 of the above noted application) by which the tape unit is connected into the circuit network of the calculator. The following is a list of terminals over which signals are transmitted into and out of the circuits of the present invention together with a clew to the location of each in the above noted applications.

*Introduction to tape writing*

When decode determines that the Q Field code is in the series 90–93, it energizes an output latch which develops a sustained signal starting at N.7 time at output terminal 002.04 which is subsequently fed into the Write Block circuit Fig. 35. Once the signal arrives in the Write Block it energizes 2-position switch 2730 since an ADVANCE signal is also present at this time. This initiates the operation of the Write Block input latch comprising the 2-position switch 2730 and delay circuit 2731 and permits the operation of the Write Block suboperation whose basic function is to transfer, digit by digit, the contents of Register 1 onto a selected tape, as will be explained below.

For the sake of ease in understanding this circuit certain conditions will be assumed to exist in the calculator at the time that the Write Block input latch is energized.

Q Field code=90.
V Field code=0965.
Register 1=3 05 0 1 2314 1566 2851.
Register 2=3 05 0 1 2314 1566 2851.
Instruction Register=3 04 20 0965 1016 0017.

Although the data words in Registers 1 and 2 are assumed to be equal, it must be understood that any appropriate 17 digit words may be located in both registers. Furthermore, it must be understood that the V Field code is the same as the four digits appearing in the R Field (0965) of the Instruction Register in the initial phase of the operation inasmuch as the Decode circuit has transferred the R Field code (positions 9–12) of the Instruction Register to the V Field at the same time that it has initiated the Write Block input latch. Therefore, at this time the V Field indicates the decimal number 0965. It should be borne in mind that the R Field code in the instruction word remains unchanged throughout the Read Block suboperation, but the R Field code which has initially been inserted into the V Field is continuously modified during the Read Block operation until the V Field code equals the S Field, indicating that the data words located in CRT storage from address R (0965) to address S (1016) have been written on tape, as will be explained in detail below.

Figure 8:
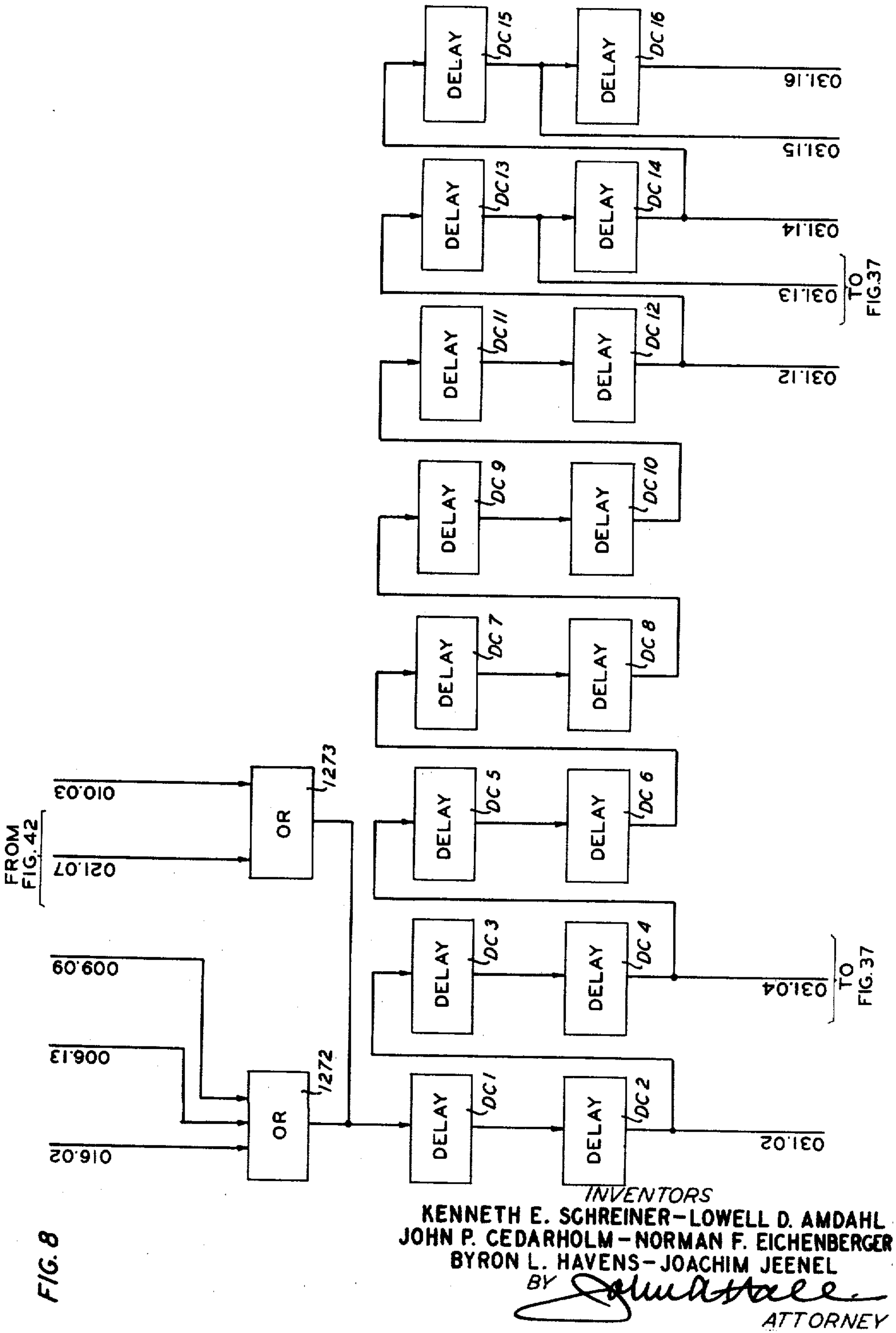
Fig. 8 is a schematic logical circuit diagram showing the control counter for timing the writing operations.
Figure 12:
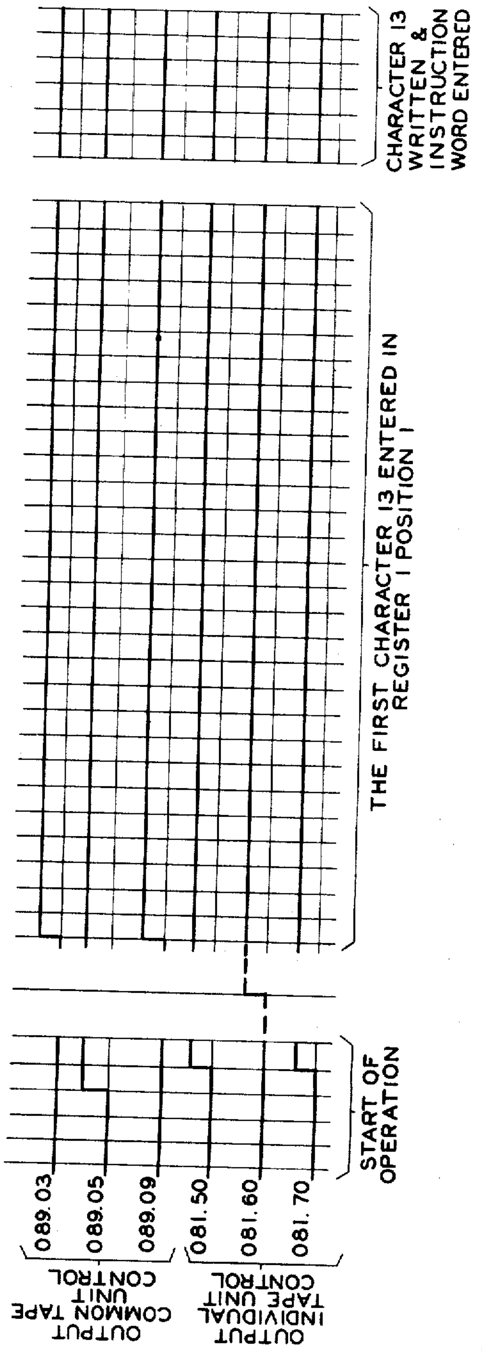

For the purpose of explaining the writing operations with the above noted data, a time chart is provided in Figs. 10 to 13 inclusive. The timing is controlled on a 14 microsecond basis for handling each digit of each word including the end-of-block character 13 and the end-of-word character 12. The timing within the calculator is controlled fundamentally by the octal commutator which transmits a recurrent series of eight one microsecond pulses, known as the N.0 to N.7 pulses inclusive. There is provided another counter, fundamentally of the same design as the octal commutator, but lacking the means for automatically recycling itself for counting off the 14 intervals of the cycle used in the writing operation. This is shown simply in Fig. 8 as a string of delay circuits, triggered from one or more OR circuits at what will be considered time T.0 and emitting pulses at time T.1, T.2, T.3, etc. Thus, if the OR circuit 1273 is brought UP for a one microsecond interval over the terminal 021.07 (see Fig. 42) at octal commutator time N.0, a pulse at time T.0 will be delivered to the first delay circuit DC-1 and this pulse will be passed along from delay circuit to delay circuit, appearing by way of example at output terminal 031.04 at time T.4. It will appear hereinafter that the terminal 021.07 will be brought UP regularly each 14 microseconds so that the OR circuit 1273 will go UP at what would be time T.14 which thus becomes T.0 but it is pointed out that this recurrent operation of the control counter is achieved by the circuitry of the so-called Write Block (Fig. 34) rather than from an internal automatic operation.

Since the octal cycle consists of a recurrent series of eight intervals and this control counter consists of a recurrent series of fourteen intervals, it is convenient to be able to derive the identity of a given octal cycle time interval and a given control counter time interval corresponding to a known count of such microsecond intervals. For this purpose the following table is presented, giving control counter times in columns and rows.

TABLE 2

OCTAL CYCLES

| | | | | | | | | |
|---|---|---|---|---|---|---|---|---|
| | 0 | 1 | 2 | 3 | 4 | 5 | 6 | 7 |
| 0 | 0 | 1 | 2 | 3 | 4 | 5 | 6 | 7 |
| 1 | 8 | 9 | 10 | 11 | 12 | 13 | 0 | 1 |
| 2 | 2 | 3 | 4 | 5 | 6 | 7 | 8 | 9 |
| 3 | 10 | 11 | 12 | 13 | 0 | 1 | 2 | 3 |
| 4 | 4 | 5 | 6 | 7 | 8 | 9 | 10 | 11 |
| 5 | 12 | 13 | 0 | 1 | 2 | 3 | 4 | 5 |
| 6 | 6 | 7 | 8 | 9 | 10 | 11 | 12 | 13 |

With the help of the above table the octal cycle time and the control counter time for any given microsecond count may be obtained. By way of example, it may be desired to know the values for a microsecond count of 13090. The modulo 8 value of this figure is derived by dividing by eight which produces the integral quotient 1636 with the remainder 2 (the modulo eight value). Thus 2 is the octal cycle value (N.2). The integral quotient 1636 is now divided by 7 which gives an integral quotient of 233 (in which we are not interested) and a remainder of 5 (the modulo 7 value). This last figure is the control counter index, by which the control counter time 0 is derived from the above table. Thus the timing at microsecond count 13090 is octal cycle time N.2 and control counter time T.0.

The timing chart, Figs. 10 to 13 arranged as in Fig. 9, is based on the above relationship and will be helpful in the following circuit description. For a clearer understanding of the circuit analysis which follows, a brief description of the time chart follows:

| Terminal | Function |
|---|---|
| 002.04 | UP as soon as Decode determines that the operational code calls for a writing operation and stays UP until the start of the subsequent calculator suboperation cycle. |
| 092.04 | UP each N.4 time regardless of the nature of the Calculator suboperation cycle, that is, the Octal Commutator invariably provides a signal at time N.4 during the execution of any calculator operation. |
| 092.06 | UP each N.6 time. |
| 092.07 | UP each N.7 time. |
| 031.04 | Each time a signal appears at terminal 021.07 (after terminal 021.04 has gone UP), the Control Counter develops a signal at time T.4. When terminal 021.04 goes DOWN, terminal 031.04 will not go UP again. |
| 031.13 | Same as 031.04 but at time T.13. |
| 089.09 | UP after 10 millisecond delay and stays UP until 021.04 goes DOWN. Operates single pulse generator 2747 in Write Block circuit (Fig. 36) to start writing operation. |
| 021.01 | UP one microsecond after 002.04 goes UP to energize indicator light to indicate write operation in process. |
| 021.02 | UP when writing operation is completed to trigger the Terminate circuit and start another suboperation cycle. |
| 021.04 | UP two microseconds after input terminal 002.04 goes UP and stays UP throughout writing operation. |
| 021.06 | UP for one microsecond each 14 microseconds in order to gate digit discharged from Register 1 into writing circuits. Always UP one microsecond after 021.07 goes UP. |
| 021.07 | UP for one microsecond each T.0 time of Control Counter (Fig. 8) operation. Provides timing for writing of digits 14 microseconds apart. Pulled DOWN when 089.09 goes DOWN. |
| 021.08 | UP for T.0 microsecond each T.0 time except the first time after a new word is entered into Register 1. Since a digit is already in position 17 at this time, no shifting out is required. The signal at this terminal accomplishes the injection of a character 12 at the same time a digit is shifted out of Register 1 for writing. |
| 021.09 | UP only when a character 13 is to be entered into Register 1 during the writing of an initial end-of-block word and a final end-of-block word. UP each 14 microseconds during this time. DOWN during the data word writing part of operation. |
| 021.10 | UP at N.7 time to insert the instruction word into Register 1 at the start and T.4 time at the end of a writing operation. |
| 021.11 | UP at N.7 time each time a word is transferred from either Register 2 or the Instruction Register into Register 1 and at T.4 time when the data word from CRT storage is entered into Register 1. It is DOWN every other time. UP at T.4 time for inserting final instruction word into Register 1. |
| 021.12 | UP for one microsecond at N.7 time after all the digits have been written in order to transfer the word in Register 2 into Register 1. |
| 021.13 | UP at N.0 time after a character 12 has been inserted into Register 1 position 17 and written on tape in order that a data word might be read out of CRT storage and entered into Register 1 before the next T.0 signal is developed at 021.07 so that the 14 microsecond interval between the written digits will not be disrupted. |
| 021.14 | UP at the first T.4 time of Control Counter (Fig. 8) operation, after a character 12 has been shifted into position 17 of Register 1, in order that the V Field code might be modified about the time that a new data word is entered into Register 1 from CRT storage. |
| 089.03 | UP after a six millisecond delay and stays UP until 021.04 goes DOWN. Function is to bring 081.60 (assuming the first tape unit is operative) UP. |
| 089.05 | UP as soon as 021.04 goes UP and stays UP until 021.04 goes DOWN. |
| 081.50 | UP one microsecond after 021.04 goes UP and stays UP until one microsecond after 021.04 goes DOWN. Function is to energize the moving coil in the direction of operation. |
| 081.60 | UP so long as 089.03 is UP. Function is to energize the four read-write heads in the selected tape unit in one direction so that when digit signals are subsequently impressed (that is, zeros of the digits) the changed direction of the current will constitute a writing operation. |
| 081.70 | UP so long as 085.50 is UP. Function is to energize the erase head. Although it goes DOWN one microsecond after 021.04 goes DOWN, the erase head circuit is so designed that the erase head remains energized for about 9 milliseconds thereafter. |

Other terminals of the write drawings in this disclosure are UP under other special conditions which will become clear during the course of the analysis. No time chart is provided for the read operation simply because timing is provided exclusively by the time interval that a particular digit is read from tape.

The timing chart, Fig. 9 (on the same sheet with Fig. 12), will show the following facts where it is assumed that a 52 word block is being written on tape. After the operation starts there will be first a 6 millisecond delay imposed by DELAY circuit 4311 (Fig. 15) followed by a 2 millisecond delay imposed by DELAY circuit 4303 (Fig. 16). This will constitute approximately 8000 microseconds, this terminology (approximately) being used since the timing is controlled by a condenser and resistance combination and it is difficult with this type of circuit to produce an absolutely accurate count of 8000 microseconds, particularly where such accuracy is not necessary. Therefore, at the first octal time N.6 thereafter, the output of the DELAY 4303 becomes effective and the terminal 089.09 is brought UP to effectively start the writing operation. Some ten microseconds thereafter the terminal 021.07 (Fig. 42) will go UP and this will be the start of the timing from which point the following events may be listed.

| | Micro-second Ct. | N.- | T.- |
|---|---|---|---|
| Timing starts | 0 | N. 0 | T. 0 |
| Character 13 entered into DP 1 | 14 | N. 6 | T. 0 |
| Instruction word entered | 252 | N. 4 | T. 0 |
| 1st word entered | 504 | N. 0 | T. 0 |
| 2nd word entered | 756 | N. 4 | T. 0 |
| 3rd word entered | 1008 | N. 0 | T. 0 |
| 4th word entered | 1260 | N. 4 | T. 0 |
| 5th word entered | 1512 | N. 0 | T. 0 |
| 6th word entered | 1764 | N. 4 | T. 0 |
| 7th word entered | 2016 | N. 0 | T. 0 |
| 8th word entered | 2268 | N. 4 | T. 0 |
| 52nd word entered | 13356 | N. 4 | T. 0 |
| INSTRUCTION word entered | 13608 | N. 0 | T. 0 |
| Last Character 13 entered | 13860 | N. 4 | T. 0 |
| Register 2 word entered into Register 1 and writing stopped | 14112 | N. 0 | T. 0 |

The following table will show the condition of Register 1 at the beginning and the end of the tape writing operation, as will be explained hereinafter.

TABLE 3

| Digit Positions | | | | | | | | | | | | | | | | | Count |
|---|---|---|---|---|---|---|---|---|---|---|---|---|---|---|---|---|---|
| 17 | 16 | 15 | 14 | 13 | 12 | 11 | 10 | 9 | 8 | 7 | 6 | 5 | 4 | 3 | 2 | 1 | |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 13 | 14 |
| 0 | 0 | 0 | 0 | 0 | 0 | 0 | 0 | 0 | 0 | 0 | 0 | 0 | 0 | 0 | 13 | 13 | 28 |
| 0 | 0 | 0 | 0 | 0 | 0 | 0 | 0 | 0 | 0 | 0 | 0 | 0 | 0 | 13 | 13 | 13 | 42 |
| 0 | 0 | 0 | 0 | 0 | 0 | 0 | 0 | 0 | 0 | 0 | 0 | 0 | 13 | 13 | 13 | 13 | 56 |
| 0 | 0 | 0 | 0 | 0 | 0 | 0 | 0 | 0 | 0 | 0 | 0 | 13 | 13 | 13 | 13 | 13 | 70 |
| 0 | 0 | 0 | 0 | 0 | 0 | 0 | 0 | 0 | 0 | 0 | 13 | 13 | 13 | 13 | 13 | 13 | 84 |
| 0 | 0 | 0 | 0 | 0 | 0 | 0 | 0 | 0 | 0 | 13 | 13 | 13 | 13 | 13 | 13 | 13 | 98 |
| 0 | 0 | 0 | 0 | 0 | 0 | 0 | 0 | 0 | 13 | 13 | 13 | 13 | 13 | 13 | 13 | 13 | 112 |
| 0 | 0 | 0 | 0 | 0 | 0 | 0 | 0 | 13 | 13 | 13 | 13 | 13 | 13 | 13 | 13 | 13 | 126 |
| 0 | 0 | 0 | 0 | 0 | 0 | 0 | 13 | 13 | 13 | 13 | 13 | 13 | 13 | 13 | 13 | 13 | 140 |
| 0 | 0 | 0 | 0 | 0 | 0 | 13 | 13 | 13 | 13 | 13 | 13 | 13 | 13 | 13 | 13 | 13 | 154 |
| 0 | 0 | 0 | 0 | 0 | 13 | 13 | 13 | 13 | 13 | 13 | 13 | 13 | 13 | 13 | 13 | 13 | 168 |
| 0 | 0 | 0 | 0 | 13 | 13 | 13 | 13 | 13 | 13 | 13 | 13 | 13 | 13 | 13 | 13 | 13 | 182 |
| 0 | 0 | 0 | 13 | 13 | 13 | 13 | 13 | 13 | 13 | 13 | 13 | 13 | 13 | 13 | 13 | 13 | 196 |
| 0 | 0 | 13 | 13 | 13 | 13 | 13 | 13 | 13 | 13 | 13 | 13 | 13 | 13 | 13 | 13 | 13 | 210 |
| 0 | 13 | 13 | 13 | 13 | 13 | 13 | 13 | 13 | 13 | 13 | 13 | 13 | 13 | 13 | 13 | 13 | 224 |
| 13 | 13 | 13 | 13 | 13 | 13 | 13 | 13 | 13 | 13 | 3 | 13 | 13 | 13 | 13 | 13 | 13 | 238 |
| 3 | 0 | 4 | 2 | 0 | 0 | 9 | 6 | 5 | 1 | 0 | 1 | 6 | 0 | 0 | 1 | 7 | 252 |
| 0 | 4 | 2 | 0 | 0 | 9 | 6 | 5 | 1 | 0 | 1 | 6 | 0 | 0 | 1 | 7 | 12 | 266 |
| 4 | 2 | 0 | 0 | 9 | 6 | 5 | 1 | 0 | 1 | 6 | 0 | 0 | 1 | 7 | 12 | 12 | 280 |
| 2 | 0 | 0 | 9 | 6 | 5 | 1 | 0 | 1 | 6 | 0 | 0 | 1 | 7 | 12 | 12 | 12 | 294 |
| 0 | 0 | 9 | 6 | 5 | 1 | 0 | 1 | 6 | 0 | 0 | 1 | 7 | 12 | 12 | 12 | 12 | 308 |
| 0 | 9 | 6 | 5 | 1 | 0 | 1 | 6 | 0 | 0 | 1 | 7 | 12 | 12 | 12 | 12 | 12 | 322 |
| 9 | 6 | 5 | 1 | 0 | 1 | 6 | 0 | 0 | 1 | 7 | 12 | 12 | 12 | 12 | 12 | 12 | 336 |
| 6 | 5 | 1 | 0 | 1 | 6 | 0 | 0 | 1 | 7 | 12 | 12 | 12 | 12 | 12 | 12 | 12 | 350 |
| 5 | 1 | 0 | 1 | 6 | 0 | 0 | 1 | 7 | 12 | 12 | 12 | 12 | 12 | 12 | 12 | 12 | 364 |
| 1 | 0 | 1 | 6 | 0 | 0 | 1 | 7 | 12 | 12 | 12 | 12 | 12 | 12 | 12 | 12 | 12 | 378 |
| 0 | 1 | 6 | 0 | 0 | 1 | 7 | 12 | 12 | 12 | 12 | 12 | 12 | 12 | 12 | 12 | 12 | 392 |
| 1 | 6 | 0 | 0 | 1 | 7 | 12 | 12 | 12 | 12 | 12 | 12 | 12 | 12 | 12 | 12 | 12 | 406 |
| 6 | 0 | 0 | 1 | 7 | 12 | 12 | 12 | 12 | 12 | 12 | 12 | 12 | 12 | 12 | 12 | 12 | 420 |
| 0 | 0 | 1 | 7 | 12 | 12 | 12 | 12 | 12 | 12 | 12 | 12 | 12 | 12 | 12 | 12 | 12 | 434 |
| 0 | 1 | 7 | 12 | 12 | 12 | 12 | 12 | 12 | 12 | 12 | 12 | 12 | 12 | 12 | 12 | 12 | 448 |
| 1 | 7 | 12 | 12 | 12 | 12 | 12 | 12 | 12 | 12 | 12 | 12 | 12 | 12 | 12 | 12 | 12 | 462 |
| 7 | 12 | 12 | 12 | 12 | 12 | 12 | 12 | 12 | 12 | 12 | 12 | 12 | 12 | 12 | 12 | 12 | 476 |
| 12 | 12 | 12 | 12 | 12 | 12 | 12 | 12 | 12 | 12 | 1 | 12 | 12 | 12 | 12 | 12 | 12 | 490 |
| 3 | 0 | 5 | 0 | 1 | 2 | 3 | 1 | 4 | 1 | 5 | 6 | 6 | 2 | 8 | 5 | 1 | 504 |
| 0 | 5 | 0 | 1 | 2 | 3 | 1 | 4 | 1 | 5 | 6 | 6 | 2 | 8 | 5 | 1 | 12 | 518 |
| 5 | 0 | 1 | 2 | 3 | 1 | 4 | 1 | 5 | 6 | 6 | 2 | 8 | 5 | 1 | 12 | 12 | 532 |
| 0 | 1 | 2 | 3 | 1 | 4 | 1 | 5 | 6 | 6 | 2 | 8 | 5 | 1 | 12 | 12 | 12 | 546 |
| 1 | 2 | 3 | 1 | 4 | 1 | 5 | 6 | 6 | 2 | 8 | 5 | 1 | 12 | 12 | 12 | 12 | 560 |
| 2 | 3 | 1 | 4 | 1 | 5 | 6 | 6 | 2 | 8 | 5 | 1 | 12 | 12 | 12 | 12 | 12 | 574 |
| 3 | 1 | 4 | 1 | 5 | 6 | 6 | 2 | 8 | 5 | 1 | 12 | 12 | 12 | 12 | 12 | 12 | 584 |
| 6 | 0 | 0 | 1 | 7 | 13 | 13 | 13 | 13 | 13 | 13 | 13 | 13 | 13 | 13 | 13 | 13 | 14028 |
| 0 | 0 | 1 | 7 | 13 | 13 | 13 | 13 | 13 | 13 | 13 | 13 | 12 | 13 | 13 | 13 | 13 | 14042 |
| 0 | 1 | 7 | 13 | 13 | 13 | 13 | 13 | 13 | 13 | 13 | 13 | 13 | 13 | 13 | 13 | 13 | 14056 |
| 1 | 7 | 13 | 13 | 13 | 13 | 13 | 13 | 13 | 13 | 13 | 13 | 13 | 13 | 13 | 13 | 13 | 14070 |
| 7 | 13 | 13 | 13 | 13 | 13 | 13 | 13 | 13 | 13 | 13 | 13 | 13 | 13 | 13 | 13 | 13 | 14084 |
| 13 | 13 | 13 | 13 | 13 | 13 | 13 | 13 | 13 | 13 | 13 | 13 | 13 | 13 | 13 | 13 | 13 | 14098 |
| 3 | 0 | 5 | 0 | 1 | 2 | 3 | 1 | 4 | 1 | 5 | 6 | 6 | 2 | 8 | 5 | 1 | 14112 |

*Selecting a tape unit*

Tape selection is accomplished by the Tape Selection circuit shown in Fig. 30 acting in conjunction with a couple of switches on the console. A tape unit may be selected either manually or semi-automatically, as will be explained below.

Any one of eight tape units may be selected semi-automatically by the P Field code of the Instruction Register after the 12 tape address switches 5361–5372 (shown in Figs. 26 and 31) have been properly set. The 12 switches have their corresponding terminals tied together. That is to say, terminals 1 which select tape unit 1 are tied together, terminals 2 which select tape unit 2 are tied together, and so on throughout the eight terminals and eight tape units. Once it is determined which tape units are available for use, the tape address switches are accordingly set to permit any one of the 12 addresses in the P Field to operate an available tape. Codes 1 through 12 of the P Field (positions 15–16) of the Instruction Register determine through which of the 12 TAPE ADDRESS switches the tape unit is to be selected. The operation of these switches will become clearer as the circuits of Fig. 30 are examined.

As soon as a word exists in the Instruction Register, the tape selection circuit examines the contents of its P Field. The digit in position 15 (terminals 443.15) of the instruction word is then changed to its decimal equivalent by the 4-to-9 wire converter 4219 (Fig. 30), while the digit, if any, in position 16 (terminal 443.16), is undisturbed. Although the code signal energizes one of the TAPE ADDRESS switches, actual tape unit selection does not take place until the tape control circuit indicates that the particular tape unit is operative and the Decode circuit detects the presence of a 90 series number in the Q Field.

Figure 31:
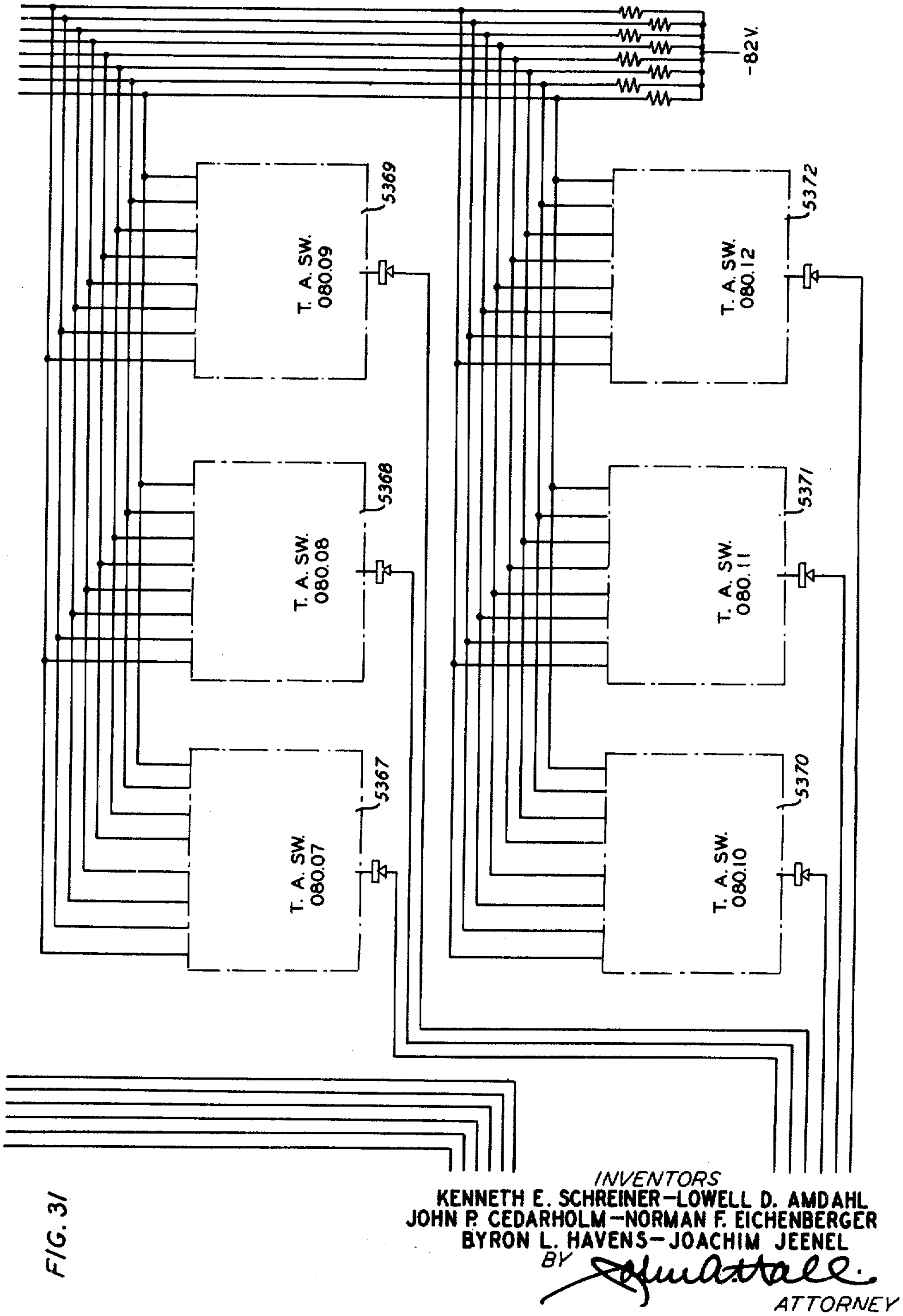

Assume that the binary-decimal value in the P Field in the Instruction Register is an 8. This means that input terminal 443.15.8 on the tape selecion circuit is energized. The 4-to-9 wire converter 4219 (Fig. 30) immediately changes this binary-decimal value into a decimal 8. Energization of the "8" line operates cathode follower 4170 and a diode in circuit with the selecting arm of the address 08 switch 5368 (Fig.31). A diode is associated with each TAPE ADDRESS switch in order to prevent current flow through any of the other switches set in the same position as the switch associated with cathode follower 4170. If the TAPE ADDRESS switch associated with this diode had previously been manually set in position 2, indicating tape unit 2, the signal developed in the "8" line is delivered to the center input terminal of AND circuit 4189 (Fig. 27). No delay is interposed between the output of the Instruction Register and the TAPE ADDRESS switch. When the cathode follower 4170 is deenergized, the center input terminal of AND circuit 4189 is brought DOWN through the normal connection of this terminal through a resistor to a −82 volt potential (see Fig. 31).

However, coincidence is not established at AND circuit 4189 until the Decode suboperation has been initiated and a signal has been received from the Tape Unit No. 2 indicating over its terminal 082.10 (Fig. 21) that Tape Unit No. 2 is available for use. Reference should be made to application 13 for a more detailed analysis as to how the signal is developed which indicates that Tape Unit No. 2 is operative.

When the Decode circuit discovers the presence of a 90 series number in the Q Field of the Instruction Register at the time that its input latch is energized, a signal is delivered to input terminal 002.02 which causes the left input terminal of AND circuit 4183 (Fig. 27) to be UP. Since the right input terminal of AND circuit 4183 is DOWN only during manual operation due to the presence of inverter 4182, coincidence is established which energizes delay circuit 4185 and causes the left input terminal of AND circuit 4189 to be UP at this time. Since it had been determined initially when the TAPE ADDRESS switches had been set up that the second tape unit was available for use, a signal appears at input terminal 082.10 which causes the right input terminal of AND circuit 4189 to be UP.

Referring to a discussion under the title "Verifying" hereinafter, it may be seen that a signal is developed at input terminal 081.10 only after all the motors and relays in the tape unit have been operated, whereupon the output terminal 24 (Fig. 25) is connected to a +40 volt source. This signal is made available to the associated control circuit, which in the hypothetical case, is the Tape Unit 2 Control circuit where it causes output terminal 082.10 to go UP. When the Tape Unit is not in an operating condition, output terminal 082.10 is held DOWN by reason of a normal connection to a −35 volt source. Therefore, a tape unit cannot be selected for operation when it is not made operative locally by turning on the POWER ON switch.

When this AND circuit 4189 is UP, Delay circuit 4217 (Fig. 28) is energized and a signal is developed at output terminal 080.82 (Fig. 32) which selects Tape Unit 2. The signal developed at output terminal 080.82 is fed to the Tape Unit 2 control circuit where it develops coincidence at various AND circuits under certain conditions. Note the connection of the Tape Unit 1 Control conductor 080.81 to AND circuits 4340, 4341, 4321, 4323, 4337 and 4333 (Figs. 19 and 20). For example, during a writing or deleting operation using Tape Unit No. 2, the signal at input terminal 080.82, indicating that this Tape Unit is operative and called for, permits coincidence at AND circuit 4388 (not shown but corresponding to 4333) of the Tape Unit 2 Control circuit and a signal to be developed at output terminal 082.60. The signal at this output terminal permits the actual writing or deleting operation to take place, as will be set forth hereinafter.

At the same time that the Tape Unit is selected, OR circuit 4209 (Fig. 29) is energized, thereby operating cathode follower 4207 and developing a signal at output terminal 080.20 which is fed to Decode to inform that circuit that a particular Tape Unit has been selected. The presence of this signal in Decode permits the latter to energize either the Write Block (Fig. 34) or the Read Block (Fig. 44) as called for by the operational code. Absence of this signal prevents either one of these suboperations to be initiated.

Figure 26:
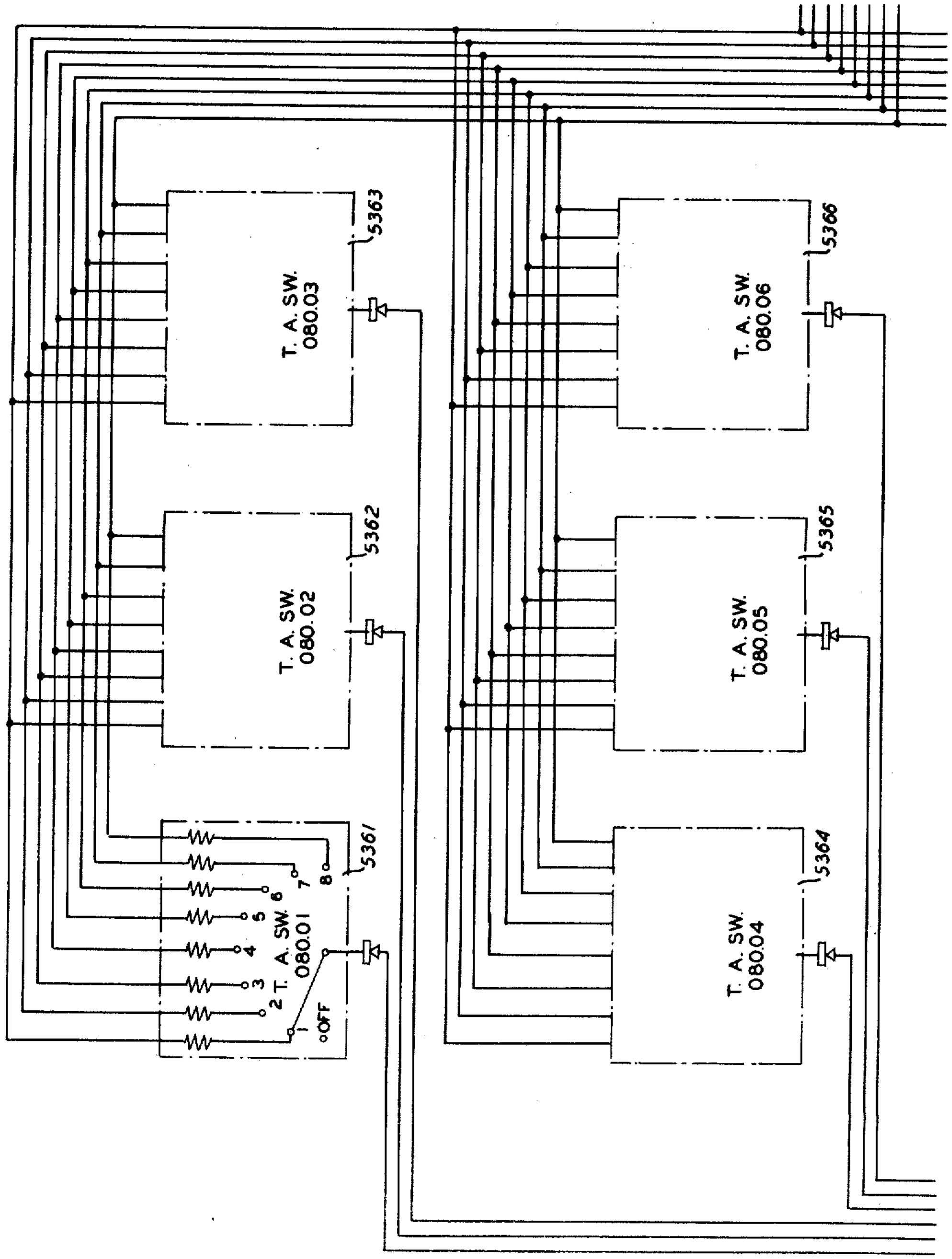

Addresses 1 through 12 control TAPE ADDRESS switches 5361 through 5372 of Figs. 26 and 31. That is to say, a 1 in the P Field operates switch 5361 and energizes the Tape Unit indicated by the switch, a 2 operates switch 5362 and sends a signal to the Tape Unit selected by this switch, and all the other P Field numbers through 12 operate their corresponding switches in a similar manner. Ten is represented by an absence of a positive number in position 15 of the Instruction Register. That is to say, when the lower order position of the P Field is zero, neither of OR circuits 4178 and 4179 (Fig. 30) is operated, but this condition is reversed by inverter 4174 which sends a signal through cathode follower 4172 and the diode in circuit with switch 5370 in order to select the Tape Unit indicated by the switch. Inverter 4160 (Fig. 30) between input terminal 443.16.1 and the first two TAPE ADDRESS switches serves to distinguish between a 1, 2 and 11, 12 respectively.

In manual tape selection the condition of the P Field in the Instruction Register and the position of the TAPE ADDRESS switches are disregarded. Manual tape selection also differs from automatic tape selection in that it occurs in order to accomplish the manual reading or a manual rewinding operation. Manual writing cannot be accomplished in the calculator.

In manual tape selection, only one switch having eight positions is used. The position at which the switch 5352A (Fig. 27) is set is connected to the +10 volt line in the calculator, and all other positions of the tape unit selector switch are connected through a resistor to the −82 volt line, as shown in Fig. 27. Of course, when the switch is in its OFF position none of the Tape Units may be manually chosen. Assume that the TAPE UNIT SELECTOR switch 5352 on the console is set at position 6. This indicates that the 6th Tape Unit is desired, and that position is now at a positive potential. That is to say, the left input terminal of AND circuit 4198 (Fig. 28) is UP.

Figure 48:
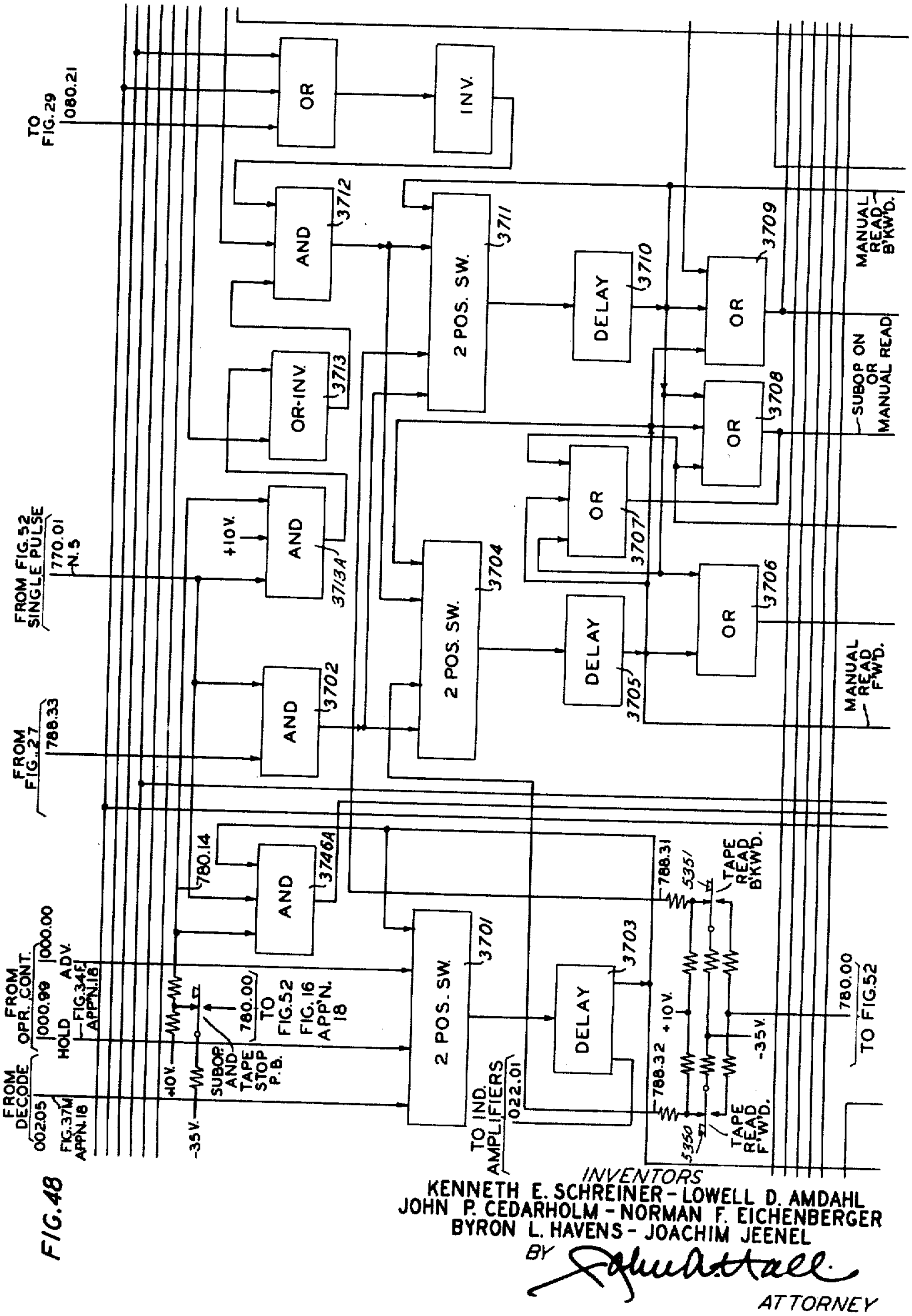

As soon as the switch setting is made, a signal is delivered from 5352B over terminal 788.33 (Fig. 48) to the left input terminal of AND circuit 3702 in Fig. 48. At an N.5 time (over terminal 770.01) coincidence is established at this AND circuit and one of two manual input latches is energized depending on whether the READ FORWARD (5350) or READ BACKWARD (5351) pushbutton on the console is depressed. Operation of either one of these latches energizes OR circuit 3706 and Delay circuit 3755 and causes a signal to appear at output terminal 022.13 (Fig. 58) which is fed to OR circuit 4181 in the Tape Selection circuit (Fig. 27).

Delay circuit 4184 (Fig. 27) is then energized and the right terminal of AND circuits 4186, 4188, 4190, 4193, 4195, 4198, 4201, and 4206 is caused to be UP. However, since the TAPE UNIT SELECTOR switch has been initially set at position 6 only AND circuit 4198 is in coincidence. After a one microsecond delay introduced by Delay circuit 4200 (Fig. 28), a signal is developed at output terminal 080.86 which selects Tape Unit 6. As in the case of the semi-automatic Tape Unit selection explained above, the signal at output terminal 080.86 is delivered to the Tape Unit 6 Control Circuit (Fig. 23) where it permits coincidence at various AND circuits to accomplish any one of the tape operations such as writing, reading and deleting.

At the same time that signal is developed for selecting Tape Unit 6, OR circuit 4208 (Fig. 29) and cathode follower 4207 are energized in order to develop a signal at output terminal 080.20 which is delivered to Decode as before. This signal does not influence the manual reading operation inasmuch as the ADVANCE line is pulled DOWN when one of the manual read latches is ON. Though not shown here, a signal at input terminal 022.13 also enters the operation control circuit to disable the signal at output terminal 000.00 which keeps the ADVANCE line of the calculator UP. Therefore, when the signal appears at input terminal 080.20 of the Decode circuit, the Read Block output latch in Decode cannot be energized.

Once the Read Block circuit (Fig. 44) indicates that a tape is being manually selected, OR circuit 4210 (Fig. 29) is energized and a signal is developed at output terminal 080.22 after a one microsecond time interval introduced by delay circuit 4215. If a signal occurs at output terminal 080.22 at the same time that there is an absence of a signal at output terminal 080.20, a latch, in Decode is energized and a sustained signal developed which prevents the Decode circuit from performing any of its other functions and pulls DOWN the ADVANCE line in the Calculator thereby effectively stalling the calculator. However, since the Calculator has already been stalled by the signal developed at output terminal 022.13 (Fig. 58 to Fig. 27) of the Read Block circuit (Fig. 44), the signal developed by Decode does not affect Calculator operation. However, in the semi-automatic operation, the signal developed by the tape inoperative output latch of Decode pulls DOWN the ADVANCE line and stalls the calculator.

It has already been shown how tape selection is accomplished by a signal automatically developed by Decode at its output terminal 002.02 (Fig. 27) and manually by a signal developed at output terminal 022.13 (Fig. 27) by the TAPE SELECTOR switch and either the READ FORWARD or the READ BACKWARD push button (Fig. 48). The Decode circuit develops a signal at its output terminal 002.02 when the operational code is in the 90's, calling for writing, deleting, reading, verifying, or rewinding.

Tape selection may also be accomplished manually for a rewind operation. First, TAPE SELECTOR switch 5352 (Fig. 27) is positioned to the desired Tape Unit of operation. When this is done, the rotary contact of switch 5352 connects terminal 788.33 to one of the terminals 081.10–088.10 (Figs. 21, 24) of one of the eight Tape Units. When the Tape Unit is available for use, terminal 788.33 is caused to go UP and the right input terminal of AND circuit 4180 (Fig. 27) goes UP also.

Figure 52:
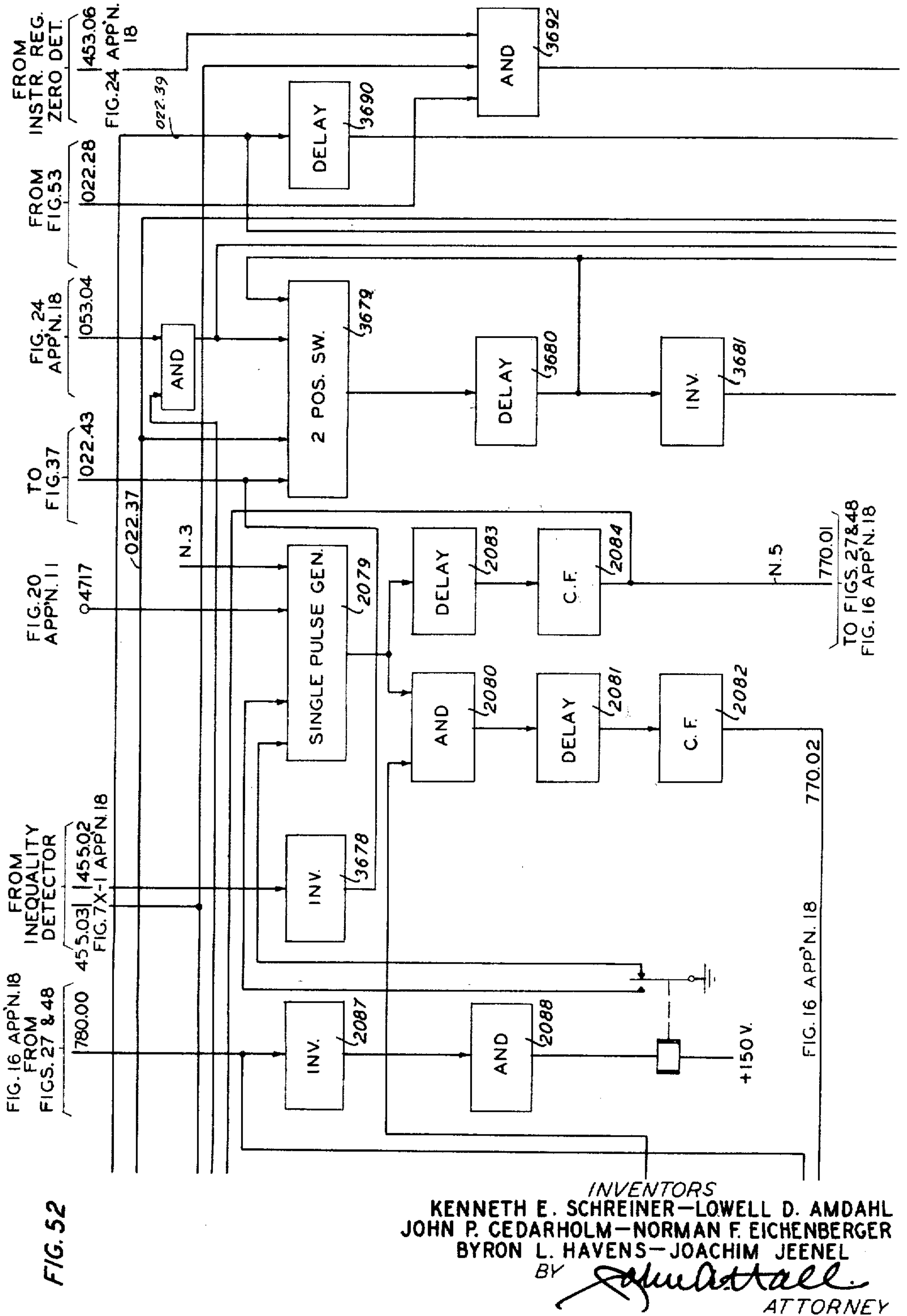

The next step is to operate the TAPE REWIND pushbutton 5348 (Fig. 27) whereupon output terminal 788.30 is connected to +10 volt source. This causes the center input terminal of AND circuit 4180 to go UP. Operation of this pushbutton also energizes the single pulse generator (Fig. 52) and causes an N.5 signal to be developed at its output terminal 770.01 (Figs. 27, 52). When the TAPE REWIND pushbutton is depressed, common switch terminal 780.00 is connected to −35 volts which operates inverter 2087 (Fig. 52), makes amplifier 2088 operative, and energizes a relay 2078 that triggers the single pulse generator 2079.

Thus AND circuit 4180 (Fig. 27) is UP for one microsecond, operating OR circuit 4181 and delay circuit 4184. Thus at N.6 time coincidence is permitted to be established at one of the AND circuits 4186, 4188, 4190, 4193, 4195, 4198, 4201 and 4206. If the TAPE SELECTOR switch has been set at position 3, AND circuit 4190 (Fig. 28) is energized and output terminal 080.83 caused to go UP for one microsecond at N.7 time. Thus the third Tape Unit is selected for rewinding.

A more detailed description of rewinding is covered in the section on rewinding hereinafter.

*Initiating the tape writing operation*

Figure 38:
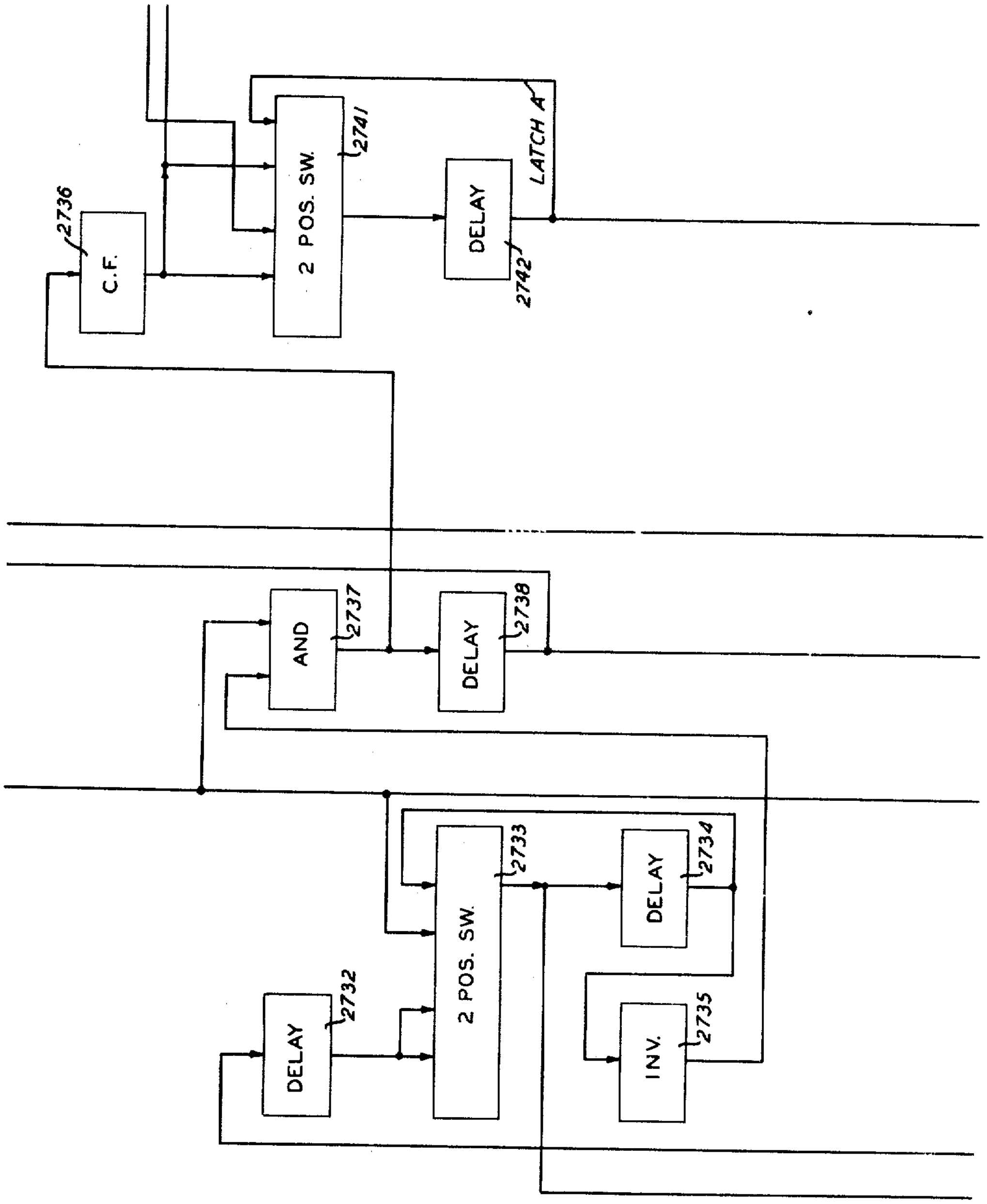

Once the Write Block input latch (Delay 2731 and AND circuit of Switch 2730, Fig. 35) has been energized, the first function performed by this suboperation is to notify the Tape Unite Control circuit that a tape writing instruction (Code 90) is located in the Q Field and that the appropriate tape should be brought up to speed for the purpose of writing. The Tape Control circuit is notified in the following manner. As soon as the Write Block input latch is energized, a signal is delivered to the right input terminal of AND circuit 2737 (Fig. 38). Coincidence occurs at this time at AND circuit 2737 because the left input terminal of this AND circuit stays UP until the very end of the Write Block suboperation. This may be seen by tracing the left input terminal from inverter 2735, which is controlled by delay circuit 2734, which operates a latch to energize OR circuit 2774 (Fig. 41) and cathode follower 2775 to output terminal 021.02 (Fig. 41) which sends a completion signal to the Terminate suboperation. Therefore, as long as this output terminal is DOWN, inverted 2735 (Fig. 38) reverses this condition and causes the left input terminal of AND circuit 2737 to be UP. Once AND circuit 2737 is UP, delay circuit 2738 is operated and a sustained signal is developed at output terminal 021.04 (Fig. 41) at an N.1 time for informing the Tape Unit Control circuit to bring the appropriate tape up to speed for writing.

The signal developed at output terminal 021.04 is then fed to the Common Tape Control circuit (Fig. 18) where it energizes OR circuit 4317 (Fig. 16) and cathode followers 4315 and 4316 and causes output terminal 089.05 (Figs. 16 and 20) to go UP.

The signal at this output terminal is then fed to the Tape Unit Control circuits (Figs. 19–24). Assuming that the first Tape Unit has been selected for writing and, therefore, output terminal 080.81 of the Tape Selection circuit is caused to be UP, the signal at the output terminal 089.05 develops coincidence at AND circuit 4341 (Fig. 19) of the Tape Unit 1 Control circuit. The right input terminal of this AND circuit is UP at this time because the rewind latch, comprising AND circuit 4324 (Fig. 20), OR circuit 4325 and delay circuit 4326, is de-energized and inverter 4327 is not made conductive.

When AND circuit 4341 (Fig. 19) is UP, OR circuit 4344 is operated to cause the left input terminal of AND circuit 4345 to go UP. The center input terminal of this AND circuit is UP at this time because the input condition of the 10 millisecond delay circuit 4342 is not changed at this time and its inverted output is UP. The right input terminal of AND circuit 4345 is also UP at this time, since the UP condition on the output of OR circuit 4344 operates the INV 4331 but this does not trigger the 10 millisecond delay 4332. The output of delay circuit 4332 (Fig. 19) is DOWN only when the tape unit in operation is to be stopped.

This causes a signal to be developed immediately at output terminal 081.50 (Fig. 25) which is then delivered to the first Tape Unit where it serves to energize the moving coil in the direction for accomplishing tape motion. The tape is initially moved over the erase head in order to erase the tape before it has new information recorded on it. The erase head is on the left-side of the read-write head so that the tape, when being moved in the forward direction, must pass over the erase head before it passes the read-write head. Tape writing can only take place in the forward direction.

The signal from AND circuit 4350 (Fig. 19) also serves to energize DELAY circuit 4351. The left input terminal of AND circuit 4350 goes UP when the signal appears at input terminal 021.04 from the Write Block circuit, and the right input terminal is UP because the rewind latch is de-energized and inverter 4327 (Fig. 20) is not made conductive. When DELAY circuit 4351 (Fig. 19) is UP output terminal 081.70 is UP and a signal is fed to Tape Unit 1 (Fig. 25) where it energizes the erase head.

Whenever a signal appears at output terminal 021.04 of the Write Block circuit, coincidence is established at an AND circuit of one of the eight Tape Unit Control circuits whichever is selected for operation. If the fifth Tape Unit is selected, coincidence is established at an AND circuit corresponding to AND circuit 4350 (Fig. 19) and output terminal 085.70 is caused to go UP. This causes input terminal 34 of the corresponding Tape Unit to go UP.

The signal developed at output terminal 081.06 (output of DELAY 4351) is also fed to the Common Tape Control circuit where it energizes OR circuit 4309 (Fig. 15). This energizes the 6 millisecond delay circuit 4311 through AND circuit 4310 and causes the right input terminal of AND circuit 4312 to go UP. Since the 30 millisecond delay circuit 4318 is not operated at this time, the center input terminal of AND circuit 4312 is UP. Coincidence is established 6 milliseconds later at AND circuit 4312 by the signal from delay circuit 4311.

This energizes cathode follower 4313 (Fig. 15) and causes output terminal 089.03 to go UP. This signal is fed to all the Tape Unit Control circuits. However, since Tape Unit 1 is assumed to have been selected for operation, the signal energizes OR circuit 4330 in the Tape Unit 1 Control circuit (Fig. 20) and develops coincidence at AND circuit 4333 (Fig. 20) with the signal developed at input terminal 080.81. This causes a sustained signal to be developed at output terminal 031.60 (Fig. 25). From there the signal is fed to Tape Unit 1 where it serves to set up the writing circuits to receive the bit signals for writing.

At the same time that the start-to-write signal is developed at output terminal 089.03, the right input terminal of AND circuit 4314 (Fig. 16) is UP and the 2 millisecond delay circuit 4303 (Fig. 16) is operated by the UP condition on the output of DELAY 4311. At the end of the 2 millisecond delay, coincidence is established at AND circuit 4314 and output terminal 089.09 goes UP. This signal is fed to the Write Block circuit (Fig. 36) to indicate that the tape writing circuits are ready for writing.

*Initiating the timing sequence*

At the completion of the approximately 8 milliseconds required to prepare the tape for writing from a standstill position, a signal is developed at output terminal 089.09 of the Common Tape Control circuit (Fig. 16) and fed to the single pulse generator 2747 in the Write Block circuit (Fig. 36). A signal can be developed at the output of this single pulse generator only at N.6 time because its right input terminals are connected to output terminal 092.06 of the Octal Commutator. Therefore, at the first N.6 time after the input terminal 089.09 is UP, the input latch of the single pulse generator 2747 is caused to be UP. However, no signal occurs at the output terminals of the single pulse generator until the next N.6 pulse arrives from the Octal Commutator. Thus it is not until an N1.7 time, using the first N.6 pulse from the Octal Commutator as the reference level, that a signal is developed at output terminal of single pulse generator 2747. Reference should be made to application 8 for a detailed explanation of the single pulse generator.

This one microsecond pulse is then delivered through OR circuit 2766 (Fig. 42) and delay circuit 2771 to output terminal 021.07 for energizing the Control Counter (Fig. 8) for one microsecond at N2.0 time. Each 14 microseconds a signal will be developed at this output terminal to recycle the Control Counter until the particular writing operation called for by the instruction word in the Instruction Register ceases. Once the single pulse generator 2747 produces the single one microsecond signal at its output terminal, the timing starts but the continuation of this timing is accomplished by the signal received at input terminal 031.13 (Fig. 40) once each 14 microseconds through the establishment of coincidence through one of the AND circuits 2767, 2765 and 2764 (Fig. 42).

Nothing further occurs in the Write Block suboperation until 13 microseconds later when the Control Counter develops a signal at its output terminal 031.13. This signal is then delivered to the right input terminal of AND circuit 2765 (Fig. 42) of the Write Block where it develops coincidence. The left input terminal of this AND circuit may be traced back to output terminal 18 of the single pulse generator 2747 (Fig. 36). A sustained signal has been previously developed at this output terminal at an N2.0 time, using the first N.6 pulse which energizes the single pulse generator input latch as the reference level. The center input terminal of AND circuit 2765 may be traced back through inverter 2814, (Fig. 39) OR circuit 2740 (Fig. 35) and terminals 454.03 and 454.01 in the Q Matrix and the WRITE OUTPUT switch on the console. Since none of these inputs is presumed to be UP at this time, inverter 2814 reverses this condition and causes the center input terminal of AND circuit 2765 to be UP. When AND circuit 2765 is UP, delay circuit 2771 (Fig. 42) is operated and the output terminal 021.07 is again UP causing the Control Counter to count through another 14 microseconds.

*Starting the writing operation*

The signal developed at output terminal 021.07 for initially starting the counter is also delivered to AND circuit 2755 (Fig. 39) for triggering a latch. The left input terminal of AND circuit 2755 is UP one microsecond after the input latch is energized (output of CF 2736, Fig. 38) comprising AND circuit 2754 (Fig. 39) and delay circuit 2757. AND circuit 2754, which controls latch operation once it is energized, is in coincidence at this time. The center input to this AND circuit is UP whenver a character 12 does not exist in position 17 of Register 1. The left input terminal of this AND circuit is energized through cathode follower 2736 (Fig. 38) from the Write Block input latch and remains UP during the course of this suboperation.

Energization of this latch permits the number in Register 1 to be left-shifted and a character 12 or character 13 injected into position 1 of this register every time a signal occurs from the Control Counter at time interval T.13. Thus when the first one microsecond pulse arrives from the Control Counter (Fig. 8) at time interval T.13, AND circuit 2767 (Fig. 42) is in coincidence, operating OR circuit 2772 and delay circuit 2773 (Fig. 42) and causing a signal to be developed at output terminal 021.08. The signal at this output terminal is fed to the Register 1 Control circuit where it sets up the conditions for left-shifting the entire 17 digits at the same time that a character 12 is injected into position 1 of Register 1.

Also, when AND circuit 2767(Fig. 42) is UP, a signal is delivered to the left input of AND circuit 2813 which is in coincidence at this time, operating delay circuit 2807 (Fig. 42) and causing a one microsecond pulse to occur at output terminal 021.09. The right input of AND circuit 2813 may be followed through inverter 2785, (Fig. 39) delay circuit 2784, and AND circuit 2782 (Fig. 39) which is in coincidence only when a character 13 occurs in position 16 of Register 1. Since such is not the case at this time, AND circuit 2782 (Fig. 39) is DOWN, which condition is reversed by inverter 2785 and the right input terminal of AND circiut 2813 (Fig. 42) is caused to be UP. The signal at this output terminal is fed ot the Register 1 Control circuit where it sets up the conditions for entering a digit 1 into position 1 of Register 1 at the same time that the signal at output terminal 021.08 is entering a character 12 into this same position. Thus output terminals 021.08 and 021.09 (Fig. 42) are UP simultaneously and permit the 17 digit number in Register 1 to be shifted one column to the left while a synthesized character 13 is introduced into position 1 of this register at the same time.

Referring to the assumed original data word in Register 1, that is 30501231415662851, the new number becomes 05012314156628513. Each 14 microseconds the 17 digit word is shifted one position to the left, as explained above for the initial left shift, until the character 13 is present in position 16 of Register 1. That is to say, at the end of 210 microseconds after the initial shifting of Register 1 began, that is after a character 13 had been shifted into position 16, the 1, 4, and 8 bit lines of output terminals 441.16 are UP, causing AND circuit 2777 (Fig. 36) to be UP also. The signal developed by this AND circuit is then delivered to the right input terminal of the left AND circuit of 2-position switch 2741 (Fig. 38) which is UP at this time due to the fact that the left input terminal is connected through cathode follower 2736 (Fig. 38) to the Write Block input latch.

Energization of 2-position switch 2741 (Fig. 35) triggers the latch, comprising this switch and delay circuit 2742, which will continue to be energized so long as the Write Block input latch stays in operation. A sustained signal produced by this latch acts in conjunction with the signal produced by the Control Counter at each time interval T.13 to guarantee that each digit whchi reaches digit position 17 of Register 1 is written on tape. Thus although this latch is UP when a character 13 is inserted in position 16 of Register 1, the sustained signal which it produces cannot cause the write operation to start until the next T.13 signal arrives from the Control Counter, that is to say not until the character 13 in position 16 is shifted into position 17.

The one microsecond signal which arrives at input terminal 031.13 (Fig. 37) fourteen microseconds after the character 13 is entered into position 16 of Register 1 again causes AND circuit 2765 (Fig. 42) to go UP and delay circuit 2771 to be operated. This time the signal from this delay circuit energizes AND circuit 2762 (Fig. 41) and causes coincidence at AND circuit 2768, since the left input terminal is UP so long as the operational code is not a 92 or 93 due to the presence of inverter 2763 (Fig. 41). When AND circuit 2768 is UP, delay circuit 2770 (Fig. 41) is energized and output terminal 021.06 (Fig. 41) goes UP for one microsecond.

At the same time that the write gate signal is developed at output terminal 021.06, a character 13 is left-shifted into position 17 of Register 1 and one microsecond thereafter it is statically made available to the Tape Writing circuits.

What may be termed a useless operation may be noted at this point, though the operation may further be considered not entirely useless since by allowing its performance a considerable saving in apparatus otherwise necessary for its avoidance would be necessary. It has been pointed out hereinbefore that a character 13 is entered into digit position 1 of Register 1 by the simultaneous transmission of signals on terminals 021.08 and 021.09 (Fig. 42). The signal on terminal 021.08 enters a character 12 into position 1 and also causes a left shift operation of the register. The signal on terminal 021.09 enters a digit 1 into this position 1 so that the combination becomes a character 13. Thereafter at each recurrent transmission of these two signals another character 13 is entered into position 1 until the register becomes filled with a character 13 in each position thereof until as above stated the first character 13 to have been entered is left shifted into position 17 where it becomes available for the first writing operation. Thereafter, and to anticipate the description somewhat, on the next left shifting operation where this original character 13 would be shifted out of Register 1, the entire lot of characters 13 in each and every digit position thereof is erased or released and the 17 digit instruction word is entered in place thereof, the digit in position 17 being made immediately available for writing. On the next left shift operation where the 17 position digit of the instruction word (the indicated bit count) is shifted out of the Register and the position 1 of the Register is vacated, a character 12 is entered thereinto. This will then appear to be a parade of characters 12 until the first of these characters 12 to have been entered into the position 1 of Register 1 reaches position 17 where it is made available for writing, whereafter it is left shifted out of the Register, the entire Register is cleared and the first word of the block is entered in lieu of the string of 17 characters 12.

*Writing a character 13*

The one microsecond signal developed at output terminal 021.06 (Fig. 41) is also fed to the Tape Writing circuits (Fig. 18) in order to gate the inverse of the character 13 through to be written on tape. That is to say, since a binary-decimal character 13 is written 1101 the inverse of this becomes 0010 and, therefore, a 2 is actually written.

In terms of Figs. 17 and 18, inverters 4605, 4623 and 4622 are made conductive, and, therefore their outputs are DOWN. This means that output terminals 881.00.1, 881.00.4 and 881.00.8 (Fig. 17) are DOWN also. However, since the 2 bit input line is DOWN, inverter 4621 (Fig. 18) is non-conductive and its output is therefore UP. When this occurs, coincidence is established at AND circuit 4610. The right input terminal is UP due to the presence of OR-inverter 4617. The absence of coincidence at AND circuit 4601 (Fig. 18) at this time causes the input of OR-inverter 4617 to be DOWN.

When AND circuit 4610 is UP, delay circuit 4619 (Fig. 17) is energized and output terminal 881.00.2 (Fig. 17) caused to go UP one microsecond after the character 13 is available at the output of position 17 of Register 1. This output terminal will stay UP for at least 14 microseconds and stay UP as long as the input of inverter 4621 is DOWN, indicating the presence of a 2 bit in the digit to be written. Only the zeros of the binary-decimal values, that is the inverse of the numbers shifted out of Register 1, are written.

It may be noted that the instruction word is entered into Register 1 at a time T.0 (terminal 021.07, Fig. 42) and that the Write Gate (021.06, Fig. 41) is active the following microsecond, time T.1. Therefore, if the digit 6 (by way of example) is sensed while in position 17, it will be available for writing at time T.1, 14 microseconds after the character 13 had been transmitted to the circuit of Figs. 17 and 18, and had triggered the latch consisting of the AND circuit 4618 and DELAY circuit 4619 (Fig. 17). Since the 2 Bit for the digit 6 will activate the INV 4621, (Fig. 18), the AND circuit 4616 (Fig. 17) will be denied coincidence and the output of the OR–INV 4617 will remain UP, whereby the 2 Bit latch will remain active and the output of CF 4619A will remain UP, that is, there will be no change. If at the next T.1 time the digit 7 (by way of example) is transmitted to the circuits of Figs. 17 and 18, the INV 4621 (Fig. 18) will again be activated and again coincidence will be denied to AND circuit 4616 whereby the 2 Bit latch will remain active and again there will be no change at the output of CF 4619A. If at the following T.1 time the digit 8 is transmitted, INV 4621 will be left undisturbed whereby its output being UP will cause coincidence in AND circuit 4616 and OR–INV 4617 (Fig. 17) will be activated whereby the 2 Bit latch will be released since both AND circuit 4618 and AND circuit 4610 will be disabled. Thus a 0 transmitted to the input of INV 4621 will cause a change in the output of CF 4619A. Thus it will be seen that each 0 transmitted to INV 4621 will cause a change at the output of CF 4619A. The same action takes place at each input and output to and from the circuits of Figs. 17 and 18.

Let us assume that the first few digits to be written on tape are character 13, 6, 7, 8, 9, 2 and 4. This means that output terminal 881.00.2 (Fig. 17) will be UP or down for 14 microsecond intervals as follows:

| Character | Code | Interval | Output | Result | Record Produced |
|---|---|---|---|---|---|
| Character 13 | 1101 | 1 | UP | change | 1 |
| Digit 6 | 0110 | 2 | UP | No change | 0 |
| Digit 7 | 0111 | 3 | UP | No change | 0 |
| Digit 8 | 1000 | 4 | DOWN | change | 1 |
| Digit 9 | 1001 | 5 | UP | change | 1 |
| Digit 2 | 0010 | 6 | UP | No change | 0 |
| Digit 4 | 0100 | 7 | DOWN | change | 1 |

Since it is the changes which constitute the writing it will be seen that the record produced is the inverse of the 2 bit of the code. It can be seen that output terminal 881.00.2 (Fig. 17) changes its condition only when a zero is to be written in the 2 bit column of the tape. When a non-zero occurs, this terminal will maintain the condition assumed when the last non-zero input at inverter 4621 occurred. This applies equally to the 1, 4 and 8 bit circuits.

It has already been shown that during the insertion of a character 13 into the Tape Writing circuits, the input to inverter 4621 is DOWN and the output terminal 881.00.2 is UP. It continues to stay UP for at least 14 microseconds. Input terminal 021.06 (Fig. 18) goes DOWN after it initiated the 2 bit latch through AND circuit 4610 (Fig. 18). At this time it causes the right input terminal of AND circuit 4616 to go DOWN, thereby preventing OR-Inverter 4617 from being operated and the 2 bit latch, comprising AND circuit 4618 and delay circuit 4619 (Fig. 17) from being de-energized.

When the write gate makes its appearance at input terminal 021.06 (Fig. 18) at the start of the next 14 microsecond period, the input terminal of inverter 4621 is now UP. Thus coincidence cannot be formed at AND circuit 4610 (Fig. 18). Since the output of inverter 4621 is DOWN, coincidence cannot be established at AND circuit 4616 and OR-Inverter 4617 (Fig. 17) cannot be operated at this time. This means that the 2 bit latch will not be de-energized. The next microsecond although the inverter 4621 is not made conductive and the left input terminal of AND circuit 4616 is UP, the write gate signal is no longer present at input terminal 021.06 and coincidence cannot be established at AND circuit 4616 for de-energizing the 2 bit latch. Thus output terminal 881.00.2 stays UP for another 14 microseconds. It stays UP for the third 14 microsecond interval when a binary-decimal 7 is to be written.

However, it goes DOWN for the fourth time interval when an 8 is to be written, with the 2 bit at zero. With the input terminal of inverter 4621 DOWN, coincidence is established at AND circuit 4616 with the write gate signal. This operates OR-Inverter 4617, which brings AND circuit 4618 DOWN. When OR-Inverter 4617 (Fig. 17) is conductive, AND circuit 4610 also goes DOWN. The next microsecond AND circuit 4610 is kept DOWN by the absence of a signal at input terminal 021.06. The latter is a one microsecond signal which appears each 14 microseconds. Thus one microsecond after a write gate signal arrives and since the 2 bit in the binary-decimal 8 (1000) is a zero, output terminal 881.00.2 (Fig. 17) goes UP and stays UP for 14 microseconds.

At the end of this time interval a write gate signal again appears at input terminal 021.06 (Fig. 18) and since a binary-decimal 9 is inserted into the Tape Writing circuits at this time, the input terminal to inverter 4621 is DOWN, which causes the left input terminal of AND circuit 4610 (Fig. 18) to go UP and coincidence to be established. The signal from this AND circuit energizes delay circuit 4619 and triggers the latch, comprising this delay circuit and AND circuit 4618 (Fig. 17). Thus output terminal 881.00.2 again goes UP for 14 microseconds.

At the sixth time interval the 2 bit latch cannot be de-energized and the output terminal remains UP for another 14 microseconds. However, when a zero is again present in the 2 bit line from Register 1 position 17, output terminal 881.00.2 goes DOWN, so that the end result is as stated in the column headed "Result" above.

All of the four latches (associated with bits 1, 2, 4 and 8) are prevented from being operated and therefore the condition of output terminals 881.00 cannot change whenever a reading operation is in process. Referring to the right side of Fig. 18, it may be seen that when either input terminal 022.21 or 022.22 is UP, indicating a read forward or read backward operation respectively, OR circuit 4604 (Fig. 18) is energized causing the left input terminal of AND circuit 4601 (Fig. 18) to go UP.

The right input terminal of AND circuit 4601 is always UP except for two milliseconds at the end of a writing operation when input terminal 021.04 (Fig. 18) goes DOWN. This is due to the fact that the 2 millisecond delay circuit 4602 (Fig. 18) is operated when its input terminal is changed in the positive direction. Initially with no signal at input terminal 021.04, the inverter 4603 (Fig. 18) reverses this condition and keeps input terminal UP. When the Write Block suboperation is started, input terminal 021.04 goes UP and the input to the 2 millisecond delay circuit goes DOWN. At the end of a writing operation, input terminal 021.04 goes DOWN, which now causes the input to the 2 millisecond delay circuit to go from a DOWN to an UP condition, causing the single shot multivibrator therein to flip over and causing the output terminal to go DOWN for 2 milliseconds. This prevents the write latches from changing status until the write circuits are de-energized, which takes 1.5 milliseconds.

Assuming coincidence at AND circuit 4601 (Fig. 18), the four OR-Inverters 4607, 4617, 4628 and 4626 (Fig. 17 and 18) are operated preventing coincidence from being established at AND circuits 4608, 4618, 4631 and 4627, respectively. This prevents the write output latches from being energized and the Tape Unit amplifiers to be driven in a writing direction.

*Transferring the instruction word in Register 1*

Another function performed by the character 13 in column 17 of Register 1 is to transfer the 17 digit word in the Instruction Register into Register 1. The instruction word is transferred into Register 1 in the following manner.

The presence of a Character 13 in Register 1 position 17 causes its output terminals 441.17.1, 441.17.4 and 441.17.8 to be UP, which develops coincidence at AND circuit 2749 (Fig. 36) in the Write Block and causes the third from the left input terminal of AND circuit 2812 (Fig. 43) to be UP. At an N.7 time interval a signal is received from the Octal Commutator which causes the rightmost input terminal of AND circuit 2812 to be UP. The second from the left input terminal of this AND circuit 2812 has been UP since the time that single pulse generator 2747 (Fig. 36) has been energized. The left input terminal of AND circuit 2812 is UP at this time due to the fact that the latch, comprising AND circuit 2744 (Fig. 39) and delay circuit 2745 is de-energized, which condition is reversed by inverter 2746 (Fig. 39). The signal which is developed by AND circuit 2812 (Fig. 43) is delivered through OR circuit 2805 and cathode follower 2806 (Fig. 43) to output terminal 021.10 (Fig. 43), which serves to operate an electronic switch for transferring the contents of the Instruction Register into the 66 wire parallel bus.

It is now necessary to insert this instruction word into Register 1. The same AND circuit 2749 (Fig. 36), operated by the presence of a character 13 in column 17, which causes the instruction word in the Instruction Register to be transferred into the parallel bus also develops a signal which prepares Register 1 to accept this transferred 17 digit word. When this AND circuit 2749 is UP, the center input terminal of AND circuit 2810 (Fig. 43) is also UP. At an N.7 time interval a pulse is received from the Octal Commutator which causes the right input of AND circuit 2810 to be UP. The left input terminal of this AND circuit, which has been receiving a sustained signal from the single pulse generator 2747 (Fig. 36) for some time now, is also UP at this time. Development of coincidence at AND circuit 2810 at this N.7 time operates OR circuit 2803 (Fig. 43) and cathode follower 2804 in order to produce an N.7 signal at output terminal 021.11 (Fig. 43), which sets up the conditions so that the 17 digit word now in the parallel transfer bus may be inserted into Register 1. At the same time that the HOLD lines are being pulled DOWN by the Register 1 Control, the gate lines are caused to be UP for one microsecond by the same register circuit, in this way permitting the insertion of the information present on the parallel transfer bus into Register 1. The erasing and inserting operations are necessarily performed simultaneously.

It is necessary that there not be a left shift of Register 1 during the time interval that the instruction word is being entered into Register 1. This is to say, output terminal 021.08 (Fig. 42) must be DOWN during this entry. As soon as the character 13 appears at the output of position 17 of Register 1, coincidence is established at AND circuit 2748 (Fig. 36) which operates inverter 2751. This brings AND circuit 2754 (Fig. 39) DOWN and de-energizes the latch, comprising this AND circuit and delay circuit 2757. This prevents coincidence at AND circuit 2767 (Fig. 42) when the next T.13 signal arrives from the Control Counter. However, when this signal does arrive, it re-energizes the latch mentioned above which permits the left shifting operation to occur again. The latch is de-energized each time a character 12 or character 13 appears at the output of Register 1 position 17 and is re-energized when a new word is entered into Register 1.

What the Write Block suboperation has done up to this time with the information that had originally been assumed to exist in the three registers may be summarized in the following manner. It has shifted out, without writing, the original number 30501231414662851 existing in Register 1, at the same time inserting a character 13 from the right until Register 1 contained nothing but characters 13. When the first 13 entered into digit position 1 of Register 1 arrived at position 17, a couple of hundred microseconds later, the Write Block suboperation caused a character 13 to be stored on tape. As the character 13 in position 17 was shifted out for writing, the word from the Instruction Register was entered into Register 1. Thus, the new word in Register 1 is 30420096510160017.

The entire instruction word is entered into Register 1, although it should be kept in mind that usually only the T Field number (0017), which represents the block number of the tape used by the calculator to search for the specific block, is used. However, the R (0965) and S (1016) codes may be used by the program to determine the size of the block after the end-of-block word has been obtained by means of a read-without-storing instruction, that is with a blank R Field. In summary, the words present in Register 1 and the Instruction Register are the same and the original word in Register 2 has not been disturbed.

*Writing the Instruction Word*

Fourteen microseconds after the first number, a character 13, has been written and after the instruction word has been entered into Register 1, the number 3 in column 17 of the hypothetical example, is written, as all of the other digits in Register 1 are left-shifted one position and a character 12 is entered in at the right. Thus at the end of the 19th 14 microsecond cycle of the Control Counter the number in Register 1 is 0420096510160017$\underline{12}$. The line under 12 indicates that this number, now in position 1, is a single code character.

As each digit of the instruction word is left-shifted out of Register 1, each 14 microseconds by the signal developed at output terminal 021.08 (Fig. 42) of the Write Block circuit, it is gated into the the Tape Writing circuits (Figs. 17 and 18) by the sustained signal developed at output terminal 021.06 (Fig. 41) of the Write Block circuit. The left shifting operation continues digit by digit with the digit arriving at position 17 being written on the tape at the time that a character 12 is introduced from the right in position 1 until this character 12 which is first introduced into Register 1 arrives at position 17, 254 microseconds later. The information now stored in tape is an end-of-block number and an instruction word as depicted in Figs. 5 and 6.

*Writing a character 12*

A character 12 is first entered into Register 1 position 1 at the time that the highest order digit of the instruction word is being shifted out of position 17 of Register 1 for tape storage. It will be recalled that a character 13 synthesized and entered into Register 1 by pulling UP output terminals 021.08 and 021.09 (Fig. 42) simultaneously. To enter a character 12, output terminal 021.08 is pulled UP and output terminal 021.09 is kept DOWN.

A character 12 is always inserted into Register 1 when output terminal 021.08 of the Write Block circuit is caused to go UP by the development of coincidence at AND circuit 2767. When this occurs, a character 12 is entered into position 1 of Register 1 at the same time that the previous digit in this position is erased.

Output terminal 021.09 of the Write Block circuit is DOWN at this time, and therefore, a "1" is not entered into position 1 for this reason. When a character 13 appears at the output of Register 1 position 16 for the first time, coincidence is established at AND circuit 2777 (Fig. 36) and the right input terminal of AND circuit 2782 (Fig. 39) goes UP. The middle input terminal of this AND circuit is UP because the R Field of the Instruction Register is not blank. The left input terminal is UP when output terminal 021.07 (Fig. 42) goes UP to start another 14 microsecond timing cycle.

Once AND circuit 2782 (Fig. 39) is UP, a latch is triggered comprising AND circuit 2783 and delay circuit 2784. This makes inverter 2785 (Fig. 39) conductive and causes the right input terminal of AND circuit 2813 (Fig. 42) to go DOWN. So long as this AND circuit 2813 is DOWN, output terminal 021.09 (Fig. 42) will be DOWN. The latch will continue to be energized until the V Field code is made equal to the S Field code and it is desirable to write the final character 13 at the end of the word.

*Reading out from CRT storage*

Once the instruction word, which has previously been entered into Registered 1, is written on tape and a character 12 occurs in position 17, the Write Block suboperation (Fig. 34) transfers the V Field code into CRT storage in order to read-out a 17 digit number at the R Field, now the V Field, address. It will be recalled that the R Field code is entered into the V Field during Decode operation.

The presence of a character 12 in column 17 of Register 1 develops coincidence at AND circuit 2776 (Fig. 36) and causes the center input of AND circuit 2786 (Fig. 37) to be UP. At time interval N.7, a signal is received from the Octal Commutator which causes the left input of AND circuit 2786 to be UP. The right input of this AND circuit is UP at this time because the latch, comprising AND circuit 2793 (Fig. 40) and delay circuit 2794, is de-energized, which condition is reversed by inverter 2795 (Fig. 40) to enable the AND circuit 2783 (Fig. 39). When AND circuit 2786 is UP, a signal is delivered through OR circuit 2799 (Fig. 40) and delay circuit 2800 to output terminal 021.13 (Fig. 40) at octal time interval N.0. It is this signal which causes the information in the V Field to be transferred into CRT storage.

The one microsecond signal developed at this output terminal is fed to the CRT Access Control circuit where it gates the V Field code into the CRT storage circuits.

In the hypothetical example, the 0965 of the V Field is transferred into CRT storage to read-out a 17 digit word at that address for entry into Register 1 and subsequent storage on tape.

*Modifying the V Field*

The same AND circuit 2776 (Fig. 36) which develops a signal for transferring the V Field code into CRT storage also develops a signal which modifies the existing V Field code. That is to say a "1" is added to the four digit V Field number so that the next V Field code delivered to CRT storage will be "1" greater than the preceding code. In the hypothetical example the 0965 is made 0966.

Operation of AND circuit 2776 causes the center input terminal of AND circuit 2796 (Fig. 40) to be UP. The right input terminal of AND circuit 2796 remains UP at this time due to the sustained signal received from single pulse generator 2747 (Fig. 36). When a signal arrives at the left input of this AND circuit at time interval T.4 from the Control Counter at input terminal 031.04 (Fig. 37), coincidence is established at AND circuit 2796 and a signal is delivered through OR circuit 2797 and delay circuit 2798 to output terminal 021.14 (Fig. 40).

The signal developed at output terminal 021.14 is delivered to the Address Modifier Control where it causes the address registered there to be increased by a value of 1. The new V Field number becomes 0966.

*Storing the data words on tape*

It is now necessary to take the data word read out of CRT storage and now present on the parallel transfer bus, which represents the 17 digit number at the V Field address (in our hypothetical example 0965) and which occurs on the transfer bus at N.5 time and enter it into Register 1. This is accomplished in the following manner.

The same AND circuit 2786 (Fig. 37) which gates the V Field code into CRT storage also serves to trigger a latch, comprising OR circuit 2788, delay circuit 2789 (Fig. 40) and AND circuit 2787 (Fig. 37), at an N.7 time. Once activated, this latch continues in operation until the Control Counter (Fig. 8) develops a signal at input terminal 031.13 (Fig. 37) which operates inverter 2779 (Fig. 37). The signal developed by this latch is delivered to the right input of AND circuit 2809 (Fig. 43) where at the next N.4 time interval coincidence is established and a signal is delivered through OR circuit 2803 and cathode follower 2804 to output terminal 021.11 (Fig. 43).

The signal developed at this output terminal is then fed to the Register 1 Control circuit where after a one microsecond time interval, that is at N.5 time, appropriate lines are pulled UP or DOWN to permit the information existing on the transfer bus at time interval N.5 to be inserted into Register 1. The first data word is now in position for transfer to tape storage.

As in the case of the instruction word which had previously been inserted into Register 1 and written on tape, the first data word is left-shifted out with the digit in position 17 being written on the tape and a 12 inserted from the right in position 1. This writing and shifting operation continues until a 12 again appears in position 17, at which time the $R+1$ code is inserted in CRT storage and the existing $R+1$ code in the V Field is modified by the addition of 1. In accordance with the hypothetical problem initially assumed the new code in the V Field would become 0967.

As each new data word is removed from CRT storage and inserted into Register 1 for writing on tape, the V Field code is modified by the addition of a 1, this process continuing until the Inequality Detector discovers that the V Field code is identical to the four digit code in the S Field of the instruction word. Stated another way, when the data words stored in CRT at the R (the hypothetical example 0965) through the S (hypothetical example 1016) address have been written on tape, that is when 52 data words have been written on the tape, the Inequality Detector informs the Write Block circuit of this situation and permits the latter to transfer again the instruction word into Register 1.

*Writing the final end-of-block word*

The same instruction word is placed at the end of a word block that is placed at the beginning of such a block. This is necessary because the tape may be "searched" in the forward and backward runs. Searching usually precedes the reading operation so that the tape called for by the instruction word, and none other, may be read. This will become clearer where tape reading is considered. The final instruction word is written only after all the data words have been written and the V Field code equals the S Field code.

At the time that the last data word is read out of CRT storage, the V Field code is modified by the addition of "1" and made equal to the S Field code. When the Inequality Detector circuit discovers this equality, its output terminal 455.02 (Fig. 52) goes DOWN. This makes inverter 3678 (Fig. 52) of the Read Block circuit non-conductive and, therefore, causes output terminal 022.43 (Figs. 52, 37) to go UP and OR circuit 2780 (Fig. 37) of the Write Block circuit to be operated.

The right input terminal of the left AND circuit of 2-position switch 2790 (Fig. 37) goes UP. The left input terminal is DOWN at this time and remains DOWN until coincidence is established at AND circuit 2796 (Fig. 40). This AND circuit is UP at T.4 time when a signal arrives at input terminal 031.04 (Fig. 37) from the Control Counter (Fig. 8) after a character 12 was found to exist in position 17 of Register 1. The presence of a character 12 develops coincidence at AND circuit 2776 (Fig. 36), the right input terminal being UP because of the absence of a "1" in position 17. Referring to the Read Block circuit (Fig. 44) it will be seen that when the 1 bit output terminal 441.17.1 (Fig. 45) of Register 1 position 17 is DOWN, inverter 3636 (Fig. 45) is not made conductive and output terminal 022.42 (Fig. 45) is, therefore, UP. AND circuit 2776 (Fig. 36) causes the center input terminal of AND circuit 2796 (Fig. 40) to go UP. This makes the left input terminal of the left AND circuit of 2-position switch 2790 (Fig. 37) go UP.

With both of the input terminals now UP, the 2-position switch is operated to trigger the latch comprising this switch and delay circuit 2791 (Fig. 37). The right input of AND circuit 2792 (Fig. 40) is caused to be UP. The left input terminal is UP each T.0 time after the one microsecond timing signal arrives at input terminal 031.13 (Fig. 37). The center input terminal goes UP one microsecond after the first character 12 is entered into position 16 during the left shift of the last data word from Register 1. At this time coincidence is established at AND circuit 2778 (Fig. 36). When AND circuit 2792 is UP, a latch is energized.

The latch, comprising delay circuit 2794 (Fig. 40) and AND circuit 2793, performs a number of functions. Operation of inverter 2795 (Fig. 40) prevents coincidence at AND circuit 2783 (Fig. 39) and at AND circuit 2786 (Fig. 37) and, therefore, prevents output terminal 021.13 (Fig. 40) from going UP. It will be recalled that this output terminal is UP whenever it is desired to read-*out* a data word from CRT storage. Another function performed by the latch and inverter 2795 is to permit a character 13 to be inserted into Register 1 in the following way.

As the inverter is made conductive, the center input terminal of AND circuit 2783 (Fig. 39) goes DOWN. This deenergizes the latch comprising this AND circuit and delay circuit 2784, and makes inverter 2785 (Fig. 39) non-conductive. The right input terminal of AND circuit 2813 (Fig. 42) which was DOWN since the first character 13 was written, that is throughout the writing operation, is now UP. After the final end-of-block word is entered into Register 1 and left-shifted out, the signal at output terminal 021.09 (Fig. 42) acts in conjunction with the signal at output terminal 021.08 (Fig. 42) to cause a character to be inserted into position 1 during each left shifting operation.

Operation of the latch, consisting of delay circuit 2794 and AND circuit 2793 (Fig. 40), also delivers a signal to the middle input of AND circuit 2811 (Fig. 43). When the character 12 at the end of the last data word reaches position 17, coincidence is established at AND circuit 2749 (Fig. 36). At T.4 time AND circuit 2811 (Fig. 43) is caused to go UP. Operation of this AND circuit energizes OR circuit 2805 and cathode follower 2806 to produce a signal at output terminal 021.10 (Fig. 43). When AND circuit 2811 is UP, OR circuit 2803 and cathode follower 2804 are energized in order that output terminal 021.11 (Fig. 43) might be pulled UP. As the signal at output terminal 021.10 goes UP to transfer the instruction word from the Instruction Register into the transfer bus, the signal at output terminal 021.11 permits this word to be inserted into Register 1.

As soon as the instruction word has been entered into Register 1, the left shift and writing operation takes place as a character 13 is entered into Register 1 from the right. Until now and since the first character 13 had been written on tape, only a character 12 has been entered into Register 1 due to the fact that output terminal 021.08 (Fig. 42), which causes the character 12 entry, has been UP and output terminal 021.09 (Fig. 42), which causes the 1 entry, has been DOWN. It may be recalled that the presence of the first character 13 in Register 1 position 16 developed coincidence at AND circuit 2782 (Fig. 39) and energized the latch comprising delay circuit 2784 and AND circuit 2783. This latch remains energized as long as the Write Block input latch is operated and the latch, comprising delay circuit 2794 (Fig. 40) and AND circuit 2793, is deenergized. As long as the latch, comprising delay circuit 2784 (Fig. 39) and AND circuit 2783 is UP, the inverter 2785 reverses this condition, removing coincidence from AND circuit 2813 (Fig. 42) and preventing a signal from being developed at output terminal 021.9 (Fig. 42) for forcing a 1 (in addition to the character 12 entered by output terminal 021.08) into position 1 of Register 1.

However, now that the S Field code has been found identical to the V Field code, the latch, comprising delay circuit 2794 (Fig. 40) and AND circuit 2793, is operated and the inverter 2795 between this latch and AND circuit 2783 (Fig. 39) brings the operation of the latch, comprising delay circuit 2784 and AND circuit 2783, to an end, which condition is then reversed by inverter 2785 for developing a signal at output terminal 021.09 (Fig. 42) at the first T.13 time interval of the Control Counter after the instruction word is entered into Register 1. In this way a character 13 is inserted into position 1 of Register 1 at the same time that the digit in position 17, in the hypothetical example, number 3, is being delivered to the tape circuit. The entire instruction word is left-shifted out of Register 1 into the tape until only characters 13 now exist in this register. Fourteen microseconds after a character 13 has been left-shifted into position 17, it is read out into the tape. The Write Block suboperation has now completed the writing of a character 13, the instruction word, 52 data words separated by characters 12, the instruction word again, and a character 13.

It must be understood that a 14 microsecond interval occurs between the writing of each digit on tape and that a character 12 is inserted at the beginning and end of each data word. The actual writing operation of the hypothetical example is accomplished in about 14 milliseconds, as the writing of a 17 digit word and a character 13 or character 12 takes 252 microseconds. Since as many as 2000 words may be written in any single block, the entire writing operation may take as long as half a second. However, in the case where the tapes are prepared on the card-to-tape-to-card machine, blocks of more than 100 words are automatically subdivided into sub-blocks of 100 words and separated by blank spaces on the tape. The blank area of tape between the 100 word blocks or between two other longer blocks is sufficient in length to permit starting and stopping of the tape without loss of information. In any case, the presence of a character 13 at the end of a specific writing operation indicates that that writing operation is completed.

*Transferring Register 2 into Register 1*

However, as the final character 13 is read out of position 17 into tape, the word present through this time in Register 2 is entered into Register 1 in the following manner.

As the character 13 occurs at the output of position 17 of Register 1, coincidence is established at AND circuit 2749 (Fig. 36) and the middle input terminal of AND circuit 2808 (Fig. 43) goes UP. The right input terminal of AND circuit 2808 is controlled by input terminal 092.07, and is UP when the N.7 signal is received from the Octal Commutator. The left input of AND circuit 2808 is UP at this time because it receives its signal from the latch, comprising delay circuit 2745 (Fig. 39) and AND circuit 2744, which has been UP a few microseconds after the first character 12 had been detected in position 17 of Register 1, and has remained UP throughout the writing operation.

Examination of this latch, comprising delay circuit 2745 (Fig. 39) and AND circuit 2744, shows that it is energized through 2-position switch 2743. The left input to the right AND circuit of this 2-position switch is UP for one microsecond when a signal arrives from the Control Counter at input terminal 031.13 (Fig. 37). The right input of this AND circuit is connected directly to a latch, comprising delay circuit 2789 (Fig. 40), OR circuit 2788 (Fig. 37) and AND circuit 2787, which is energized only when a character 12 is detected in Register 1 position 17 by the Write Block circuit.

The existence of the first character 12 in position 17 of Register 1 operates AND circuit 2776 (Fig. 36) and causes the center input of AND circuit 2786 (Fig. 37) to be UP. Since the V Field code is not equal to the S Field code at this time, the right input to AND circuit 2786 is caused to be UP, and when the N.7 signal arrives from the Octal Commutator, AND circuit 2786 is in coincidence. This operates OR circuit 2788 (Fig. 37) and delay circuit 2789 and causes the right input of AND circuit 2787 to be UP. The left input of this AND circuit is always UP because of its connection to the Write Block input latch. The center input terminal of AND circuit 2787 remains UP until the next one microsecond signal arrives from the Control Counter at input terminal 031.13.

The signal from delay circuit 2789 (Fig. 40) is delivered to the right AND circuit of 2-position switch 2743 (Fig. 39) where it develops coincidence when the next timing signal occurs at input terminal 031.13. It will be recalled that this same timing signal serves to de-energize the latch, comprising AND circuit 2787 (Fig. 37), OR circuit 2788 and delay circuit 2789 (Fig. 40). Although coincidence is removed from AND circuit 2787 (Fig. 37) at T.13 time, the presence of delay circuit 2789 (Fig. 40) permits coincidence at the right AND circuit of 2-position switch 2743 (Fig. 39) at time interval T.13. Thus a signal continues to be delivered to the right input of the right AND circuit of 2-position switch 2743 so that when the T.13 signal arrives from the Control Counter (Fig. 8), for de-energizing one latch, comprising AND circuit 2787, OR circuit 2788 and delay circuit 2789, it energizes another latch, comprising AND circuit 2744 (Fig. 39) and delay circuit 2745. This latter latch continues to be operated until the Write Block suboperation is discontinued.

Thus when an end-of-block character 13 occurs at the output of position 17 of Register 1, coincidence is established at AND circuit 2808 (Fig. 43), operating OR circuit 2801 and cathode follower 2802 and causing a signal to be developed at an N.7 time at output terminal 021.12 (Fig. 43). This signal is delivered to the Register Output Switch Control to gate the 17 digit number located in Register 2 onto the 66 wire parallel transfer bus.

At the same time that AND circuit 2808 is in coincidence another AND circuit 2810 (Fig. 43) is in coincidence in order that conditions might be set up whereby the information gated under control of AND circuit 2808 onto the parallel bus may be inserted into Register 1. Once permission to write has been granted by the Tape Control circuit to the Write Block suboperation, AND circuit 2810 is UP at an N.7 time whenever a character 13 is present in position 17 of Register 1. The operation of this AND circuit energizes OR circuit 2803 and cathode follower 2804 and causes a one microsecond signal to be developed at output terminal 021.11 (Fig. 43) at N.7 time.

This signal is then delivered to the Register 1 Control where some output terminals are caused to be DOWN and others to be UP. When output terminal 021.11 is UP, the characters 13 of Register 1 are erased and the Register 2 word present on the transfer bus is entered into Register 1.

*Developing a completion signal*

The same AND circuit 2808 (Fig. 43) which develops a signal for operating an electronic switch in order that the Register 2 word might be transferred to Register 1, also delivers a signal which lets the Terminate circuit know that the writing operation has been completed. This signal from AND circuit 2808 is first delivered to delay circuit 2732 (Fig. 38) and 2-position switch 2733 where it energizes a latch comprising this switch and delay circuit 2734. The operation of this latch energizes the Terminate suboperation and prevents further writing.

When 2-position switch 2733 (Fig. 38) is caused to be UP, OR circuit 2774 (Fig. 41) and cathode follower 2775 are operated and a signal is developed at output terminal 021.02 (Fig. 41) starting at an N.0 time. This signal is then delivered to the Terminate input latch where it triggers the Terminate suboperation since a tape check failure or an end-of-file condition has not occurred.

*Stopping the writing operation*

Returning to the second function of the latch, comprising 2-position switch 2733 (Fig. 38) and delay circuit 2734, the signal occurring at the output of delay circuit 2734 operates inverter 2735 and causes the left input of AND circuit 2737 to be DOWN. This removes coincidence from this AND circuit and after a one microsecond time delay introduced by delay circuit 2738 output terminal 021.04 (Fig. 41) is caused to be DOWN. By pulling this output terminal DOWN the Tape circuits are directed to stop further tape operation.

When this output terminal is DOWN, output terminal 089.05 of the Common Tape Control circuit (Figs. 15 and 16) is DOWN also. This removes coincidence from AND circuit 4341 (Fig. 19) of the Tape Unit 1 Control circuit and causes output terminal 081.50 (Fig. 25) to go DOWN. When this terminal is DOWN, the tape is no longer in motion.

Furthermore, when output terminal 021.04 of the Write Block circuit is DOWN, coincidence is removed from AND circuit 4350 (Fig. 19) of the Tape Unit 1 Control circuit and output terminal 081.70 (Fig. 25) goes DOWN, so that the erase head is de-energized.

Pulling DOWN output terminal 081.70 also removes coincidence at AND circuit 4312 (Fig. 15) and causes output terminal 089.03 of the Common Tape Control circuit to go DOWN. This causes output terminal 081.60 (Fig. 25) of the Tape Unit 1 Control circuit to go DOWN. When this occurs the write heads which had previously written on tape can no longer be energized.

Thus it is seen that when output terminal 021.04 (Fig. 41) goes DOWN after the Register 2 word is transferred into Register 1, tape movement ceases, the erasing operation stops, and the write heads cannot be energized further.

At the same time that further writing is prevented, Control Counter operation is also prevented in the following way. As output terminal 089.03 (Fig. 15) goes DOWN, coincidence is removed from AND circuit 4314 (Fig. 16) and output terminal 089.09 goes DOWN. When this occurs, single pulse generator 2747 (Fig. 36) is de-energized and its output terminal is brought DOWN. This prevents coincidence at AND circuits 2765 and 2764 (Fig. 42) and, therefore, prevents output terminal 021.07 from going UP. Since this terminal cannot now go UP, coincidence is prevented at AND circuit 2762 (Fig. 41) and output terminal 021.06 cannot go UP. When this terminal is DOWN, digits can no longer be gated into the tape writing circuits.

The Control Counter cannot be kept in operation through AND circuit 2767 (Fig. 42). During the presence of the final end-of-block character 13 in Register 1 position 17, AND circuit 2743 (Fig. 36) of the Write Block circuit is made to go UP operating inverter 2751 which removes coincidence from AND circuit 2754 (Fig. 39). This de-energizes the latch, comprising this AND circuit, and delay circuit 2757, and brings the left input terminal of AND circuit 2767 (Fig. 42) DOWN. This AND circuit is UP at the time that the characters 13 are erased from Register 1 and the Register 2 word is entered into Register 1 because of the interposition of appropriate delays, including delay circuit 2771 (Fig. 42).

However, two microseconds after the character 13 are erased from Register 1, the left input terminal of AND circuit 2767 (Fig. 42) goes DOWN and remains DOWN when the next signal is developed by the Control Counter at input terminal 031.13 (Fig. 37). AND circuit 2767 cannot go UP at this time and output terminal 021.07 (Fig. 42) cannot again be energized through AND circuit 2767.

*End-of-file label*

Two kinds of end-of-file indications on the tape will actuate the end-of-file indicator: the end-of-file label during the write and delete operations and the end-of-file mark during read and verify operations. The end-of-file label is attached to the tape so that it actuates the end-of-file photoelectric sensing device. The label produces two changes from dark to light which are spaced apart by more than the stop distance and less than the stop and start distances combined. The primary purpose of the label is to provide a warning by turning on the end-of-file indicator when the end-of-tape is being approached during writing or deleting.

This indication may be used to either stop the calculator or to cause a conditional program transfer. The end-of-file label should precede the end-of-tape label by a distance which allows the writing of the largest possible block plus an end-of-file mark after the end-of-file label has been sensed and before the end-of-tape label is reached. The end-of-file mark is written by means of a write instruction with blank R and S Fields, with the T Field being irrelevant. The mark consists of such an instruction word bounded on both sides by a character 13. Such an end-of-file mark may also be generated in the card-to-tape-to-card machine, application 13, by punching the card with one word plus the beginning and end-of-block word. When this mark is encountered, during reading the tape, operation will cease and the end-of-file indicator will be illuminated.

When the end-of-file label is sensed during a writing operation, output terminal 36 (Fig. 25) shown in the Tape Unit Wiring Diagram goes UP. This causes output terminal 081.90 of the Tape Unit 1 Control circuit to be UP. This is so because Tape Unit 1 is assumed to be operative according to the hypothetical example. Furthermore, it is assumed that the Tape Unit Wiring Diagram pertains to Tape Unit 1, although it should be understood that there is a diagram of this kind with each of the eight tape units.

When output terminal 081.90 goes UP, OR circuit 4304 (Fig. 16) is energized and output terminal 089.29 of the Common Tape Control circuit also goes UP.

Thus when the photo-electric sensing device detects an end-of-file label on the tape during the writing operation, a signal is caused to appear at input terminal 089.29 (Fig. 41) of the Write Block circuit where it acts in conjunction with the signal developed by the Write Block input latch to cause AND circuit 2760 (Fig. 41) to be UP and a signal developed at output terminal 021.03.

This signal is then delivered to the Read Block (Fig. 51) where it serves to energize the end-of-file latch, comprising delay circuit 3663, 2-position switch 3661 and OR circuit 3662. When this latch is energized, signals are produced which serve to illuminate the end-of-file indicator and may also be used either to stop the calculator or to cause a conditional program transfer. The end-of-file indicator warns the operator during the writing or deleting operation that the end-of-tape is being approached .

When the end-of-file latch is energized, output terminal 022.04 (Fig. 56) goes UP. The signal at this output terminal is fed to the Check Stop Control circuit and the Program Indicator Storage circuit where, if the CONDITION STOP SUPPRESS switch is OFF, further calculator operation will cease at this time. The ADVANCE line of the calculator will be pulled DOWN, and the latter condition will prevent the Terminate circuit from being energized at the end of the specified writing operation. The sensing of the end-of-file mark does not stop the writing operation, since as many as 2002 words may be written between the end-of-file label and the end-of-tape label. However, the calculator cannot proceed to the next instruction at the end of the writing operation.

If, on the other hand, the CONDITION STOP SUPPRESS switch has previously been turned ON, the calculator is not stopped, but, instead, the writing operation continues beyond the end-of-file label until an entire block has been written, at which time a conditional transfer is made as follows. When the end-of-file latch (Fig. 51), comprising 2-position switch 3661, OR circuit 3662 and delay circuit 3663, is energized, output terminal 022.04 of the Read Block circuit is UP. The signal at this output terminal is made available to the Program Indicator Storage circuit.

When the tape writing operation is then completed between the end-of-file label and the end-of-tape label, the Write Block circuit develops a completion signal at its output terminal 021.02 (Fig. 41) which initiates the Terminate suboperation. At this time the U Field code is entered into the V Field and modified by 1. During the Read Instruction operation of the subsequent calculator suboperation cycle, the instruction word at this new address is read into the instruction Register. It is assumed that the operator will have programmed an instruction word containing an operational code of 67 at this time. This will have the effect of deenergizing the end-of-file latch shown in Fig. 51 of the Read Block circuit and initiating automatically a new calculator suboperation cycle after the 17 digit word stored at the R address is transferred to the S address and the T Field code is entered into the V Field as the address of the new instruction.

*Writing an end-of-file mark*

An end-of-file mark is written when it is desired to separate blocks of information or shorten the length of a tape. In the case of card-to-tape-to-card operation it is used to mark off the last block of any group of 100 word blocks. An end-of-file mark consists of an appropriate instruction word flanked at each end of a character 13. An example of such a mark is $$\underline{13}\ 1\ 0791\ 0000\ 0000\ 0063\ \underline{13}$$

To write an end-of-file mark the operator must first program an instruction word having blank R and S Fields into the Instruction Register, after which the Write suboperation transfers this instruction word through the 66 wire parallel bus into Register 1. However, as explained above, the old 17 digit word present in Register 1 is first left-shifted out and the character 13 is inserted from the right until the first character 13 appears in position 17, at which time it is written on tape. As this character 13 is being written, the instruction word on the parallel line bus is transferred into Register 1 and left-shifted out into the tape with a character 13 again being inserted into digit position 1 from the right. When the first character 13 inserted into Register 1 has been shifted left into position 17, it is written on tape. The writing of this character 13, as in the case of the character 13 terminating the block word analyzed above, is followed by a shifting of the contents of Register 2 into Register 1.

In terms of the actual circuitry, once the Write Block suboperation has determined that the V Field code is identical to the S Field code, it causes the Terminate output latch (Fig. 38), comprising 2-position switch 2733 and delay circuit 2734 to be energized. As it has already been pointed out, energization of this output latch develops a signal which initiates the Terminate suboperation after which another calculator suboperation cycle is initiated. One of the first effects of starting a new suboperation cycle is to pull the HOLD line 000.09 (Figs. 35 and 48) DOWN, thereby de-energizing all the suboperation input latches energized in the previous calculator suboperation cycle. This means that the Write Block input latch (Fig. 35) comprising 2-position switch 2730 and delay circuit 2731 is de-energized and will not again be energized until an appropriate completion signal is received from Decode at an N.7 time. De-energization of the Write Block input latch also causes the Terminate output latch (Fig. 38) in the Write Block, comprising 2-position switch 2733 and delay circuit 2734, to be de-energized, thereby informing, through the output terminal 021.04 (Fig. 41), the Tape Control circuit to bring the tape up to speed again in order to write down the end-of-file mark.

As the tape comes up to speed, single pulse generator 2747 (Fig. 36) is operated and a signal is delivered through OR circuit 2766 (Fig. 42) and delay circuit 2771 to start the Control Counter (Fig. 8) which starts the counting operation that accomplishes the transfer of the new information into Register 1 and the reading out of this information onto tape, as explained above in the original example. Every 14 microseconds, signals are developed at output terminals 021.08 (Fig. 42) and 021.09 which left shift the number present in Register 1 out of the register while entering a character 13 from the right into position 1 at the same time.

After the Control Counter has been initially energized by the Single Pulse Generator signal, it is recycled by the sustained signal developed by the Single Pulse Generator acting in conjunction with the signals at input terminals 453.01 (Fig. 39) and 031.13 (Fig. 37). When the Instruction Register Zero Detector determines that the R Field of the Instruction Register is blank, it causes its output terminal 453.01 to stay UP. This energizes OR circuit 2758 (Fig. 39) and causes the center input terminal of AND circuit 2764 (Fig. 42) to stay UP. Every 14 microseconds coincidence is established at this AND circuit for recycling the Control Counter.

As in the original word block writing operation, the first writing occurs when a character 13 appears in position 17 of Register 1. The presence of a character 13 in the output side of position 17 causes AND circuits 2749 (Fig. 36) and 2812 (Fig. 43) to be UP, thereby operating OR circuit 2805 and cathode follower 2806 in order to develop an output signal at terminal 021.10. This enables the 17 digit word in the Instruction Register to be transferred into the parallel bus. At the same time the signal developed at output terminal 021.11 (Fig. 43) modifies the conditions in Register 1 so that the old word in this register is erased and the new word appearing on the transfer bus is permitted to be inserted.

Once AND circuit 2812 (Fig. 43) is energized, and the contents of the Instruction Register are inserted into Register 1, the conditions are set up whereby such a transfer is prevented in the future. The signal from AND circuit 2812 develops coincidence at the left AND circuit of 2-position switch 2743 (Fig. 39) with the signal from input terminal 453.01. This AND circuit energizes the latch, comprising AND circuit 2744 and delay circuit 2745. The signal from this latch makes inverter 2746 conductive and, therefore, prevents coincidence at AND circuit 2812 (Fig. 43). Also AND circuit 2811 cannot go UP during a mark writing operation since a character 12 is not written at this time and AND circuit 2776 (Fig. 36) does not go UP.

As the instruction word is shifted out of Register 1 digit by digit, a character 13 is again entered into position 1 of this register once each 14 microseconds. When the character 13 reaches position 17 of Register 1, it is written and then sets up the conditions whereby the word in Register 2 is transferred to Register 1. AND circuit 2749 (Fig. 36) goes UP developing coincidence at N.7 time at AND circuit 2808 (Fig. 43). The left input terminal of this AND circuit is UP because the latch (Fig. 39), comprising AND circuit 2744 and delay circuit 2745, is energized. At N.7 time the right input terminal is UP due to the N.7 signal at input terminal 092.07 (Fig. 37).

The Writing completion signal is then developed as already explained in the case of the block writing operation. The signal from AND circuit 2808 (Fig. 43) energizes the completion latch (Fig. 38), comprising 2-position switch 2733 and delay circuit 2734. The sustained signal at output terminal 021.02 (Fig. 41) energizes the Terminate circuit in order that a new calculator suboperation cycle might be started. Output terminal 021.04 goes DOWN to de-energize the tape writing circuits.

The V Field is not modified during a mark writing operation and no words are read out of CRT storage because output terminals 021.13 (Fig. 40) and 021.14 are DOWN. It will be recalled that these terminals only go UP when a character 12 appears in position 17 of Register 1.

In the case of writing a block word, a character 12 is inserted into Register 1 as the instruction word is read into the tape. Such is not the case when the end-of-file mark is written for the following reason. Since the R Field of the instruction word representing an end-of-file mark is blank, input terminal 453.02 (Fig. 39) of the Write Block circuit is DOWN. This means that no coincidence can occur at AND circuit 2782 and that the latch, comprising delay circuit 2784 and AND circuit 2783, must remain de-energized. This condition in turn is inverted by inverter 2785 and the right input of AND circuit 2813 (Fig. 42) kept UP. In this way, every time interval T.0 (same as T.14) that AND circuit 2767 is in coincidence, AND circuit 2813 is also in coincidence, developing a one microsecond signal at output terminal 021.09. Thus only a character 13 is entered into Register 1 during a mark writing operation.

*Writing blocks of 100 words*

When tapes are prepared for the card-to-tape-to-card machine, blocks of more than 100 words are automatically subdivided into sub-blocks of 100 words separated by blank spaces on the tape. This is due to the fact that the C–T–C machine has a 100 word storage capacity. A code 91 in the Q Field of the Instruction Register permits the same writing operation which has already been examined in the case of code 90 plus the insertion of a blank space on the tape at the end of a particular 100 word group.

As the Decode suboperation detects a 91 in the Q Field of the Instruction Register, it delivers a signal to the Write Block circuit which energizes the Write Block input latch. This starts the tape in its forward motion and commences the timing operation whereby the Control Counter delivers a signal every time interval T.0 for the reading in and reading out of information from Register 1. The first signal developed at output terminal 021.07 (Fig. 42) for initiating the counting operation is obtained through single pulse generator 2747 (Fig. 36) as soon as the tape has come up to speed. Succeeding counting signals are developed at this output terminal through the operation of AND circuit 2764 (Fig. 42) which is UP at each T.0 time due to the operation of OR circuit 2758 (Fig. 39). OR circuit 2758 is operated at this time by its left input terminal because of the non-operation of the latch, comprising AND circuit 2744 and delay circuit 2745, and the operation of inverter 2746.

The 10 millisecond delay circuit 2753 (Fig. 39) is not operated when the R and V Field codes are initially equal. The R and V Field are always equal prior to the actual tape reading and writing operations. In circuit sequence the character 13 and the instruction word are written and a character 12 is made to appear in position 17 of Register 1. One microsecond after the character 12 is entered into position 17, it is present at the output side. AND circuit 2776 (Fig. 36) in the Write Block circuit is energized. Since this character is stored in this position of the register for 14 microseconds, this AND circuit is UP for that period of time.

Subsequently when an N.7 signal arrives from the Octal Commutator, coincidence is established at AND circuit 2786 (Fig. 37), which triggers a latch, comprising OR circuit 2788, delay circuit 2789 (Fig. 40) and AND circuit 2787 (Fig. 37). The signal developed by the latch is fed to the right AND circuit of 2-position switch 2743 (Fig. 39). However, no coincidence is established at this AND circuit because input terminal 031.13 (Fig. 37) is DOWN at this time.

Coincidence at AND circuit 2776 (Fig. 36) also feeds a signal to AND circuit 2796 (Fig. 40) which is at coincidence at T.4 time when the Control Counter develops a signal at its output terminal 031.04 (Fig. 37). The signal from AND circuit 2796 energizes OR circuit 2797 (Fig. 40) and delay circuit 2798 in order to cause output terminal 021.14 to go UP. It will be recalled that the signal at this output terminal accomplishes the modification of the V Field number by having a "1" added to it. Thus a new V Field number is developed and input terminal 455.01 (Fig. 36) caused to go UP before the next T.13 signal appears at input terminal 031.13 (Fig. 37).

When this signal does appear, coincidence is developed at the right AND circuit of 2-position switch 2743 (Fig. 39) because although inverter 2779 (Fig. 37) de-energizes the latch, comprising AND circuit 2787, OR circuit 2788 and delay circuit 2789 (Fig. 40), the output of this latch is not DOWN until T.14 time. Once the latch (Fig. 39), comprising AND circuit 2744 and delay circuit 2745, is energized, a signal is sent to AND circuit 2752. However, because the V Field is "1" greater than the R Field, input terminal 455.01 (Fig. 36) is UP, which operates inverter 2750 and prevents coincidence at AND circuit 2752 (Fig. 39) until 100 words have been written.

Thus it is seen that the 10 millisecond delay circuit 2753 (Fig. 39) can only be energized after the first 100 words have been written. The left input of this AND circuit is UP through the latch, comprising delay circuit 2745 and AND circuit 2744, which is energized when the second character 12 is found to exist in position 17 of Register 1. The second from the left input terminal of AND circuit 2752 is always UP whenever the Write Block suboperation discovers a 91 or a 93 in the Q Field of the Instruction Register. The third from the left input terminal of AND circuit 2752 is also UP throughout this operation so long as the R Field code is greater than zero. The right input of AND circuit 2752 is also UP at this time because the last two digits of the R Field code and the V Field code are the same. That is to say, since the third and fourth positions of the four digit V Field and R Field number are the same, input terminal 455.01 (Fig. 36) is DOWN, which condition is then reversed by inverter 2750 (Fig. 36) and the right input of AND circuit 2752 (Fig. 39) caused to be UP.

For example, if the R and V Field codes were equal originally at 0014, after 100 words had been written the last two digits are again equat at 14 although the four digit number is 0114. At the end of the next 100 words, the number will be 0214 and so on, each time the last two digits being 14. The Inequality Detector merely looks at the last two digits of the R and V Fields. Thus as soon as a hundred words have been stored on tape, the third and fourth positions of the V and R Field codes become identical, thereby causing input terminal 455.01 (Fig. 36) of the Inequality Detector to be DOWN. This condition is again reversed by inverter 2750 and coincidence established at AND circuit 2752.

Each time that the third and fourth positions of the V and R Field codes become identical, that is at the end of a 100 word writing operation, the Control Counter can no longer count until a signal is developed at output terminal 021.07 (Fig. 42) by the 10 millisecond delay circuit 2753 (Fig. 39). As long as the Control Counter is de-energized, no further reading in or reading out of Register 1 is possible, since output terminal 021.06 (Fig. 41) cannot be energized. However, the tape continues to move forward providing the necessary blank space at the end of the first 100 written words. The blank space is equivalent to about 40 words.

At the end of the ten millisecond delay period a signal from the delay circuit 2753 (Fig. 39) is delivered to the left input terminal of AND circuit 2756 (Fig. 39). Coincidence is established at this AND circuit due to the fact that AND circuit 2752 has been UP since the R and V Field codes have been found to be identical and remains UP at this time. AND circuit 2756 is UP and a signal sent to the single pulse generator 2759 so long as AND circuit 2752 is UP. Input terminals of the single pulse generator are UP when the next two successive N.6 signals arrive from the Octal Commutator so that at an N.7 time a one microsecond signal energizes OR circuit 2766 (Fig. 42) and delay circuit 2771 to cause output terminal 021.07 (Fig. 42) to go UP at N.0 time. It is this signal which permits the counting operation to commence again in order to write the next block of 100 words or any number of blocks thereafter up to a maximum of 20, provided, of course, that the blank space will be developed at the end of each hundred word group.

At the end of each 100 word writing operation, the 10 millisecond delay circuit is always operated when the operational code is 91 or 93. During the blank spacing operation, only output terminal 021.04 (Fig. 41) in the Write Block circuit remains UP in order that the tape might continue in its forward motion without writing. The V Field is not disturbed during the blank spacing and, therefore, input terminal 455.01 (Fig. 36) remains DOWN.

The end-of-word character 12 is written at the end of the block and a data word is read out of CRT storage and inserted into Register 1 prior to the spacing operation. It should be understood that the first word block written consists of an instruction word and 99 data words. Assuming that the R and V Field codes were initially equal at 0014, this means that data words at the CRT addresses 0014 through 0112 are written in the first block. As the 99th data word at address 0112 is being shifted out of Register 1 for storage on tape, a character 12 is entered in until Register 1 contains only characters 12. The V Field code is 0113 at this time. Since the last two digits of the V Field (0113) and the R Field (0014) are not the same, input terminal 455.01 (Fig. 36) is UP at this time.

The presence of a character 12 in position 17 permits the data word at address 0113 to be read out of CRT and the V Field code counted up to 0114 in the following way. At N.7 time of Octal Commutator operation, coincidence is established at AND circuit 2786 (Fig. 37). This energizes OR circuit 2799 (Fig. 40) and delay circuit 2800 and causes output terminal 021.13 to go UP at N.0 time. It will be recalled that the signal at this output terminal transfers the V Field code into the CRT storage circuits for reading out the data word at the particular address, in the hypothetical situation considered above the data word at address 0113.

The presence of a character 12 in Register 1 position 1 and the energization of AND circuit 2776 (Fig. 36) also causes coincidence to be established at AND circuit 2796 (Fig. 40) when the Control Counter develops a signal at input terminal 031.04 (Fig. 37). When AND circuit 2796 is UP, OR circuit 2797 and delay circuit 2798 are energized and output terminal 021.14 (Fig. 40) caused to go UP for one microsecond. It will be recalled that the signal at this output terminal counts the V Field number up by "1." In our hypothetical situation, the 0113 becomes 0114, thereby making the last two digits of the V Field (0114) the same as the last two digits of the R Field (0014). Input terminal 455.01 (Fig. 36) goes DOWN and the 10 millisecond delay circuit 2753 (Fig. 39) is operated.

When a spacing operation comes to an end and a signal is developed at output terminal 021.07 (Fig. 42), the timing operation is resumed and another 100 words written. In the hypothetical situation, the data word of address 0113 is in Register 1 at this time. The Write Block circuit (Fig. 34) starts to shift out this word onto the tape 14 microseconds after the signal is developed at output terminal 021.07. The first signal at output terminal 021.07 (Fig. 42) develops coincidence at AND circuit 2762 (Fig. 41), thereby energizing AND circuit

2768 and delay circuit 2770 and causing output terminal 021.06 (Fig. 41) to go UP. This gates the digit in position 17 into the Tape Writing circuits (Figs. 17 and 18) for subsequent storage on tape.

The signal at output terminal 021.07 (Fig. 42) also energizes the latch (Fig. 39), comprising AND circuit 2754, and delay circuit 2757, so that when the Control Counter develops its first signal after the spacing operation at input terminal 031.13 (Fig. 37) coincidence may be developed at AND circuit 2767 (Fig. 42) and output terminal 021.08 caused to go UP in order to left-shift the contents of Register 1 and store the digit entered into position 17 on tape. A character 12 is entered in as the digits are shifted out, inasmuch as the latch (Fig. 39), comprising AND circuit 2783 and delay circuit 2784, is still UP thereby preventing output terminal 021.09 (Fig. 42) from going UP.

Thus it is seen that the end-of-word character 12 is written and the 100th data word is entered into Register 1 prior to a spacing operation. The second 100 word block will consist of the 100th word through the 199th word, with the 100th word being entered into Register 1 before the second spacing operation. The last block will consist of the number of words left over when the V Field code is made equal to the S Field code, at which time an end-of-block instruction word and an end-of-block character bring the writing operation to an end, as already explained.

If, for some reason, the operator should wish to divide the block being written or deleted into 100 word sub-blocks after an operational code of 90 or 92 had been located in the Instruction Register, he may do so by turning the WRITE OUTPUT switch 5286 (Fig. 35) to the ON position. When this switch is so positioned during a writing or deleting operation, it causes input terminal 781.31 (Fig. 35) to go UP. This energizes OR circuit 2740, as do the operational codes 91 and 93, and thereby permits AND circuit 2752 (Fig. 39) to be UP at the end of each 100 word writing operation. It will be recalled that this AND circuit energizes 10 millisecond delay circuit 2753. However, it is unlikely that this switch would be turned on for any but the writing operation under code 90.

It should be understood that in a 100 word block writing operation only 100 words are written even if this means that only one word is to be written after the 10 millisecond delay. For example, if the instruction word is:

| | | | | | |
|---|---|---|---|---|---|
| 2 | 09 | 91 | 0014 | 0212 | 1678 |
| | Tape Selecting Code | Operating Code | R Field Code | S Field Code | T Field Code |

This means that 199 data words are to be written in blocks of 100. This will appear on tape as:

| | | | | | |
|---|---|---|---|---|---|
| I.E.O.B.W. 99 Data Words | + | 10 mil. sec. delay | 100 Data Words | 10 mil. sec. delay | F.E.O.B.W. |

The I.E.O.B.W. being the initial end-of-block word (character 13+instruction word) and the F.E.O.B.W. being the final end-of-block word (instruction word+character 13).

As the first data word at address 0014 is read out of CRT storage for entry on tape, the V Field code is modified by 1. Therefore, after the instruction word and the first data word are written but before the second data word is read out of CRT storage, the V Field number is 0015. Each succeeding time that a data word is read out of CRT storage, the V Field code is counted up. After the 99th data word is entered onto the tape, the 100th word is entered into Register 1 as the V Field is counted up to 0114. The 100th word was read out of CRT storage at address 0113. Since the last two digits of the R Field and the V Field are identical, a 10 millisecond delay is introduced.

After the delay the final 100 words are written. As the 199th word is read out of CRT storage for entry into Register 1, the V Field code becomes 0213. However, for a 10 millisecond delay it is necessary to count the V Field code up one more to 0214. This is accomplished in the following manner.

As the 100th word is shifted out of Register 1 into tape, characters 12 are entered into Register 1 from the right until a Character 12 is in position 17, at which time the V Field code is counted up again. Fourteen microseconds after a character 12 is entered into Register 1 position 17, the instruction word is entered into Register 1 again. At this time the V Field code is 0214, and another 10 millisecond delay occurs.

At the end of this period, the instruction word is shifted out into tape as characters 13 are entered into Register 1. When a character 13 is read out of Register 1 for tape, the Register 2 word is transferred into Register 1 and the writing operation ceases.

Referring to Fig. 34 and the chart shown in Fig. 60, the counting up of the V Field to 0214 to guarantee a 10 millisecond delay is accomplished as follows. In this chart the first line indicates that at an arbitrarily selected time the data word at address 0211 is in Register 1, the second line indicates that about the time that this word is in this register the V Field code is 0212, and the third and fourth lines refer to the two latches in Figs. 37 and 40 respectively.

When the V Field code is 0212, the S and V Field codes are identical. This means that input terminal 022.43 (Fig. 37) of the Write Block circuit (from Fig. 52 to Fig. 37) is UP, operating OR circuit 2780 (Fig. 37), causing the right input terminal of the left AND circuit of 2-position switch 2790 to go UP. As the word at address 0211 is shifted out into tape, characters 12 are entered into Register 1 until a character 12 appears in Register 1 position 17, at which time coincidence is established at AND circuit 2796 (Fig. 40) and the left input terminal of the left AND circuit of 2-position switch 2790 goes UP. The F latch (Fig. 37) is energized at this time, and the V Field code is modified so that it now becomes one more than the S Field code.

The signal from latch F is fed to AND circuit 2792 (Fig. 40) so long as the Write Block input latch is UP. When a character 12 is detected in position 16 of Register 1 after the data word at address 0212 has been entered onto tape and before the instruction word is entered into Register 1, AND circuit 2792 goes UP energizing latch (Fig. 40) G. The V Field code at this time is again counted up so that now its last two digits equal the last two digits of the R Field. Operation of latch G permits the instruction word to be entered into Register 1, since coincidence is accomplished at AND circuit 2811 (Fig. 43).

After the 10 millisecond delay, the instruction word is shifted out of Register 1 and characters 13 are entered therein. Coincidence cannot again be developed at AND circuit 2796 (Fig. 40) and therefore the V Field cannot be changed. After the character 13 is shifted out onto tape, the Register 2 word is entered into Register 1 and the writing operation ceases. This permits the calculator to proceed to another instruction and suboperation cycle, as already explained.

*Deleting*

The tape circuits also contain provision for accomplishing the deletion of information which has already been stored on tape. However, this requires that a new instruction word be programmed into the Instruction Register in which the Q Field code is a 92 or a 93. When the operational code is a 92, the deletion takes place in a space corresponding to a word block written by operational code 90, and when the operational code is 93, the deletion corresponds to a block, having one or more sub-blocks of 100 words, written when the operational code is 91.

Unlike writing, the deleting operation requires that the operator determine the block to be deleted by having the tape read backward through the block to be deleted, thereby bringing the read-write head to rest .75 inch ahead of that block. This means that an instruction word must first be programmed into the Instruction Register with the operational code being a 95 and the R Field code being 0000. A blank R Field indicates that the tape will move through the block specified by the T Field code of the Instruction Register and the words will be checked without any words being stored in CRT. The reading operation will subsequently be examined in detail. When the reading-without-storing operation is completed, another instruction word must be programmed into the Instruction Register having an operational code of 92 or 93. Like writing, deleting can only take place in the forward direction. The process of deleting consists of saturating the tape, and so the read-write heads are turned on as soon as the tape moves. This insures smearing of the very first digits of the blocks to be deleted. It will be recalled that in writing the energization of the heads is delayed until the tape comes up to speed.

When the Decode suboperation detects the presence of a 92 or 93 in the Q Field of the instruction word, it delivers a signal to the Write Block which energizes the latter's input latch. The Write Block input latch delivers a signal through cathode follower 2736 (Fig. 38) and develops coincidence at AND circuit 2737. At the end of a one microsecond interval introduced by delay circuit 2738 (Fig. 38) a signal is developed at output terminal 021.04 (Fig. 41) which directs the tape circuits to begin the forward motion of the tape, as explained above in section 4. Another signal from delay circuit 2738 is delivered to the left input terminal of AND circuit 2761 (Fig. 41), which is now in coincidence because of the operation of OR circuit 2739 (Fig. 35) by the signal appearing at the input terminal 454.02 of 454.03. This input terminal is always UP when a 92 or 93 is found to exist in the Q Field of the instruction word. The coincidence of AND circuit 2761 (Fig. 41) operates delay circuit 2769 and causes a sustained signal to appear at output terminal 021.05 (Fig. 41). This output terminal delivers the signal in turn to the tape circuits where it directs them to commence the saturation operation. At the time that AND circuit 2761 is UP, inverter 2763 (Fig. 41) is operated, removing coincidence from AND circuit 2768 and preventing a signal from appearing at output terminal 021.06. When this output terminal is DOWN, the writing of information on tape is prohibited. The signal at output terminal 021.04 (Fig. 41) of the Write Block circuit is delivered to the Common Tape Control circuit where it energizes OR circuit 4317 (Fig. 16) and causes output terminal 089.05 (Fig. 20) to go UP. Assuming that tape unit No. 1 is selected, the signal at output terminal 089.05 develops coinicidence at AND circuit 4341 (Fig. 19) and one microsecond later sustained signals are developed at output terminals 081.50 and 081.70 for energizing the tape moving coil and erase head respectively in tape unit No. 1.

The signal developed at output terminal 081.70 is also fed to the Common Tape Control circuit where it triggers a six millisecond delay 4311 (Fig. 15), after which it brings output terminal 089.03 (Fig. 15) UP. This signal is fed to the Tape Unit 1 Control circuit, assuming this tape unit is selected for operation, where it energizes OR circuit 4330 (Fig. 20) and AND circuit 4333 to cause output terminal 081.60 (Fig. 25) to go UP. However, during deletion, output terminal 081.60 is controlled by terminal 021.05 (Fig. 20). This signal is fed to the Tape Unit and from there to four tape amplifiers. Thus it is seen that the signal at input terminal 021.05 turns on the read-write head 6 milliseconds sooner than does the signal at terminal 089.03. The signal developed at output terminal 081.60 of the Tape Unit 1 Control circuit is fed to the four amplifiers in tape unit No. 1. Details of the operation of these amplifiers are to be found in application 13.

As in a normal tape writing operation, about 8 milliseconds after the signal appears at output terminal 021.04 (Figs. 41 and 18), input terminal 089.09 (Figs. 16 and 36) is UP and single pulse generater 2747 (Fig. 36) of the Write Block circuit is operated. This operates OR circuit 2766 (Fig. 42) and delay circuit 2771 in order to cause output terminal 021.07 (Fig. 42) to go UP for cycling the Control Counter circuit. The old word in Register 1 is shifted out and characters 13 entered therein, as in normal writing, until a character 13 is in position 16 at which time the latch A (Fig. 38), comprising 2-position switch 2741 and delay circuit 2742, is energized and remains energized until the Write Block input latch is deenergized at the start of the next calculator suboperation cycle.

The sustained signal developed by delay circuit 2742 causes the left input terminal of AND circuit 2762 (Fig. 41) to go UP. When output terminal 021.07 (Fig. 42) is UP at the next T.14 time interval, coincidence is established at AND circuit 2762. However, coincidence, is prevented at AND circuit 2768 (Fig. 41) due to the conductivity of inverter 2763 since the operational code is a 92 or 93. In such a case output terminal 021.06 (Fig. 41) cannot go UP and a gating signal cannot be developed for gating the character 13 and the other digits subsequently to be discharged from Register 1 in to the tape circuits.

As the digits are shifted out from Register 1 at the left by the T.14 signal at output terminal 021.08 (Fig. 42), the signal developed at this output terminal also forces a character 12 into Register 1 at the right. Each time that a character 12 is stored on tape, a new data word is read out of CRT storage by the signal developed at output terminal 021.13 (Fig. 40) at N.0 time, and entered into Register 1 by the signal developed at output terminal 021.11 (Fig. 43). One microsecond after a 17 digit word is entered into Register 1, the word is examined for a Modulo 4 and greater-than-9 error by the Word Check circuit. Shortly after read out of a word from CRT storage, a signal at output terminal 021.14 (Fig. 40) modifies the V Field code by adding a "1" to it.

When all the data words have been read out from CRT storage (but not written on tape), the one microsecond signal at output terminal 021.10 (Fig. 43) transfers the instruction word into Register 1. The end-of-block character 13 is again entered into Register 1 by the signals at output terminals 021.08 and 021.09 (Fig. 42). This is followed by the transfer of the Register 2 word into Register 1 to remove the character 13 by the signal at output terminal 021.12 (Fig. 43). Then the Write Block completion latch is energized and a signal developed at output terminal 021.02 (Fig. 41) initiating the Terminate suboperation.

Thus it is seen that as in the case of writing a word on tape deleting can be performed on only one block word at a time, each new block word calling for a new calculator cycle and re-energization of the tape circuits. It must be kept in mind that it takes 10 milliseconds to stop or start the tape in the forward direction. In the event that it is desired to delete the block word just previously written, it is first necessary to program an instruction word into the Instruction Register calling for a reading operation backwards. It takes 10 milliseconds to stop the tape in the backward direction. Upon completion of the backward read operation, the deleting operation may be programmed in order to delete this block word. The calculator continues its program without waiting for the expiration of the tape deceleration time. However, if a certain tape unit is selected for use in writing or deleting before the tape deceleration time has expired, the calculator must wait until deceleration is completed.

In case the deletion code is a 93, the tape unit deletes sub-blocks of 100 words and leaves a 10 millisecond space as in a regular writing operation of code 91. Codes 91 and 93 operate the 10 millisecond delay circuit 2753 (Fig. 39). Transfer of words into Register 1, a modulo 4 and greater-than-9 check, and their left shifting out is accomplished as where the code is 91 with the exception that no writing takes place with a 93 code.

As in a regular writing operation so in deletion the tape unit is stopped about .75 inch after the end-of-block word has been acted upon. Since this is the distance at the start of tape motion and because the tape may be read forwards and backwards, this means that the minimum inter-block space is 1.5 inches. The same consideration applies in the case of inter-sub-block spacing during tape writing for CTC operation, although it should be understood that the tape is not ordinarily stopped at an inter-sub-block space. The inter-sub-block space is 10 milliseconds or about 42 words long. Since an inch is 28 words long, this means that the space between two sub-blocks is 1.5 inches long or a distance which permits the tape to be stopped and started without missing any digits.

*Word check failure condition*

If in the course of a writing operation a 17 digit word read out of CRT storage and entered into Register 1 is found to have a modulo 4 or a greater-than-9 error, a latch is energized in the Register Error Storage circuit which develops a sustained output signal which is delivered to the Write Block circuit in order to bring the tape writing operation to an end.

When only characters 12 exist in Register 1 and an N.0 signal is developed at output terminal 021.13 (Fig. 40) and an N.4 signal is developed at output terminal 021.11 (Fig. 43), a 17 digit word is read out of CRT storage and entered into Register 1. The signal at output terminal 021.11 is fed to the Register 1 Control circuit where it sets up the conditions whereby the old word in Register 1 is erased as the new word read-out of CRT storage is entered.

The presence of either of these error conditions is fed to the Register Error Storage circuit where conditions are set up to energize OR circuit 2780 (Fig. 37) which causes the right input terminal of the left AND circuit of 2-position switch 2790 to go UP. The left input terminal of this AND circuit is UP when AND circuit 2796 (Fig. 40) is UP indicating that a character 12 is in position 17 of Register 1, a new data word is to be read out of CRT storage, and the V Field should be modified. Energization of 2-position switch 2790 (Fig. 37) starts a latch comprising this switch and delay circuit 2791. It should be noted that a character 12 can only be shifted into position 17 of Register 1 if the erroneous word is shifted out of this register for tape storage.

This delay circuit causes the right input terminal of AND circuit 2792 (Fig. 40) to go UP. Fourteen microseconds after a character 12 is inserted into Register 1 position 16, as the first word after the erroneous word is shifted out for tape storage, this AND circuit is at coincidence and a latch (Fig. 40) comprising AND circuit 2793 and delay circuit 2794 is started. The latch signal is delivered to AND circuit 2811 (Fig. 43) where coincidence is established after a character 12 is present in position 17 of Register 1 and an N.7 signal arrives from the Octal Commutator.

When AND circuit 2811 is UP, OR circuits 2805 and 2803 and cathode followers 2806 and 2804 are energized to cause output terminals 021.10 and 021.11 (Fig. 43) to go UP simultaneously. This permits the instruction word to be transferred from the Instruction Register to Register 1.

The operation of inverter 2795 (Fig. 40) de-energizes the latch (Fig. 39), comprising AND circuit 2783 and delay circuit 2784, and therefore permits AND circuit 2813 (Fig. 42) to be energized and a character 13 injected into Register 1, as the instruction word is shifted out for storage on tape. The signals at output terminals 021.08 and 021.09 (Fig. 42) each 14 microseconds permit the left shifting of Register 1 and the injection of characters 13.

When all characters 13 are in Register 1 and an N.7 signal arrives from the Octal Commutator, AND circuits 2810 and 2808 (Fig. 43) are UP and the Register 2 word is transferred into Register 1 through the signals developed at output terminals 021.11 and 021.12 (Fig. 43) respectively. The signal from AND circuit 2808 also energizes the Write Block completion latch and develops a signal at output terminal 021.02 (Fig. 41). If the ARITHMETIC AND CONTROL CHECK STOP SUPPRESS SWITCH is OFF at this time, the completion signal at output terminal 021.02 cannot initiate the Terminate suboperation in preparation for another calculator suboperation cycle.

When the Write Block completion latch is energized, inverter 2735 (Fig. 38) is made conductive thereby removing coincidence from AND circuit 2737 and causing output terminal 021.04 (Fig. 41) to go DOWN. It will be recalled that tape motion is initiated by a signal at this terminal; hence an absence of a signal will stop further tape motion.

Thus it is seen that when an erroneous word has been read out of CRT storage and entered into Register 1, the calculator may be stalled immediately but the tape writing operation continues. The erroneous word and the word immediately succeeding it is written but no other data words are written even though the error occurred in the first word read out of CRT storage for tape storage and hundreds of words still remain to be written before the V Field code equals the S Field code. After the first word succeeding the error word is written, an end-of-block instruction word and a character 13 are written and the Register 2 word is inserted into Register 1 as in a normal writing operation. The end-of-block word is "forced" into tape storage so that the block might be recognized in a backward reading operation prior to the deletion of the block having the erroneous word.

*End-of-tape operation*

End-of-tape metal labels are attached on either end of the tape in order that they might actuate the end-of-tape photo-electric sensing device. These labels are equal in length to twice the stop distance of the tape or 1.5 inches. One or more additional safety labels are placed to stop the tape in case maloperations cause the tape to move beyond the end-of-tape labels. An end of tape label detected, transmits a signal over terminal 35 (Fig. 25).

From the terminal 35 of Fig. 25, the signal goes to input terminal 081.20 of the Tape Unit Control circuit. Assuming that tape unit No. 1 is being operated, this means that coincidence is established at AND circuit 4328 (Fig. 20) of the Tape Unit 1 Control circuit. The left input terminal is UP at this time because a rewind operation is not in process and inverter 4327 (Fig. 20) is therefore made non-conductive. The second from the left input terminal is also UP because input terminal 089.04 is always UP except for 30 milliseconds following the reset of the Rewind Latch. The second from the right input terminal is UP as soon as input terminal 080.81 is UP, indicating that tape unit No. 1 has been selected. The rightmost input terminal is UP when the tape unit No. 1 develops an end-of-tape signal. Once AND circuit 4328 is UP, output terminal 081.00 goes UP also.

This signal is then fed to the Tape Selection circuit where it energizes OR circuit 4211 (Fig. 29) and causes the left input terminal of AND circuit 42113 to go UP. The right input terminal is UP throughout the writing or reading operation. When AND circuit 4213 is UP, delay circuit 4214 is energized and output terminals 080.21 and 080.23 (Fig. 29) are UP. The latter merely illuminates the end-of-tape indicator light. The signal at output terminal 080.21 is delivered to the Check Stop Control circuit and the Write Block circuit (Figs. 34 and 37).

The signal fed to the Write Block circuit energizes OR circuit 2780 (Fig. 37) which then serves to energize a latch whose ultimate function is to bring the tape writing operation to an end by "forcing" an end-of-block instruction word to be written and the Write Block completion latch to be energized, as explained above. However, this is done merely to bring the tape to a standstill, because the end-of-block word can be used in future searching operations preliminary to reading.

Actually it is very unlikely that the end-of-tape will be reached in a regular writing operation if the operator is alert. There are 1400 feet of tape to a reel, and a distance is provided between the end-of-file label and the end-of-tape label sufficient to write all the 2000 words stored in CRT. The operator can actually see how near he is to be completion of the roll. After a whole block, which has actually gone beyond the end-of-file label is written, the tape is stopped. Since the end-of-file indication is received prior to the completion of the writing, either the calculator has been stalled or the conditions have been set up in the calculator for programming another instruction word having a different tape selection code in the P Field of the Instruction Register. Only if the operator or programmer fails to program an instruction word which selects another tape will he find himself writing up to the end-of-tape, a situation which should be avoided.

*Depressing the SUBOPERATION AND TAPE STOP pushbutton*

It has been discussed above how the tape circuits are de-energized and the tape motion stopped automatically during a normal operation when the V Field code equals the S Field code, during an abnormal operation when the 17 digit word written on tape has a modulo 4 or greater-than-9 error, and when the end-of-tape has been reached. When an error occurs or the end-of-tape is reached, provision is made for stalling the calculator. However, it is also possible to de-energize the tape circuits and stop the tape manually by the depression of the SUBOPERATION AND TAPE STOP pushbutton located on the console.

When this pushbutton is depressed during a regular writing operation, input terminal 780.14 (Fig. 37) of the Write Block circuit is UP. This energizes OR circuit 2780 and permits 2-position switch 2790 to be energized and a latch, comprising this switch and delay circuit 2791, to be triggered, as already explained.

It has already been shown how operation of OR circuit 2780 prevents further read-out from CRT storage for transfer to tape storage and stops tape operation after the end-of-block word has been written.

In any case where the tape unit is stopped either automatically or manually, 10 milliseconds must transpire before another writing operation can take place. To stop the tape either automatically or manually output terminal 021.04 (Fig. 41) of the Write Block circuit must go DOWN. When this terminal is DOWN, output terminal 089.05 (Fig. 16) goes DOWN immediately. Assuming that the first tape unit is operative, coincidence is removed from AND circuit 4341 (Fig. 19) of the Tape Unit 1 Control circuit de-energizing OR circuit 4344 and AND circuit 4345. When AND circuit 4345 goes DOWN, inverter 4331 reverses this condition and causes the input to 10 millisecond delay circuit 4332 to go UP. Output terminal of delay circuit 4332 is DOWN for a 10 millisecond interval preventing coincidence at AND circuit 4345 (Fig. 19) for this interval. Thus during this time the move line of the tape unit cannot go UP because output terminal 081.50 is DOWN.

*Introduction to tape reading*

Tape reading consists of magnetically sensing the digits previously written on tape, entering the digits into Register 1 and from there into CRT storage to be used in subsequent calculator operations. The information may have been stored on tape after being punched on card by the card-to-tape-to-card (CTC) machine (application 13) or after a tape writing code has caused some of the information in CRT storage to be stored on tape. The speed at which a reading operation takes place is the same as that in which a writing operation occurs, it being understood that approximately a 14 microsecond interval occurs between the reading of each digit from tape.

Unlike writing, tape reading may be accomplished with the tape moving in either forward or backward direction. Before an actual reading operation takes place the proper word block must be discovered on the tape. In searching for the word block which the Instruction Register wishes to have read, the blocks may or may not be verified during the searching period depending upon the operational code. Whereas the words are read-out of CRT storage in writing, in reading the words read from the tape are entered into CRT storage in order to participate in future calculator operations.

It will be recalled that a word block is written on tape with an end-of-block word (instruction word) and an end-of-block character 13 preceding or ending it. This is necessary in order that the operator may locate the proper block (maximum 2000 words) occupying possibly a very small portion of the 1400 foot reel of tape. No reading and CRT storage can actually take place until the block on tape corresponding to the block indicated by the T Field code of the Instruction Register has been selected. The one exception to this is where the T Field code of the Instruction Register is 0000 which means that the next block in sequence is to be read.

Since the reading operation begins when the proper word block has been located through the first end-of-block word, which may be the first or last end-of-block word written, depending upon whether reading is done in the forward or backward direction, the reading operation ceases when the second end-of-block word has been detected after all the data words in a block have been read and stored in CRT. Only one word block can be read and stored during any calculator suboperation cycle. After the second end-of-block word has been detected, the Terminate circuit is energized and the V Field code is changed so that a new instruction word may be read out of CRT storage and inserted into the Instruction Register at the start of the next Calculator suboperation cycle in the event that it is desired to read another word block from tape.

Tape selection for reading differs from that for writing only to the extent that TAPE READ FORWARD and TAPE READ BACKWARD pushbuttons are provided on the console in order to accomplish manual reading, as will be subsequently explained. Whereas tape selection during automatic reading is done under the control of the operational codes once the TAPE ADDRESS switches have been properly set, tape selection for manual reading is accomplished by setting the TAPE SELECTOR switch on the console to the desired tape unit and depressing either the TAPE READ FORWARD (5350) or TAPE READ BACKWARD (5351) pushbutton (Fig. 48). During an automatic reading operation calling for verification, all the words are checked prior to the location of the desired block, whereas in a manual reading operation only one block can be checked at a time, after which the TAPE READ FORWARD or TAPE READ BACKWARD pushbutton must again be depressed so that another word may be checked.

*Automatic reading*

At the first N.7 time after the Decode suboperation has been started and the tape is found to be operative and called for by an appropriate reading code in the Q Field (Codes 94–97), a sustained signal is delivered to Read Block in order to trigger the input latch comprising 2-position switch 3701 and delay circuit 3703 (Fig. 48). This latch will continue to be energized so long as the calculator HOLD line 000.99 (Fig. 48) is UP.

Once the input latch is energized the Read Block examines the operational code in the Q Field of the Instruction Register and sets up the conditions for reading the tape either forwards or backwards. It also determines at this time whether the tape is to be verified during the block word searching operation. Since the effect of codes 94 and 95 on Read Block is the same, it will be sufficient to analyze the operation of Read Block in terms of one of these codes. Codes 96 and 97, which call for the verification of all the word blocks during a word block searching operation, are covered below under a separate heading.

Figure 55:
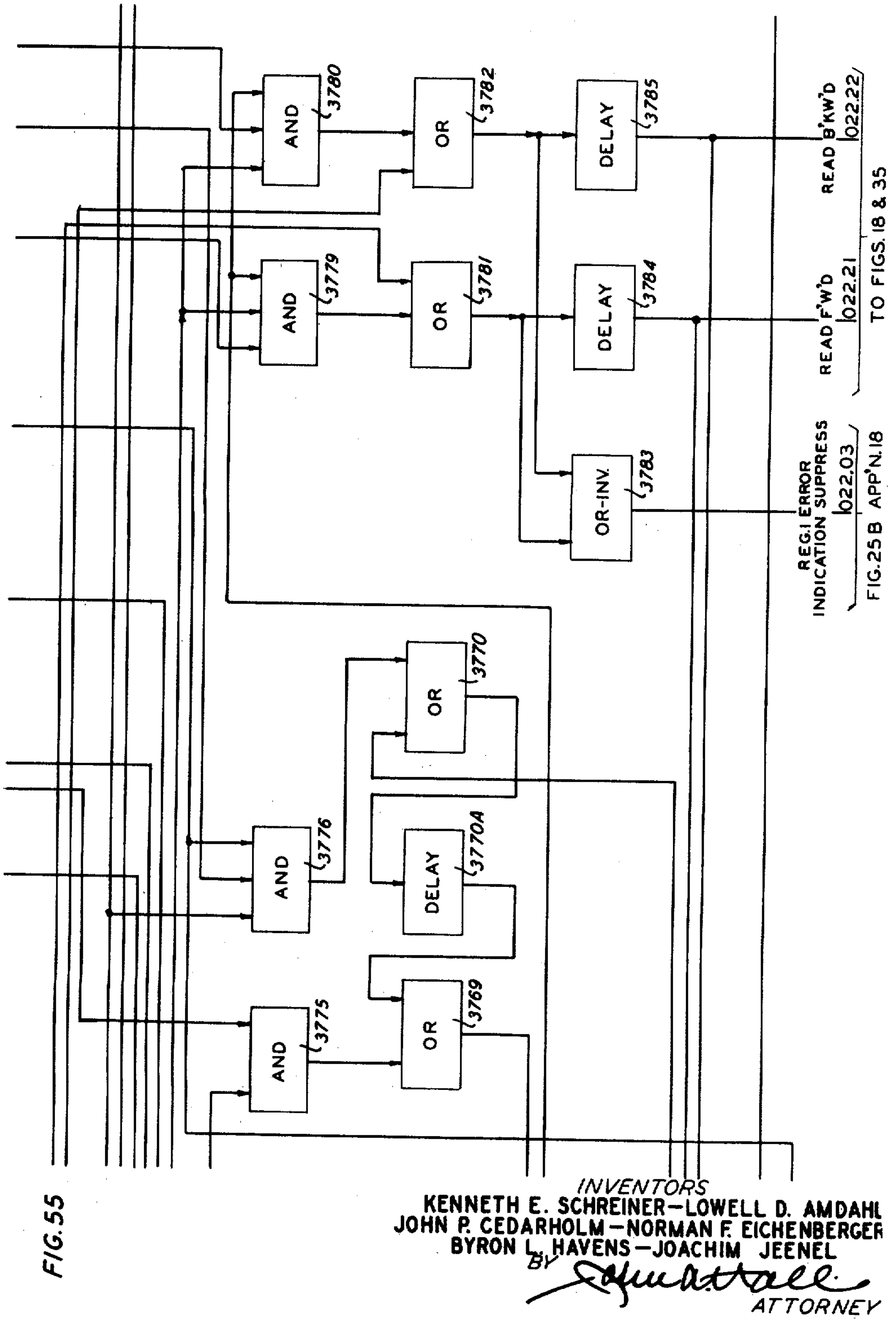

The presence of code 95 in the Q Field of the Instruction Register operates OR circuit 3797 and delay circuit 3796 (Fig. 50), thereby causing the center input terminal of AND circuit 3780 (Fig. 55) to be UP. The left input terminal of this AND circuit is UP one microsecond after the completion signal is received from Decode (002.05, Fig. 48). The right input terminal of AND circuit 3780 is UP at this time and will continue to stay UP until the Read Block suboperation has been completed, because it is connected through inverter 3753 (Fig. 58) to the Read Block completion latch. Coincidence at this AND circuit energizes OR circuit 3782 (Fig. 55) and delay circuit 3785 and causes a sustained signal to be developed at output terminal 022.22 (Fig. 55). This signal is then fed to the Tape Control circuits where it directs that the selected tape be moved backwards.

The signal developed at output terminal 022.22 is also fed to the Common Tape Control circuit where it energizes OR circuit 4317 (Fig. 16) and cathode followers 4315 and 4316 in order to cause output terminal 089.05 to go UP. From here the signal is fed to all Tape Unit Control circuits shown in Figs. 19 to 24 inclusive. Assuming that tape unit No. 1 has been selected for reading, the circuits affected may be traced in Figs. 19 and 20. Other units selected will be affected in similar manner.

The signal at input terminal 089.05 (Figs. 16, 19 through 24) causes the right input terminal of AND circuit 4341 (Fig. 19) to go UP. The left input terminal is UP as soon as input terminal 080.85 is UP indicating that tape unit No. 1 has been selected. The right input terminal of AND circuit 4341 is UP because the Rewind latch (Fig. 20), comprising AND circuit 4324, OR circuit 4325 and delay circuit 4326, is de-energized and inverter 4327 reverses the condition at the output of the latch. Operation of AND circuit 4341 (Fig. 19), energizes OR circuit 4344 and causes the left input terminal of AND circuit 4345 to go UP.

The center input terminal of AND circuit 4345 (Fig. 19) is also UP at this time. The signal developed at output terminal 022.22 of the Read Block circuit causes the right input terminal of AND circuit 4340 (Fig. 19) to go UP. The left input terminal of this AND circuit is UP as soon as input terminal 081.81 is UP. Once coincidence is established at this AND circuit, OR circuit 4343 is energized, causing output terminal 081.30 and the input terminal of 10 millisecond delay circuit 4342 (Fig. 19) to go UP. The changed condition to UP at the input of the delay circuit causes its output to stay DOWN for 10 milliseconds and then stay UP until the output of the OR circuit 4343 again comes from DOWN to UP. Thus the center input terminal of AND circuit 4345 is initially DOWN for 10 milliseconds and then remains UP for the remainder of the backward reading operation. Thus coincidence cannot be established at AND circuit 4345 until 10 milliseconds have gone by. The right input terminal is UP until the tape is to be stopped, at which time this terminal goes DOWN.

Thus it is seen that for the initial 10 milliseconds output terminal 081.50 (Fig. 19) is DOWN while output terminal 081.30 is UP and stays UP throughout the backward reading operation. Thus the backward bias coil is energized 10 milliseconds before the moving coil is energized in an operative condition. At the end of the 10 millisecond delay coincidence is established at AND circuit 4345, causing output terminal 081.50 to go UP. Erasing cannot be accomplished during reading because coincidence cannot be established at AND circuit 4350 (Fig. 19) and output terminal 081.70 cannot go UP.

The signal immediately developed at output terminal 081.30 is delivered through pin 32 of the connecter shown in Fig. 25 into the tape unit (see application 13) to cause the backwards movement.

If, on the other hand, the Q Matrix circuit notifies the Read Block circuit that a 94 exists in the Q Field of the Instruction Register, OR circuit 3794 (Fig. 50) and delay circuit 3795 of the Read Block circuit (Fig. 44) are operated, thereby causing the left input terminal of AND circuit 3779 (Fig. 55) to be UP. The center input terminal of this AND circuit is UP so long as the Read Block input latch is UP, and the right input terminal remains UP throughout the operation of Read Block because of its connection through inverter 3753 (Fig. 58) to the Read Block completion latch. Once coincidence is established at AND circuit 3779 (Fig. 55), OR circuit 3781 is energized, which operates delay circuit 3784 and causes a sustained signal to be developed at output terminal 022.21 (Fig. 55). This signal is fed to the Common Tape Control circuit (Fig. 18) to indicate that the operational code calls for forward reading of the tape.

The signal fed to the Common Tape Control circuit energizes OR circuit 4317 (Fig. 16) and cathode followers 4315 and 4316 and causes output terminal 089.05 to go UP. This signal is then fed to the control circuits of the eight tape units. Assuming that the sixth tape unit has been selected by the operator by having the proper code in the P Field of the Instruction Register and by properly setting the TAPE ADDRESS switches, reference should be made to the circuits of the Tape Control and Tape Unit number 6 indicated in Fig. 23.

There the signal at input terminal 089.05 causes the right input terminal of AND circuit corresponding to 4341 (Fig. 19) to go UP. The left input terminal of this AND circuit is UP when input terminal 080.86 is UP indicating that the sixth tape unit has been selected by the Tape Selection circuit. The right input terminal is UP because rewinding of this tape unit is not in process and the latch, comprising AND circuit corresponding to 4324 (Fig. 20), OR circuit corresponding to 4325, and delay circuit corresponding to 4326, is de-energized. This means that inverter corresponding to 4327 is non-conductive and its output is UP.

Coincidence at AND circuit corresponding to 4341 (Fig. 19) energizes OR circuit corresponding to 4344 and develops coincidence at AND circuit corresponding to 4345 whereupon terminal 086.50 is caused to go UP. Since no signal is made available at input terminal 021.04, AND circuit corresponding to 4350 cannot go UP and, therefore, no erasing can take place. Terminal 021.04 is only UP during a writing or deleting operation when the operational code is in the 90–93 range.

Figure 23:
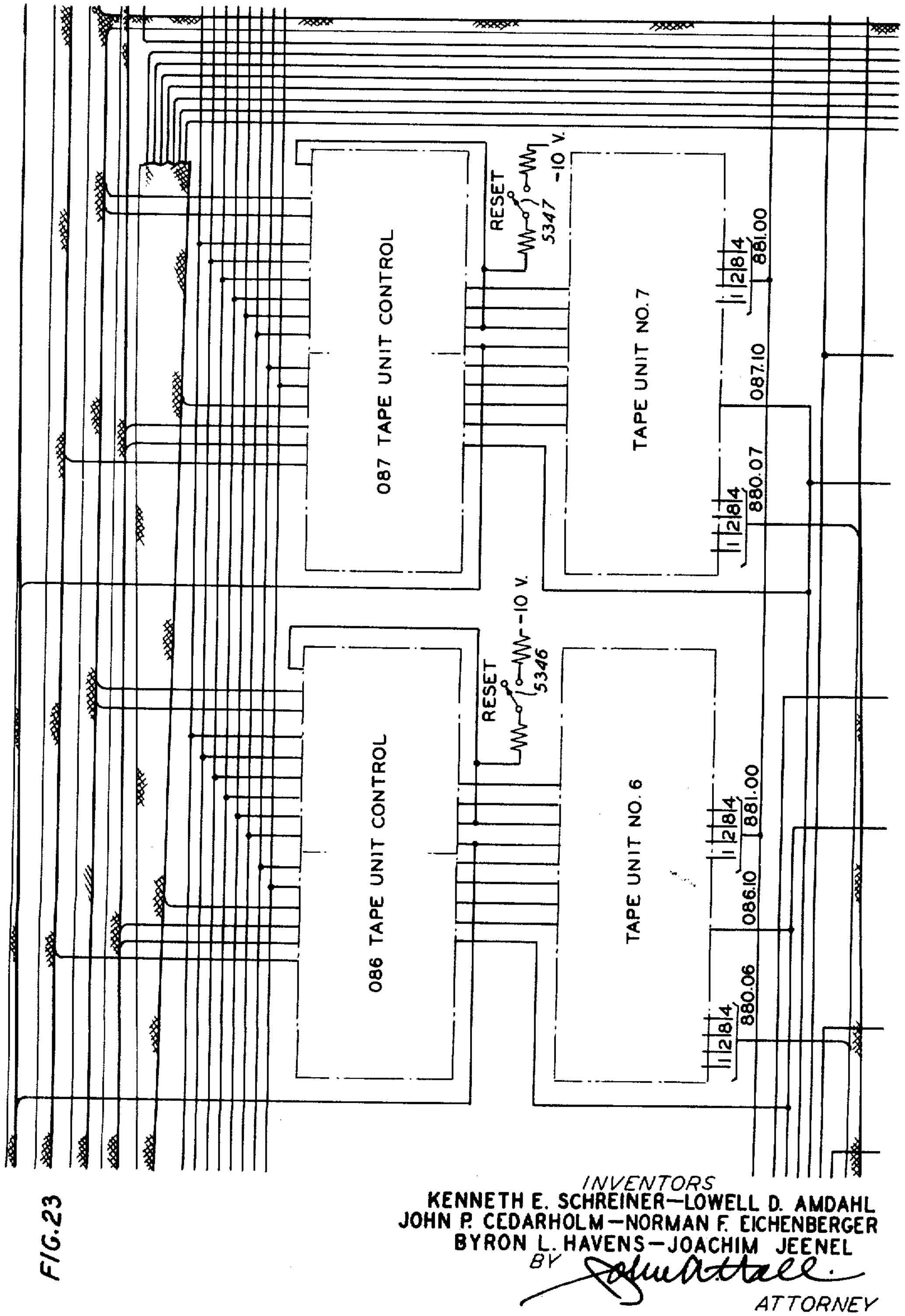
Figure 24:
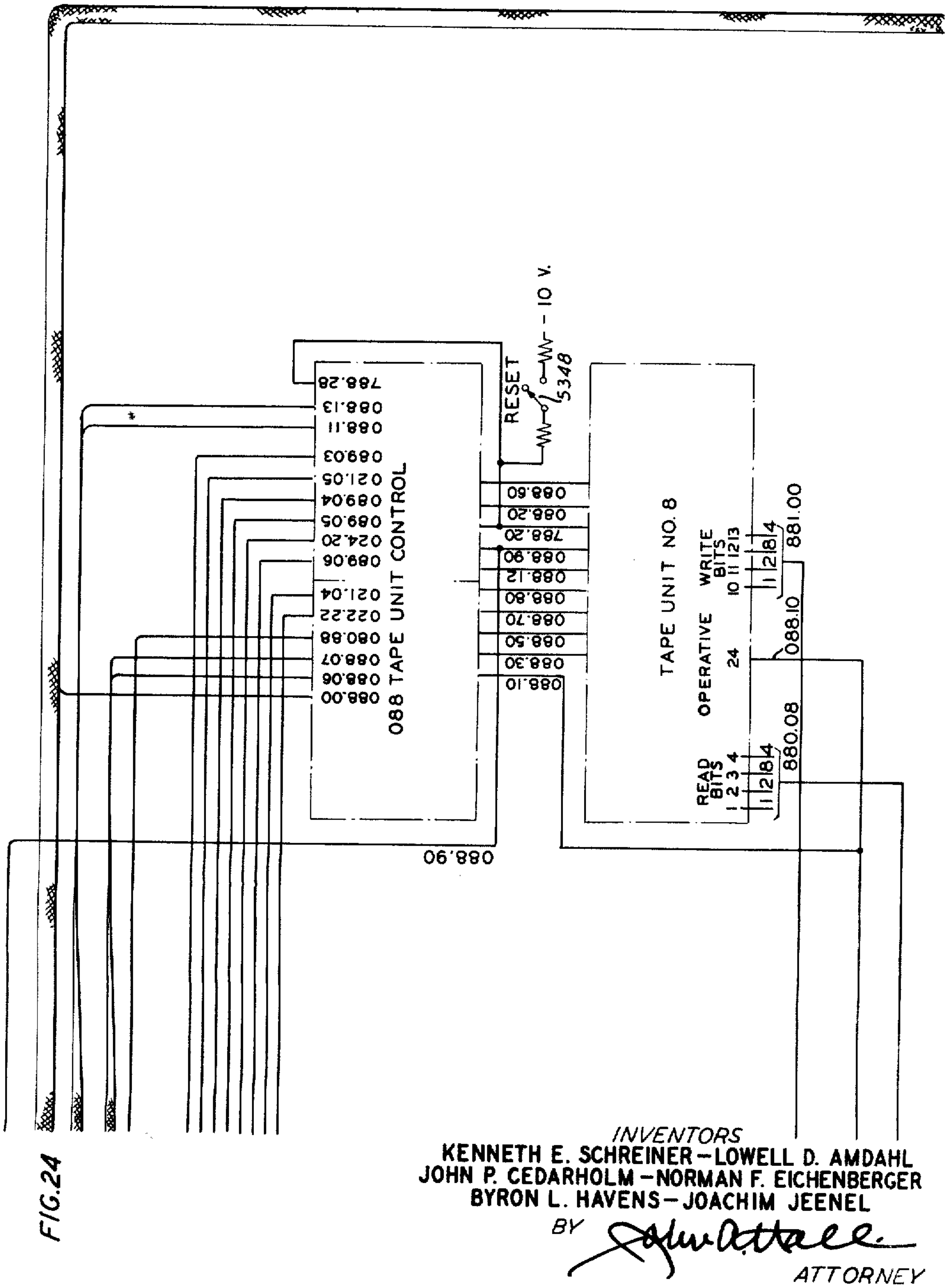

The signal developed at input terminal 086.50 is fed to the circuits in the sixth tape unit (Fig. 23).

The signal at output terminal 086.50 of the Tape Unit 6 Control circuit is fed through pin 31 of the connector to cause the tape to move. The backward line is de-energized at this time because output terminal 086.30 of the Tape Unit 6 Control circuit is DOWN.

When either OR circuit 3781 or OR circuit 3782 (Fig. 55) is operated, OR inverter circuit 3783 causes the output terminal 022.03 to be DOWN. This has the effect of suppressing the Register 1 error indication which would otherwise be developed by a greater-than-9 or a modulo 4 error.

Once the instruction for forward or backward reading has been delivered to the tape circuits, the actual reading operation begins and the tape reading circuits deliver a one microsecond signal to terminal 880.19 of Read Block each time one of the four parallel reading heads, corresponding to binary orders 1, 2, 4 and 8, senses a mark on tape (Fig. 33 to Fig. 50). The object of the initial reading from tape is not to transfer any block word into CRT storage but rather to determine the location of a block word indicated by the Instruction Register.

As the read-write head picks up the magnetic marks from tape, the signal developed in each coil written in inverted binary code with each change of flux, regardless of polarity, indicating the presence of a zero. For example, a character 13 (1101) shifted out of Register 1 position 17 is written as digit 2(0010), with only the flux in the 2 bit head being changed.

In terms of the Tape Reading circuits indicated in Fig. 25, when tape unit No. 6 is being used for reading, iuput terminals 880.06 (Fig. 23) are caused to go UP during a reading operation. For example, if a 5(0101) is read from tape unit No. 6, signals will appear at input terminals 880.06.2 and 880.06.8. This is due to the fact that the inverse (1010) of the number is written on tape. These digits are then gated through 4-pole 9-position switch 4586 (Fig. 32) by the signal developed at input terminal 080.86. This terminal is UP only when the Tape Selection circuit selects the sixth tape unit for operation. No delay is introduced in the 4-pole 9-position switch 4586 and so the two digits 2 and 8 are immediately made available to the tape blocking oscillator 4583 (Fig. 33).

The left terminal of the left group of two input terminals numbered 5457 is controlled by the 8 bit signal and is therefore UP. The right input terminal numbered 5456 of this group which is connected to delay circuit 4597 (Fig. 32) is DOWN at this time. However, the DOWN condition is fed to an inverter, 5408A shown in Fig. 61, which reverses this condition and sets up the conditions for triggering a blocking oscillator. During the operation of the blocking oscillator, a signal is developed at the leftmost output terminal 5427 (Fig. 33) of circuit 4583.

In the same way, the signal corresponding to the 2 bit causes the left input terminal of the second from the left group of two terminals to go UP. Since the right input terminal of this group is DOWN at this time, this condition is reversed by an inverter and conditions are set up for triggering a blocking oscillator in circuit 4583 in order to bring the second from the right output terminal UP.

The short signals produced by the blocking oscillators of circuit 4583 (Fig. 33) are fed to the tape pulse stretchers 4582 where they are widened. The tape pulse stretching circuit is described in detail hereinafter particularly in connection with Figs. 61 and 62. When an input terminal of a pulse stretching circuit is UP, its normal output terminal is UP for a greater time interval and its inverted output terminal is DOWN as long as the normal terminal is UP. In terms of the hypothetical situation since the 2 and 8 bit input terminals of circuit 4582 are UP, the corresponding bit normal output terminals such as 5427 are moved DOWN. However, since the 1 and 4 bit input terminals are DOWN at this time, the normal output terminals are DOWN and the inverter output terminals are UP. This means that the 1 and 4 bits are developed at output terminals 880.18 (Fig. 33).

The signals developed at the output terminals of the tape pulse stretcher 4582 (Fig. 33) energize OR circuit 4589 and cause coincidence at AND circuit 4581. The left input terminal of this AND circuit is UP at this time due to the non-conductivity of OR-inverter 4570. The signal from AND circuit 4581 energizes delay circuit 4578 which causes the input of OR-inverter 4570 to go UP and coincidence to be removed from AND circuit 4581. This pulls DOWN point B, as may be seen from Time Chart Fig. 63.

The signal from delay circuit 4578 (Fig. 33) energizes delay circuit 4579 and brings point D UP. Again OR-inverter 4570 is made conductive and point B stays DOWN. Delay circuit 4580 is energized to bring point E UP. This time OR-inverter 4570 is not made conductive, therefore AND circuit 4581 is at coincidence and point B goes UP. At the same time interval OR circuit 4572 is energized and coincidence is established at AND circuit 4576. Inverter 4577 is not conductive at this time, making the right input terminal of AND circuit 4576 to go UP. With this AND circuit UP, delay circuit 4575 is operated and a latch is established, comprising OR circuit 4572, AND circuit 4576 and delay circuit 4575. Point F goes UP at time interval T.5.

It has been said that AND circuit 4581 is caused to go UP at the time that the Read Shift output latch is started. This means that the delays are again operated sequentially with the various points going UP as indicated in Time Chart Fig. 63. When point D is UP, coincidence is established at AND circuit 4573 (Fig. 33), which energizes cathode follower 4571 and brings output terminal 880.19 (Fig. 33) UP at time interval T.6. This signal at output terminal 880.19 is sent to the Read Block circuit (Fig. 50) where it serves to develop a signal to shift the contents of Register 1 either right or left according to whether digit entry is made into this register from tape either through position 1 or position 17. At the same time that it sets up the conditions for shifting Register 1, the signal at output terminal 880.19 also develops a signal in the Read Block circuit which gates the digit available at output terminal 880.18 into the special one position register shown in Fig. 47.

The following microsecond, that is time interval T.7, point E goes UP and coincidence is established at AND circuit 4574 (Fig. 33). The signal developed by this AND circuit brings terminal 5440 (Fig. 33) UP, discharges the storage capacitors in the tape pulse stretchers 4582 and resets the latch in Fig. 33. The latter function is performed by energizing Inverter 4577 which removes coincidence from AND circuit 4576 and thereby terminates the latch.

The signal fed to tape pulse stretcher 4582 (Fig. 33) causes input terminal 5440 Fig. 61 to go UP. Near the end of one microsecond signal pentode 5444 (Fig. 61) is made conductive, operating the blocking oscillator circuit 5430, which drives inverter 5445. The action of the inverter makes the diodes such as 5433A, associated with the 2 and 4 bit pulse stretching circuits respectively, conductive. This discharges storage capacitors such as 5434. As these capacitors return to their approximately −30 volt level, cathode followers such as 5432 become non-conductive and output terminals, such as 5441, go DOWN. At this time interval all normal output terminals, such as 5441, are DOWN, and the inverted output terminals, such as 5442 (Fig. 61), are UP. A more detailed description of the Tape Pulse Stretcher circuit will be found hereinafter.

When the normal output terminals of pulse stretcher 4582 (Fig. 33) go DOWN, OR circuit 4589 is de-energized and the left input terminal of AND circuit 4581 goes DOWN, although the right input terminal of this AND circuit goes UP one microsecond later. Therefore, this AND circuit cannot go UP again until a 2 or an 8 are again read about 14 microseconds after, this time interval being the interval between the digits written on tape.

It may be noted that only a 2 bit or 8 bit is used to develop a read shift signal at output terminal 880.19

(Fig. 33) of the Tape Reading circuits. First it should be understood that the digits are stored inversely on tape. For example, the end-of-block character 13(1101) is stored on tape as a 2(0010), and the end-of-word character 12(1100) is stored as a 3(0011). As may be seen from the table below, the inverse of every binary-decimal value between 1–9 and 12–13 contains either a 2 bit or 8 bit.

| Decimal Value | Decimal-Binary Equivalent | Inverse Decimal-Binary Value |
|---|---|---|
| 1 | 0001 | 1110 |
| 2 | 0010 | 1101 |
| 3 | 0011 | 1100 |
| 4 | 0100 | 1011 |
| 5 | 0101 | 1010 |
| 6 | 0110 | 1001 |
| 7 | 0111 | 1000 |
| 8 | 1000 | 0111 |
| 9 | 1001 | 0110 |
| 12 | 1100 | 0011 |
| 13 | 1101 | 0010 |

When the tape pulse stretchers 4582 (Fig. 33) are energized causing all or some of their normal output terminals to go UP, the signals so developed serve to prevent the blocking oscillator circuits shown in the upper part of Fig. 61 from being energized again during the time that the digit signals continue at the output of 4-pole 9-position switch 4586 (Fig. 32). Returning to the hypothetical example where bits 2 and 8 (the inverse of the binary-decimal 5) were tape sensed, this means that input terminals such as terminal 5457 for the 2 bit and 8 bit of the tape blocking oscillator 4583 are UP and output terminals such as 5441 of P.S. 4582 are UP also. The signal at output terminal 5441 energizes OR circuit 4585 (Fig. 32) which develops coincidence at AND circuit 4593 along with the 8 bit signal developed by 4-pole 9-position switch 4586. Operation of this AND circuit energizes delay circuit 4597 in order to bring input terminal 5456 of the tape blocking oscillator 4583 UP.

As input terminal 5456 (Fig. 61) goes UP, inverter 5408A (Fig. 61) is made conductive causing cathode follower 5408B to go DOWN. This removes coincidence at AND circuit 5409 and brings DOWN cathode follower 5420A. When this cathode follower is inoperative, and so long as it is inoperative, pentode 5419 cannot trigger blocking oscillator 5420B to bring output terminal 5427 UP. If cathode follower 5420A did not bring the suppressor grid of pentode 5419 DOWN, the blocking oscillator would be operated each microsecond that a clamp signal arrived.

Since an 8 bit has also been hypothetically read from tape, output terminal 5441 (Fig. 33) of pulse stretchers 4582 is UP. This energizes OR circuit 4585 (Fig. 32) which then establishes coincidence at AND circuit 4593 along with the 8 bit signal from 4-pole 9-position switch 4586. The signal from this AND circuit energizes delay circuit 4597 and thereby establishes a latch, comprising AND circuit 4593, delay circuit 4597 and OR circuit 4585. The latch can only be deenergized when the 8 bit output line from 4-pole 9-position switch 4586 is DOWN.

The signal from delay circuit 4597 (Fig. 32) is fed to input terminal 5456 of the Tape Blocking Oscillator 4583 (Fig. 33). This has the effect of preventing a blocking oscillator from being triggered again, as explained above. More specifically when input terminal 5456 (Figs. 32 and 61) goes UP, inverter 5408A (Fig. 61) becomes conductive, pulling cathode follower 5408B DOWN. This removes coincidence from AND circuit 5409 and de-energizes cathode follower 5420A. This makes the suppressor grid of pentode 5419 negative and prevents tube conductivity when a clamp signal arrives one microsecond later. So long as tube 5419 cannot conduct, blocking oscillator 5420B cannot be triggered and output terminal 5427 cannot go UP.

Thus, one microsecond after the two tape blocking oscillators (the 8 bit and 2 bit) are triggered, they are prevented from being triggered and output terminals are DOWN. Since the 1 bit and 4 bit output terminals are DOWN, all four output terminals are now DOWN. When input terminals such as 5427 (Figs. 33 and 61) of the pulse stretchers 4582 (Fig. 33) are DOWN, their associated diode tubes are no longer conductive and storage capacitors such as 5434 (Fig. 61) are charged to their maximum level and remain charged until seven microseconds later when the signal from AND circuit 4574 (Fig. 33), causes input terminal 5440 (Figs. 33 and 61) of the pulse stretcher circuits to go UP.

This permits the pentode 5444 (Fig. 61) to conduct, triggering blocking oscillator circuit 5430 and making inverter 5445 conductive. This makes diodes such as 5433A conductive which discharges the two capacitors such as 5434. Cathode followers such as 5432 go DOWN, pulling DOWN output terminals such as 5441. With all the normal output terminals DOWN at this time, all the inverted output terminals are UP. This means that the 1, 2, 4 and 8 bit output lines labelled 880.18 (Figs. 33 and 47) are UP at this time. However, because output terminal 880.19 (Figs. 33 and 50) is DOWN at this time and remains DOWN until the next digit is read from tape, the binary-decimal 15 (1111) present at output terminals 880.18 cannot be inserted into the one position register shown in Fig. 47 of the Read Block circuit.

Thus it has been shown how signals corresponding to a digit 10 (inverse of the desired digit 5) is read from tape, amplified, gated through a 4-to-9 wire converter in order to operate a blocking oscillator, stretched and made available to a one position storage circuit associated with Register 1. Actually the first digit which is read from tape is an end-of-block character 13. Since the inverse of a binary-decimal 13 (1101) is a 2 (0010), only the circuits associated with the 2 bit line of one of the eight tape units are operated.

The character of a written block work must be first understood before proceeding further into an analysis of the reading operation. A tape block word comprises an initial end-of-block word, a number of data words and a final end-of-block word. The first and last end-of-block words consist of a character 13 and a 17 digit instruction word. The T Field (positions 1–4) of the instruction word indicates the number of data words in the particular block word and the tape location of the block word. Any number of data words up to 2000 may be inserted on tape between the two end-of-block words.

The first part of the reading operation is searching for the desired word block. Circuitwise this means that the tape buffer storage circuit of the Read Block circuit and Register 1 be conditioned to receive and examine the first word, that is the end-of-block word, read from tape. The process of examining the first word read from tape by Read Block will now be examined.

Six microseconds after the read-write heads sense a character 13 on tape, input terminal 880.19 (Fig. 50) in the Read Block circuit is caused to be UP, which brings the right input terminal of AND circuit 3739 (Fig. 54) UP also. The middle input terminal of this AND circuit is UP throughout the manual or automatic reading operation. The left input terminal of AND circuit 3739 remains UP until the Read Block suboperation has been terminated because it is connected through inverter 3749 (Fig. 53) to the latch which is only energized when an end-of-file mark is detected or the final end-of-block word has been read.

Thus when the signal is received from the Tape Reading circuits indicating that an actual reading operation has taken place, AND circuit 3739 (Fig. 54) is caused to be UP, operating delay circuit 3758 (Fig. 59), and after a one microsecond time interval, developing a one microsecond signal at output terminal 022.30. So long as this input terminal is UP, AND circuit 3759 (Fig. 59) is DOWN due to the action of inverter 3757, and output terminal 022.29 is caused to be DOWN. Output terminals 022.29 and 022.30 control the entry and storage of information read out from tape into the tape buffer storage circuit shown in Fig. 47.

The tape buffer storage circuit, comprising 4-pole 2-position switch 3655 (Fig. 47) and delay circuits 3654, is similar to the individual position storage circuits of Registers 1 and 2. Thus as the DOWN condition of input terminal 022.29 erases the digit previously stored in the tape buffer storage circuit, the UP condition of input terminal 022.30 permits the number, in this case a character 13, to be inserted into the 4-pole 2-position switch for storage. The character 13 will continue to be stored in the tape buffer storage circuit until the next number is read from tape 14 microseconds later. Although the digits had previously been written with a 14 microsecond time spacing, due to possible tape slippage and other mechanical irregularities introduced in the tape unit, the interval may be actually smaller or greater than the 14 microseconds.

At the same time that Read Block inserts the first digit read from tape into the tape buffer storage circuit, it also causes a one position shift to take place in Register 1. If the operational code is 94 or 96, that is if it directs the tape to be read in forward motion, then the contents of Register 1 are left-shifted one position at this time. However, if the Q Field code is 95 or 97, that is if it calls for a backward reading of the tape, Register 1 is then shifted one position to the right.

Figure 54:
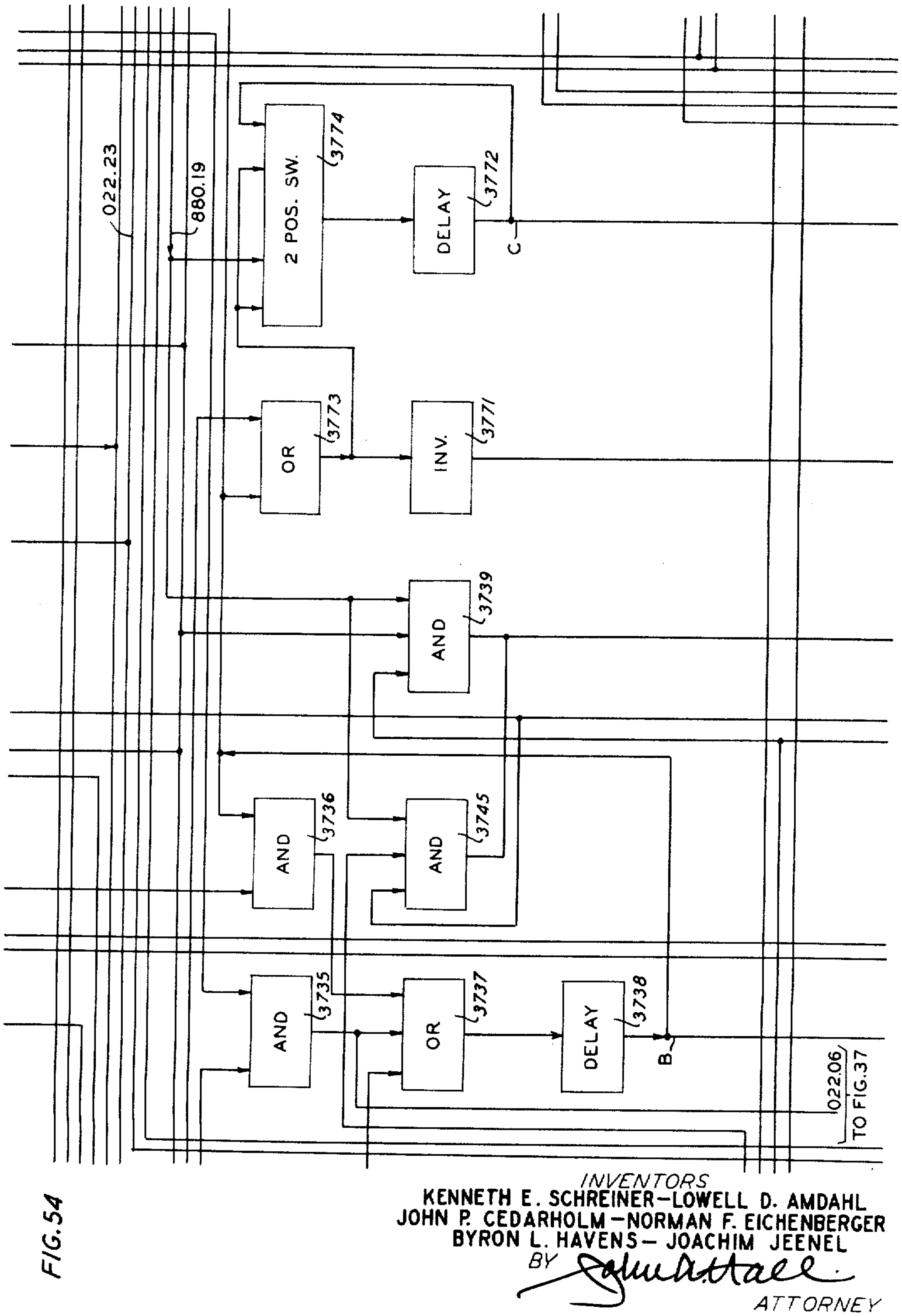
Figure 56:
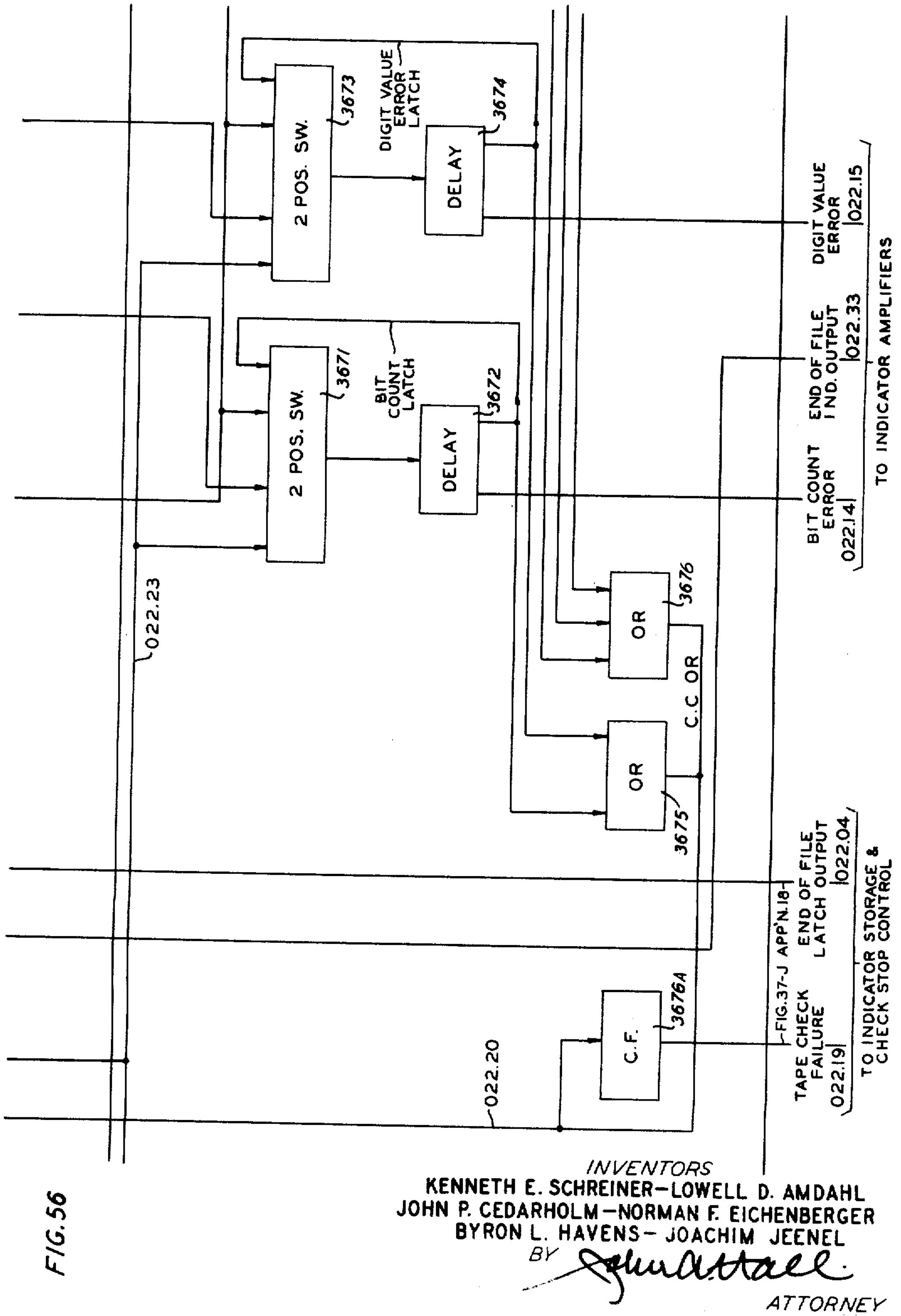

A signal for left shifting the contents of Register 1 is developed in the following manner. The presence of 94 or 96 in the Q Field energizes OR circuit 3794 (Fig. 50), delay circuit 3795, AND circuit 3779, and OR circuit 3781, and causes the right input terminal of AND circuit 3762 (Fig. 59) to be UP. The center input terminal of this AND circuit stays UP until a complete data word or a complete end-of-block word has been read or an end-of-file mark has been detected. The left input terminal of AND circuit 3762 is UP when coincidence is established at AND circuit 3739 (Fig. 54). The left input terminal is UP always one microsecond before output terminal 022.30 (Fig. 59) is UP. It will be recalled that this occurs when input terminal 880.19 (Fig. 50) is UP, provided there is no tape check failure signal at input terminal 022.20 (Fig. 56).

Figure 59:
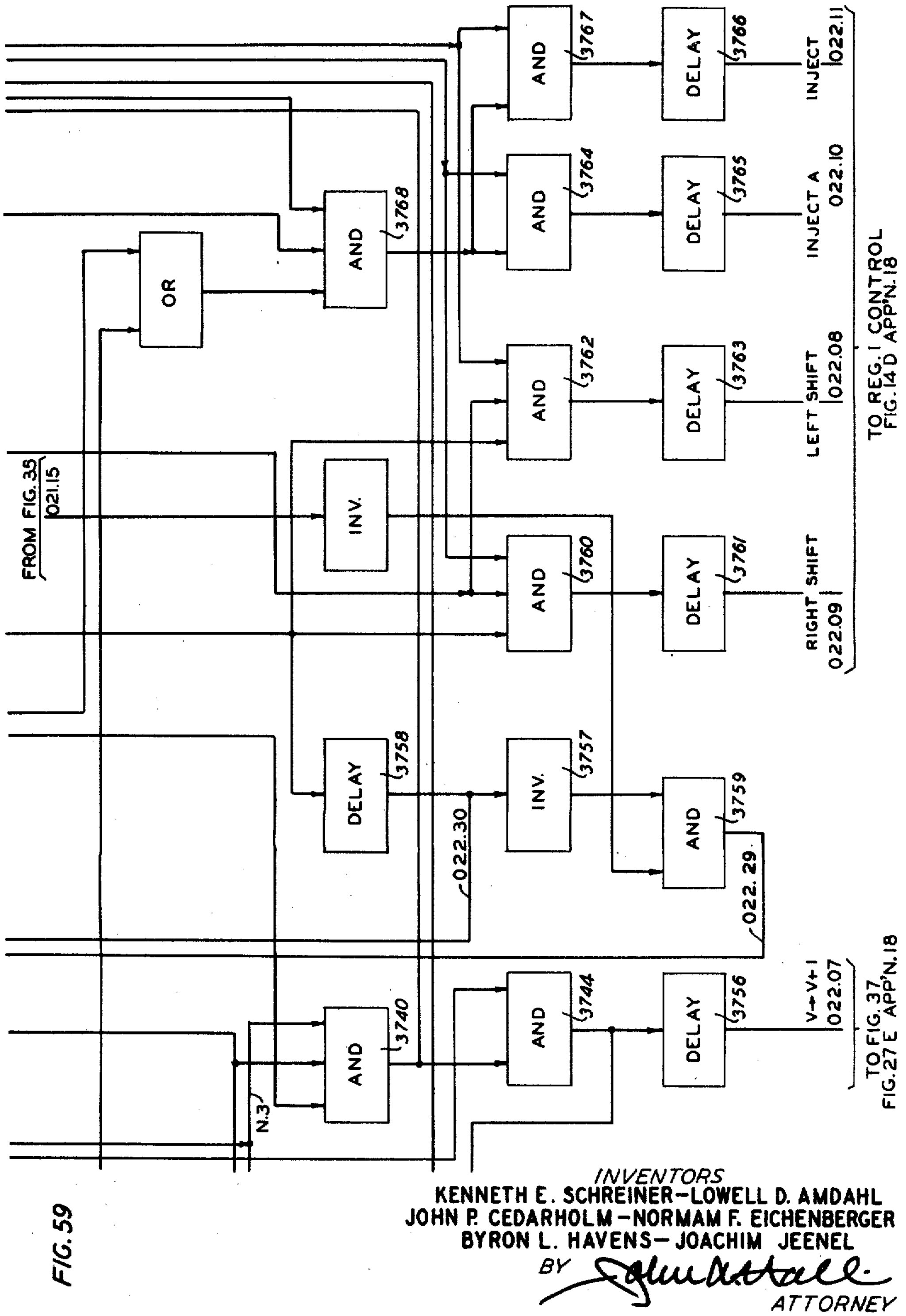

Once coincidence is established at AND circuit 3762 (Fig. 59), delay circuit 3763 is energized and a one microsecond pulse is developed at output terminal 022.08 (Fig. 59). The signal developed at this output terminal is fed to the Register 1 Control circuit where it develops the conditions whereby Register 1 might be left-shifted one position and the digit in the tape buffer storage circuit is entered into position 1 of Register 1. Subsequently it will be shown how the digits are inserted individually into Register 1 from the tape buffer storage through position 1 and left-shifted until all seventeen positions of the register are occupied by the instruction word or data word read out from tape.

The Read Block circuit develops a signal for right shifting the contents of Register 1 in the following manner. The presence of a 95 or a 97 in the Q Field of the Instruction Register operates OR circuit 3797 (Fig. 50), delay circuit 3796, AND circuit 3780 (Fig. 55), and OR circuit 3782, and causes the right input terminal of AND circuit 3760 (Fig. 59) to be UP. The center input terminal of AND circuit 3762 stays UP until a word has been read from tape into Register 1. The left input terminal of this AND circuit will be UP as soon as input terminal 880.19 (Fig. 50) is UP, indicating that the reading heads had sensed a digit on tape. Once coincidence is established at this AND circuit, delay circuit 3761 is operated and a one microsecond signal developed at output terminal 022.09 (Fig. 59). This signal is then fed to the Register 1 Control where it sets up conditions whereby Register 1 might be right-shifted one position and the digit present in the tape buffer storage circuit is transferred into position 17 of Register 1. Thus when the tape is reading backwards, a right shifting of Register 1 takes place as the number from the tape buffer storage circuit is shifted out into position 17 of Register 1 until a complete data word or instruction word is present in Register 1.

Assume that the operational code calls for reading the tape in forward motion. This means that the contents of Register 1 will be shifted one position to the left each time the reading heads detect a magnetic mark on tape. Approximately 14 microseconds after the first number, in this case character 13, has been read from tape, the read heads sense the next magnetic marks, which in this case happen to be the highest order digit of the first end-of-block instruction word. Of course, in reading backward the second digit sensed would be the lowest order digit of the instruction word.

In forward reading one microsecond after the signal has been developed at input terminal 880.19 (Fig. 50) by the tape reading circuits, a one microsecond signal is developed at output terminal 022.08 (Fig. 59). Furthermore, as in the case of the sensing of the first digit on tape, output terminal 022.29 (Fig. 59) is caused to be DOWN and output terminal 022.30 (Fig. 59) to be UP.

As input terminal 022.29 (Fig. 59) is pulled DOWN, the character 13 stored in the tape buffer storage circuit is erased at the same time that the second number read from tape is entered into the 4-pole 2-position switch 3655 (Fig. 47) through input terminal 880.18. At the same time interval that the new digit is being stored in the tape buffer storage circuit, the old digit, that is the character 13 is taken from this one position storage circuit and inserted into position 1 of Register 1.

Actually the output of the tape buffer storage circuit is always made available to position 1 of Register 1. However, the digit at the output of the tape buffer storage circuit cannot be entered into Register 1 until output terminal 022.08 (Fig. 59) of the Read Block circuit is UP. As the binary-decimal value is entered into position 1 of Register 1 from the tape buffer storage circuit, the shifting operation in Register 1 ceases. At this time the first digit sensed is in position 1 of Register 1 and the second digit read out from tape is in the tape buffer storage circuit.

The signal developed at output terminal 022.08 (Fig. 59) is fed to the Register 1 Control circuit where it permits the contents of Register 1 to be left-shifted one position.

Approximately 14 microseconds later the third digit is read out from tape and entered into the tape buffer storage circuit as the second digit stored therein is entered into position 1 of Register 1 during the left-shifting operation. At this time the character 13 is in position 2 of Register 1, the first digit of the end-of-block word is in position 1 of Register 1 and the second digit of the end-of-block word is in tape buffer storage. This process continues until the entire first instruction word is read from tape and shifted into Register 1.

Once the end-of-block word has been entered into Register 1, the Inequality Detector determines whether the first four positions of the newly inserted word in Register 1 are identical to the first four positions of the Instruction Register, that is to say if the T Field number of the end-of-block word is identical to the T Field number of the Instruction Register. If the T Fields are not equal, assuming that the T Field is not blank, the searching operation is not ended and the tape is continued in its forward motion and read out into Register 1 until the T Field of the instruction word inserted into Register 1 is identical to the T Field number in the Instruction Register. In the case where the T Field of the Instruction Register is blank, the first block read is stored in CRT, without regard to the condition of the T Field in the end-of-block word.

After an initial end-of-block word is discovered whose T Field code is identical to the T Field code of the Instruction Register, Read Block sets up conditions whereby succeeding words read from tape may be entered into Register 1 and subsequently transferred into CRT storage.

Reference to the circuits of Fig. 44 will show that the presence of a character 12 in the tape buffer storage and a character 13 in position 17 of Register 1 will produce an initial end-of-block word. One microsecond after the character 12 at the end of the instruction word has been inserted into the 4-pole 2-position switch 3655 (Fig. 47) of the tape buffer storage it appears at the output of delay circuits 3654. Since the 8 and 4 bit lines are energized, the center and right input terminals of AND circuit 3641 (Fig. 47) are caused to be UP. The DOWN condition of the one bit line is reversed by inverter 3640 and the left input of AND circuit 3641 is caused to be UP, thereby developing coincidence and causing the right input terminal of AND circuit 3642 (Fig. 46) to be UP. The left input of AND circuit 3642 is UP whenever a character 13 is found to exist at the output of position 17 of Register 1. Delay circuit 3638 (Fig. 45) permits the digit in this position to be examined even though it is erased from the Register in order to accommodate the entire 17 digits of the end-of-block word. Thus the examination of the end-of-block word is made during a one microsecond interval as a character 12 is being inserted into the tape buffer storage circuit and a character 13 is being discharged from position 17 of Register 1.

Therefore, when the 4 and 8 bit lines from Register 1 (position 17) are energized, the center and left input terminals of AND circuit 3634 (Fig. 45) are UP. The right input terminal of this AND circuit comes UP one microsecond after a code 94 or 96 has been found to exist in the Q Field of the Instruction Register. Coincidence at AND circuit 3634 causes the left input terminal of AND circuit 3635 to be UP. The right input terminal of this AND circuit is also UP at this time because of the presence of a one bit at the output of position 17. When AND circuit 3635 is UP, delay circuit 3638 (Fig. 45) is operated causing the left input terminal of AND circuit 3642 (Fig. 46) to be UP. Since the center input terminal of this AND circuit is connected to the +10 volt line, coincidence is established and a signal is developed at output terminals 022.35 and 022.36 (Fig. 46).

Figure 46:
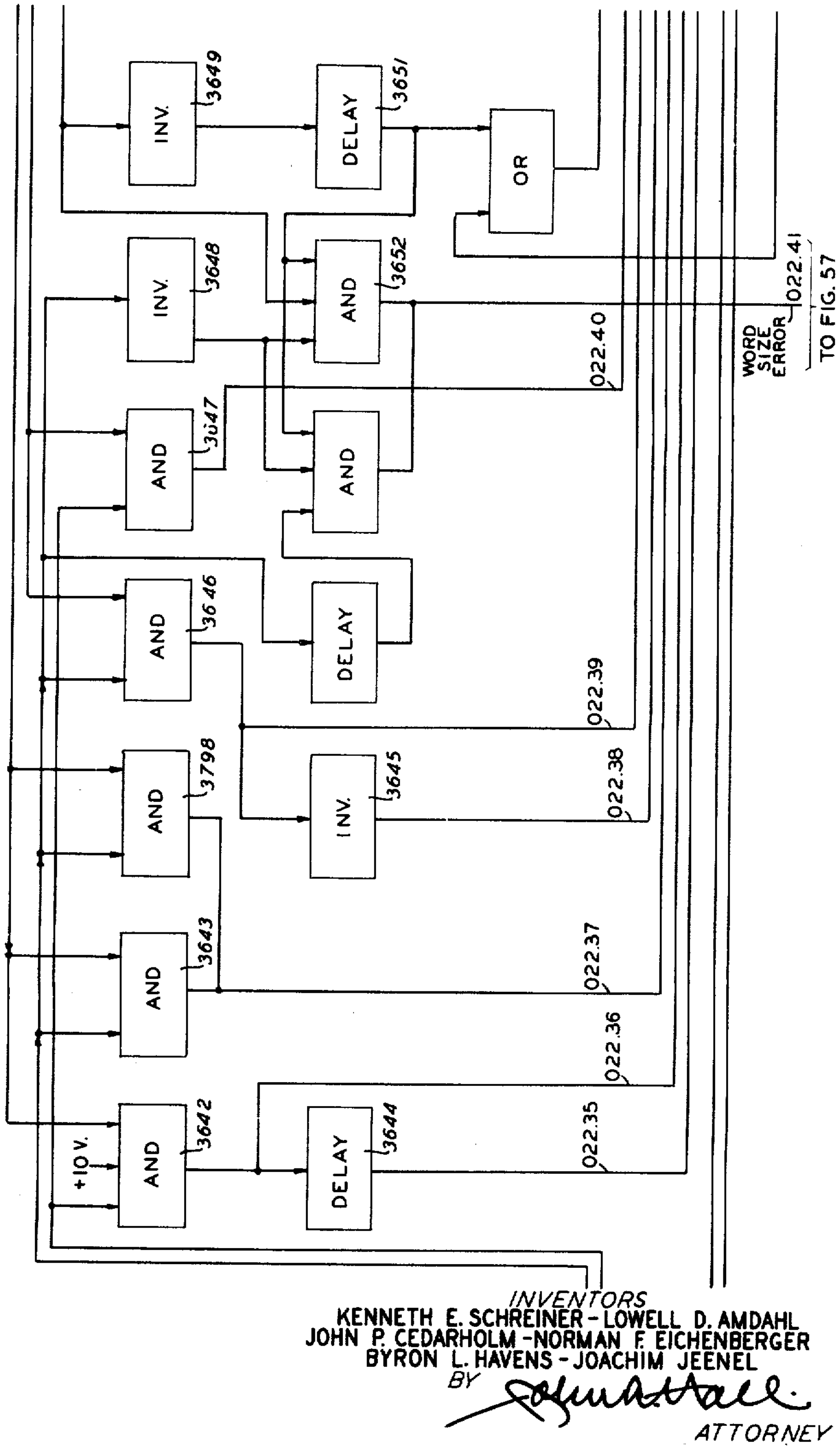

A one microsecond delay is introduced between AND circuit 3642 and output terminal 022.35 by delay circuit 3644 (Fig. 46). This is necessary so that the initial end-of-block signal may be made available to circuits shown in Fig. 49 at the same time that the Inequality Detector develops a signal to indicate that the desired block has been located. The presence of signals at output terminals 022.35 and 022.36 indicates that the first end-of-block word has been examined. The signal at output terminal 022.35 is used only in manual reading and vertifying, as will be explained subsequently.

Figure 49:
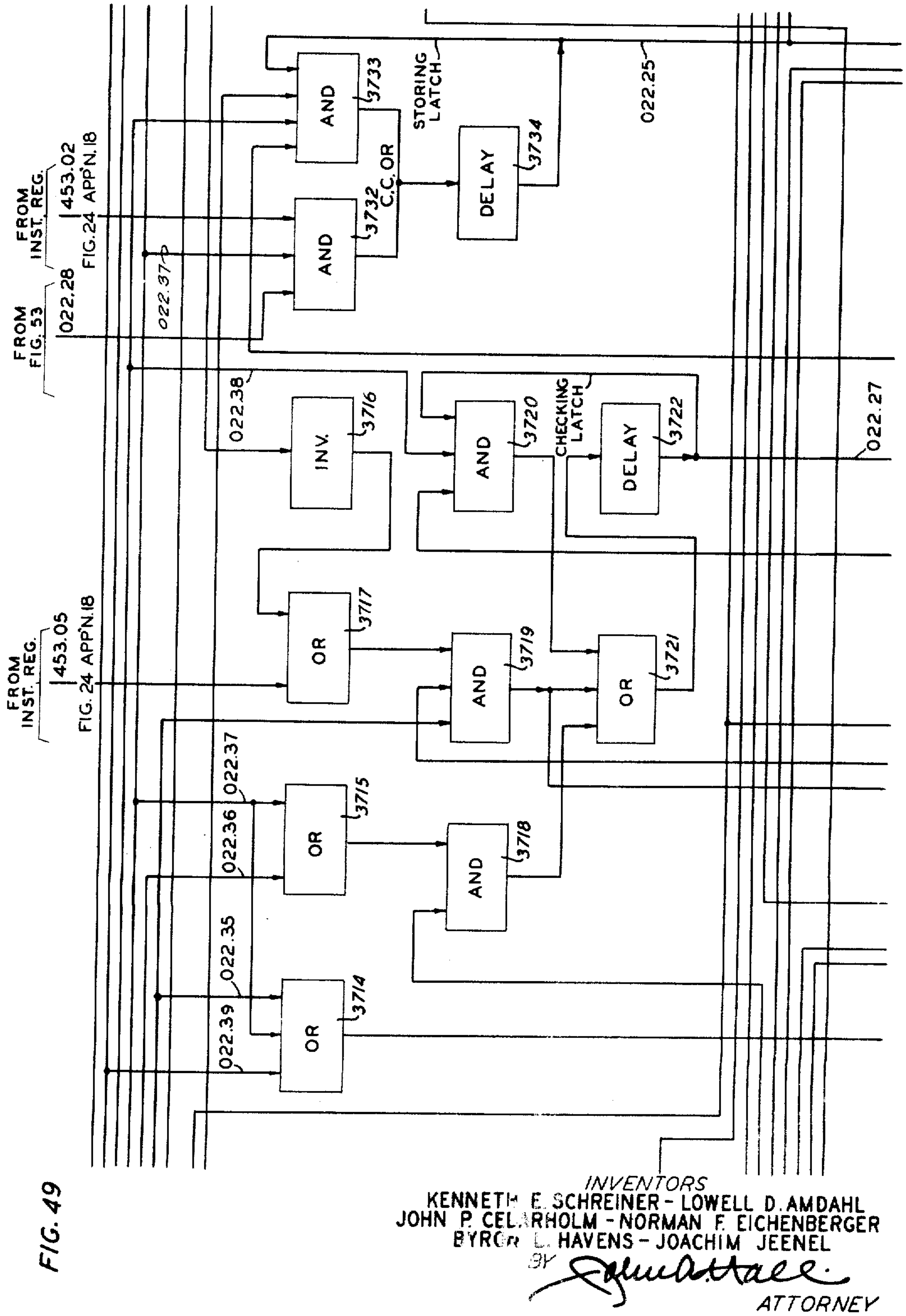

The initial end-of-block word signal developed at output terminal 022.35 is delivered to the left input terminal of AND circuit 3719 (Fig. 49). Since it is assumed that the T Field numbers of the instruction word is Register 1 and the instruction Register are identical at this time, that is to say that the proper block has been selected from the tape, input terminal 455.03 (Fig. 52) is DOWN. This condition is reversed by inverter 3716 (Fig. 49), thereby operating OR circuit 3717 and causing the right input terminal of AND circuit 3719 to be UP. Coincidence is established at this AND circuit because the center input terminal is UP so long as the Read Block input latch remains energized. The output of AND circuit 3719 serves to energize two latches which continue to stay UP throughout the Read Block suboperation.

Coincidence at AND circuit 3719 (Fig. 49) energizes OR circuit 3721 and then delay circuit 3722. The output of delay circuit 3722 is fed into the right input terminal of AND circuit 3720. The center input terminal of AND circuit 3729 stays UP until the final end-of-block word has been found to exist in Register 1, that is to say, after an entire block has been read from tape. The left input terminal of AND circuit 3720 remains UP throughout the automatic or manual reading operation. A signal provided by the checking latch (Fig. 49), comprising AND circuit 3720, OR circuit 3721, and relay circuit 3722, serves to provide a signal throughout the Read Block suboperation which permits the data word in Register 1 to be read into CRT storage and the V Field address modified.

The signal from AND circuit 3719 (Fig. 49) also serves to energize the specified block latch (Fig. 53), comprising OR circuit 3726, delay circuit 3727 and AND circuit 3724. This latch will continue to stay UP so long as the Read Block input latch is energized. The signal developed by this latch is delivered through output terminal 022.28 (Fig. 53) to AND circuit 3692 (Fig. 52) where it serves to develop a block number error signal when such an error is indicated at the end of a reading operation. The signal from the specified block latch is also fed to the left AND circuit of 2-position switch 3747 (Fig. 53) where it serves to initiate the Read Block completion latch when a final end-of-block word has been read from tape.

At the same time that the signal from AND circuit 3719 (Fig. 49) is energizing the specified block latch (Fig. 53), comprising AND circuit 3724, OR circuit 3726 and delay circuit 3727, it energizes OR circuit 3729 (Fig. 53) and then delay circuit 3728. A temporary latch is formed until the next N.7 time by OR circuit 3729, delay circuit 3728 and AND circuit 3730. When this temporary latch is energized, a signal is delivered through OR circuit 3773 (Fig. 54) to the input of inverter 3771 (Fig. 54), which reverses this condition and removes coincidence from AND circuits 3760 and 3762 (Fig. 59). One microsecond later output terminals 022.09 and 022.08 (Fig. 59) are pulled DOWN, which prevents a shifting operation to take place in Register 1 at this time, that is when an initial end-of-block word has been read from tape and is present in Register 1. Actually these output terminals are DOWN and neither right nor left-shifting of Register 1 can take place whenever any 17 digit word, either end-of-block word or data word, is present in Register 1.

The signal from the temporary latch is also fed to the left input terminal of AND circuit 3741 (Fig. 58) where at an N.7 time coincidence is established and a signal is delivered to OR circuit 3743. Energization of this OR circuit operates cathode follower 3744 and causes output terminal 022.05 (Fig. 58) to be UP at an N.7 time. When this output terminal is UP, the contents of Register 1 are inserted into the 66 wire parallel transfer bus for a modulo 4 and greater-than-9 check. Transfer of a Register 1 word can be made to CRT storage only when this output terminal is UP at N.4 time and terminals 022.06 (Fig. 54) and 022.07 (Fig. 59) are permitted to go UP. These latter output terminals can only be made to go UP after the storing latch (Fig. 49), comprising delay circuit 3734 and AND circuit 3733, has been energized. This occurs when the first data word has been read from tape, as will be shortly shown. Thus, it is seen that the instruction word read from tape into Register 1 is not stored in CRT, but instead is shifted out as an unwanted word as the first data word is entered into Register 1 from tape.

The Read Block now proceeds to have the tape read with the object of transferring the information into CRT storage. As the 17 digits of the first data word are sequentially read, they are entered through the tape buffer storage (Fig. 47) into Register 1. After the entire data word has been entered into Register 1, Read Block performs its next important function of transferring this word into CRT storage. This is accomplished in the following manner.

Assuming a forward reading operation, the presence of a character 12 at the output of position 17 of Register 1 causes output terminals 441.17.4 and 441.17.8 to be UP. With input terminal 022.31 UP throughout this time, AND circuit 3634 (Fig. 45) is UP causing the left input terminal of AND circuit 3637 to be UP also. The inverter 3636 reverses the condition developed by the absence of a one bit pulse at output terminal 441.17.1 and causes the right input terminal of AND circuit 3637 to be UP at this time. Coincidence having been established at this AND circuit, delay circuit 3639 (Fig. 45) is operated causing the left input terminal of AND circuits 3643 and 3798 (Fig. 46) to be UP. Since a character 12 has been entered into the 4-pole 2-position switch 3655 (Fig. 47) of the tape buffer storage circuit and found to exist at the output of delay circuits 3654, AND circuit 3641 is in coincidence at this time. Inverter 3640 has reversed the condition caused by the absence of a one bit signal at the output of delay circuit 3654. When AND circuit 3641 is UP, the right input terminals of AND circuits 3643 and 3798 (Fig. 46) are UP also, developing coincidence there and causing a signal to be developed at output terminal 022.37 (Fig. 46) which indicates that a word is present in Register 1.

The signal developed at output terminal 022.37 is then fed to the circuits in Fig. 49 where it serves to transfer the first data word in Register 1 into CRT storage at the address indicated by the V Field.

The data word signal transfers the contents of Register 1 into the 66 wire parallel transfer bus in the following manner.

Figure 53:
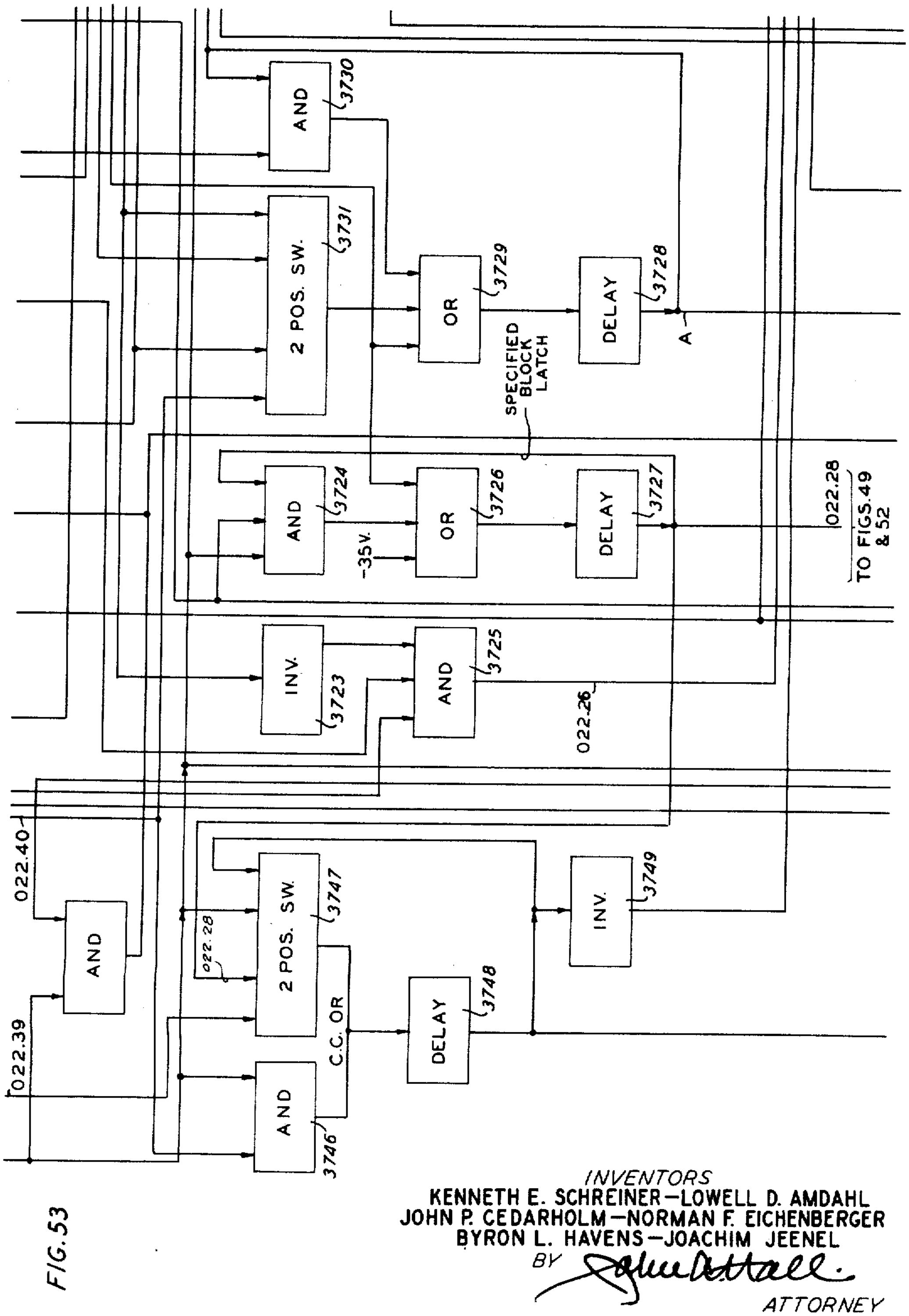

When input terminal 022.37 is UP, OR circuit 3714 (Fig. 49) is operated and the left input terminal of the right AND circuit of 2-position switch 3731 (Fig. 53) is caused to be UP. The right input terminal of this AND circuit has been UP shortly after the T Field code of the instruction word in the initial end-of-block word has been found to be identical to the T Field code in the Instruction Register. At that time the checking latch (Fig. 49), comprising AND circuit 3720, OR circuit 3721 and delay circuit 3722, has been energized. When 2-position switch 3731 (Fig. 53) is operated, OR circuit 3729 and delay circuit 3728 are energized causing the left input terminal of AND circuit 3741 (Fig. 58) to be UP. A latch (Fig. 53) is formed, comprising OR circuit 3729, delay circuit 3728 and AND circuit 3730, which latch remains energized until the next N.7 time when inverter 3788 (Fig. 50) is made conductive and coincidence is removed from AND circuit 3730 (Fig. 53).

However, an N.7 signal from the Octal Commutator develops coincidence at AND circuit 3741 (Fig. 58) delivering a positive signal to the OR circuit 3743. Operation of this OR circuit develops a signal at output terminal 022.05 (Fig. 58) which operates the Register Output Switch Control. The switching of this electronic switch permits the contents of Register 1, in the present case the first data word of the block word, to be entered into the bus. Since the contents of Register 1 are always made available to the 17 4-pole 3-position switches of the Register Output Switch, the presence of a signal gates this Register 1 number through the switch and into the bus. The Register 1 contents are maintained on the bus for one microsecond for a Modulo 4 and greater-than-9 check by the Word Check circuit.

The word signal developed at input terminal 022.37 performs its next function of transferring the Register 1 word present on the bus into CRT storage at the address of the V Field. This is done in the following manner. When input terminal 022.37 (Figs. 46 and 49) is UP, the center input terminal of AND circuit 3732 (Fig. 49) is also UP. The right input terminal of this AND circuit stays UP from the time that the R Field of the Instruction Register is found to be greater than zero. It should not be forgotten that the R Field code is the first V Field number at which the first data word is stored in CRT and it is, therefore, necessary that the R Field not be blank. The left input terminal of this AND circuit has been UP since the time that the specified block output latch (Fig. 53) comprising AND circuit 3724, OR circuit 3726, and delay circuit 3727 has been energized. This latch had been energized when it was discovered that the word block on tape is the word specified by the T Field of the Instruction Register.

As AND circuit 3732 (Fig. 49) is caused to be UP, delay circuit 3734 is operated and the storing latch (Fig. 49), comprising this delay circuit and AND circuit 3733, is energized. The output of delay circuit 3734 is delivered to the right input terminal of AND circuit 3735 (Fig. 54) which is in coincidence at an N.7 time determined by the operation of AND circuit 3741 (Fig. 58), explained above. Thus at an N.7 time a signal is developed at output terminal 022.06 (Fig. 54) which gates the R Field code, inserted into the V Field during the Decode suboperation into the CRT storage circuits. The signal developed at output terminal 022.06 is delivered through OR circuit 2799 (Fig. 40) and delay circuit 2800 of the Write Block circuit and causes output terminal 021.13 (Fig. 40) to go UP. From here the signal goes to the CRT Access Control circuit and into the CRT storage circuits. The V Field code is entered into CRT storage at an N.0 time for developing the proper deflection circuit conditions which take four microseconds. That is to say, the data word in Register 1 cannot be entered into CRT storage until an N.4 time.

At the same time that AND circuit 3735 (Fig. 54) is caused to be UP for the purpose of transferring the V Field code into CRT storage, it delivers a signal to OR circuit 3737 (Fig. 54). This triggers a temporary latch (Fig. 54) comprising OR circuit 3737, delay circuit 3738 and AND circuit 3736, which latch is made to go DOWN at the next N.3 time when the signal at input terminal 092.03 (Fig. 50) from the Octal Commutator operates inverter 3787 (Fig. 50) and removes coincidence at AND circuit 3736. The signal from this latch causes the middle input terminal of AND circuit 3740 (Fig. 59) to go UP. The left input terminal of AND circuit 3740 is UP throughout the Read Block suboperation. Therefore, when an N.3 signal arrives from the Octal Commutator at the right input terminal of AND circuit 3740, this AND circuit is UP operating delay circuit 3756 and causing a one microsecond signal to be developed at output terminal 022.07 (Fig. 59) at an N.4 time. AND circuit 3740 also delivers a signal to OR circuit 3743 (Fig. 58) and causes output terminal 022.05 (Fig. 58) to be UP for one microsecond at an N.3 time. The signal developed at output terminal 022.05 goes through a one microsecond delay in the Register Output Switch Control before it is used to switch the Register 1 contents into the 66 wire parallel bus.

The signal developed at output terminal 022.07 (Fig. 59) performs two functions. In the first place it modifies the existing V Field code by adding a one to it. Secondly, it gates the 17 digit word appearing on the bus into CRT storage at the address developed by the unmodified V Field code, which is gated into the CRT circuits at an N.0 time by the signal at output terminal 022.06 (Fig. 54). Thus the first data word read from tape is entered into CRT storage for future use.

A process of reading data words from tape, inserting them into the tape buffer storage and the Register 1, and subsequently storing them in the CRT circuits continues until all the data words have been read and stored in CRT. In the event that the first digit of a data word is entered into tape buffer storage before the data word in Register 1 has been transferred to the CRT Storage circuits, provision is made in the Read Block for preventing a shifting operation in Register 1 until the Register 1 word has been removed for storage and for inserting a character 12 into Register 1 when the next shifting operation takes place. This means that a character 12 must be entered into position 17 (backward reading) or position 1 (forward reading) since the character 12 stored in the tape buffer storage is erased as the new digit is entered before Register 1 has been emptied into CRT storage. All this is accomplished in the following manner.

Two important details must first be understood. One is that the latch (Fig. 53), comprising AND circuit 3730, OR circuit 3729, and delay circuit 3728 (Fig. 53) which serves to present the Register 1 word on the transfer bus at an N.7 time for checking purposes, is UP for a period determined by the development of the word signal at input terminal 022.37 (Fig. 46) until the first N.7 time thereafter. The other basic detail is that the latch (Fig. 54) comprising AND circuit 3736, OR circuit 3737, and delay circuit 3738, which serves to gate the data word in Register 1 into CRT storage and simultaneously modify the V Field code, is energized shortly after the first latch is operated and remains energized until the first N.3 time thereafter.

When either one of these two latches is energized, OR circuit 3773 (Fig. 54) is caused to be UP, which condition is then reversed by inverter 3771 and the center input terminals of AND circuits 3760 and 3762 (Fig. 59) are caused to be DOWN. One microsecond later both output terminals 022.08 and 022.09 (Fig. 59) are DOWN, thereby preventing a left or a right shifting operation of Register 1. Thus a shifting operation is prevented so long as one of the two latches mentioned above is energized, and the latch, comprising AND circuit 3736, OR circuit 3737, and delay circuit 3738, continues to stay energized until the contents of Register 1 have been transferred into CRT storage.

Assume now that the Tape Reading circuits deliver a signal at input terminal 880.19 (Fig. 33) to indicate that another digit has been read from tape and should be entered into tape buffer storage. When terminal 880.19 is UP, AND circuit 3739 (Fig. 54) is in coincidence energizing delay circuit 3758 (Fig. 59) in order to bring output terminal 022.30 UP. At the same time the output of delay circuit 3758 operates inverter 3757, thereby removing coincidence from AND circuit 3759 and causing the output terminal 022.29 (Fig. 59) to be DOWN. The condition of these two output terminals now permits the digit previously read from tape to be entered into tape buffer storage.

Figure 47:
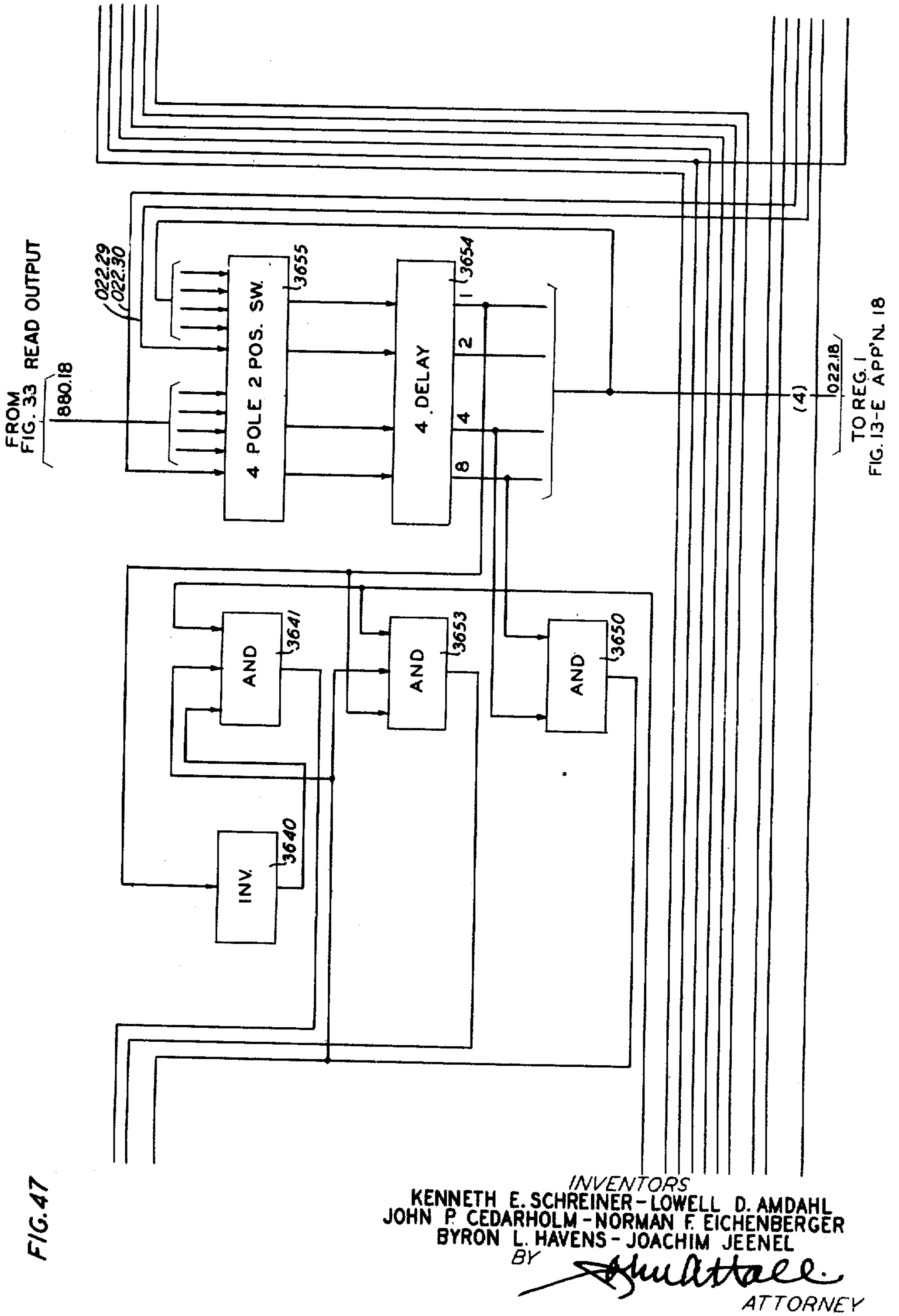

However, since no shifting operation has taken place in Register 1 with the entry of this digit into tape buffer storage, the character 12 which had been formerly stored in tape buffer storage is erased by pulling DOWN the HOLD input terminal 022.29 (Figs. 59 and 47). Therefore, a character 12 must be injected into position 1 (forward reading) or position 17 (backward reading) after the data word in Register 1 has been transferred into CRT storage. The character 12 is developed in the following manner. When input terminal 880.19 (Fig. 50) is UP, the right input terminal of the left AND circuit of 2-position switch 3774 (Fig. 54) is caused to be UP. The left input terminal of this AND circuit stays UP so long as one of the two latches discussed above is energized and OR circuit 3773 (Fig. 54) is operated.

Operation of 2-position switch 3774 (Fig. 54) energizes delay circuit 3772 and triggers the latch, comprising these two components, which continues to be energized until both of the previously mentioned latches are DOWN. The center input terminal of AND circuit 3768 (Fig. 59) stays UP for this same length of time. The left input terminal of this AND circuit is UP (output of INV 3790, Fig. 50) unless input terminal 022.20 (Figs. 50 and 56) is UP indicating a tape check failure. At an N.4 time when output terminal 022.07 (Fig. 59) is UP, which gates the data word in Register 1 into CRT storage, OR circuit 3769 (Fig. 55) is energized and the right input terminal of AND circuit 3768 (Fig. 59) is UP. In a forward reading operation, coincidence at AND circuit 3768 energizes AND circuit 3764 and delay circuit 3765 to cause output terminal 022.10 (Fig. 59) to be UP. Thus at an N.5 time either one of these two output terminals is UP depending upon which operational code is in the Q Field of the Instruction Register. Since the data word in Register 1 is discardable once it has been transferred into CRT storage, a character 12 is entered into Register 1 before the next shifting of Register 1 takes place.

A character 12 may also be injected into Register 1 position 1 or 17, for the reason explained above, during a checking operation or when a tape check failure condition exists. It will be recalled that a checking operation without storing takes place during a manual reading operation and when the operational code is 96 or 97. It is desirable to enter a character 12 into Register 1 at such a time in order that the word checks might be made despite the reading of an "early" digit (i.e. digit read before the word in Register 1 is entered into the bus for examination). For the same reason a character 12 is entered into Register 1 when the tape check failure condition is suppressed.

It may be seen that a character 12 is entered into Register 1 by coincidence at AND circuit 3776 (Fig. 55) when the checking latch (Fig. 49), comprising AND circuit 3720, OR circuit 3721, and delay circuit 3722, is energized and the storing latch (Fig. 49), comprising AND circuit 3733 and delay circuit 3734, is not energized. In the latter case inverter 3789 (Fig. 50) reverses the condition and causes the center input terminal of AND circuit 3776 (Fig. 55) to go UP. The right input terminal goes UP at N.7 time determined by the operation of the Octal Commutator. The signal from AND circuit 3776 operates delay circuit 3770, OR circuit 3769 and develops coincidence at AND circuit 3768 (Fig. 59), as explained previously. Thus at an N1.1 time either output terminal 022.10 or 022.11 (Fig. 59) goes UP for entering a character 12.

A character 12 is entered only after a new digit is read from tape and entered into the tape buffer circuit. At the time a new digit is entered into the tape buffer circuit, input terminal 880.19 (Fig. 50) is UP and a latch (Fig. 54), comprising 2-position switch 3774 and delay circuit 3772, is energized. Only then can AND circuit 3768 (Fig. 59) be UP for one microsecond.

Furthermore, a character 12 can only be entered after the 17 digit word is entered into the transfer bus for checking. It will be recalled that this is accomplished by the signal at output terminal 022.05 (Fig. 58) which occurs the first N.7 time after a word is found to be present in Register 1. As already indicated, a character 12 is not inserted into Register 1 until an N1.1 time or two microseconds later.

A character 12 may also be inserted into Register 1 during a tape check failure condition when the TAPE OR PRINTER TEST switch (Fig. 50) is not in the TAPE position. The object for such a setting is to permit the calculator and tape operation not to be influenced by the tape error condition but to proceed, however, with storing digits read in CRT. An error condition of this kind brings input terminal 022.20 (Figs. 56 and 50) UP and develops coincidence at AND circuit 3775 (Fig. 55) which operates OR circuit 3769. The signal from this OR circuit permits coincidence at AND circuit 3768 (Fig. 59), as already explained, and brings either output terminal 022.10 or 022.11 (Fig. 59) UP.

Thus it is seen that it is impossible to enter a digit of a succeeding data word into Register 1 before the contents of Register 1 have been transferred into CRT storage. The process of reading data words from tape into tape buffer storage and then Register 1 continues until the particular block word has been completely read and the final end-of-block word is located in Register 1. The condition is now set up which stops the Read Block suboperation in the following manner.

Figure 45:
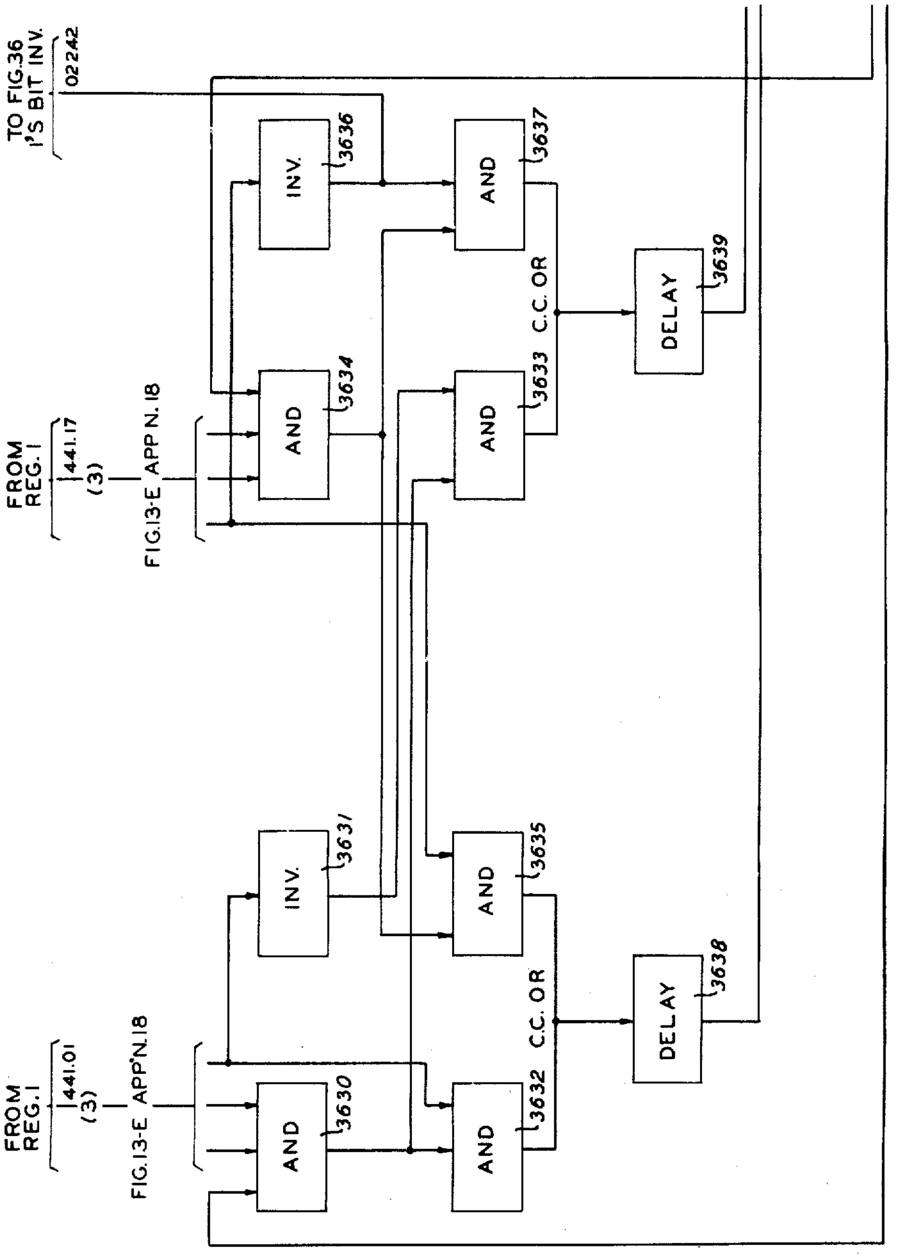

One microsecond after the end-of-block character 13 has been entered into the tape buffer storage through input terminals 880.18 (Fig. 47), the 1, 4 and 8 bit lines at the output of delay circuits 3654 are energized. This develops coincidence at AND circuit 3653 (Fig. 47) and causes the right input terminal of AND circuit 3646 (Fig. 46) to be UP. The left input terminal of this AND circuit is UP two microseconds after a character 12 is inserted in either position 17 (forward reading) or position 1 (backward reading) of Register 1. In the case of a forward reading operation when a character 12 is located in position 17 AND circuit 3634 (Fig. 45) is energized and causes the left input of AND circuit 3637 (Fig. 45) to be UP. The right input of this AND circuit is UP due to the action of inverter 3636 (Fig. 45) which reverses the DOWN condition of input terminal 441.17.1 (Fig. 45).

Coincidence at AND circuit 3637 (Fig. 45) having been established, delay circuit 3639 is operated causing the left input terminal of AND circuit 3646 (Fig. 46) to be UP. Coincidence is established at this AND circuit and a signal is developed at output terminal 022.39 to indicate that the final end-of-block word is located in Register 1. Whenever output terminal 022.39 is UP, output terminal 022.38 is DOWN due to the action of inverter 3645 (Fig. 46).

The first function performed by the final end-of-block word signal developed at output terminal 022.39 (Fig. 46) is to transfer the contents of Register 1 into Register 2. The signal at terminal 022.39 is delivered to the left input terminal of the left AND circuit of 2-position switch 3747 (Fig. 53) where it develops coincidence at this time due to the fact that the right input of this AND circuit (terminal 022.28) remains UP throughout the Read Block suboperation. Energization of this AND circuit has the effect of energizing the latch (Fig. 53), comprising delay circuit 3748 and 2-position switch 3747, which serves to trigger the completion latch (Fig. 58) and cause a left input terminal of AND circuit 3742 (Fig. 58) to be UP at this time.

The positive signal at input terminal 022.39 (Figs. 46 and 49) also serves to energize OR circuit 3714 (Fig. 49) and cause the left input of the right AND circuit of 2-position switch 3731 (Fig. 53) to be UP at this time. The right input terminal of the right AND circuit of this 2-position switch is UP at this time due to the energization of the checking latch (Fig. 49), comprising AND circuit 3720, OR circuit 3721, and delay circuit 3722. Operation of this 2-position switch energizes OR circuit 3729 (Fig. 53) and delay circuit 3728 in order to cause the left input of AND circuit 3741 (Fig. 58) to be UP. Coincidence is established at this AND circuit at an N.7 time determined by the Octal Commutator and a signal is delivered to the right input of AND circuit 3742 (Fig. 58) developing coincidence therein. When AND circuit 3742 is UP, a signal is developed at an N.7 time which accomplishes the transfer of the contents, in the present case the instruction word, of Register 1 into Register 2. At the same N.7 time determined by the operation of AND circuit 3741, OR circuit 3743 is operated and a signal is developed at output terminal 022.05 (Fig. 58) which places the contents of Register 1 into the 66 wire transfer bus. The signal developed at output terminal 022.05 is fed to the Register Output Switch Control.

To transfer the contents of Register 1 into the 66 wire parallel transfer bus, it is first necessary that the signal developed at output terminal 022.05 be fed to the Register Output Switch Control where it gates the contents of Register 1 through the seventeen 4-pole 3-position switches into the bus.

While the contents of Register 1 are being transferred into the bus, Register 2 is being prepared to receive this 17 digit word. Conditions are set up in Register 2 Control such that Register 2 has its old information erased as the new information from Register 1 may be entered therein.

Figure 58:
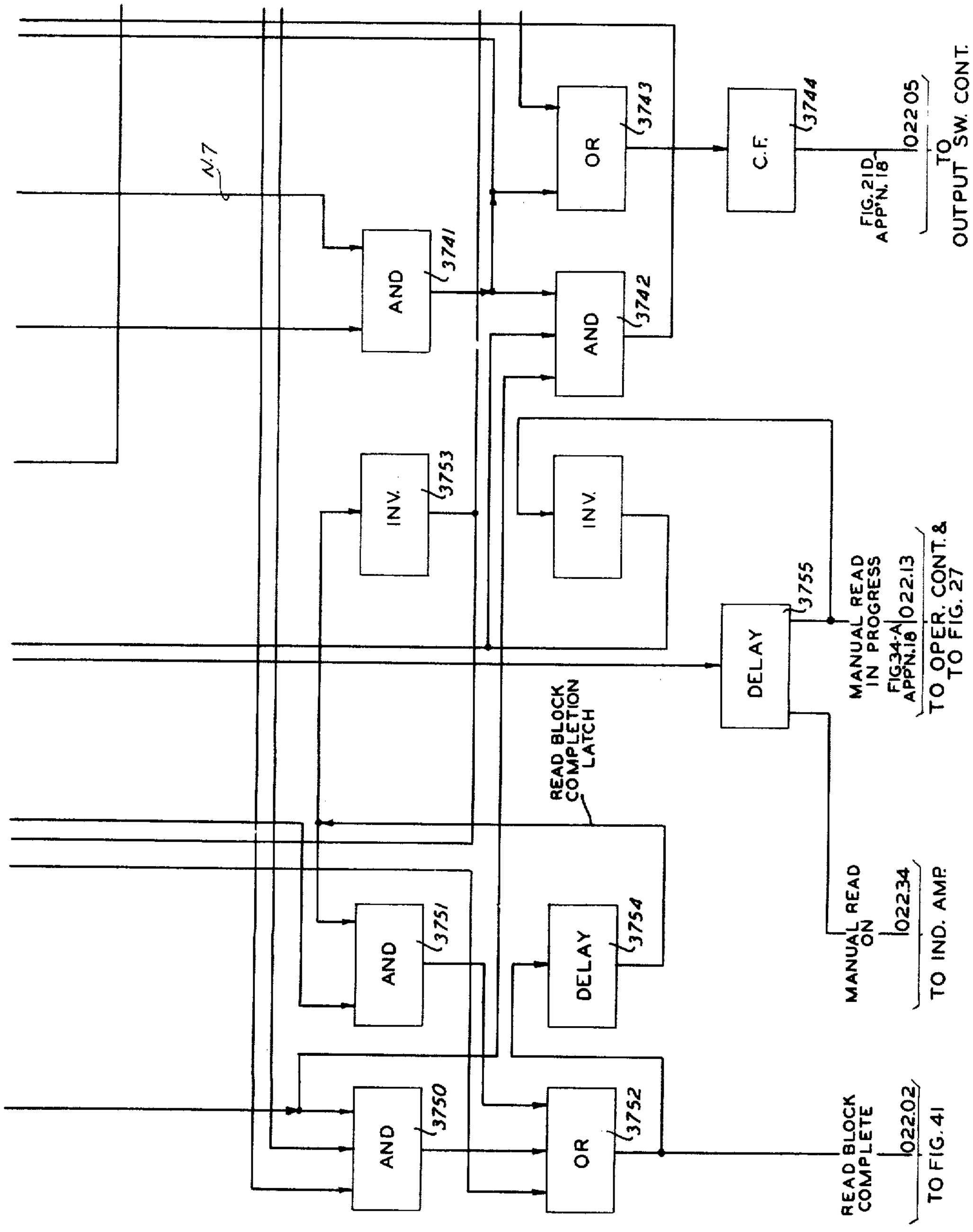

Another function performed by the latch comprising 2-position switch 3747 (Fig. 53) and delay circuit 3748 is to develop coincidence at AND circuit 3750 (Fig. 58) and trigger the completion latch for notifying the Terminate suboperation of the completion of the reading operation. The signal developed by delay circuit 3748 causes the right input terminal of AND circuit 3750 to be UP. The left input terminal of this AND circuit is UP throughout the Read Block suboperation due to the operation of the latch (Fig. 54) comprising AND circuit 3735, OR circuit 3737 and delay circuit 3738, and is DOWN only when a tape check failure, indicated by input terminal 022.20 (Fig. 50) being UP, occurs in the calculator. The N.7 signal which serves to prepare Register 2 to receive the contents of Register 1 also energizes OR circuit 3737 (Fig. 54) and triggers the above-mentioned latch. The middle input terminal is UP at an N.3 time determined by the Octal Comutator, which causes AND circuit 3750 (Fig. 58) to be UP at this N.3 time, thereby energizing OR circuit 3752 and causing a signal to be developed at output terminal 022.02 (Fig. 58). This signal is delivered to the Write Block (Fig. 41) where it energizes OR circuit 2774 and cathode follower 2775 and causes a signal to be developed at output terminal 021.02 (Fig. 41). It is this signal which is delivered to Terminate in order to initiate that suboperation.

At the time output terminal 022.02 (Fig. 58) is caused to be UP, the Read Block completion latch (Fig. 58) comprising OR circuit 3752, delay circuit 3754 and AND circuit 3751 is triggered. This permits the Read Block suboperation to perform its final function of stopping tape motion. The output of delay circuit 3754 is delivered to inverter 3753 (Fig. 58) which develops a DOWN condition at its output side and causes the right input terminal of AND circuit 3779 (Fig. 55) and AND circuit 3780 (Fig. 55) to be DOWN. If forward reading had been in process, AND circuit 3779 is caused to be DOWN. This de-energizes OR circuit 3781 and delay circuit 3784 and causes output terminal 022.21 (Fig. 55) to be DOWN. If backward reading had been in process, AND circuit 3780 is taken out of coincidence and OR circuit 3782 and delay circuit 3785 are de-energized, thereby causing output terminal 022.22 (Fig. 55) to be DOWN. The operative tape unit is then notified of the condition of either one of these output terminals and prepares to discontinue further tape operation.

Assuming that the tape unit 5 had been read in the forward direction, output terminal 022.21 (Fig. 55) is caused to go DOWN. This immediately pulls DOWN output terminal 089.05 (Fig. 16) of the Common Tape Control circuits. Reference to the Tape Unit 5 Control circuit shows that coincidence is removed from AND circuit corresponding to 4341 (Fig. 19) which causes output terminal 085.50 (Fig. 19) to go DOWN. It will be seen that when this terminal is DOWN the move line is de-energized and further tape motion is prevented.

*End-of-file mark*

It has been shown above how the Read Block suboperation can be terminated by the presence of the final end-of-block word in Register 1. However, this suboperation can also be completed by the reading of an end-of-file mark from tape. The end-of-file mark consists of an instruction word having a blank R and S Field which is flanked on both sides by a character 13. The T Field in an end-of-file mark is irrelevant. In a writing operation an end-of-file mark may be placed at the end of a desired number of word blocks or after an end-of-file label to let the operator know that further searching or verifying cannot be done on that particular tape. The end-of-file mark may be used by the programmer in various other ways. The end-of-file mark terminates Read Block suboperation in the following manner.

The presence of a character 13 in the tape buffer storage will develop coincidence at AND circuit 3653 (Fig. 47) and cause the right input terminal of AND circuit 3647 (Fig. 46) to be UP. The presence of a character 13 in position 17 (forward reading) or position 1 (backward reading) of Register 1 operates delay circuit 3638 (Fig. 45) and causes the left input terminal of AND circuit 3647 (Fig. 46) to be UP. Coincidence having been established at this AND circuit, a signal is developed at output terminal 022.40 (Fig. 46) which is delivered to Fig. 53.

It will be recalled that an end-of-file mark is written in a separate calculator suboperation cycle with the regular spacing of 1.5 inches from the previously written block. Therefore, during a regular block reading operation, the calculator suboperation cycle is terminated and tape motion stopped by the final end-of-block word. However, during a searching operation for the desired block, the final end-of-block word cannot stop tape motion. Instead, stopping is accomplished by the end-of-file mark or the end-of-tape label, if no end-of-file mark is present. The operator or programmer may find it convenient to place an end-of-file mark on tape to indicate one end of the written portion. Therefore, in such a searching operation the end-of-file mark stops the tape operation and stalls the calculator before the end-of-tape label is detected.

The end-of-file mark serves to stall the calculator and stop tape motion but not before the 17 digit number is transferred from Register 1 to Register 2. The end-of-file mark signal at input terminal 022.40 develops coincidence at the left AND circuit of 2-position switch 3731 (Fig. 53), which energizes OR circuit 3729 and triggers a latch, comprising this OR circuit, delay circuit 3728 and AND circuit 3730. At N.7 time coincidence is developed at AND circuit 3741 (Fig. 58), as the latch mentioned above is de-energized by the same N.7 signal. The right input terminal of AND circuit 3742 is UP at N.7 time.

The left input terminal of AND circuit 3742 (Fig. 58) is also UP at this time for the following reason. The signal at input terminal 022.40 develops coincidence at AND circuit 3746 (Fig. 53) which operates a latch comprising delay circuit 3748 and 2-position switch 3747. This latch, which remains energized as long as the Read Block input latch is energized, delivers a signal to AND circuit 3742 (Fig. 58). However, the conditions for inserting the 17 digit number of the end-of-file mark from Register 1 to Register 2 are controlled by output terminal 022.05 (Fig. 58), which gates the Register 1 word into the transfer bus. This occurs by the signal from AND circuit 3741, which operates OR circuit 3743 and cathode follower 3744 (Fig. 58).

Figure 51:
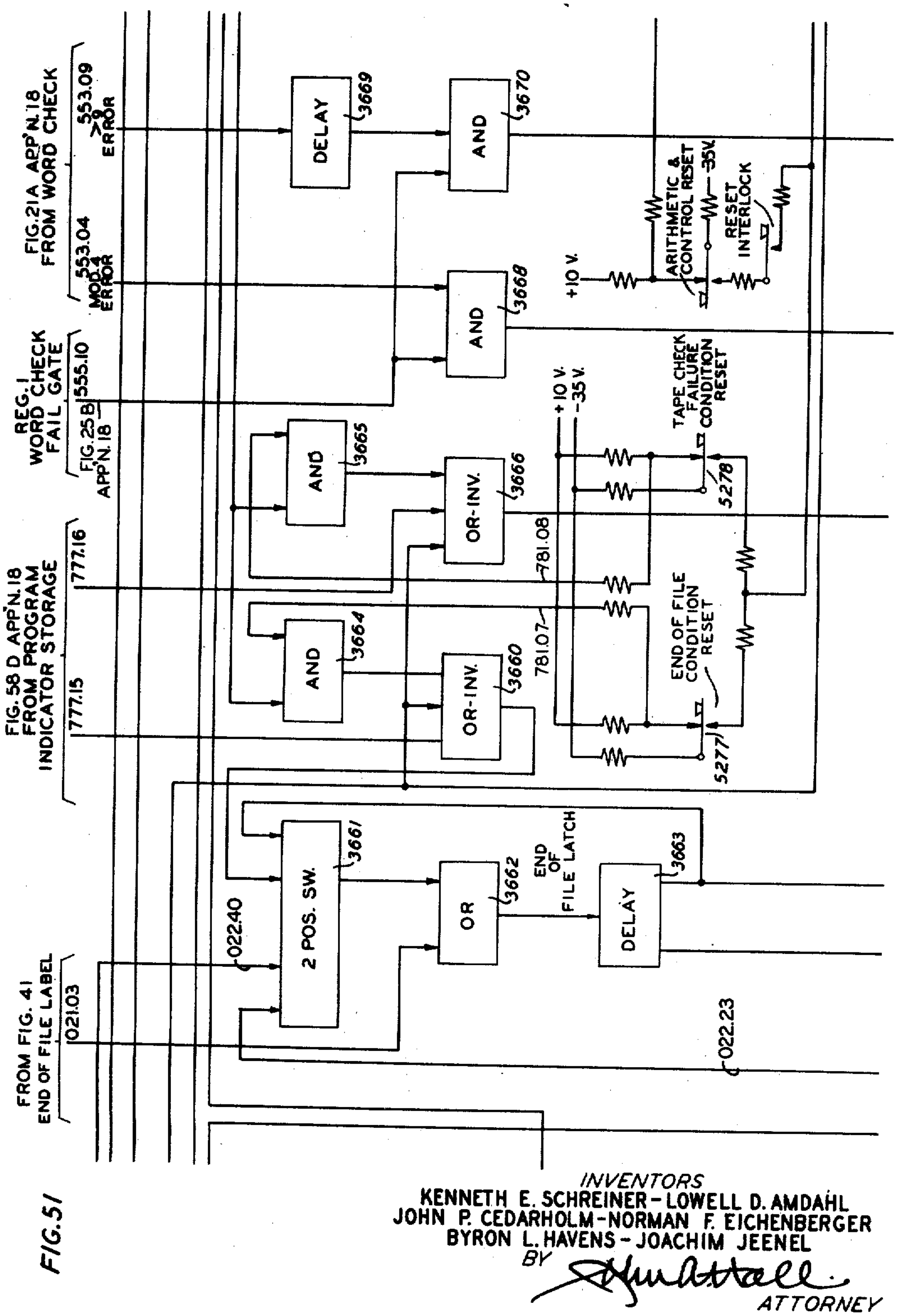

The signal developed at output terminal 022.40 (Figs. 46 and 51) is also delivered to the right input terminal of the left AND circuit of the 2-position switch 3661 (Fig. 51). The left input terminal of this AND circuit is UP throughout the manual or automatic reading operation. Coincidence at this AND circuit energizes the end-of-file latch (Fig. 51) comprising 2-position switch 3661, OR circuit 3662, and delay circuit 3663. The HOLD signal for this latch is provided by OR-inverter 3660 (Fig. 51) so long as the ARITHMETIC AND CONTROL RESET pushbutton or the END-OF-FILE RESET pushbutton on the console is not depressed and a signal is not received at input terminal 777.15 (Fig. 51) from the Program Indicator Storage circuit.

Once the end-of-file latch has been energized a sustained signal is developed at output terminal 022.33 (Fig. 56) which illuminates the end-of-file indicator and another signal is developed at output terminal 022.04 (Fig. 56) which may prevent the Read Block from initiating the Terminate suboperation and stall the calculator. The signal at output terminal 022.04 is fed to the Program Indicator Storage circuit and the Check Stop Control circuit. If the END OF FILE CONDITION STOP switch on the console is OFF, the calculator is stalled, but if this switch is turned ON, the calculator is permitted to finish its cycle and accomplish a conditional transfer, provided that an operational code 67 is programmed into the Instruction Register at the start of the new calculator suboperation cycle.

The end-of-file mark stops tape motion in the same way as the end-of-block word does. The coincidence established at AND circuit 3746 (Fig. 53) of the Read Block circuit triggers a latch (Fig. 53), comprising 2-position switch 3747 and delay circuit 3748. At N.3 time coincidence is established at AND circuit 3750 (Fig. 58), which energizes the Read Block completion latch, comprising AND circuit 3751, OR circuit 3752 and delay circuit 3754. The signal from this latch makes inverter 3753 (Fig. 53) conductive and removes coincidence from AND circuit 3779 (Fig. 55) if forward reading was in process and from AND circuit 3780 if a backward reading operation occurred. Pulling DOWN output terminal 022.21 or 022.22, (Fig. 55), as previously explained, brings the tape to a standstill.

*Verifying*

As it has been stated previously, codes 96 and 97 differ from codes 94 and 95 respectively in that the former permits the Read Block suboperation to examine and check all blocks passed while searching for the block specified by the T Field of the Instruction Register. That is to say, when either code 96 or 97 is located in the Q Field of the Instruction Register, the Read Block suboperation performs the same functions during a searching operation as it does during the actual reading operation with the exception that the data words inserted into Register 1 during a searching operation are not transferred into CRT storage. The presence of one of these two codes during automatic Reed Block operation, therefore, permits the words of all blocks passed to be read and entered into Register 1 and then presented on the 66 wire bus where a Modulo 4 and a greater-than-9 error check might be made. A word size check is also performed at the time that the word is in Register 1.

The presence of the 96 (forward reading) or a 97 (backward reading) code in the Q Field is represented by the input terminal 454.06 or input terminal 454.07 respectively incoming to Read Block (Fig. 50) being UP. Either one of these terminals causes OR circuit 3792 (Fig. 50) to be UP thereby operating delay circuit 3793. The signal from this delay circuit energizes OR circuit 3709 (Fig. 48) and brings the left input terminal of AND circuit 3718 (Fig. 49) UP. When the initial end-of-block word (I.E.O.B.W.) is developed at input terminal 022.36 (Figs. 46 and 49), as explained previously, OR circuit 3715 (Fig. 49) is energized and the right input of AND circuit 3718 is caused to be UP. Coincidence at this AND circuit having been established, a latch (Fig. 49) is energized comprising AND circuit 3720, OR circuit 3721 and delay circuit 3722. This checking latch will continue to be energized until the final end-of-block word (F.E.O.B.W.) signal is developed at input terminal 022.35 (Figs. 46 and 49). It will be recalled that this latch is energized when the operational code is 94 of 95 only when the T Field code of the initial end-of-block word is identical to the T Field code in the Instruction Register or when the T Field of the Instruction Register is blank.

It will be recalled that signals are developed at output terminals 022.35 and 022.36 (Fig. 46), with the latter signal appearing one microsecond earlier than the former signal of the Read Block circuit when an initial end-of-block word is found to be present in Register 1. These signals are necessary to check the first initial end-of-block word after it is read from tape, as will be explained now. The undelayed signal at input terminal 022.36 energizes OR circuit 3715 (Fig. 49) and develops coincidence at AND circuit 3718 with the signal from OR circuit 3709 (Fig. 48). The signal from this AND circuit starts the checking latch (Fig. 49). One microsecond after input terminal 022.36 (Fig. 46) is UP, the right input terminal of the right AND circuit of 2-position switch 3731 (Fig. 53) is UP. At this time interval a signal appears at input terminal 022.35 (Fig. 46) which energizes OR circuit 3714 (Fig. 49) and brings the left input terminal of the right AND circuit of 2-position switch 3731 (Fig. 53) UP.

Coincidence having been established at 2-position switch 3731, a latch (Fig. 53) is triggered comprising AND circuit 3730, OR circuit 3729 and delay circuit 3728. At the next N.7 time coincidence is established at AND circuit 3741 (Fig. 58), OR circuit 3743 is energized and output terminal 022.05 (Fig. 58) goes UP. This signal serves to place the initial end-of-block word on the bus for a Modulo 4 and greater-than-9 check. The initial end-of-block word cannot be checked during an automatic operation under codes 94 and 95.

Operation of the checking latch will permit 2-position switch 3731 (Fig. 53) to be energized each time a word signal is developed at input terminal 022.37 (Figs. 46 and 49), indicating that a data word has been inserted in Register 1. Each time this 2-position switch is energized a latch (Fig. 53) comprising OR circuit 3729, delay circuit 3728 and AND circuit 3730 is energized for a period sufficient to develop coincidence at AND circuit 3741 (Fig. 58). Operation of AND circuit 3741 develops the signal at N.7 time at output terminal 022.05 (Fig. 58) which transfers the contents of Register 1 into the 66 wire transfer bus to be checked by the Word Check circuit. Entry into the tape buffer storage and Register 1, the shifting within Register 1, the entry of a character 12 into the last entry position of Register 1, and all the other operations are accomplished in the same way during the checking operation with codes 96 and 97 as with a storing operation wtih codes 94 and 95. The various types of checking accomplished by the Read Block suboperation are covered below under a separate heading.

*Manual reading*

In the event that it is not desired to read automatically under the control of the Decode suboperation and the Q Field code in the Instruction Register, provision is included in Read Block for reading manually by depressing appropriate pushbuttons on the console. Only one word may be read during any manual reading operation initiated by the depression of the appropriate pushbutton on the console. Since the operation is manual, the Read Block completion latch and some of the other latches of Read Block are not operated during manual operation. This may be seen from the analysis of manual operation below.

The calculator having been energized from the console, the Tape Selection switch (Fig. 27) is set to select one of eight tape units. Once this switch has been properly set and an N.5 signal has been developed at input terminal 770.01 (Fig. 48) by the Manual Pulse Source, AND circuit 3702 (Fig. 48) is caused to be UP. The output of this AND circuit is then delivered to the left input terminal of the left AND circuit of 2-position switch 3704 and 3711 (Fig. 48). If the TAPE READ BACKWARD pushbutton has been depressed at this time, 2-position switch 3711 is operated initiating a latch comprising this swtich and delay circuit 3710. The sustained signal from this latch is delivered to OR circuit 3782 (Fig. 55) and delay circuit 3785 before reaching output terminal 022.22 (Fig. 55) for directing the selected tape to move backward.

On the other hand, if the TAPE READ FORWARD pushbutton (Fig. 48) is depressed at this time, it develops coincidence at the left AND circuit of 2-position switch 3704 (Fig. 48) which triggers the latch comprising this switch and delay circuit 3705. The signal from this latch energizes OR circuit 3781 (Fig. 55) and delay circuit 3784 and causes output terminal 022.21 (Fig. 55) to be UP. The signal at this terminal directs the selected tape unit to read the tape in the forward direction.

Assume that the TAPE READ FORWARD pushbutton (Fig. 48) has been depressed and the input latch associated with it in Read Block is energized. The output of delay circuit 3705 develops a signal at output terminal 022.21 (Fig. 55) which starts the forward reading motion of the tape. Another signal from this delay circuit energizes OR circuit 3706 (Fig. 48) and delay circuit 3755 (Fig. 58) in order to develop a sustained signal at output terminal 022.13 (Fig. 58) starting at an N.7 time.

The signal developed at output terminal 022.13 performs two important functions. In the first place it is fed to Operation Control where it pulls DOWN the ADVANCE line and thereby prevents the Read Block circuit from energizing the Terminate circuit after the desired block has been read from tape. This permits the operator to perform another manual operation or to proceed with automatic operation. The signal developed at this output terminal is also fed to the Tape Selection circuit (Fig. 27) where it develops the coincidence necessary for the selection of one of the eight tape units. The tape selected by the TAPE SELECTION switch on the console cannot be energized until the signal at output terminal 022.23 is delivered to the Tape Selection circuit. Once the particular tape unit has been manually selected and set in motion either in the forward or backward direction, according to the depression of either the TAPE READ FORWARD or TAPE READ BACKWARD pushbutton (Fig. 48) on the console, the Read Block suboperation is prepared to enter the initial end-of-block word into Register 1.

After the read-write heads detect the first written digit on tape (as already explained), a signal is developed at input terminal 880.19 (Fig. 50) which develops coincidence at AND circuit 3739 (Fig. 54) as in the case of automatic operation. Coincidence at this AND circuit sets up the conditions at the input of the tape buffer storage circuit whereby the digit sensed on tape may be entered into this storage circuit before entry into Register 1. The entire initial end-of-block word is run through the tape buffer storage into Register 1, and the shifting operation is accomplished in Register 1 as in automatic operation. A character 12 is entered into position 17 (backward reading) or position 1 (forward reading) when the first digit of the succeeding data word is read from tape before the previous data word has been transferred from Register 1 into CRT storage.

The presence of the initial end-of-block word in Register 1 develops a signal at output terminal 022.36 (Fig. 46). This signal is then delivered to OR circuit 3715 (Fig. 49) and causes the right input terminal of AND circuit 3718 (Fig. 49) to be UP. The left input of this AND circuit has been UP since the time that either the manual read forward latch (Fig. 48), comprising 2-position switch 3704 and delay circuit 3705, or the manual read backward latch (Fig. 48), comprising 2-position switch 3711 and delay circuit 3710, has been energized. When one of these latches is operated, OR circuit 3709 (Fig. 48) is energized and the left input of AND circuit 3718 (Fig. 49) is UP. Coincidence at this AND circuit triggers the checking latch (Fig. 49) comprising OR circuit 3721, delay circuit 3722, and AND circuit 3720, in disregard of the condition of the T Feld in the Instruction Register. It will be recalled that this latch is also initially energized when the operational code is 96 or 97 during an automatic operation. The checking latch mentioned above remains energized so long as one of the two manual input latches is energized or until the final end-of-block word (F.E.O.B.W.) has been read into Register 1.

As in automatic reading, energization of this latch permits 2-position switch 3731 (Fig. 53) to be operated each time a signal is developed at input terminal 022.37 (Fig. 46), indicating the presence of a data word in Register 1. Operation of this 2-position switch triggers a latch (Fig. 53) comprising OR circuit 3729, delay circuit 3728, and AND circuit 3730, which develops coincidence at AND circuit 3741 (Fig. 58) at an N.7 time and develops a signal at output terminal 022.05. It is this signal which gates the contents of Register 1 into the 66 wire bus for Modulo 4 and greater-than-9 checks by the Word Check circuit.

The Read Block suboperation is incapable of storing the contents of Register 1 in CRT during manual reading in the forward or backward direction. This is due to the fact that the storing latch (Fig. 49), comprising AND circuit 3733 and delay circuit 3734, can only be energized during the automatic reading process. Failure of this latch to be operated prevents coincidence from developing at AND circuit 3735 (Fig. 54) and output terminal 022.06 (Fig. 54) and 022.07 (Fig. 59) from ever going UP. These output terminals permit the word in Register 1 to be stored in CRT.

Thus it may be seen that the only function performed by Read Block during manual reading is that of checking the words of all the blocks read for a Modulo 4 error and a greater-than-9 error. A word size error check is also accomplished as will be subsequently explained. Since the Read Block completion latch cannot be energized during manual operation, the Read Block suboperation can only be stopped by de-energizing the manual read input latch. The operating manual read input latch may be de-energized by the depression of the ARITHMETIC AND CONTROL RESET pushbutton on the console, the depression of the SUBOPERATION AND TAPE STOP pushbutton on the console, or by reaching the final end-of-block word in a manual reading operation. The depression of one of the two pushbuttons on the console operates OR-inverter 3713 (Fig. 48) and causes the left input of AND circuit 3712 to be DOWN. This has the effect of pulling DOWN the HOLD input terminal of 2-position switches 3704 or 3711, thereby causing whichever input latch had been operating at the time to be de-energized.

Manual operation is normally stopped at the end of the word block reading operation after the final end-of-block word has been inserted in Register 1. The manual read forward and read backward latches are kept energized through coincidence at AND circuit 3712 (Fig. 48), which is maintained until either the ARITHMETIC AND CONTROL RESET pushbutton or the SUBOPERATION AND TAPE STOP pushbutton is depressed or until the final end-of-block word is read. Once the TAPE READ FORWARD or TAPE READ BACKWARD pushbutton is depressed, the first block word encountered by the read-write heads is read into tape. It is this initial end-of block word which energizes the checking latch shown in the Read Block circuit. When the final end-of-block word is read into Register 1, this checking latch is de-energized as well as the manual read latch, and the pushbutton must again be depressed if another block is to be checked.

When Read Block detects the presence of the final end-of-block word in Register 1, as indicated by a character 12 in position 1 (backward reading) or position 17 (forward reading) and a character 13 in tape buffer storage, coincidence is established at AND circuit 3646 (Fig. 46) and a final end-of-block word (F.E.O.B.W.) signal is developed at output terminal 022.39. At the same time the condition at the output of AND circuit 3646 is reversed by inverter 3645 and output terminal 022.38 is caused to be DOWN. It will be seen that when terminal 022.39 is caused to be DOWN coincidence is removed from AND circuit 3712, (Fig. 48), thereby causing the HOLD input terminal of the two manual input latches to be DOWN. Thus the operating manual operation latch is de-energized and the manual operation ceases. To initiate another manual reading operation it is essential that the TAPE READ FORWARD or TAPE READ BACKWARD pushbutton be depressed again.

It will be recalled that the calculator was previously stalled by the signal developed at output terminal 022.13 (Fig. 58). The signal at output terminal 022.34 (Fig. 58) merely illuminates the indicator light. When the operating manual read latch is DOWN, output terminal 022.13 goes DOWN, thereby permitting the ADVANCE line of the calculator to be brought UP again by the depression of appropriate pushbuttons on the console.

*Checking operations*

During an automatic reading operation the Read Block suboperation is capable of performing five checks on the word read from tape into Register 1. These checks include the block number, block size, word size, digit value, and bit count. The presence of any of these faults during an automatic operation may cause the calculator to stall or prepare the way for a conditional transfer.

When the operational code is 94 or 95 none of the five checks can be performed on a word when the block being read from tape is not the one specified by the T Field code in the Instruction Register. That is to say, when the T Field code of the instruction word in the end-of-block word is found not to correspond to the T Field code in the Instruction Register, the succeeding data words in this block word which are read and inserted into Register 1 cannot even be checked for a bit count error (Modulo 4) and a digit value error (greater-than-9). Of course, if the T Field code in the Instruction Register is blank, then the words of the next block closest to the read-write heads are checked. Of course, all five checks are made when the desired block has been located.

In the event that operational code 96 or 97 is present in the Instruction Register, all the words read from tape and entered into Register 1 are checked for Modulo 4, greater-than-9 and word size errors during the search for the desired block. All five checks are made after the desired block is located.

During forward or backward manual reading, only Modulo 4, greater-than-9 and word size error checks are made during the reading of all the words from tape.

During the searching process of automatic operation in either forward or backward reading, as each initial end-of-block word is inserted into Register 1 its T Field is automatically examined with T Field of the Instruction Register. If the T Field code in the Instruction Register is greater than zero and that code and the T Field code of the end-of-block word are not identical, the searching process continues until identical T Field codes are located.

CHECKING TABLE

| READING OPERATION | >9 Check | Mod-4 Check | Word Size Error Check | Block Size Error Check | Block No. Error Check |
|---|---|---|---|---|---|
| Automatic Cds. 94, 95 Searching. | NO | NO | NO | NO | NO. |
| Automatic Cds. 94, 95 Storing. | YES | YES | YES | YES | YES. |
| Automatic Cds. 96, 97 Searching. | YES | YES | YES | NO | NO. |
| Automatic Cds. 96, 97 Storing. | YES | YES | YES | YES | YES. |
| Manual Reading | YES | YES | YES | NO | NO. |

"Automatic (codes 94, 95) searching" refers to that part of an automatic forward or backward reading operation wherein the T Field code of each initial end-of-block word is compared with the T Field code of the Instruction Register until both codes are found to be identical. No searching is permitted where the T Field of the Instruction Register is blank, but, instead, the first block approached is read for storage and all five checks are made of the data words.

"Automatic (codes 94, 95) storing" refers to that part of an automatic forward or backward reading operation wherein the T Field codes are found to be equal or the Instruction Register T Field is blank. At this time every word must be examined before entry into CRT storage and the block checks made.

"Automatic (codes 96, 97) searching" refers to that part of an automatic forward or backward reading operation, commonly referred to as verifying, wherein each word read during the search for the desired block is checked.

"Automatic (codes 96, 97) storing" refers to that part of an automatic forward or backward reading operation wherein all the words are checked before being stored in CRT and the selected block is checked also. This occurs when the T Field codes are the same or the T Field in the Instruction Register is blank. All the words previously read have been checked.

"Manual Reading" differs from item 3 above only to the extent that verifying is done by depressing appropriate pushbuttons and not through operational codes. Since words cannot be stored during manual reading, there is no searching for a desired block and, therefore, no block checks can be made.

The block number error latch, comprising AND circuit 3689 and delay circuit 3688, and the block size error latch (Fig. 57) comprising 2-position switch 3685 and delay circuit 3686, are incapable of being energized during the searching operation. These latches can only be energized after the correct block word has been located on tape and the final end-of-block word is in Register 1.

After the correct block word has been located on tape, its data words stored in CRT and the final end-of-block word located in Register 1, the Inequality Detector determines if the T Field number in this end-of-block word is different from the T Field number in the Instruction Register. If these two numbers are not identical, a signal is developed at input terminal 455.03 (Fig. 52). At the same time the Instruction Register Zero Detector determines if the T Field of the Instruction Register is not blank, at which time it causes a signal to be developed at input terminal 453.06 (Fig. 52). Input terminal 022.28 (Fig. 58) is UP throughout the automatic reading operation provided that the specified block output latch (Fig. 53) comprising AND circuit 3724, OR circuit 3726 and delay circuit 3727 is energized. It will be recalled that this latch is operated at the time that the initial end-of-block word had been examined and its T Field code found to be identical to the T Field code of the Instruction Register.

Figure 57:
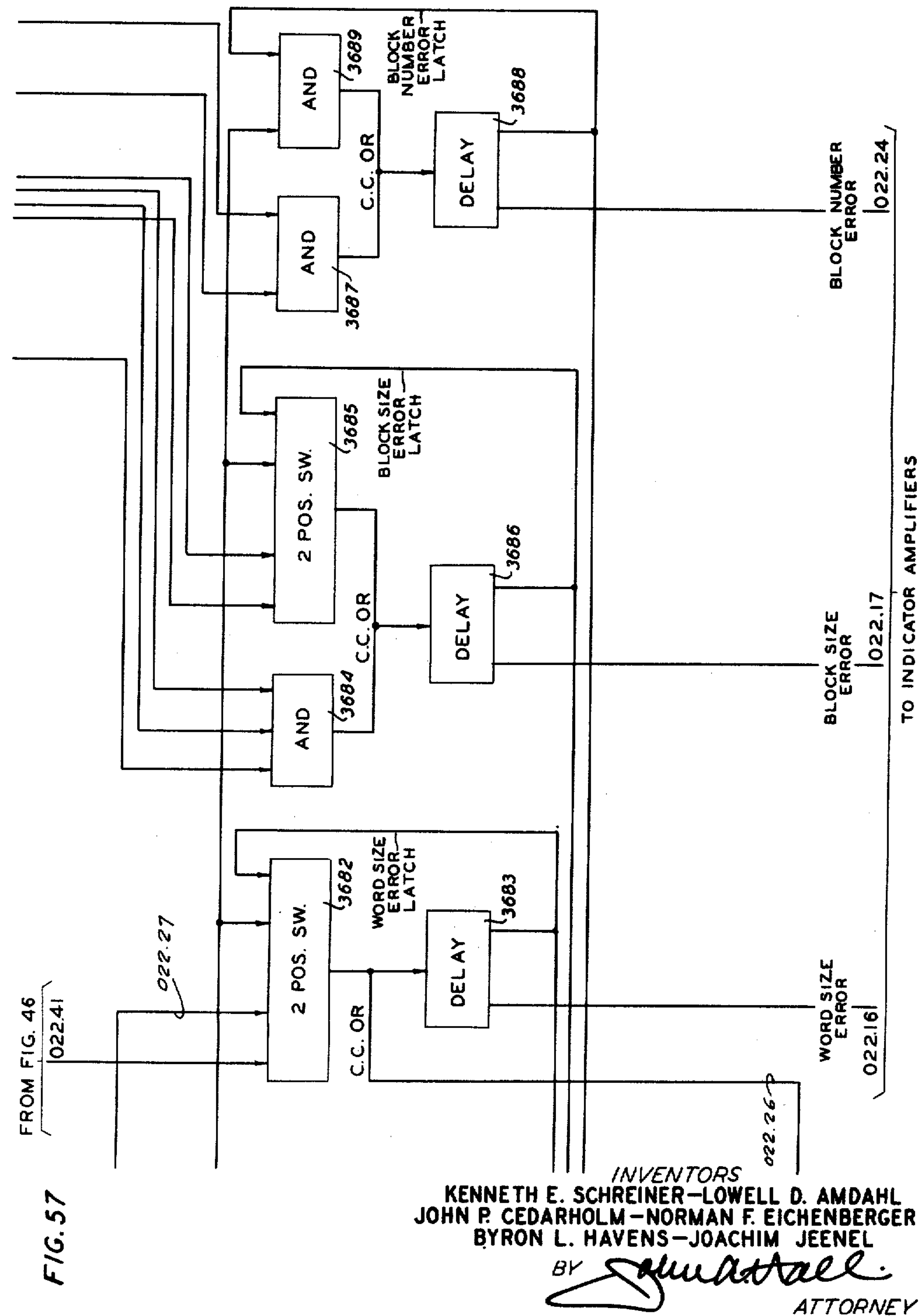

These three signals cause AND circuit 3692 (Fig. 52) to go UP. Thus when the final end-of-block word is read into Register 1 input terminal 022.39 (Fig. 46) goes UP operating delay circuit 3690 (Fig. 52) and developing coincidence at AND circuit 3687 (Fig. 57). The signal from this AND circuit triggers the block number error latch comprising AND circuit 3689 and delay circuit 3688. A sustained signal is developed at output terminal 022.19, 022.20 (Fig. 56) and 022.24 (Fig. 57). The signal at output terminal 022.24 merely illuminates the indicator light.

The signal developed at output terminal 022.19 (Fig. 56) is fed to the Check Stop Control circuit where the ADVANCE line in the calculator is pulled DOWN and the calculator is stalled. This condition is reflected in Terminate where it prevents the Read Block from energizing the Terminate suboperation at the end of the reading and storing.

In the event that the operator does not wish to stall the calculator, he may accomplish a conditional transfer with the signal at output terminal 022.19 (Fig. 56). This signal is fed to the Program Indicator Storage circuit where the reading and storing operation is permitted to be completed and a new instruction word programmed into the Instruction Register.

Assuming that the new operational code is a 68, when the calculator runs through the Terminate operation, a signal is developed to bring terminal 777.16 (Fig. 51) UP. When this terminal is UP, OR-inverter 3666 is operated and the block number error latch (Fig. 57) is de-energized. In fact, operation of the OR-inverter 3666 de-energizes any of the five error latches that might be UP.

Figure 50:
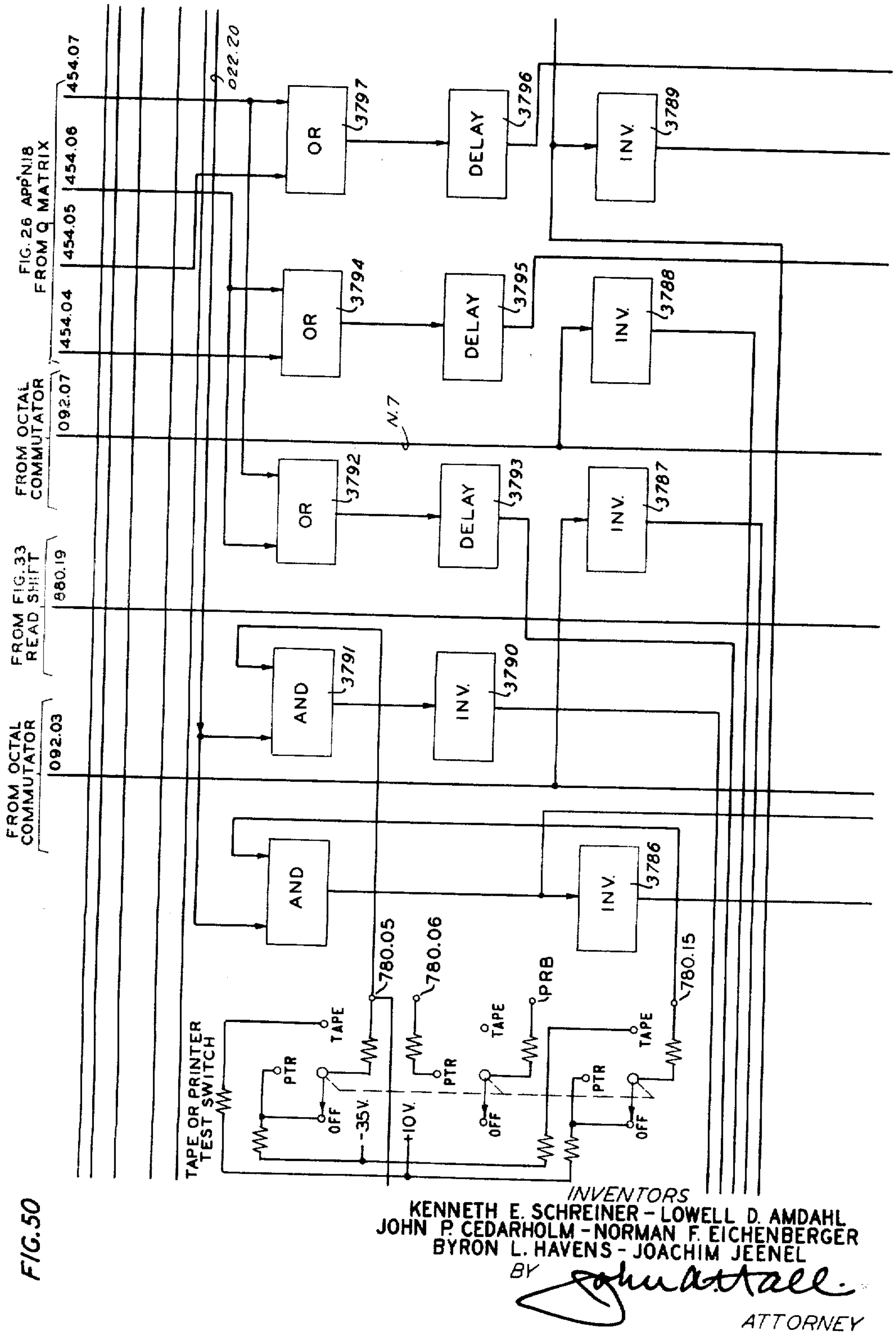

The signal developed through OR circuit 3676 (Fig. 56) at output terminal 022.20 is delivered to Fig. 50. So long as input terminal 022.20 is UP, the Read Block suboperation is incapable of performing some of its principal functions. For example, when this input terminal is UP inverter 3786 (Fig. 50) reverses this condition and removes coincidence from AND circuit 3744 (Fig. 59). When this AND circuit is DOWN, the V Field code cannot be modified and the Register 1 word cannot be entered into CRT storage. At the same time the presence of a signal at input terminal 022.20 (Fig. 56) develops coincidence at AND circuit 3791 (Fig. 50) with the signal developed at input terminal 780.05 when the TAPE-OR-PRINTER TEST switch on the console is in the TAPE position. Of course, if this switch is in the OFF or PRINTER position, coincidence cannot be developed at AND circuit 3791. However, when AND circuit 3791 is UP, inverter 3790 reverses this condition and removes coincidence from AND circuit 3745 (Fig. 54). When this AND circuit is DOWN, the Tape Buffer Storage circuit cannot accept any more digits read from tape, and Register 1 cannot be right or left-shifted. Furthermore, when the output of Inverter 3790 (Fig. 50) is DOWN, the Read Block completion latch cannot be energized.

Since the completion latch cannot be energized when a signal appears at input terminal 022.20 and the TAPE-OR-PRINTER TEST switch is in position TAPE, the tape cannot be stopped automatically but instead requires that the SUBOPERATION AND TAPE STOP switch on the console be depressed. When this pushbutton is depressed, output terminal 780.14 (Fig. 48) is UP and a signal is delivered to AND circuit 3746A (Fig. 48) where it energizes OR circuit 3752 (Fig. 58) and initiates the completion latch which stops further tape motion.

If the TAPE-OR-PRINTER TEST switch is not set at TAPE, coincidence is not established at AND circuit 3791 (Fig. 50) and the tape reading goes on, with verification if called for, as in a normal operation except that no words entered into Register 1 from tape are stored in CRT. The tape is stopped in the normal way according to whether the operation is automatic or manual.

Another check which Read Block makes is that of block size. Correct block size is indicated by the equality of the number in the V Field and the S Field in the Instruction Register. Each time that a data word is read from tape and inserted into CRT storage the V Field is modified by one and the comparison of this modified number with the S Field number goes on throughout the reading operation, it being understood that the original V Field number is the R Field number. Although the determination of the V and S Fields is being made throughout the reading operation, the block size error indication cannot be developed until the end of the reading operation.

A block size error exists when the V Field equals the S Field at the time that a data word exists in Register 1 or when the V Field number does not equal the S Field number at the time that the final end-of-block word is present in Register 1. In the first situation the equality of the V and S Fields causes input terminal 455.02 (Fig. 52) from the Inequality Detector to be DOWN and input terminal 022.37 to be UP due to the presence of a data word in Register 1. Inverter 3678 reverses the DOWN condition of input terminal 455.02 and develops coincidence at the left AND circuit of 2-position switch 3679. This triggers the latch, comprising 2-position switch 3679 and delay circuit 3630, which will stay UP so long as the signal is received at input terminal 022.25, indicating that the storing latch (Fig. 49), comprising AND circuit 3733 and delay circuit 3734, is in operation. The storing latch remains energized throughout the period that the contents of Register 1 are entered into CRT storage and continues to be energized until a tape check failure occurs or the final end-of-block word has been entered into Register 1.

The signal from delay circuit 3680 (Fig. 52) is delivered to the left AND circuit of 2-position switch 3685 (Fig. 57) where it develops coincidence and triggers the block size error latch comprising 2-position switch 3685 and delay circuit 3686. When this latch is energized, a block size error indicator is illuminated through terminal 022.17 (Fig. 57) and signals are developed at output terminals 022.19 and 022.20 (Fig. 56) which may stall the calculator and prevent further entry of digits into Register 1, as explained above.

The block size error latch can also be energized when the V and S Fields are unequal at the time that the final end-of-block word has been read from tape and inserted into Register 1. This occurs in the following manner. When the Inequality Detector determines that the V and S Fields are unequal, it delivers a signal to terminal 455.02 (Fig. 52) which operates inverter 3678 and prevents the input latch, comprising 2-position switch 3679 and delay circuit 3680, from becoming energized.

However, when this latch is not operating, inverter 3681 (Fig. 52) reverses this condition and causes the left input terminal of AND circuit 3684 (Fig. 57) to be UP. This signal at input terminal 022.25 will continue to arrive until one microsecond after the final end-of-block word signal has de-energized the storing latch (Fig. 49), comprising AND circuit 3733 and delay circuit 3734. Thus as the input terminal 022.39 is caused to be UP, coincidence is established at AND circuit 3684 (Fig. 57) which triggers the block size error latch and causes output terminals 022.17 (Fig. 57), 022.19 and 022.20 (Fig. 56) to go UP. The final end-of-block word signal at input terminal 022.39 is developed when a character 13 is discovered in tape buffer storage and a character 12 is at the output of position 1 or 17 of Register 1, as already explained.

Another check which is made during the course of the Read Block sub-operation is that on the size of the word. The word size error latch (Fig. 57), comprising 2-position switch 3682 and delay circuit 3683, which is energized either when the initial end-of-block word read tape is not observed by the Read Block circuit or when a word size error is discovered at the time that the checking latch (Fig. 49), comprising AND circuit 3720, OR circuit 3721 and delay circuit 3722, is energized.

Failure of the Read Block circuit to detect the initial end-of-block word in Register 1 is indicated by a signal at input terminal 022.26 (Fig. 57) which energizes delay circuit 3683 and triggers the word size error latch. In the case where a word size error has been detected during a checking operation, input terminals 022.41 and 022.27 are UP. This develops coincidence at the left AND circuit of 2-position switch 3682 and energizes the word size error latch.

Terminal 022.26 can only be UP when AND circuit 3725 (Fig. 53) is in coincidence. The left input of this AND circuit is UP only when OR circuit 3709 (Fig. 48) is energized, which occurs when one of the manual reading input latches is energized or during automatic operation when the operational code is 96 or 97. The presence of operational code 94 or 95 prevents coincidence at AND circuit 3725 during automatic operation. The center input terminal of AND circuit 3725 is UP only when Read Block detects the presence of a data word in Register 1 which had been read from tape.

In normal operation the right input terminal of AND circuit 3725 is DOWN due to the presence of inverter 3723 (Fig. 53), inasmuch as the checking latch (Fig. 49) comprising AND circuit 3720, OR circuit 3721 and delay circuit 3722 is energized when Read Block recognizes that the initial end-of-block word had been read from tape and inserted into Register 1, provided, of course, that the T Field codes of the initial end-of-block word and the Instruction Register are equal or the T Field of the Instruction Register is blank. However, in the event that the initial end-of-block word read from tape had not been recognized by Read Block, input terminals 022.36 and 022.35 (Figs. 46 and 49) are DOWN thereby preventing the checking latch from being energized. Failure of Read Block to recognize the initial end-of-block word and energize the checking latch before the first data word is recognized and a signal developed at input terminal 022.37 develops a signal at output terminal 022.26 which energizes the word size error latch in Fig. 57.

As it has been pointed out, the word size error latch may also be energized at the time that the checking latch is energized when an actual error is detected in the size of the word. A signal is developed at terminal 022.41 (Fig. 57) to indicate a word size error. It must be kept in mind that a correct word size is one in which a character 12 exists at the output of the tape buffer storage and at the output of position 1 or 17 depending upon whether the reading is backward or forward. It has already been shown how the Read Block suboperation detects the presence of the correct word size.

Assume that the reading is accomplished in the forward direction and that a character 12 is at the output of a tape buffer storage but not at the output of position 17 of Register 1. Absence of a character 12 at the output of position 17 is indicated by one or both terminals 441.17.4 and 441.17.8 being DOWN or terminal 441.17.1 being UP. In the first case coincidence is removed from AND circuit 3634 (Fig. 45) and in the latter case inverter 3636 is made conductive. In either event AND circuit 3637 is pulled DOWN, thereby preventing the operation of delay circuit 3639 and causing the input of inverter 3648 (Fig. 46) to be DOWN. The inverter reverses this condition and causes the left input terminal of AND circuit 3652 to be UP. The presence of a character 12 at the output of the tape buffer storage is indicated by the 4 and 8 bit output lines of delay circuits 3654 (Fig. 47) being UP. These signals cause AND circuit 3650 to be energized and the center input terminal of AND circuit 3652 (Fig. 46) to be UP. The right input terminal of this AND circuit is UP for one microsecond because of the action of inverter 3649 and delay circuit 3651. Coincidence having been established at AND circuit 3652 a one microsecond signal is developed at output terminal 022.41. This signal is then delivered to 2-position switch 3682 (Fig. 57) in order to energize the word size error latch.

Another check carried out by the Read Block suboperation is the digit value error check or better known as the greater-than-9 check. This check may be made during both the manual and automatic reading operations, unlike the block size error and the block number error checks which can only be made during the automatic reading operation. It has already been shown how a word is entered into the 66 wire parallel bus shortly after it is read serially from tape into Register 1. Each time that a word is so placed in the bus for one microsecond the Word Check circuit examines it in order to determine if any of the 17 digits of the word is greater than 9.

Whenever a greater-than 9 digit occurs in any position of the word, a signal is developed by the Word Check circuit which energizes delay circuit 3669 in Fig. 51 and causes the right input of AND circuit 3670 to be UP. The left input of this AND circuit is UP when the error signal arrives from the Word Check circuit. The left input of the left AND circuit of 2-position switch 3673 (Fig. 56) is connected through input terminal 022.23 to the automatic and manual read input latches of Read Block. One of the three latches must be energized during any reading operation. Once 2-position switch 3673 is energized, the digit value error latch, comprising this switch and delay circuit 3674, is initiated. As in the case of the above discussed error latches, operation of the digit value error output latch provides signals at output terminals 022.19 and 022.20 which may stall the calculator. The signal at output terminal 022.15 illuminates an indicator light.

Another check which may be made during manual and automatic reading operation is the bit count error check commonly known as a Modulo 4 check. As in the case of the digit value error check, that is the greater-than-9 error check, the bit count error check is made by the Word Check circuit at the time that the word read from tape into Register 1 is transfered for one microsecond into the 66 wire parallel bus for examination. Detection of a Modulo 4 error by the Word Check circuit causes a signal to be developed which causes the right input terminal of AND circuit 3668 (Fig. 51) to be UP. The left input terminal is UP when the error signal arrives from the Word Check circuit. When this AND circuit is UP, coincidence is established at the left AND circuit of 2-position switch 3671 (Fig. 56) inasmuch as the left input terminal of this AND circuit is always UP throughout the manual or automatic reading operation. Operation of 2-position switch 3671 triggers the bit count error latch comprising this switch and delay circuit 3672. As in the case of the other error latches the signals developed at output terminals 022.19 and 022.20 may prevent further Read Block and calculator operation. A signal is also developed at output terminal 022.14 which illuminates an indicator light.

Once the block number error latch, the block size error latch, the word size error latch, the digit value error latch, or the bit count error latch is energized, it will remain so until an appropriate pushbutton is depressed on the console or a signal is received from the Program Indicator Storage circuit. Normally the input to OR-inverter 3666 (Fig. 51) is DOWN and the output is UP in order to keep the particular error latch which has been energized in operation. This constitutes the HOLD line for these output latches.

The right input terminal of OR-inverter 3666 may be caused to be UP by developing coincidence at AND circuit 3665 by depressing the TAPE CHECK FAILURE CONDITION RESET pushbutton 5278 on the console. At an N.5 time determined by a signal at input terminal 770.01 produced by the Manual Pulse Source AND circuit 3665 is caused to be UP. It will be seen that when this pushbutton is depressed output terminal 781.08 is connected to a +10 volt source.

OR-inverter 3666 (Fig. 51) may also be operated by the depression of the ARITHMETIC AND CONTROL RESET pushbutton on the console. It operates the single pulse generator 2079 shown in Fig. 52 and develops an N.5 signal at output terminal 770.02.

The error output latches may also be de-energized automatically, as already explained, when the proper conditions exist in the Program Inductor Storage circuit. A signal is developed at output terminal 771.16 (Fig. 51) when the operational code is a 68, and a signal is received from the Terminate suboperation. Operational code 68 calls for transferring the contents stored at the R address to the S address and the T Field code is to be used as the address of the next instruction. Since the operational code which initiated the Read Block suboperation was a 94—97, it is necessary to remove the old instruction word and insert a new instruction word having an operational code of 68 into this register. This is due to the fact that to modify any of the fields or positions of the Instruction Register, it is necessary to insert an entirely new instruction word because the Instruction Register is incapable of right or left shifting.

Thus if manually either the TAPE CHECK FAILURE CONDITION pushbutton, the ARITHMETIC AND CONTROL RESET pushbutton or, automatically, the operational code is a 68, the OR-inserter 3666 (Fig. 51) is operated and its output side is caused to be DOWN. This causes the HOLD input terminals of the particular error latch in operation to be DOWN and removes the tape check failure indication.

In the event that an end-of-file mark is sensed during an automatic reading operation, the end-of-file latch (Fig. 51), comprising 2-position switch 3661, OR circuit 3662 and delay circuit 3663 is energized, as hereinbefore described. However, it may be pointed out that this latch may be reset by depressing the ARITHMETIC AND CONTROL RESET pushbutton, at which time the error latches are de-energized. Depression of the TAPE CHECK FAILURE CONDITION RESET latch does not de-energize the end-of-file latch.

*Rewinding*

When the operator decides that a particular tape ought to be rewound, he either programs the proper instruction to accomplish the operation automatically or he depresses the TAPE REWIND pushbutton to do the job manually. Rewinding would be necessary where the operator desired to re-use a fully written tape, since writing can only be done in the forward direction with the previously written information erased prior to the writing.

Automatically the operator can accomplish rewinding when he programs an instruction word having a 98 in its Q-Field (positions 13, 14) and having an appropriate P Field code (positions 15, 16), which selects the desired one of eight tapes, according to the setting of the 12 TAPE ADDRESS switches on the console, as already explained. Further details of the rewinding operation may be found in application 13.

Since none of the calculator suboperations are disturbed by the depression of the TAPE REWIND switch, the calculator may proceed with its operations as if the pushbutton had not been depressed. Where the rewinding operation has been accomplished automatically under control of operational code 98, the calculator proceeds to the next instruction without waiting for the tape which is to be rewound to move.

The presence of an operational code 90—97 during a rewinding operation will cause the calculator to stall until the rewinding is completed, at which time the particular tape being rewound is either read, written or deleted in the forward direction.

Forward reading of the tape is represented by output terminal 022.21 (Fig. 55) of the Read Block circuit being UP, and the writing operation is represented by output terminal 021.04 (Fig. 41) of the Write Block circuit being UP. Referring to the Common Tape Control circuit Figs. 15 and 16, it may be seen that when either of these two terminals is UP, OR circuit 4317 is energized and output terminal 089.05 goes UP. This signal is then delivered to all eight tape unit control circuits. In the hypothetical situation, since the fifth tape unit has been selected for operation, the signal is delivered to Tape Unit 5 Control circuit where it causes the left input terminal of AND circuit corresponding to 4337 (Fig. 20) to go UP. The second from the left input terminal of this AND circuit is UP so long as the rewind latch is UP. The third from the left input terminal to AND circuit 4337 is UP as soon as input terminal 080.85 is UP, indicating that the fifth tape unit has been selected in the Tape Selection circuit. Therefore, when the end-of-tape label has been sensed during a rewinding operation, coincidence is established at AND circuit corresponding to 4337 and output terminal 085.07 is caused to go UP.

It may be seen that when input terminal 085.07 is UP, OR circuit 4307 (Fig. 15) is energized and the 30 millisecond delay circuit 4318 is triggered. Delay circuit 4318 operates in such a manner that when its input terminal goes UP, the inverted output terminal goes DOWN and the normal output terminal goes UP for a 30 millisecond period. Since the normal output terminal of the delay circuit is UP, cathode follower 4301 is energized and output terminal 089.06 goes UP.

Returning to the Tape Unit 5 Control circuit, it may be seen that when input terminal 089.06 goes UP, coincidence is established at AND circuit corresponding to 4321 (Fig. 20) with the signal present at input terminal 080.85. Thus inverter corresponding to 4322 is made conductive, causing the right input terminal of AND circuit corresponding to 4324 to go DOWN and thereby de-energizing the rewind latch. One microsecond later, output terminals 085.50 and 085.30 are de-energized in order to bring tape motion to a stop, and output terminal 085.01 is brought DOWN in order to deenergize the indicator line.

It has been mentioned above that the rewind latch may be automatically energized from the calculator by the development of a signal at an output terminal of the Terminate circuit. However, the rewind latch may also be energized locally from the tape unit. It may be seen that when the LOAD pushbutton indicated in Fig. 25 as Manual Switch is depressed, output terminal 085.80 is caused to go UP. When this occurs, OR circuit corresponding to 4325 (Fig. 20) is energized and the rewind latch triggered. When the LOAD pushbutton on the tape unit is not depressed, the right input terminal of OR circuit 4325 is normally kept DOWN because it is connected through a resistor to a −35 volt source.

As output terminal 085.30 is pulled DOWN to stop the backward motion of the tape, output terminal 085.50 stays UP to accomplish the forward motion of the tape. One microsecond after the resetting signal arrives, inverter corresponding to 4327 develops a signal which causes AND circuit corresponding to 4328 to go UP at the same time that OR circuit corresponding to 4343 (Fig. 19) and output terminal 085.30 go DOWN. OR circuit corresponding to 4344 is thus continued in operation and coincidence is continued at AND circuit corresponding to 4345. This prevents output terminal 085.50 from going DOWN. As long as this output terminal is now UP, the tape will move in the forward direction. It should be noted that this applies when a tape operation is signalled while the tape unit is rewinding. Also, it should be noted that the output of the OR circuit corresponding to 4344 comes DOWN for one microsecond, causing DELAY circuit corresponding to 4332 to be triggered and this holds terminal 085.50 DOWN for 10 milliseconds while the direction of motion of the tape is being changed.

However, although the tape is moved forward during the 30 millisecond delay period, no writing can take place since the inverted output of the 30 millisecond delay circuit 4318 (Fig. 15) is DOWN for this interval, thereby preventing AND circuit 4312 from going UP and cathode follower 4313 from being operated. Following the 30 millisecond delay AND circuit 4310 will respond to the UP condition on the output of delay circuit 4318 and will trigger the 6 millisecond delay 4311 (which will hold off AND circuit 4312 for another 6 milliseconds) to in turn trigger the 2 millisecond delay 4303 (Fig. 16). Thus output terminal 089.03 is kept DOWN and writing is prevented. At the end of this time interval writing is permitted, and two milliseconds later permission is given the Write Block circuit to start gating digits into the writing circuits in the selected tape unit.

So long as coincidence cannot be established at AND circuit 4312 (Fig. 15), cathode follower 4313 will not be energized and output terminals 089.03 and 089.09 cannot go UP. When output terminal 089.09 is DOWN, the Write Block circuit is prevented from operating. Thus as soon as the backward bias coil is de-energized and the backward motion of the tape stopped, the tape is moved forward a distance approximately three times as long as a normal inter-block space before any writing takes place. Since the tape may be rewound manually by the depression of the tape unit LOAD button, it is therefore possible to rewind the tape to the load point. A more detailed discussion of the loading and unloading of the tape is available in application 13.

The blank space at the start of a tape insures that the front end of the first block is covered by the erase head when writing of the new series of blocks is again started. However, it is not necessary to position a tape at the load point prior to reading or verifying forward the first block on the tape since these operations do not affect the information stored on the tape. But since nothing is written at the front end of the tape, consequently nothing will be read. Thus there is no problem of an error being introduced if the reading operation takes place without waiting for the 30 millisecond delay 4318 to run is course.

It will be recalled from discussion elsewhere that the development of an end-of-tape signal normally brings about the stalling of the calculator. However, in the case where the end-of-tape signal is developed during a rewinding operation, the calculator is not stopped, as may be seen by referring to the Tape Unit 5 Control circuit, it being assumed that the fifth tape unit has been selected for operation. There it may be seen that the end-of-tape signal is developed at output terminal 085.00 when the rewind latch is de-energized and input terminals 089.04 and 080.85 are UP.

When the end-of-tape is first sensed and a signal developed at input terminal 085.20, coincidence cannot be established at AND circuit corresponding to 4328 (Fig. 20) because the rewind latch is still UP at this time and the left-most input terminal of AND circuit corresponding to 4328 is DOWN. At the same time the end-of-tape signal at input terminal 085.20 develops coincidence at AND circuit corresponding to 4337, assuming that a read or write instruction has been programmed into the Instruction Register and input terminal 089.05 is UP at this time. The signal at output terminal 085.07 eventually operates the 30 millisecond delay circuit 4318 (Fig. 15) and causes output terminal 089.04 to go DOWN and output terminal 089.06 to go UP.

It will be recalled that the signal at output terminal 089.06 de-energizes the rewind latch and therefore causes the left input terminal of AND circuit corresponding to 4328 (Fig. 20) to go UP one microsecond later. However, since input terminal 089.04 is DOWN at the time that input terminal 089.06 is UP, coincidence cannot be established at AND circuit 4328 and output terminal 085.00 cannot go UP. So long as AND circuit corresponding to 4328 is DOWN, output terminal 085.00 cannot go UP and an end-of-tape signal is not developed for stalling the calculator. By the time that the 30 millisecond interval has elapsed and input terminal 089.04 goes UP, the end-of-tape signal will no longer exist at input terminal 085.20.

*Tape blocking oscillator*

The tape blocking oscillator 4583 (Fig. 33) contains four circuits which are energized during the reading operation by signals developed when the read heads sense information during the time that the tape is in motion. One circuit is associated with the 1 bit read-write head, another with the 2 bit head, a third with the 4 bit head and the fourth with the 8 bit head. All four circuits are identical in structure and function. The circuit associated with the 1 bit track is shown in Fig. 61 and will be discussed as a typical operation.

Initially when a digit has been sensed, input terminal 5457 (Fig. 61) goes UP. At this time, input terminal 5456 is DOWN and, therefore, inverter 5408A is non-conductive. Since cathode follower 5408B is conductive at this time, AND circuit 5409 is operated. This raises the grid bias of cathode follower 5420A and makes the latter conductive.

As cathode follower 5420A is energized, the suppressor grid of pentode 5419 goes UP. The screen grid is kept positive continuously because of its connection through resistor 5417 to a +150 volt source. Capacitor 5418 performs a bypass function for the grid circuit.

Once each microsecond a clamp signal is developed of a very short duration less than a whole microsecond at input terminal 5429 which is coupled through capacitor 5415 to the control grid of the pentode. Resistor 5416 performs a grid leak function. With the three grids of pentode 5419 UP simultaneously, the tube is made conductive and triggers the blocking oscillator 5420B. Due to the phase inversion introduced by transformer 5421, the grid of the blocking oscillator is made more positive and the tube 5420B conducts current through the primary winding of transformer 5421, making the grid more positive. Operation of tube 5420B causes current to flow through resistor 5426 and brings output terminal 5427 UP. Capacitor 5428 is a bypass capacitor, but its value has a determining effect on the shape and size of the pulse.

When current is not flowing through the primary of transformer 5421, its secondary is kept at −17.5 volts by voltage dividing resistors 5424 and 5425. During the time that tube 5420B is conductive, capacitor 5429 is driven more and more negative, below its normal level of −17.5 volts determined by voltage dividing resistors 5424 and 5425. When tube conduction ceases, capacitor 5429 discharges exponentially until it again reaches its normal level.

*Tape pulse stretcher*

The tape pulse stretcher shown in Fig. 61 requires the action of one diode to charge up a capacitor and another diode to discharge the capacitor. During the time that the capacitor is charged, a cathode follower is energized and an output signal provided. A blocking oscillator is used to drive an inverter which accomplishes the discharge of the capacitor.

The pulse stretcher shown in the lower portion of Fig. 61 is one of four indicated as 4582 in Fig. 33. The blocking oscillator and inverter bring about the discharge of all four charging capacitors such as capacitor 5434. Only the circuit associated with the 1 bit input will be examined.

As the 1 bit output line of the tape blocking oscillator 5420B goes UP, output terminal 5427 goes UP also. This signal is coupled to the plate of diode 5433B, which now becomes conductive and makes capacitor 5434 fully charged. This has the effect of making the cathode follower circuit 5432 operative, thereby causing output terminal 5441 to go UP and to stay UP until the capacitor is discharged in the following manner.

When no signal is applied at input terminal 5427, resistor 5435 serves to keep capacitor 5434 clamped at about a −30 volt potential as determined by the voltage dividing resistors 5436 and 5437.

First, pentode 5444 is made conductive by the signals present at input terminals 5440 and 5443. The clamp signal at input terminal 5443 arrives regularly once each microsecond, see chart (Fig. 62), and has a duration less than one microsecond. The signal at input terminal 5440 arrives at a time interval determined by the associated circuitry, as shown in Tape Reading circuits.

Pentode 5444 operates in a coincidence arrangement. The microsecond that a signal arrives at input terminal 5440, all three grids of pentode 5444 become positive and the blocking oscillator circuit 5430 is operated. The signal entered at terminal 5440 is slowed by a capacitor 5455 so that coincidence might be assured when the clamp signal arrives at input terminal 5443. Coincidence is established during the slope of the signal at input terminal 5440.

The signal having a magnitude of about +50 volts and developed by the blocking oscillator in its cathode circuit, is coupled by capacitor 5446 to inverter 5445, thereby making the latter conductive. When no signal is impressed on the grid, the grid is kept more negative than the cathode due to the voltage divider network 5447 and 5450 connected to the −150 volt source. The voltage divider network 5449 and 5450 keeps the cathode bias of inverter 5445 at a steady potential of −135 volts. In a non-conductive state, the grid of inverter 5445 is connected through a parasitic suppressor 5451 and voltage dropping resistor 5447 to a −150 volt source and is therefore at a more negative potential.

As the blocking oscillator conducts, a short signal of sufficient magnitude is delivered to the grid of inverter 5445 to make the grid less negative than the cathode. This tube conducts, inverting the grid signal and making the cathode of diode 5433A less positive than the plate, thereby causing this diode to conduct and capacitor 5434 to discharge. When diode 5434 is not conducting, its cathode is maintained at about −135 volts.

As capacitor 5434 is discharged, the cathode follower circuit 5432 is made non-conductive and output terminal 5441 goes DOWN. Pulling DOWN this terminal brings inverter 5431 DOWN, whereby its output goes UP and the output 5442 goes UP. When output terminal 5441 is UP, the reverse takes place and output terminal 5442 is DOWN.

What is claimed is:

1. In an intelligence handling system wherein items of information and operational signals interspersed among said items of information are each expressed by decimal numbers in turn expressed in four place binary code, a shifting register for handling words each containing a plurality of items of information, means for simultaneously clearing out an operational code from each digital position thereof and entering a word in place thereof, means for shifting each code in said register one place and simultaneously entering an operational code in the last place thereof vacated, means for receiving and disposing of each code shifted out of said register and means responsive to the receipt and disposal of an operational code for operating said first means.

2. In an intelligence handling system wherein items of information and operational signals interspersed among said items of information are each expressed by decimal numbers in turn expressed in four place binary code, a shifting register for handling words each containing a plurality of items of information, said register having a number of digit positions equal in number to the number of items of information in a said word, means for entering an operational code in the first digital position of said register, means for shifting codes in each digital position of said register into the next higher order position thereof and simultaneously entering another like operational code in said first digital position of said register, means for receiving and disposing of each code shifted out of the last digital position of said register, means responsive to the receipt of an operational code for releasing all codes in said register and for simultaneously entering the items of information of a word therein, and means for entering and shifting operational codes in said first digital position as said word is shifted step by step out of said register.

3. In an intelligence handling system wherein items of information and operational signals interspersed among said items of information are each expressed by decimal numbers in turn expressed in four place binary codes, means for entering a word consisting of a given number of items of information in a register having an equal number of digit positions, means for periodically shifting said word one position at a time, means for writing an item of information shifted out of said register on tape, means for entering operational signals into digit positions vacated by said shifting operation, means for synthesizing certain operation signals for adding a value 1 to said signal being entered simultaneously therewith, a V Field register for temporarily holding a number constituting the address from which said word is taken, means controlled by said synthesizing means for increasing the value of said V Field number upon the entry of each new word in said first register, an instruction register holding a limiting address value and an inequality detector for determining when said increasing V Field value reaches said limiting value.

4. A data handling system for processing data words stored on a movable magnetic tape, said words arranged serially in blocks of variable lengths and each said block having an end-of-block word for purposes of identification, comprising the combination of: first register means for storing a plurality of multi-digit numbers; sensing means for reading data from said tape; second register means coupled to said sensing means for accepting and storing each word read from said tape; means responsive to a predetermined portion of said first and second register means for producing an indication when the contents thereof are identical, thereby indicating that said first register means is currently storing an end-of-block word of a predetermined block; addressable storage means connected to receive a word from said second register means; and circuit means responsive to said indication and to said first register means to effect storage of the words associated with said predetermined end-of-block word in said addressable storage means at addresses designated by some of said predetermined numbers.

5. The apparatus as claimed in claim 4 wherein said first register means includes first, second and third multi-digit numbers, said first number identifying the block to be stored by said addressable storage means; and said circuit means being responsive to said second and third numbers to store said words comprising said block at a plurality of sequential addresses inclusively designated by said second and third numbers.

6. The apparatus as claimed in claim 4 wherein each block includes an end-of-block word at both ends thereof, each end-of-block word comprising a first multi-digit number identifying said block, and second and third numbers inclusively designating the number of words in said block including, means causing said sensing means to read a plurality of blocks stored on said tape; means for verifying each block read from said tape including first means for determining if each word is of predetermined length; second means checking the value of each digit of each word; third means responsive to said indication to determine if said first number of both end-of-block words of the predetermined block are identical; fourth means coupled to said first and second register means for determining if the length of said predetermined block is properly reflected by the word stored in said first register means; and means responsive to said first, second, third and fourth means to produce an error indication including means controlling said circuit means to interrupt the storage of said predetermined block in said addressable storage means.

References Cited in the file of this patent

UNITED STATES PATENTS

| | | |
|---|---|---|
| 2,556,958 | Branson et al. | June 12, 1951 |
| 2,679,638 | Bensky | May 25, 1954 |
| 2,714,843 | Hooven | Aug. 9, 1955 |
| 2,765,038 | Rhodes | Oct. 2, 1956 |
| 2,782,398 | West | Feb. 19, 1957 |
| 2,797,862 | Andrews | July 2, 1957 |
| 2,860,325 | Welsh et al. | Nov. 11, 1958 |